(12) United States Patent
Basu et al.

(10) Patent No.: US 11,449,942 B2
(45) Date of Patent: Sep. 20, 2022

(54) DYNAMIC ASSET SECTOR SIMULATOR APPARATUSES, METHODS AND SYSTEMS

(71) Applicant: FMR LLC, Boston, MA (US)

(72) Inventors: Archan Basu, Lexington, MA (US); Anshul Jain, Providence, RI (US); Lisa J. Emsbo-Mattingly, Lexington, MA (US)

(73) Assignee: FMR LLC, Boston, MA (US)

(*) Notice: Subject to any disclaimer, the term of this patent is extended or adjusted under 35 U.S.C. 154(b) by 717 days.

(21) Appl. No.: 15/018,799

(22) Filed: Feb. 8, 2016

(65) Prior Publication Data

US 2016/0155200 A1    Jun. 2, 2016

Related U.S. Application Data

(63) Continuation-in-part of application No. 14/601,119, filed on Jan. 20, 2015, now Pat. No. 10,290,059, and
(Continued)

(51) Int. Cl.
*G06Q 40/00* (2012.01)
*G06Q 40/06* (2012.01)
(Continued)

(52) U.S. Cl.
CPC .......... *G06Q 40/06* (2013.01); *G06F 3/0482* (2013.01); *G06F 3/0484* (2013.01); *G06F 40/186* (2020.01); *G06T 11/206* (2013.01)

(58) Field of Classification Search
CPC ........................... G06Q 40/06; G06F 3/04847
(Continued)

(56) References Cited

U.S. PATENT DOCUMENTS

| 5,499,325 A | 3/1996 | Dugan, Jr. |
| 5,918,217 A | 6/1999 | Maggioncalda |

(Continued)

FOREIGN PATENT DOCUMENTS

| WO | WO-9930261 A1 * | 6/1999 | ......... G06Q 30/0601 |
| WO | WO-0221530 A1 * | 3/2002 | ........... G11B 27/329 |

(Continued)

OTHER PUBLICATIONS

Haines et al., "Evaluating Automatically Generated Personalized Interfaces on an Ergometer for People with Diverse Abilities," 30th Annual International IEEE EMBS Conference, Vancouver British Columbia, Canada, 2008 (Year: 2008).*

(Continued)

*Primary Examiner* — Alexander G Kalinowski
*Assistant Examiner* — William B. Bunker
(74) *Attorney, Agent, or Firm* — Hanchuk Kheit LLP.; Walter G. Hanchuk

(57) ABSTRACT

The Dynamic Asset Sector Simulator Apparatuses, Methods and Systems ("DASS") transforms market assumptions, constraints, portfolio construction/adjustment requests inputs via DASS components into asset allocation records, portfolio allocation and graphic presentation, seasonal portfolio investment records output. The DASS includes instructions to obtain a user indication of a portfolio simulation request including user configured market assumption parameters and retrieve a user interface template including a portfolio parameter configuration widget. The DASS's seasonal portfolio construction component may obtain economic indicator data from a data provider based on the selected collection and instantiate a regression structure employing an economic indicator. The DASS's seasonal portfolio construction component may then generate a probabilistic output indicating a probability that a current (Continued)

economic cycle phase belongs to the first economic cycle phase upon the instantiation of the regression structure. Then the DASS may provide the customized portfolio parameter configuration widget to a user device and obtain a user input of portfolio parameter via the customized portfolio parameter configuration widget.

28 Claims, 68 Drawing Sheets

Related U.S. Application Data a continuation-in-part of application No. 14/286,792, filed on May 23, 2014, now Pat. No. 10,217,167, which is a continuation of application No. 14/137,971, filed on Dec. 20, 2013, now Pat. No. 8,768,815.

(60) Provisional application No. 62/113,510, filed on Feb. 8, 2015, provisional application No. 61/929,478, filed on Jan. 20, 2014.

(51) Int. Cl.
*G06F 3/0482* (2013.01)
*G06T 11/20* (2006.01)
*G06F 3/0484* (2022.01)
*G06F 40/186* (2020.01)

(58) Field of Classification Search
IPC .................................................... G06Q 40/00
See application file for complete search history.

(56) References Cited

U.S. PATENT DOCUMENTS

| | | | |
|---|---|---|---|
| 6,275,814 B1 | 8/2001 | Giansante et al. | |
| 6,684,190 B1* | 1/2004 | Powers | G06Q 40/06 705/36 R |
| 7,050,998 B1 | 5/2006 | Kale et al. | |
| 8,429,051 B1 | 4/2013 | Samson | |
| 8,473,858 B2* | 6/2013 | Buchanan | G06Q 40/04 705/33 |
| 9,400,976 B1* | 7/2016 | Courtright | G06Q 20/102 |
| 10,825,033 B2* | 11/2020 | Rebrovick | G06Q 30/0203 |
| 2001/0009003 A1 | 7/2001 | Groat | |
| 2002/0138386 A1* | 9/2002 | Maggioncalda | G06Q 40/06 705/36 R |
| 2005/0187851 A1 | 8/2005 | Sant | |
| 2006/0020531 A1 | 1/2006 | Veeneman | |
| 2007/0005477 A1* | 1/2007 | McAtamney | G06F 3/04845 705/35 |
| 2008/0208769 A1 | 8/2008 | Beer et al. | |
| 2009/0099978 A1 | 4/2009 | Manning | |
| 2010/0153298 A1* | 6/2010 | Fulshaw | G06Q 10/10 705/36 R |
| 2011/0107259 A1* | 5/2011 | Haugh | G06F 3/0482 715/810 |
| 2012/0011458 A1* | 1/2012 | Xia | G06F 3/04847 715/771 |
| 2012/0054121 A1 | 3/2012 | Fiala et al. | |
| 2012/0101933 A1* | 4/2012 | Hanson | G06Q 30/0202 705/37 |
| 2013/0174073 A1 | 7/2013 | Ash | |
| 2013/0191141 A1* | 7/2013 | Chun | G06Q 10/1057 705/2 |
| 2015/0134565 A1* | 5/2015 | Bendel | G06Q 40/06 705/36 R |
| 2016/0171608 A1 | 6/2016 | Milner | |

FOREIGN PATENT DOCUMENTS

| | | | | |
|---|---|---|---|---|
| WO | WO-2005033910 A2 * | 4/2005 | | G06Q 40/06 |
| WO | WO-2010055331 A  * | 5/2010 | | G06F 3/0488 |
| WO | WO-2012162722 A1 * | 12/2012 | | G06Q 40/06 |

OTHER PUBLICATIONS

Seaman et al., "User Interface Evaluation and Empirically-Based Evolution of a Prototype Experience Management Tool," IEEE Transactions on Software Engineering, vol. 29, No. 9, Sep. 2009 (Year: 2009).*
"Portfolio Management Approach in Trade Credit Decision Making", Romanian Journal of Economic Forecasting, Grzegorz Michhalski, 2007, vol. 3, pp. 42-53.
Grzegorz Michalski, "Portfolio Management Approach in Trade Credit Decision Making", Roman Journal of Economic Forecasting, 2007, vol. 3, pp. 42-53, abstract and pp. 48-50.
International Search Report and Written Opinion for application No. PCT/US2014/071765, dated Apr. 27, 2015.

* cited by examiner

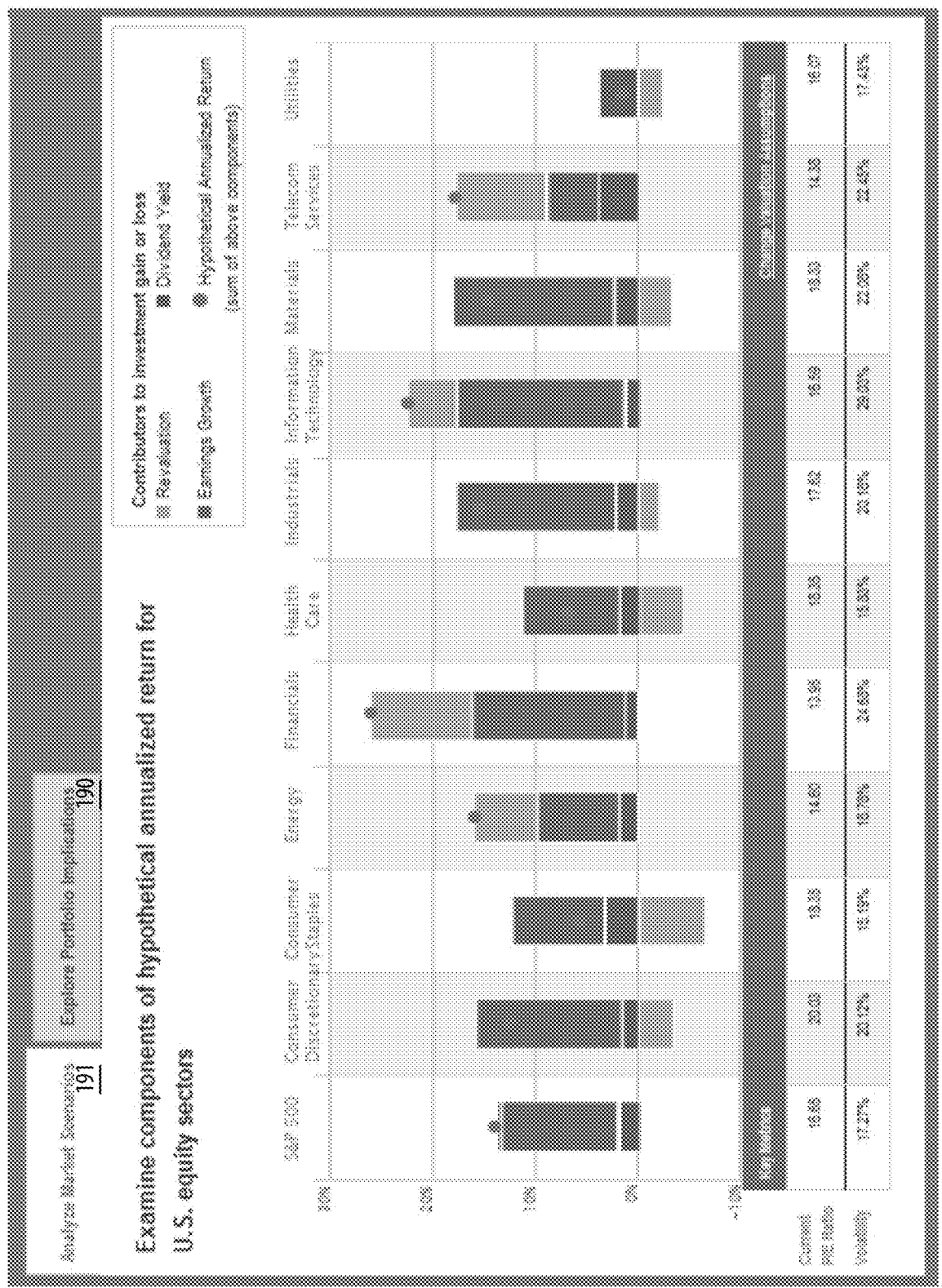
Fig.1a: DASS—Asset Sector Investigator User Interface

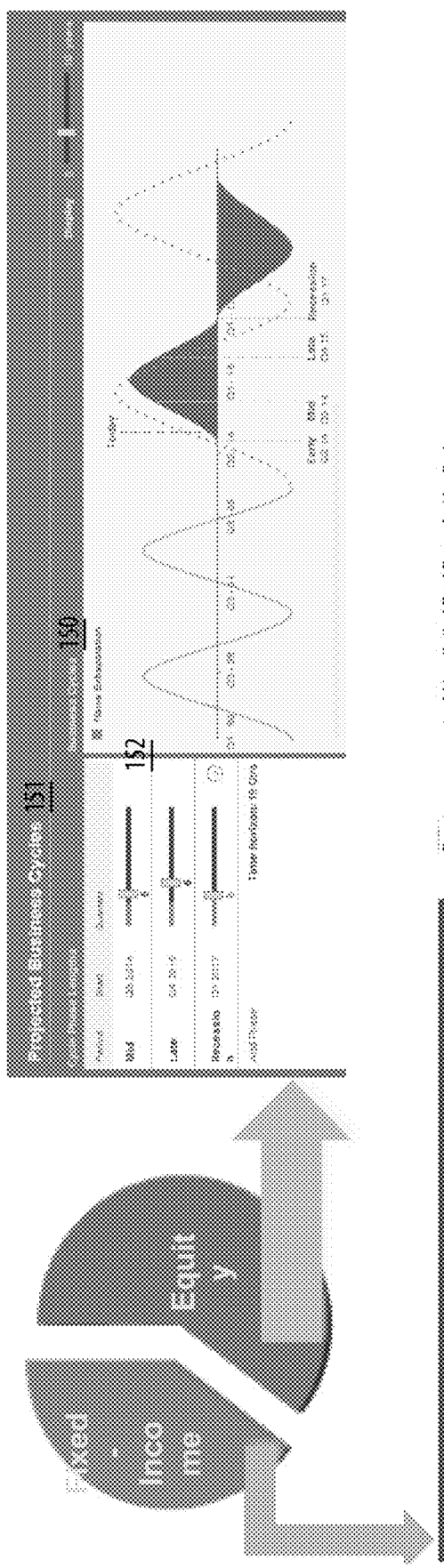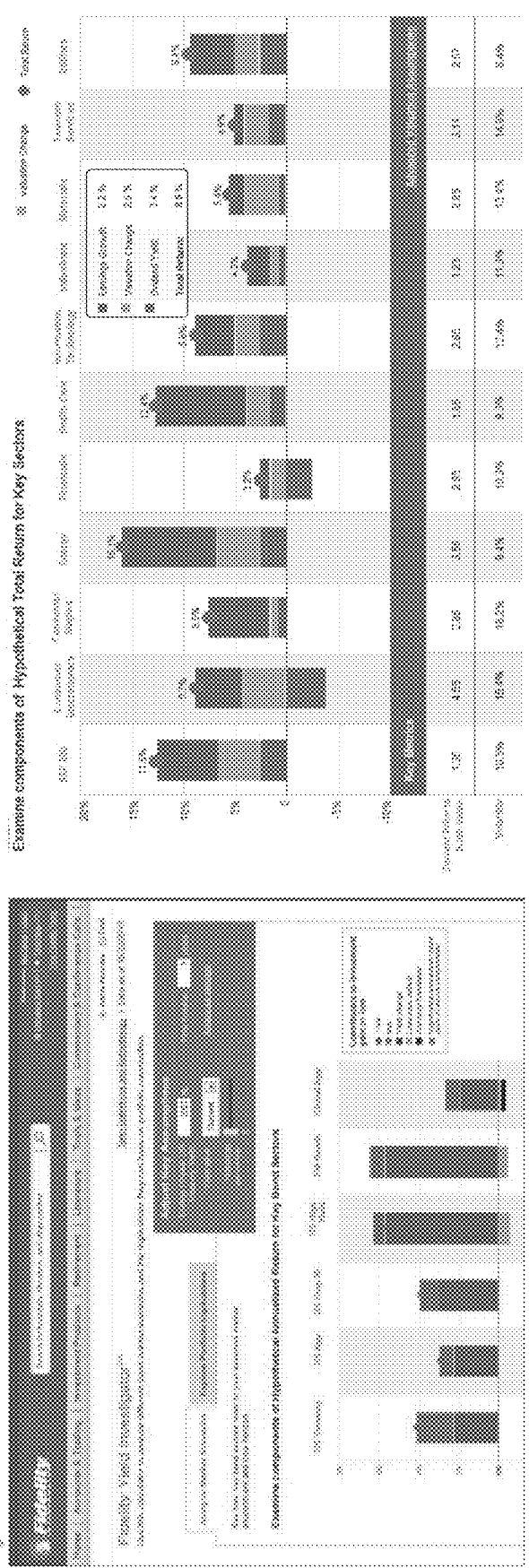
Fig. 1b: DASS—Asset Sector Investigator Use (e.g., deconstructiong advisor's model portfolio)

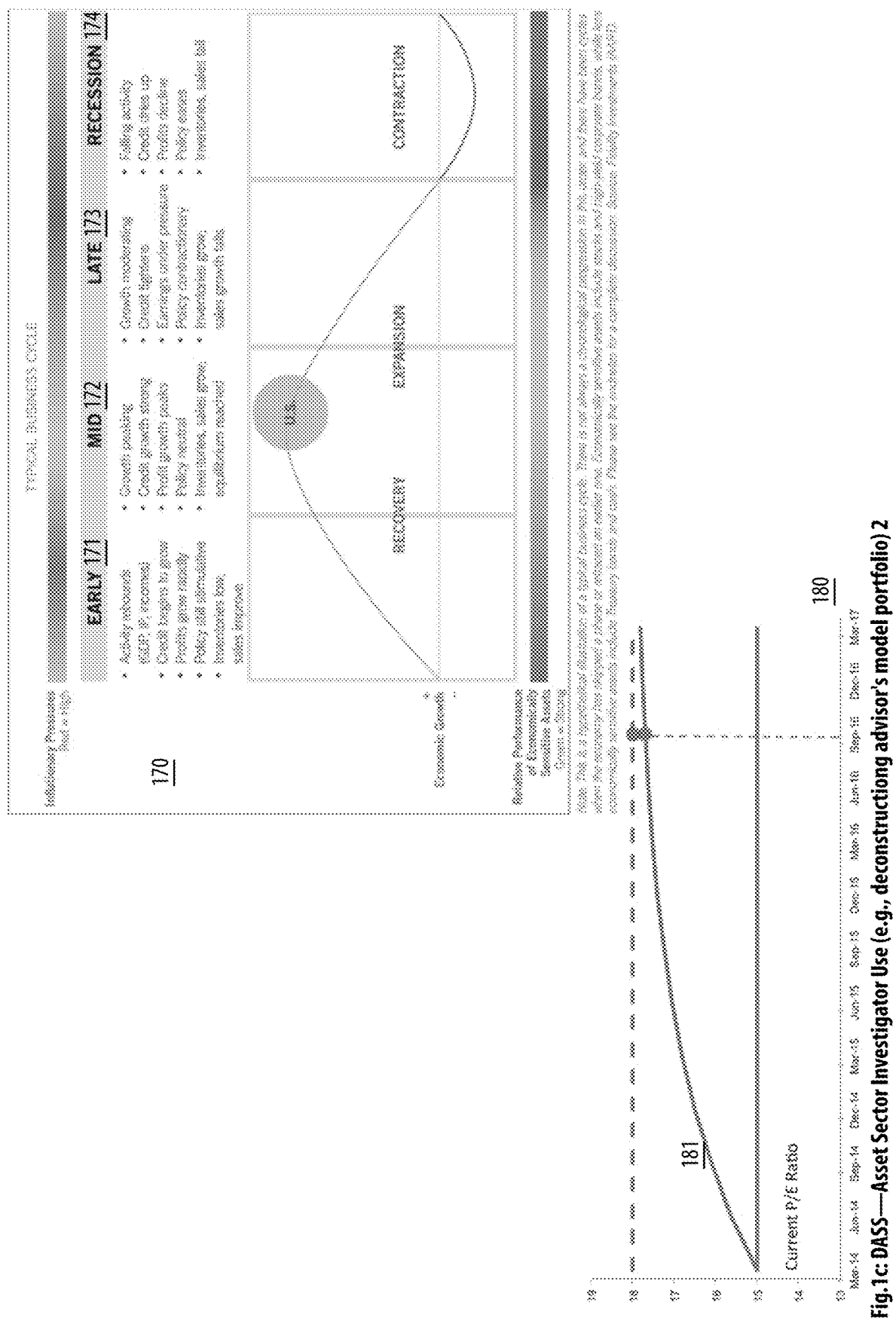
Fig.1c: DASS—Asset Sector Investigator Use (e.g., deconstructiong advisor's model portfolio) 2

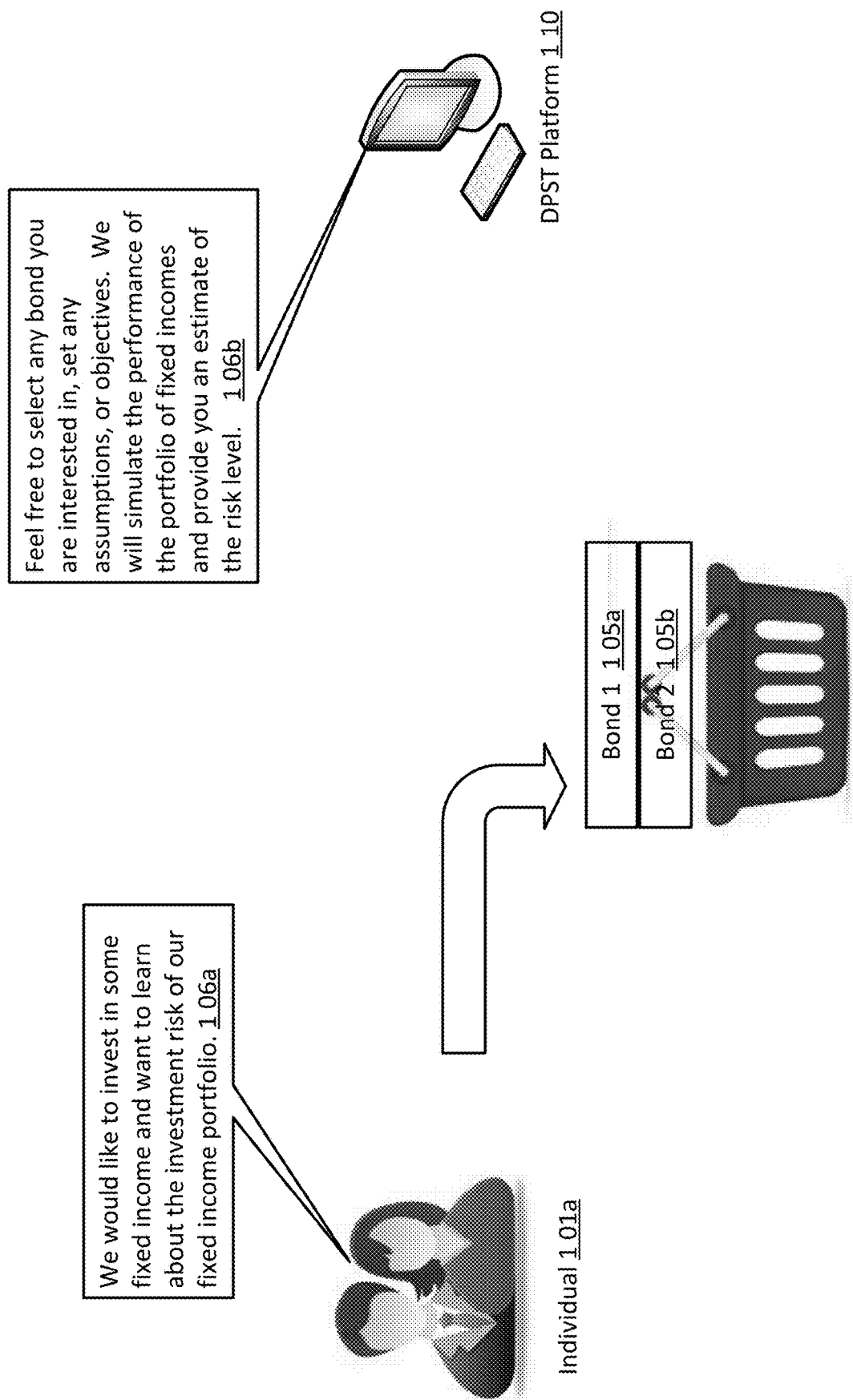
Fig. 1d: DASS—DPST Example, Fixed Income Portfolio Simulation

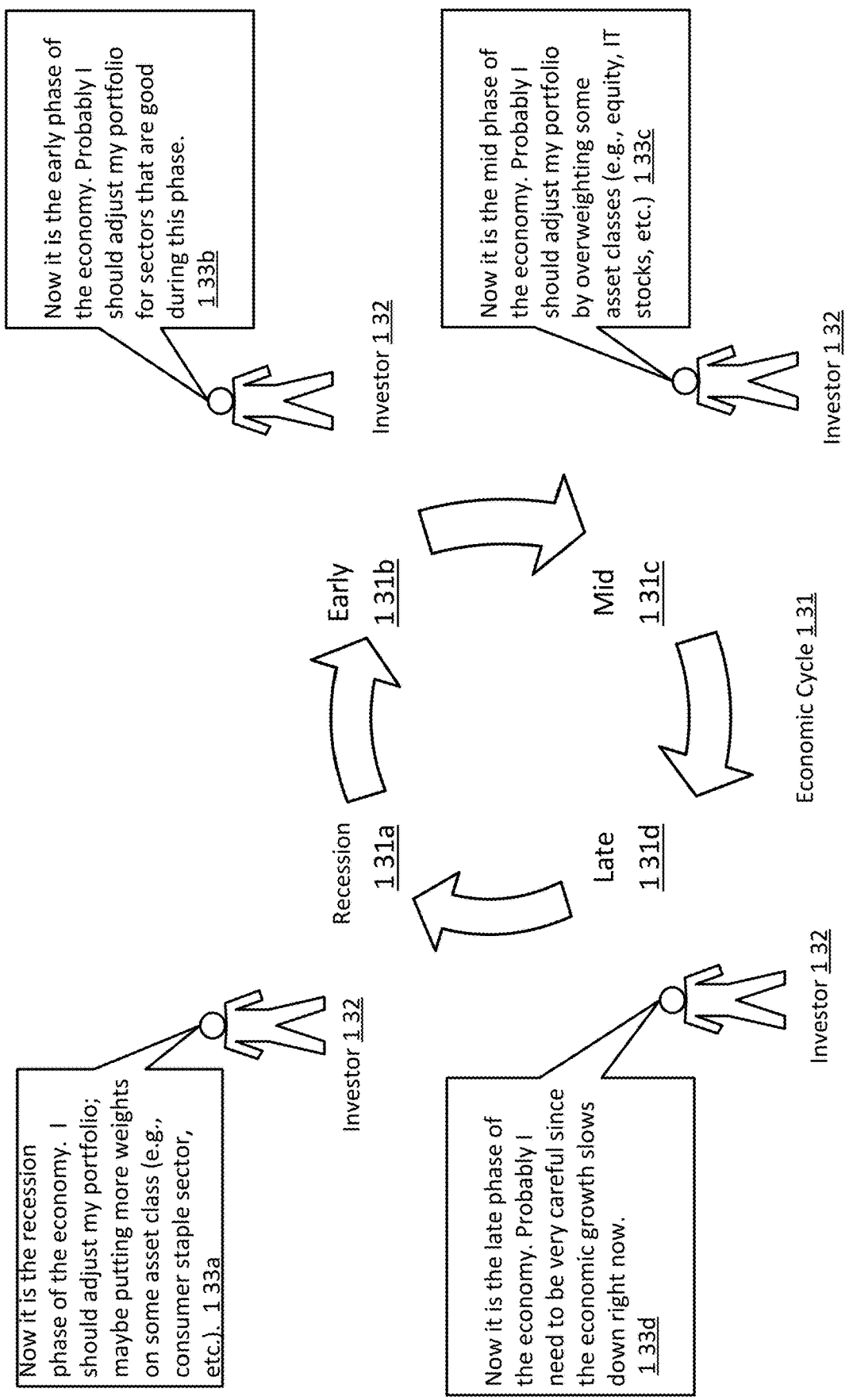
Fig.1e: DASS—SPC Example, Economic Cycle Based Investment

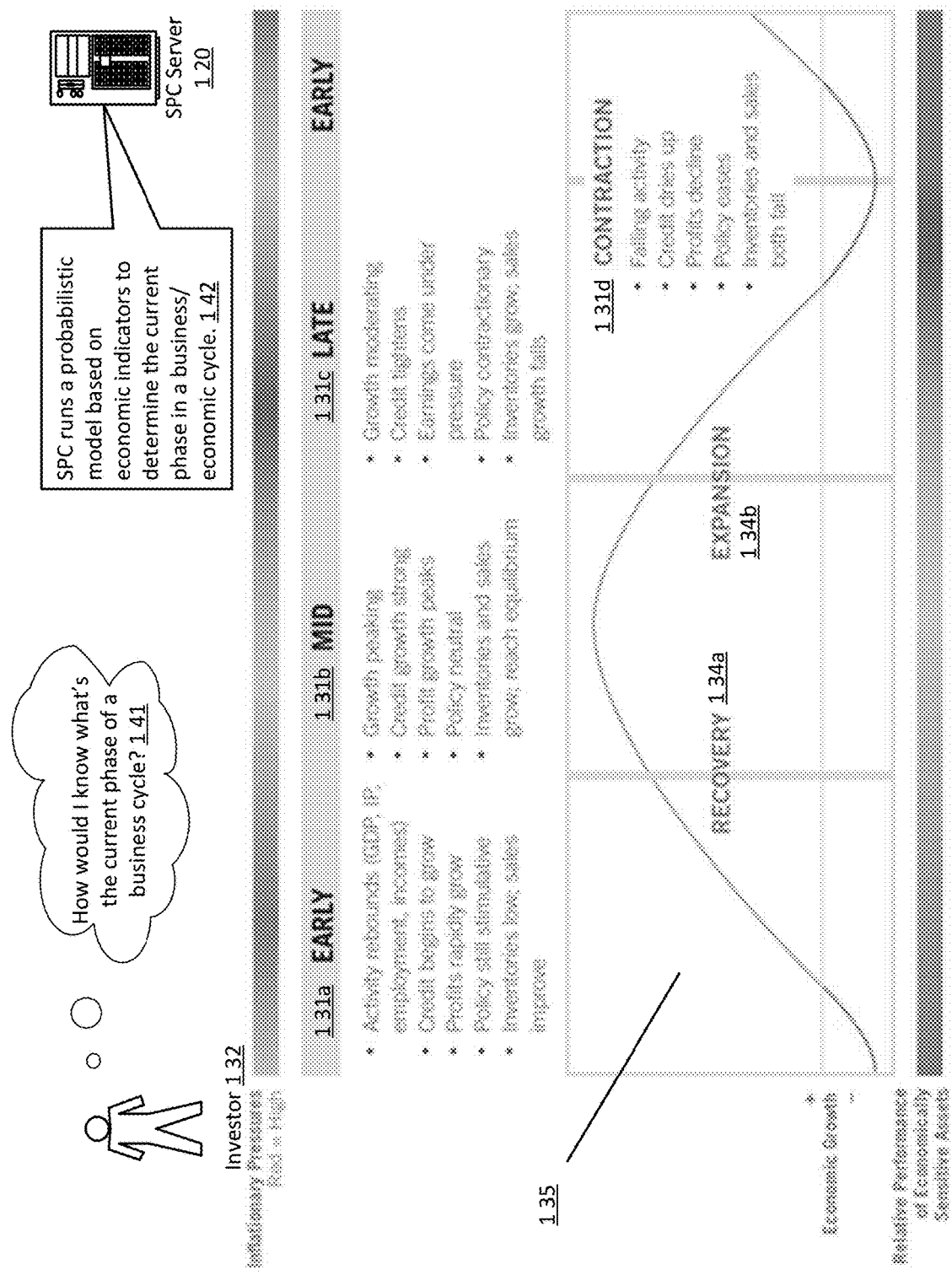
Fig.1f: DASS—SPC Example, Economic Cycle Phase Determination

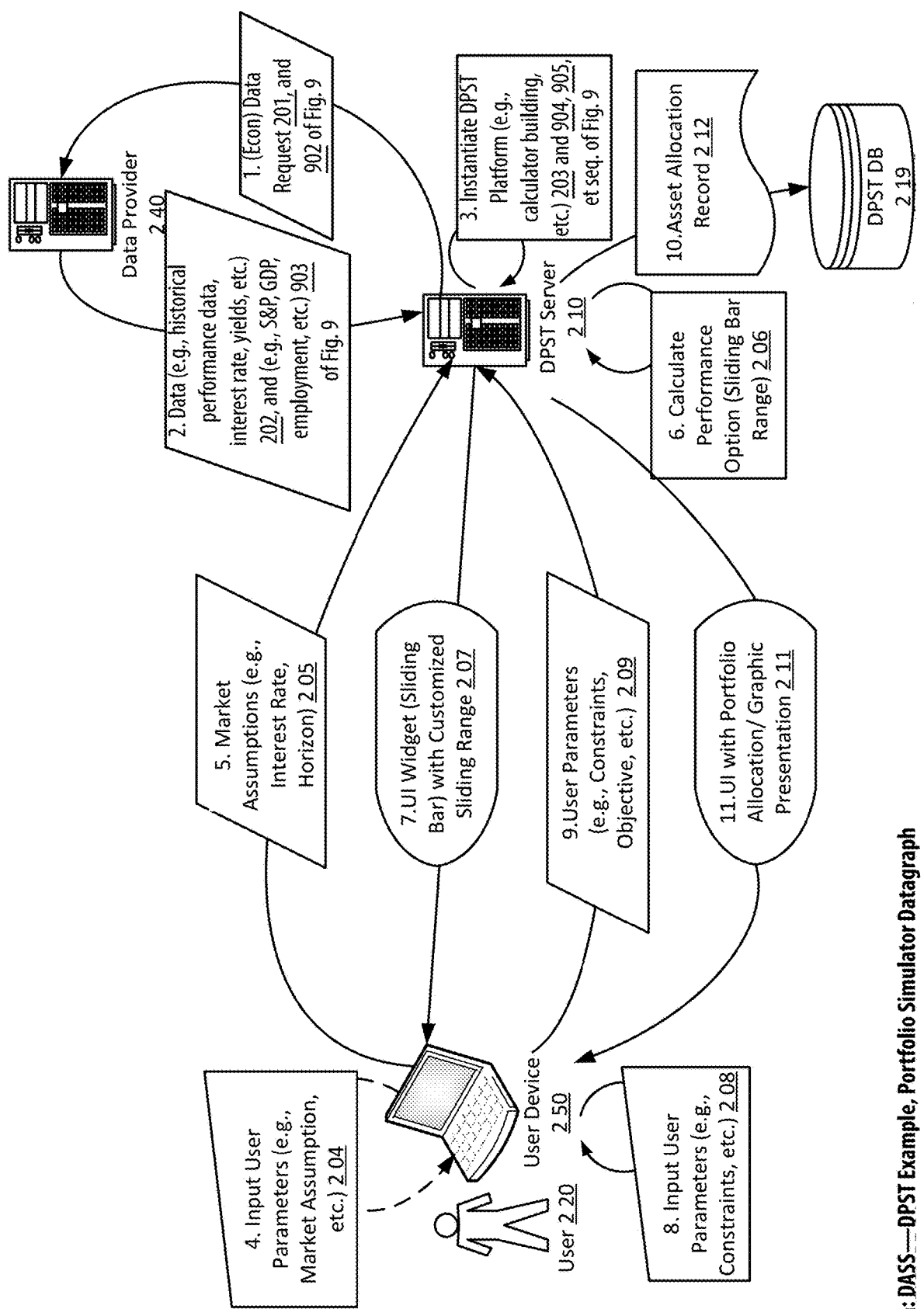
Fig.2a: DASS—DPST Example, Portfolio Simulator Datagraph

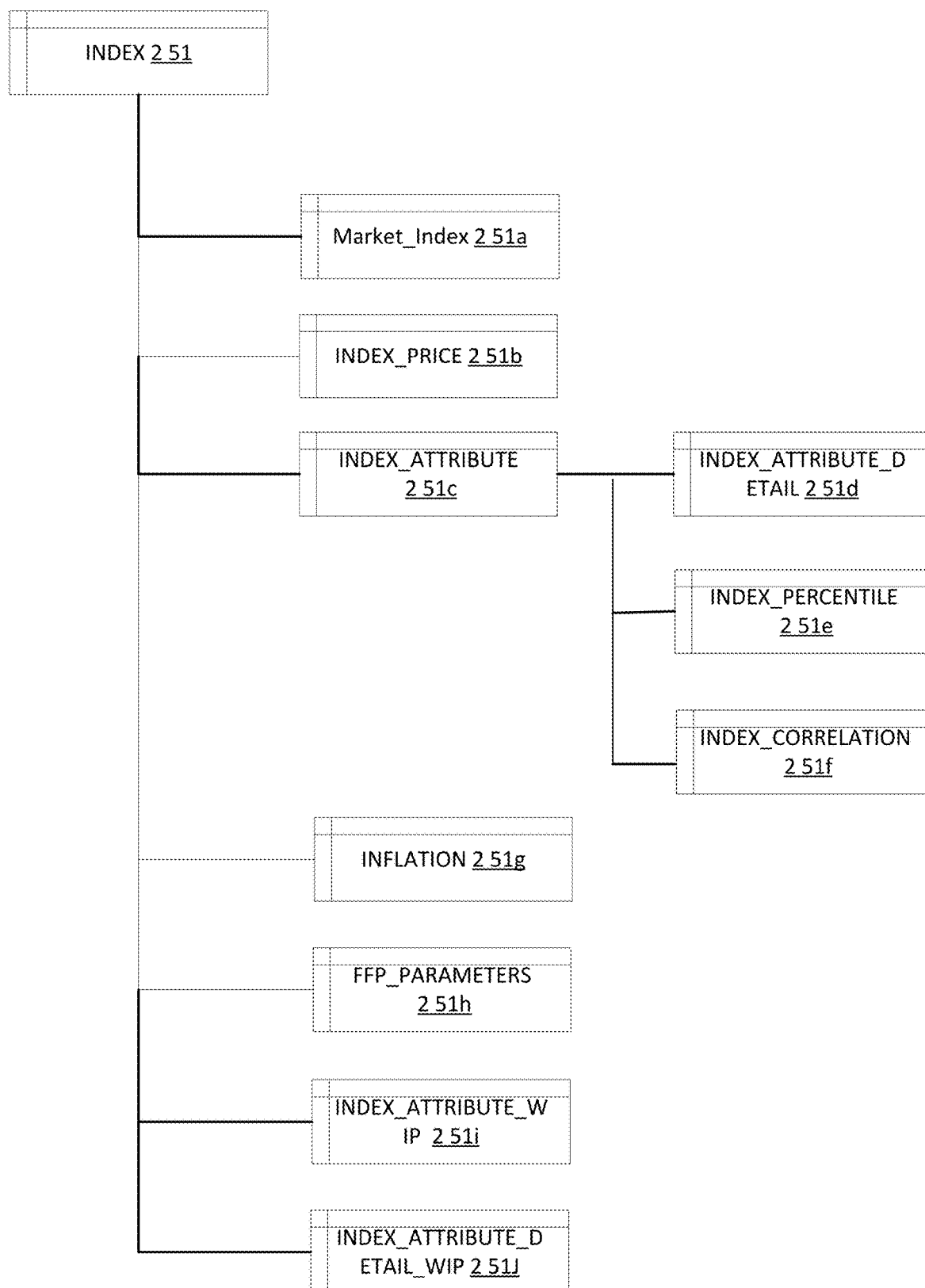
Fig.2b: DASS—DPST Example, Data Structure

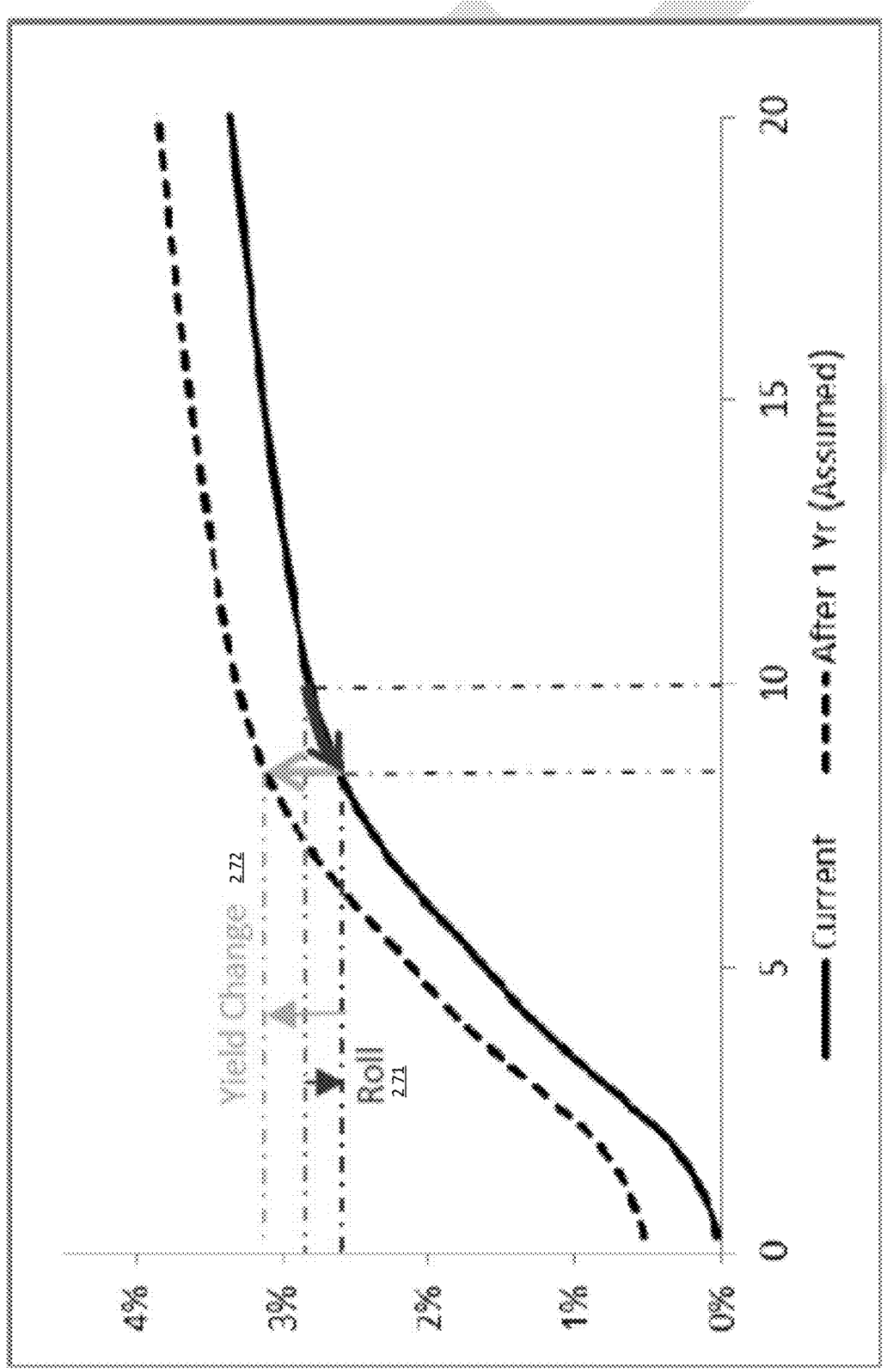
Fig.2c: DASS—DPST Example, Yield Processing Data Plot

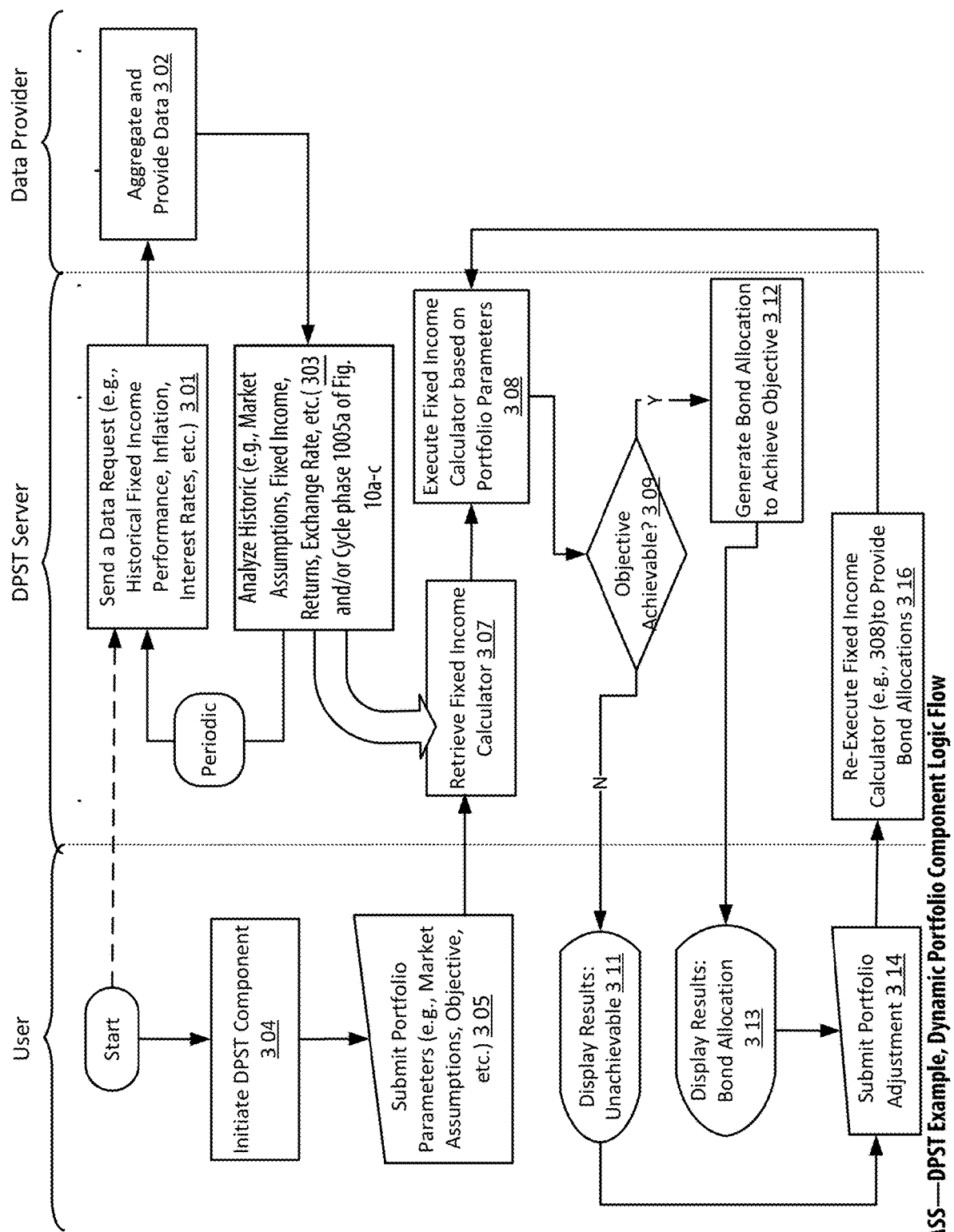
Fig.3a: DASS—DPST Example, Dynamic Portfolio Component Logic Flow

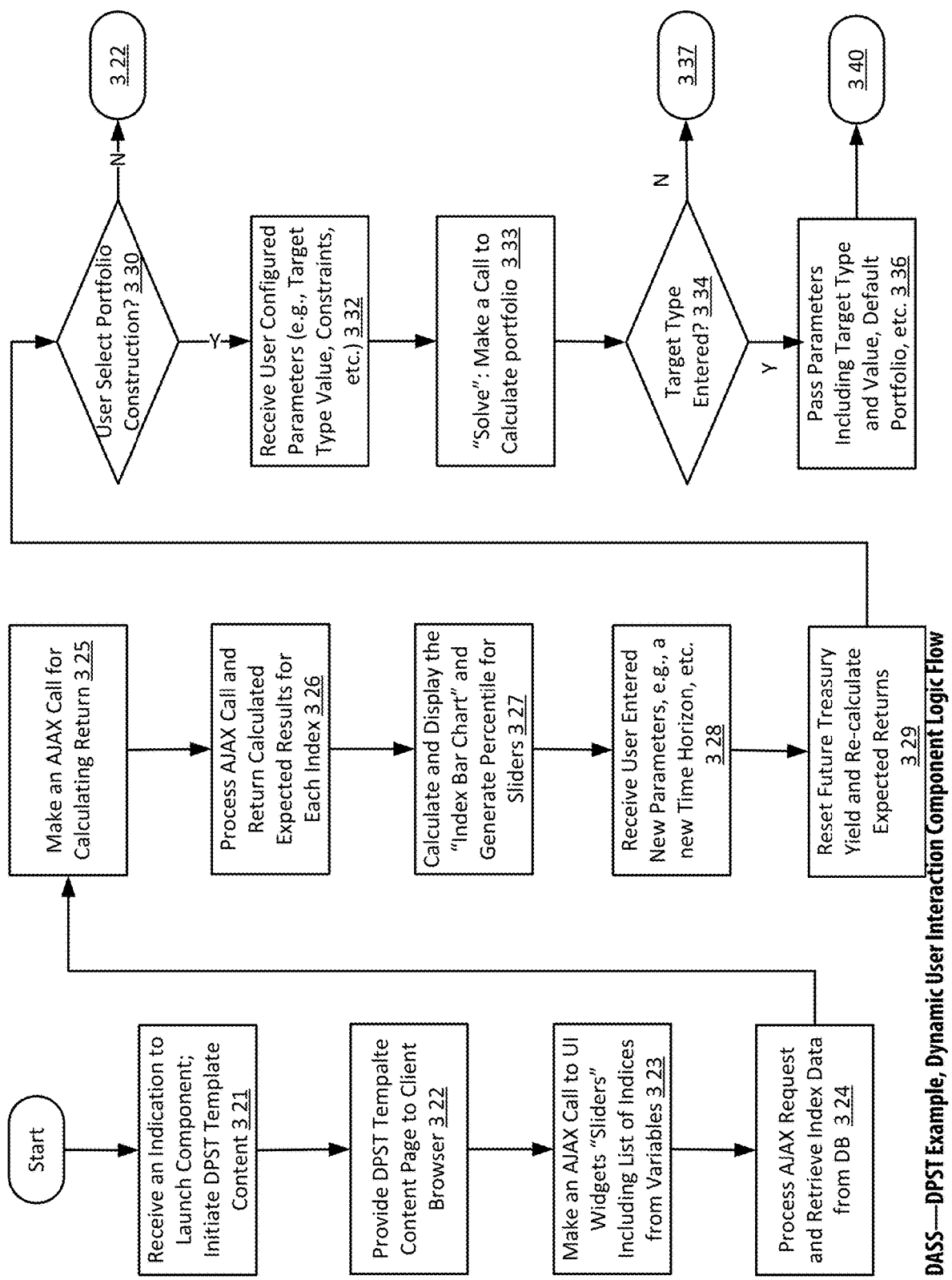
Fig.3b: DASS—DPST Example, Dynamic User Interaction Component Logic Flow

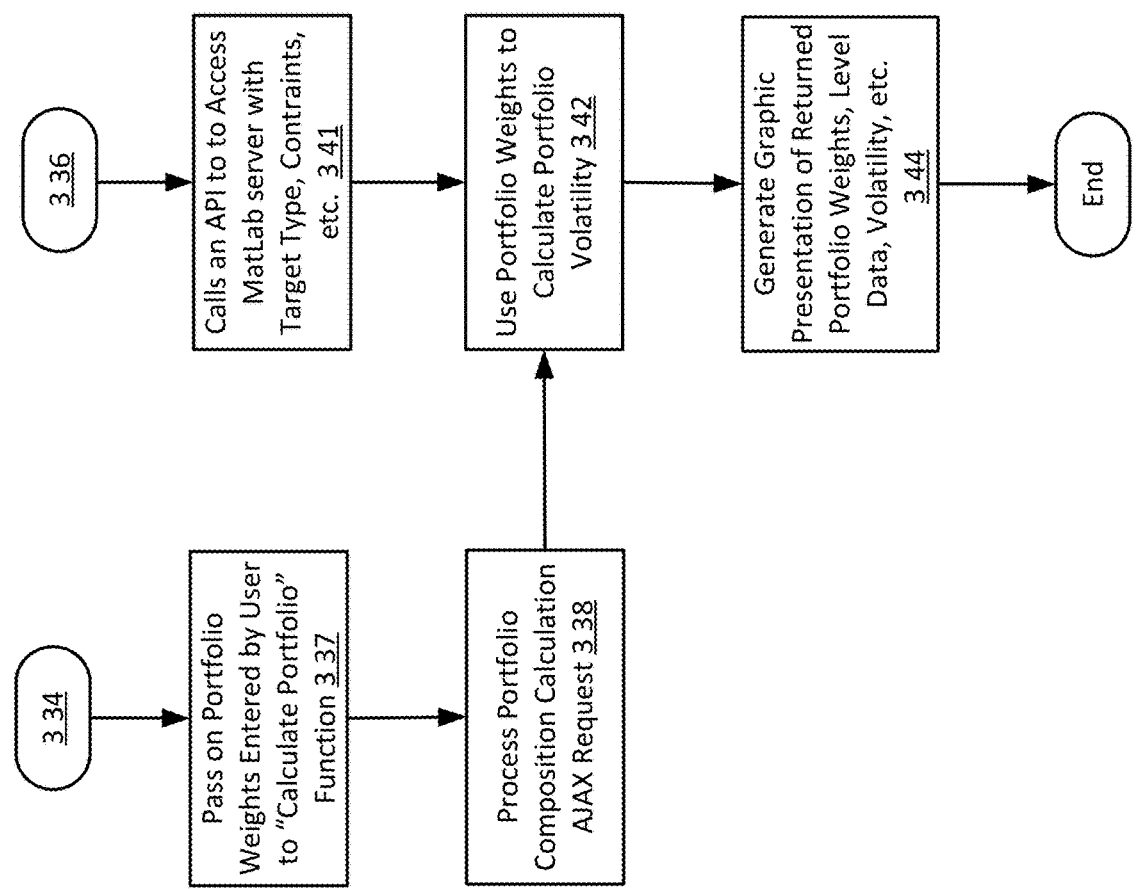
Fig.3c: DASS—DPST Example, Dynamic User Interaction Component Logic Flow

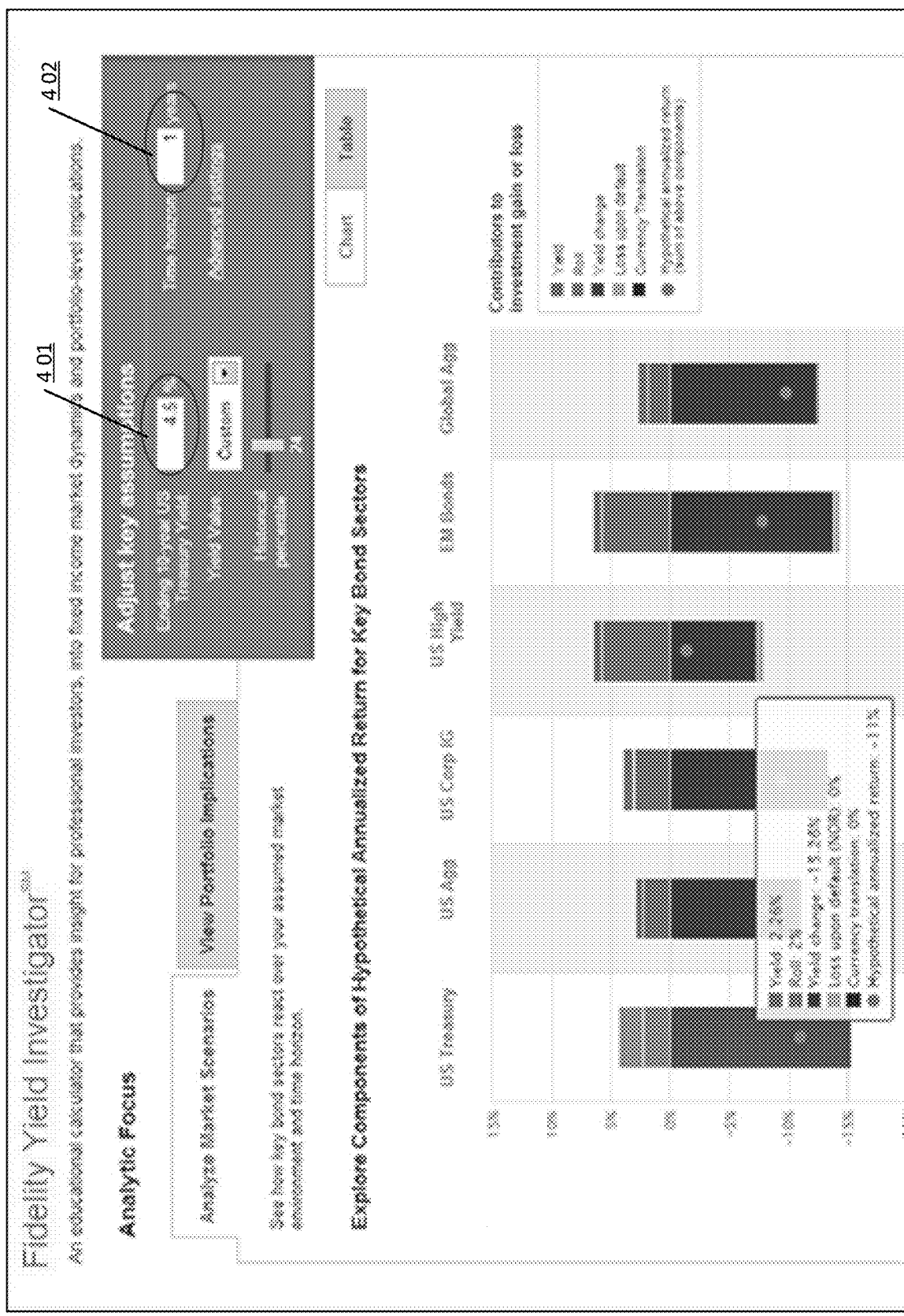
Fig.4a: DASS—DPST Example, User Interface

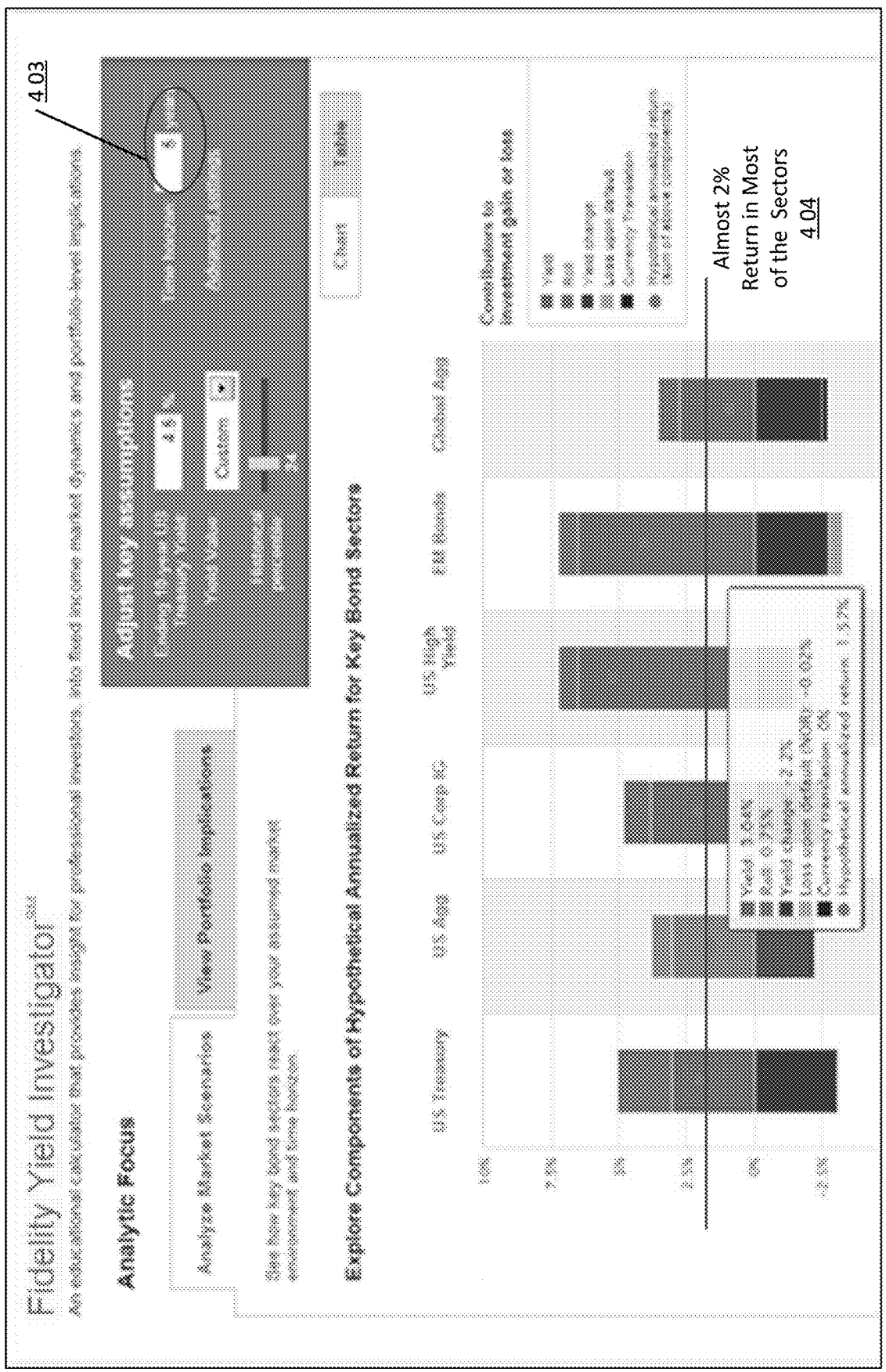
Fig.4b: DASS—DPST Example, User Interface

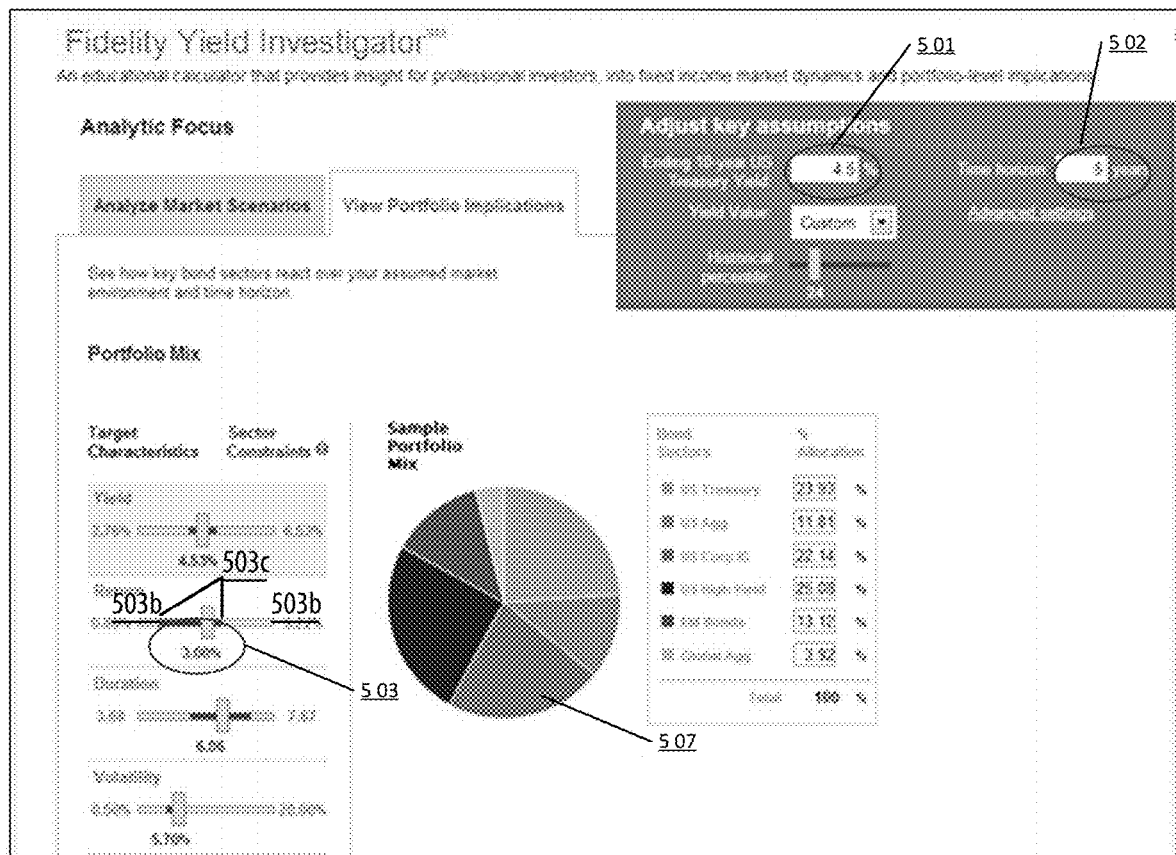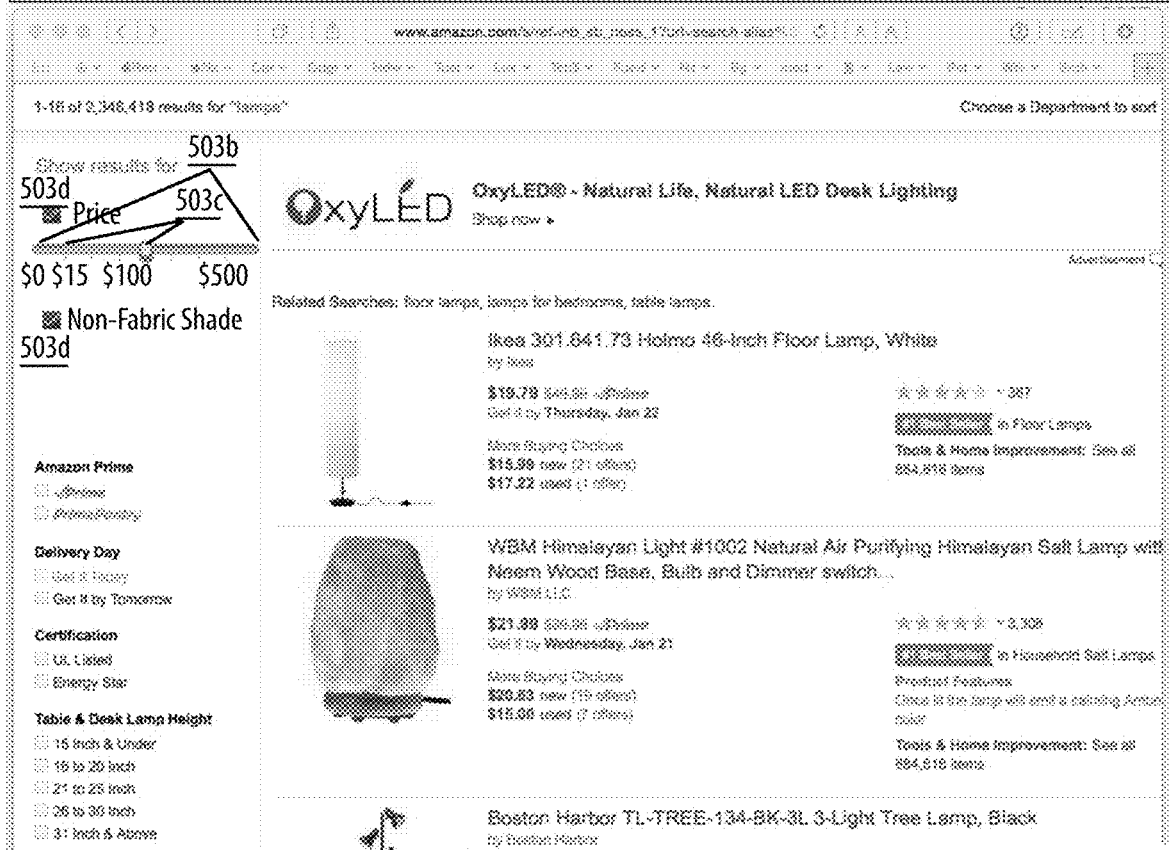
Fig.5a: DASS—DPST Example, User Interface

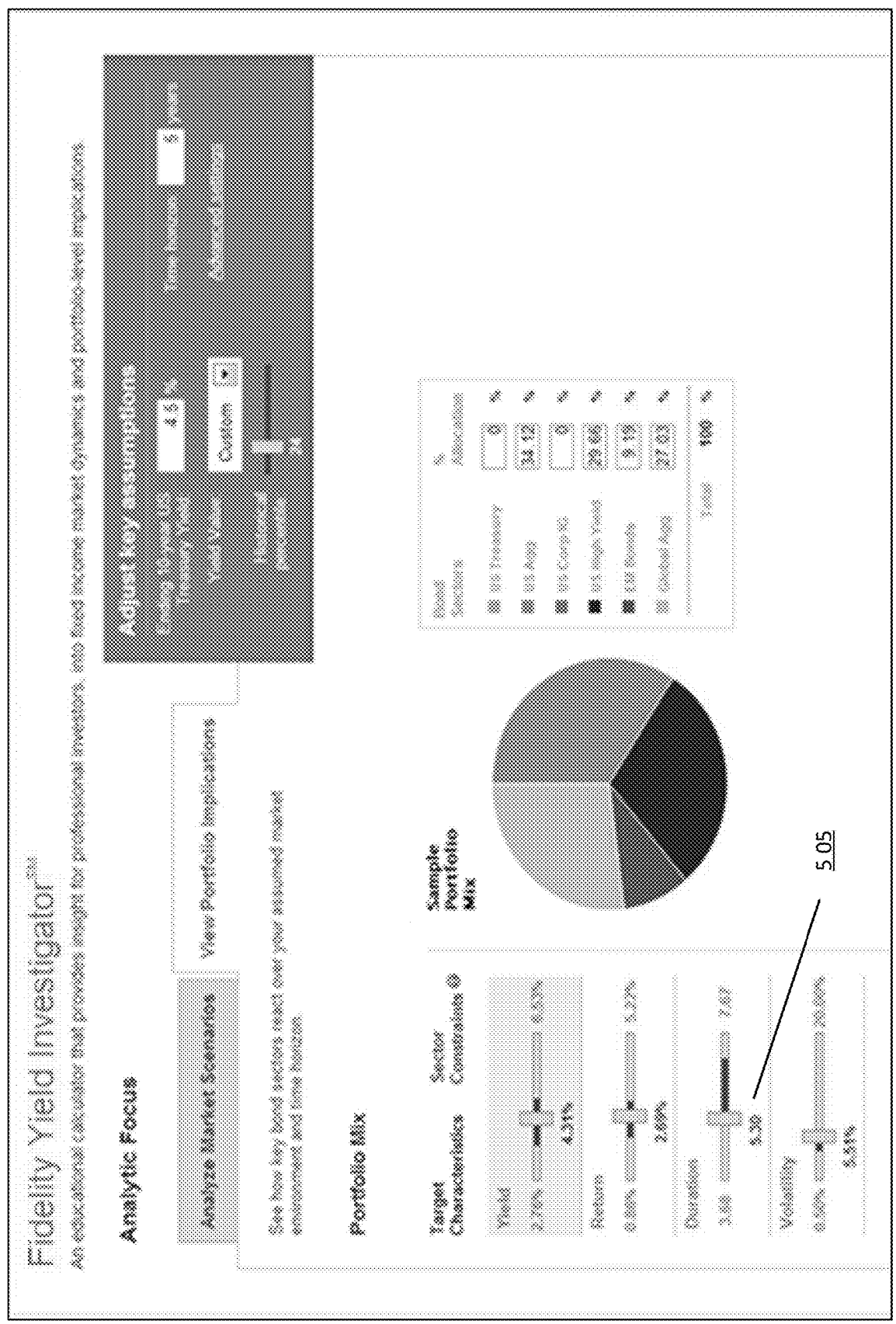
Fig.5b: DASS—DPST Example, User Interface

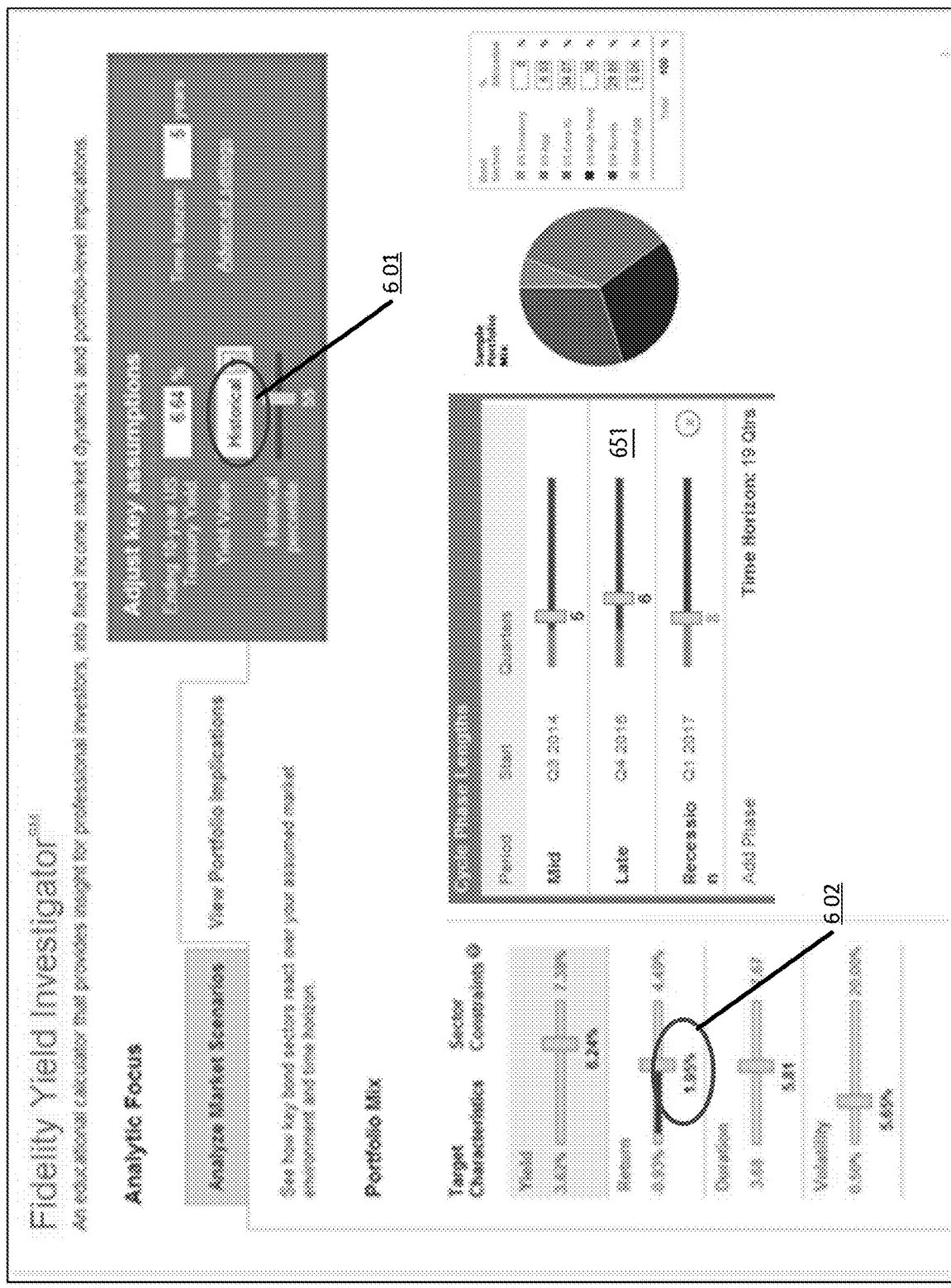
Fig.6a: DASS—DPST Example, User Interface

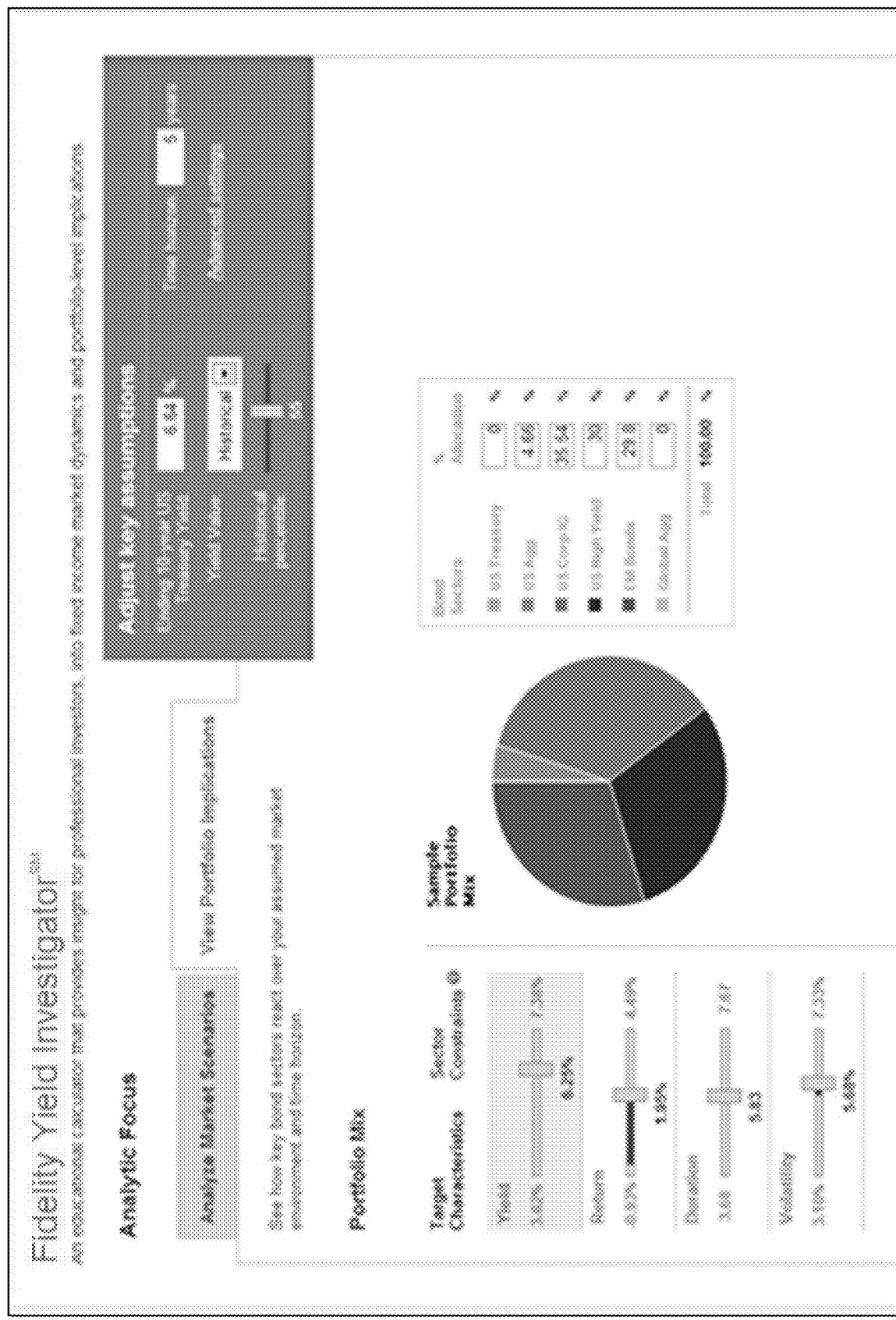
Fig. 6b: DASS—DPST Example, User Interface

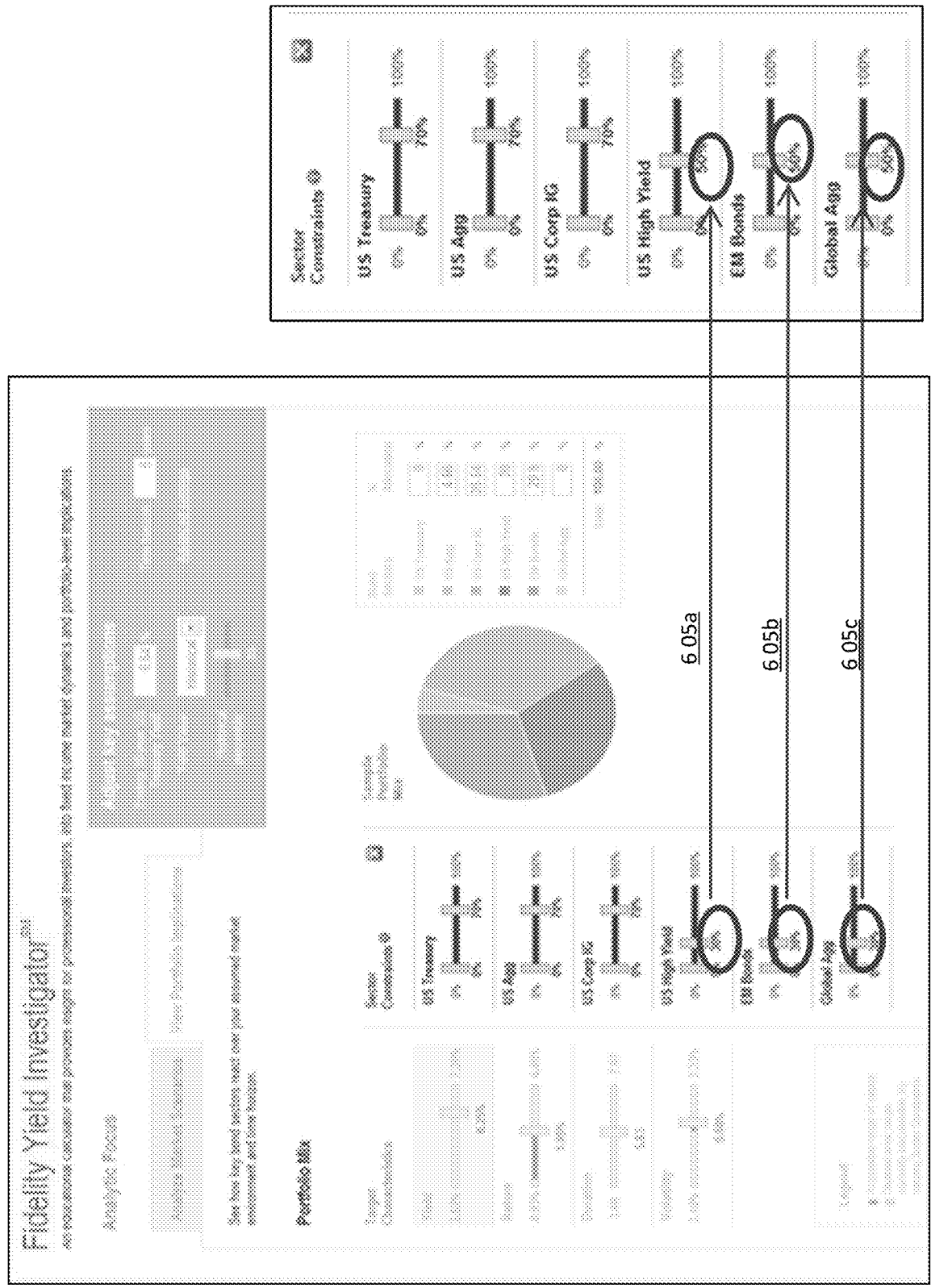
Fig.6c: DASS—DPST Example, User Interface

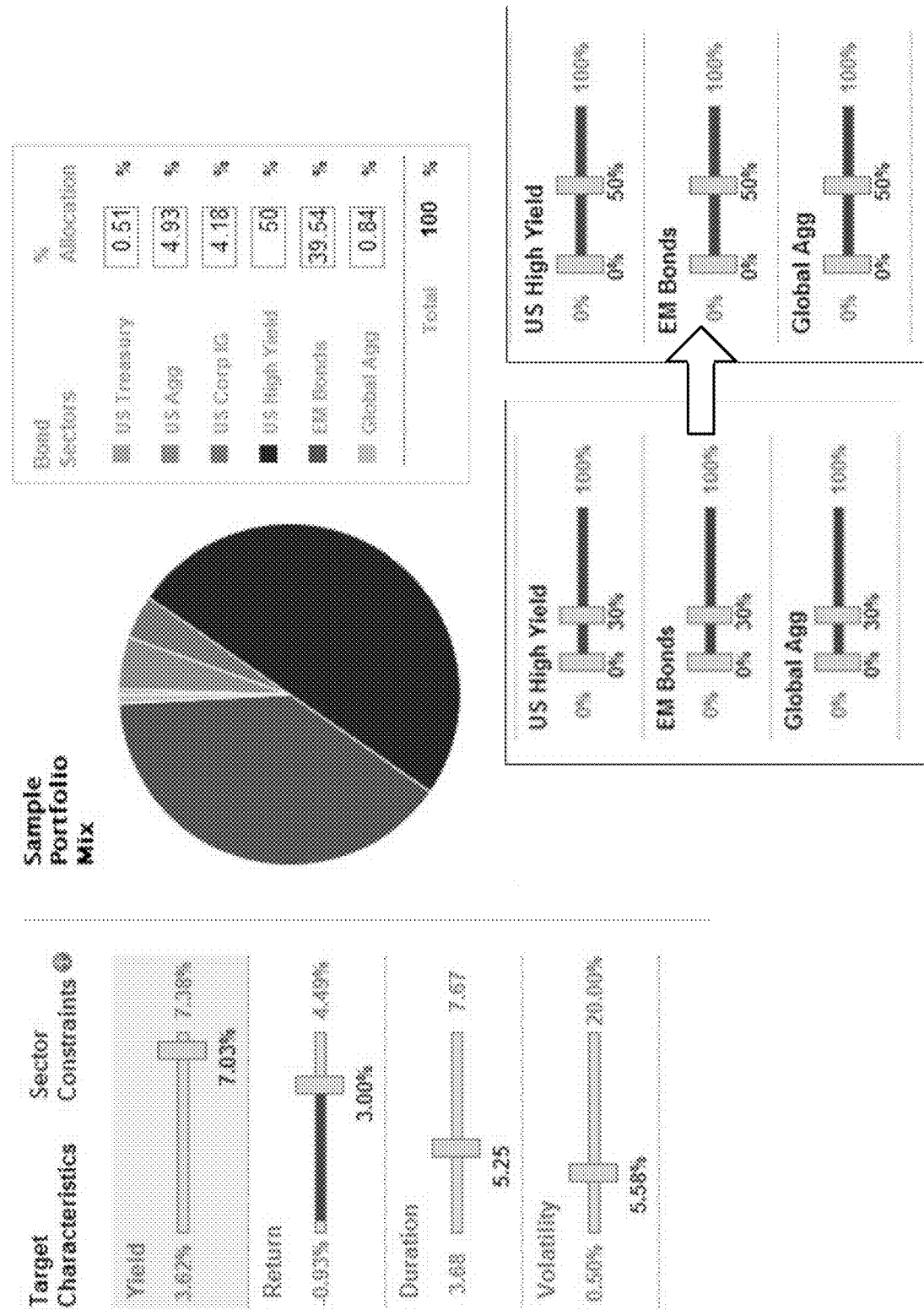
Fig.6d: DASS—DPST Example, User Interface

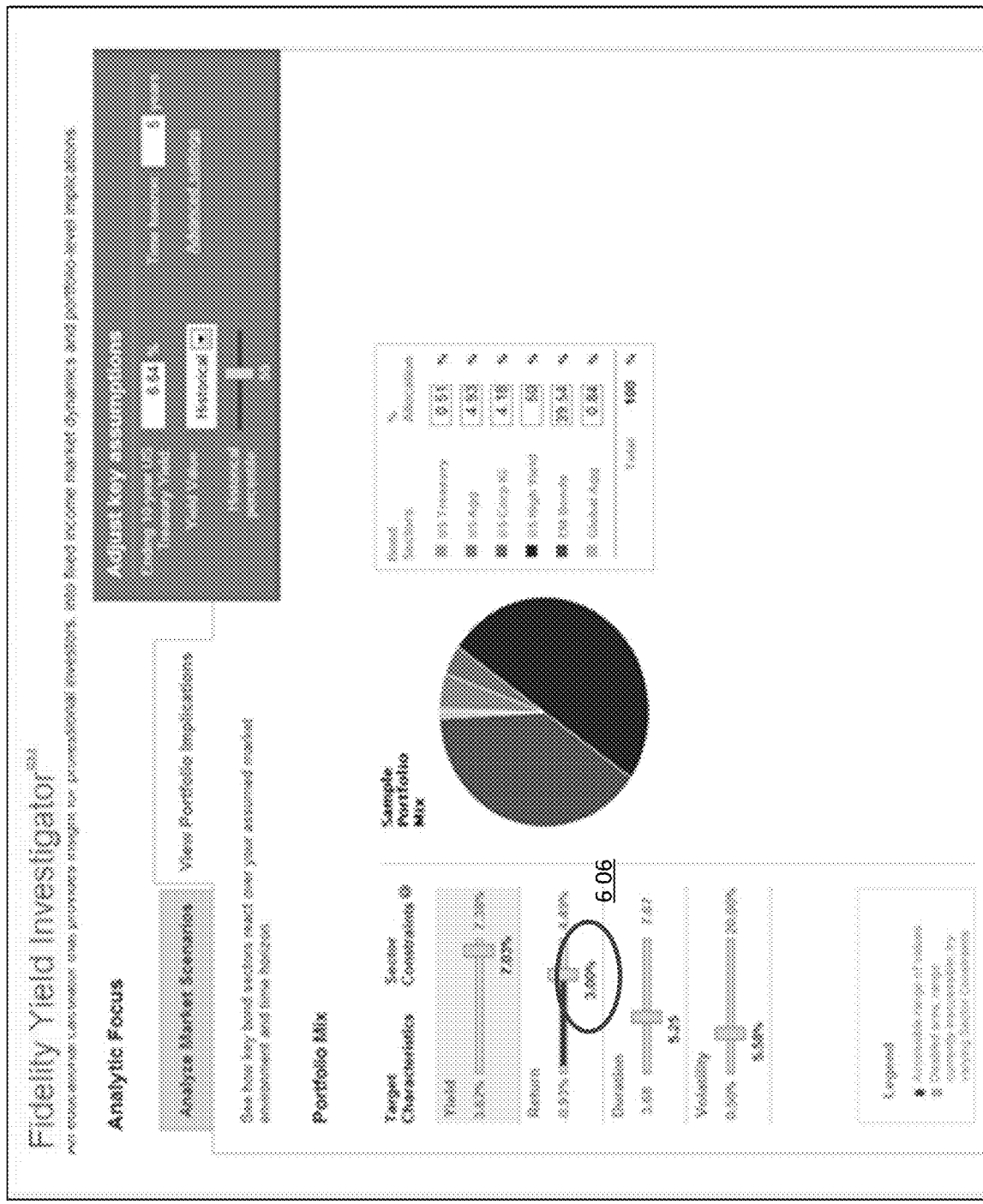
Fig.6e: DASS—DPST Example, User Interface

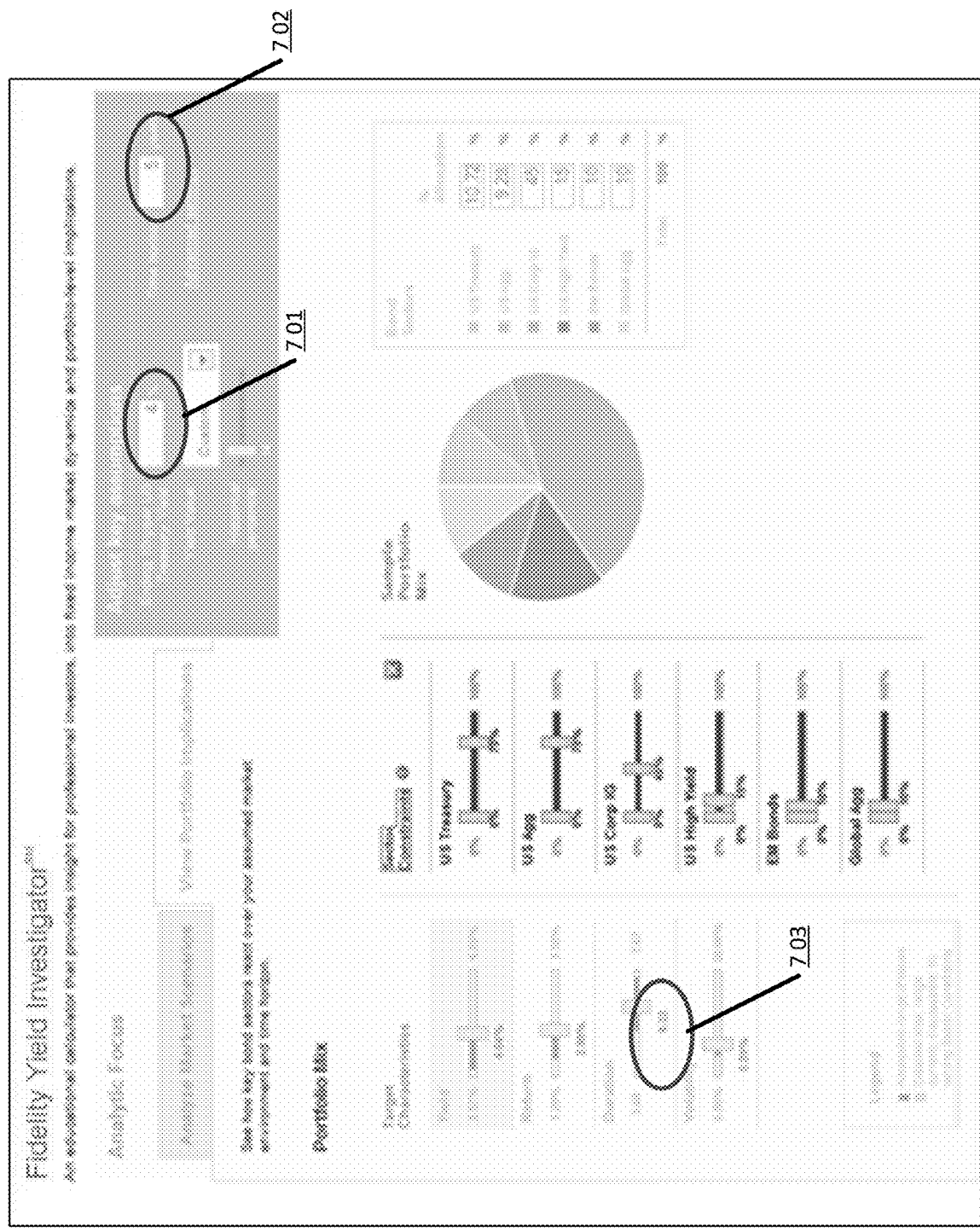
Fig.7a: DASS—DPST Example, User Interface

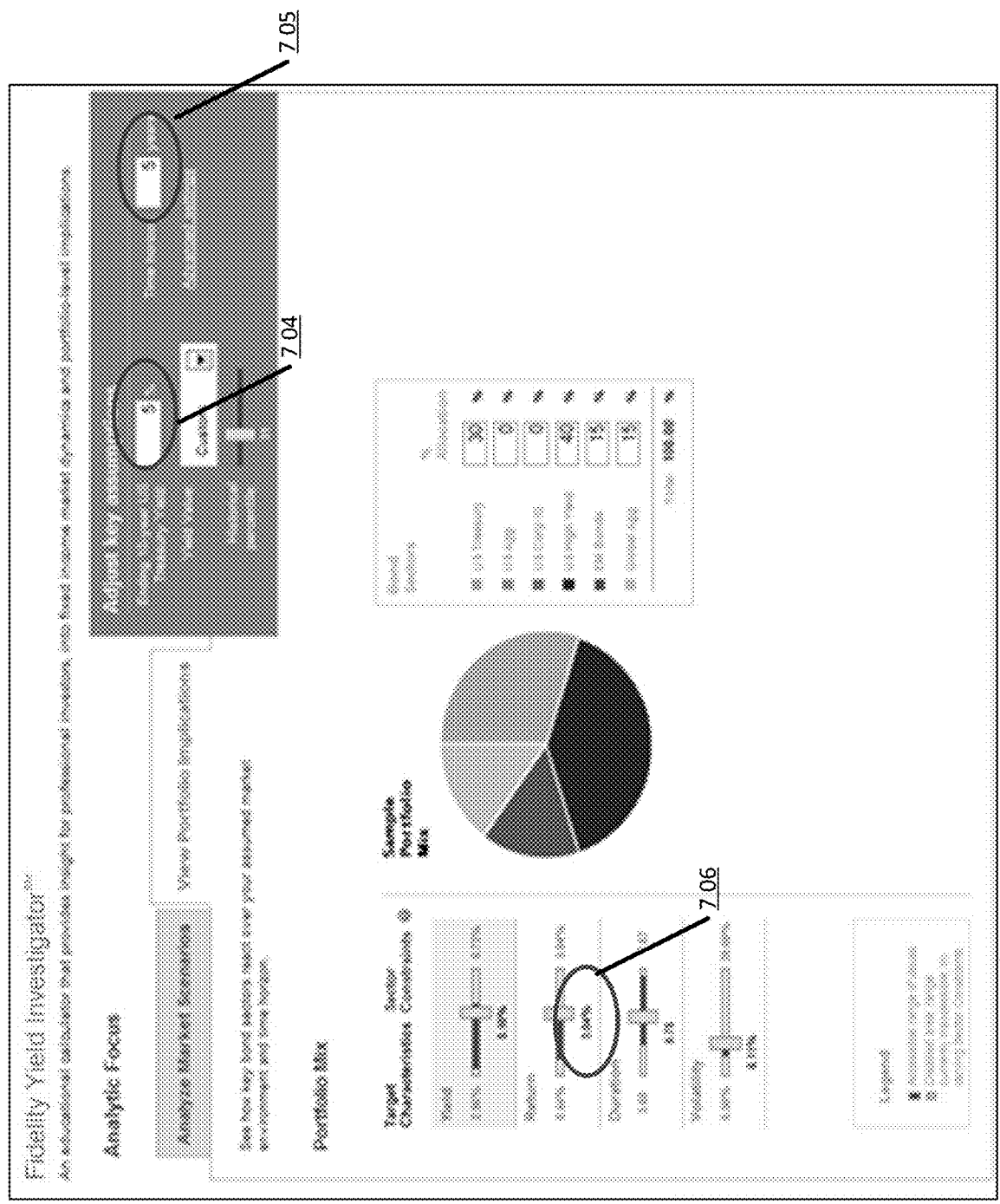
Fig.7b: DASS—DPST Example, User Interface

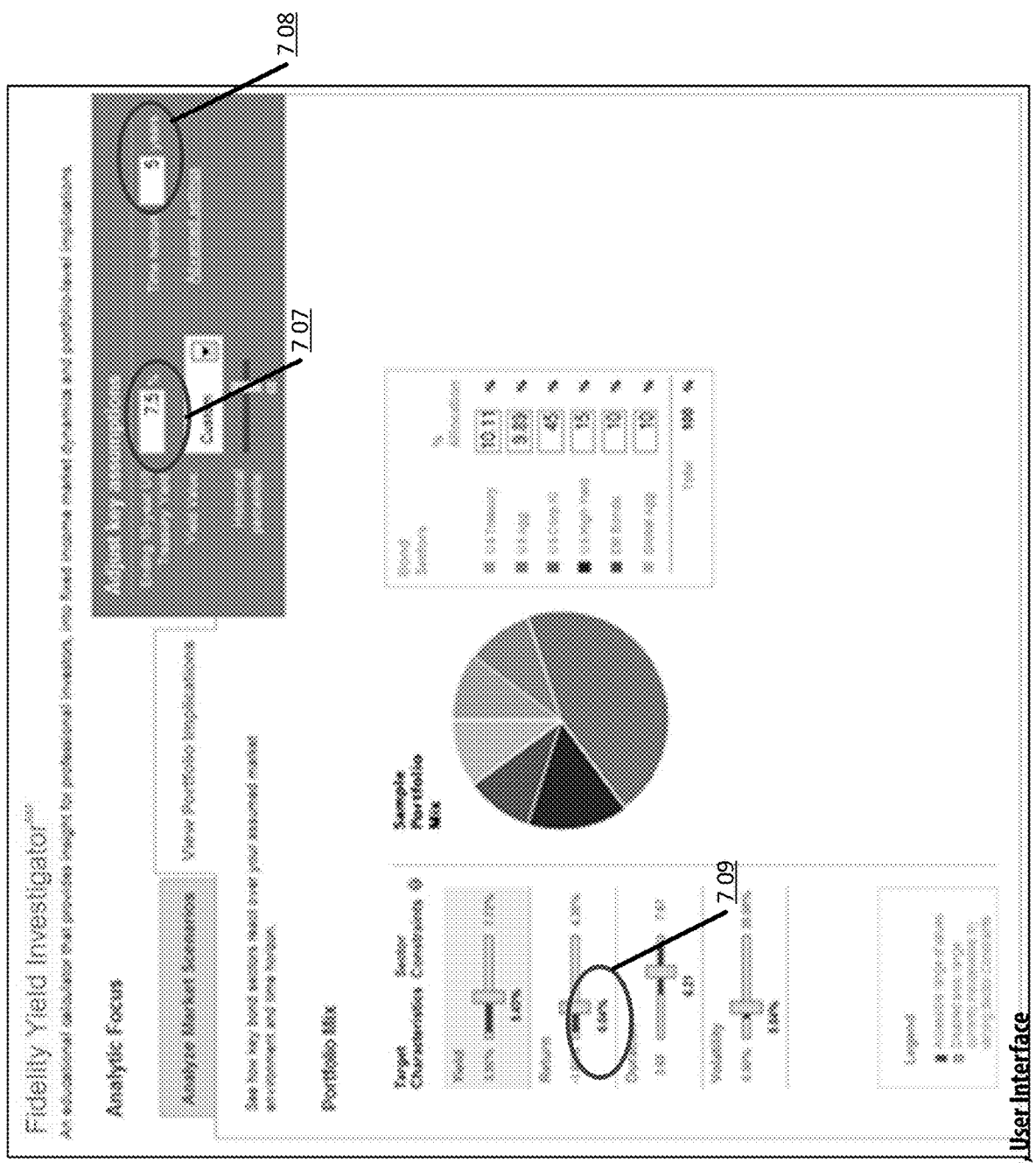
Fig.7c: DASS—DPST Example, User Interface

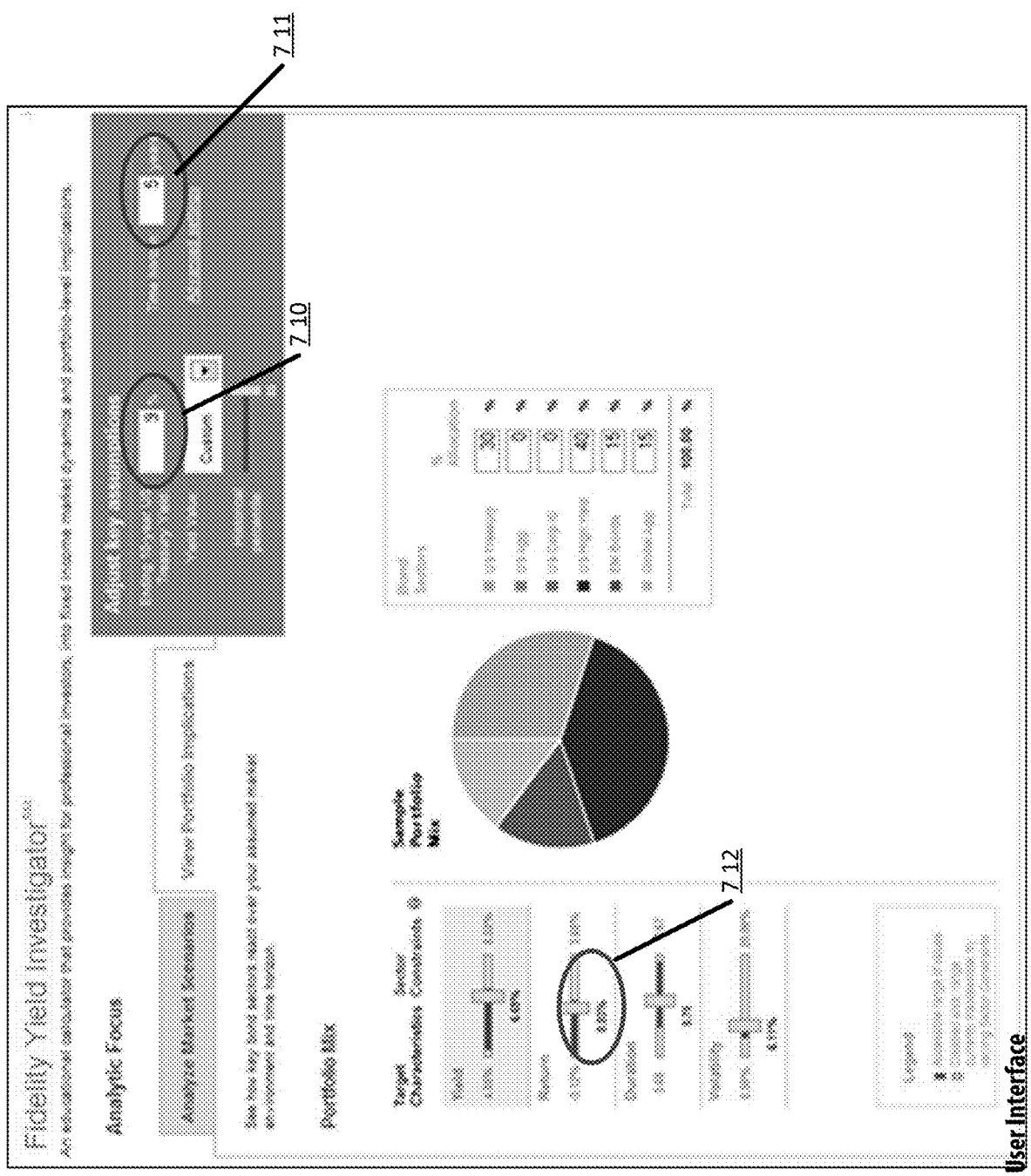
Fig.7d: DASS—DPST Example, User Interface

Fig.8a: DASS—DPST Example, User Interface

Fig.8b: DASS—DPST Example, User Interface

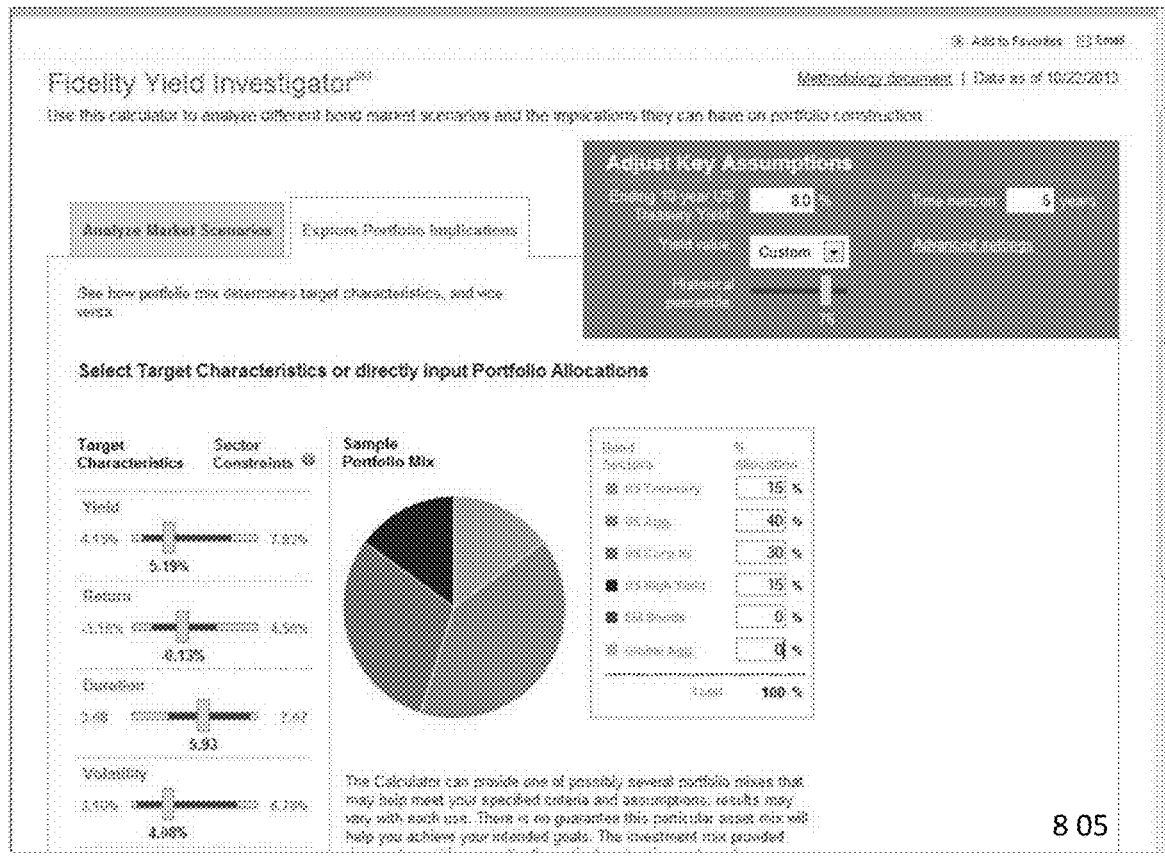
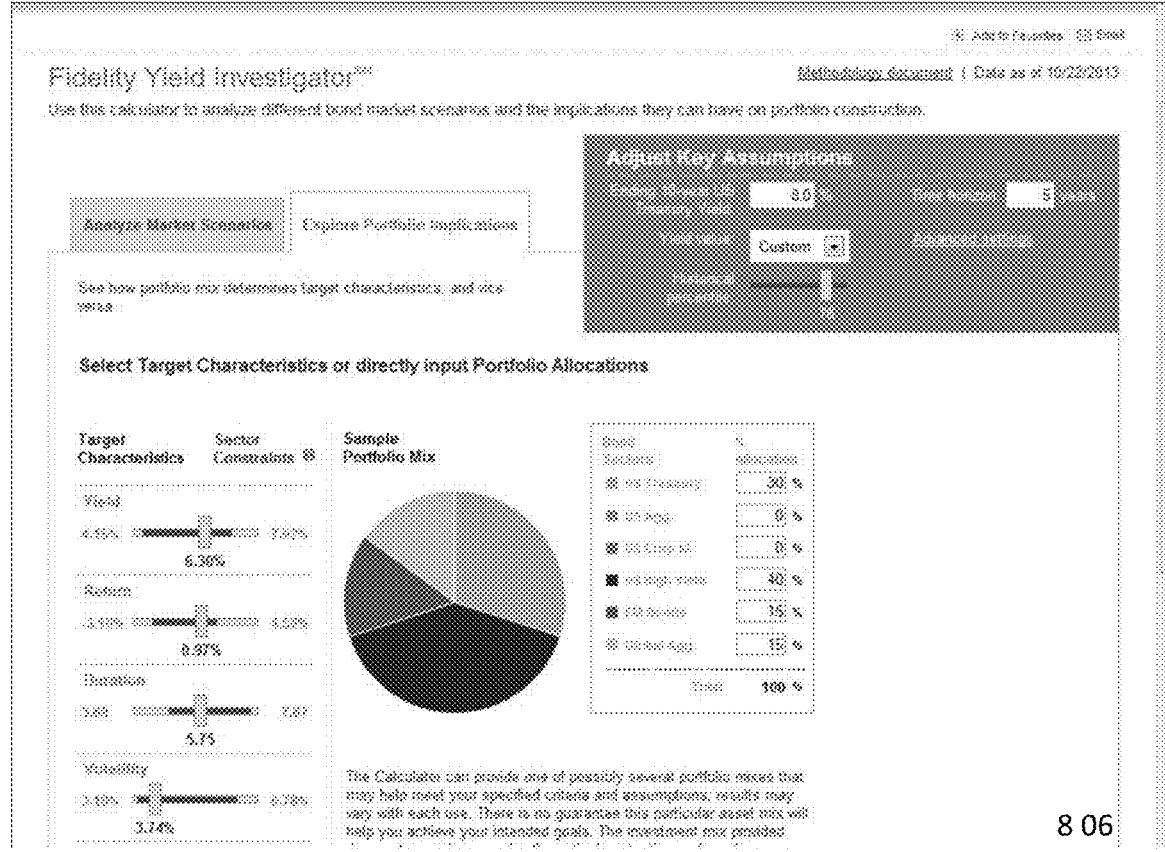
Fig.8c: DASS—DPST Example, User Interface

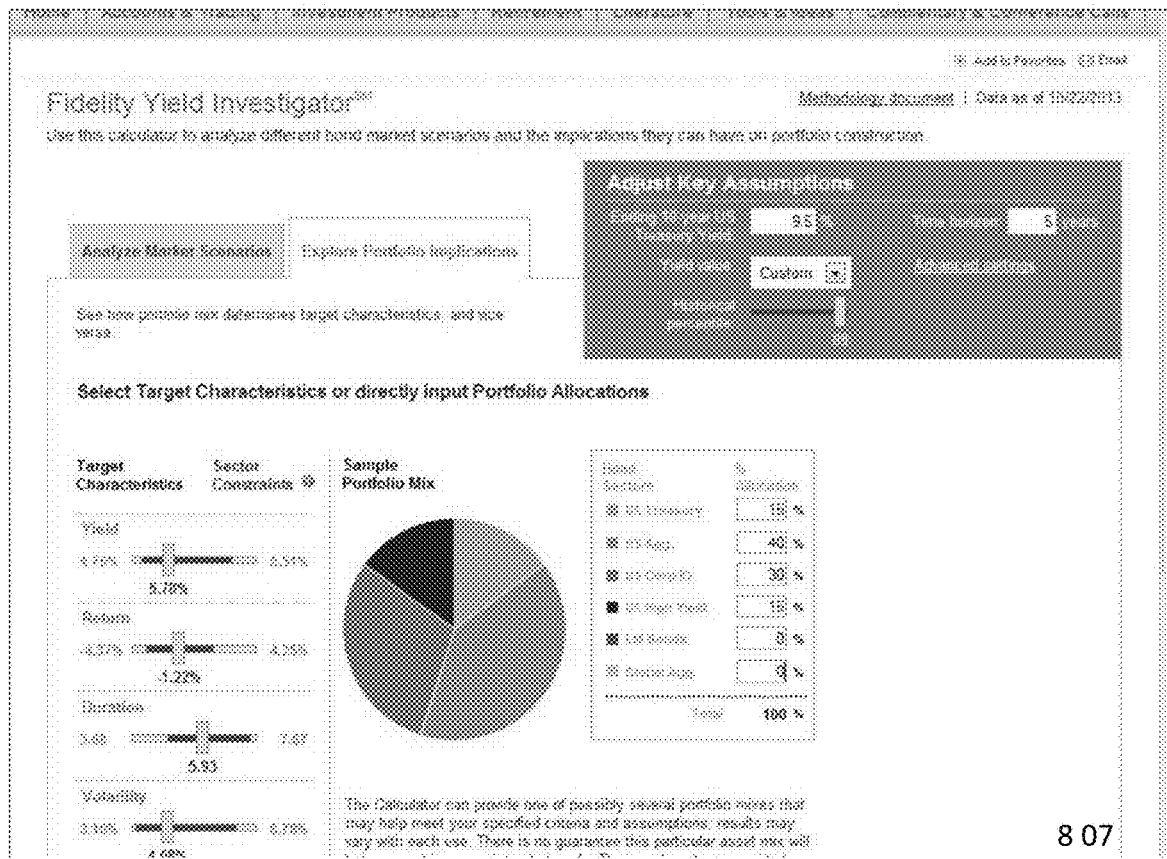
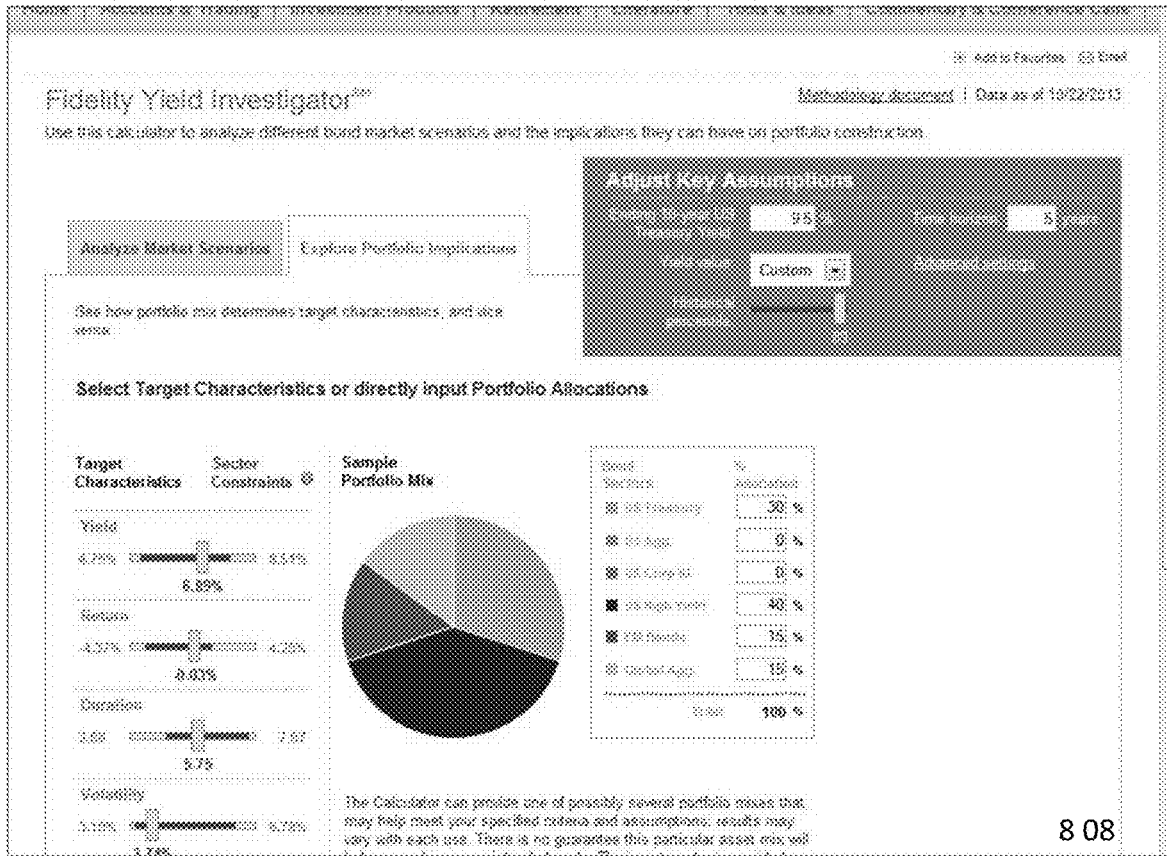
Fig.8d: DASS—DPST Example, User Interface

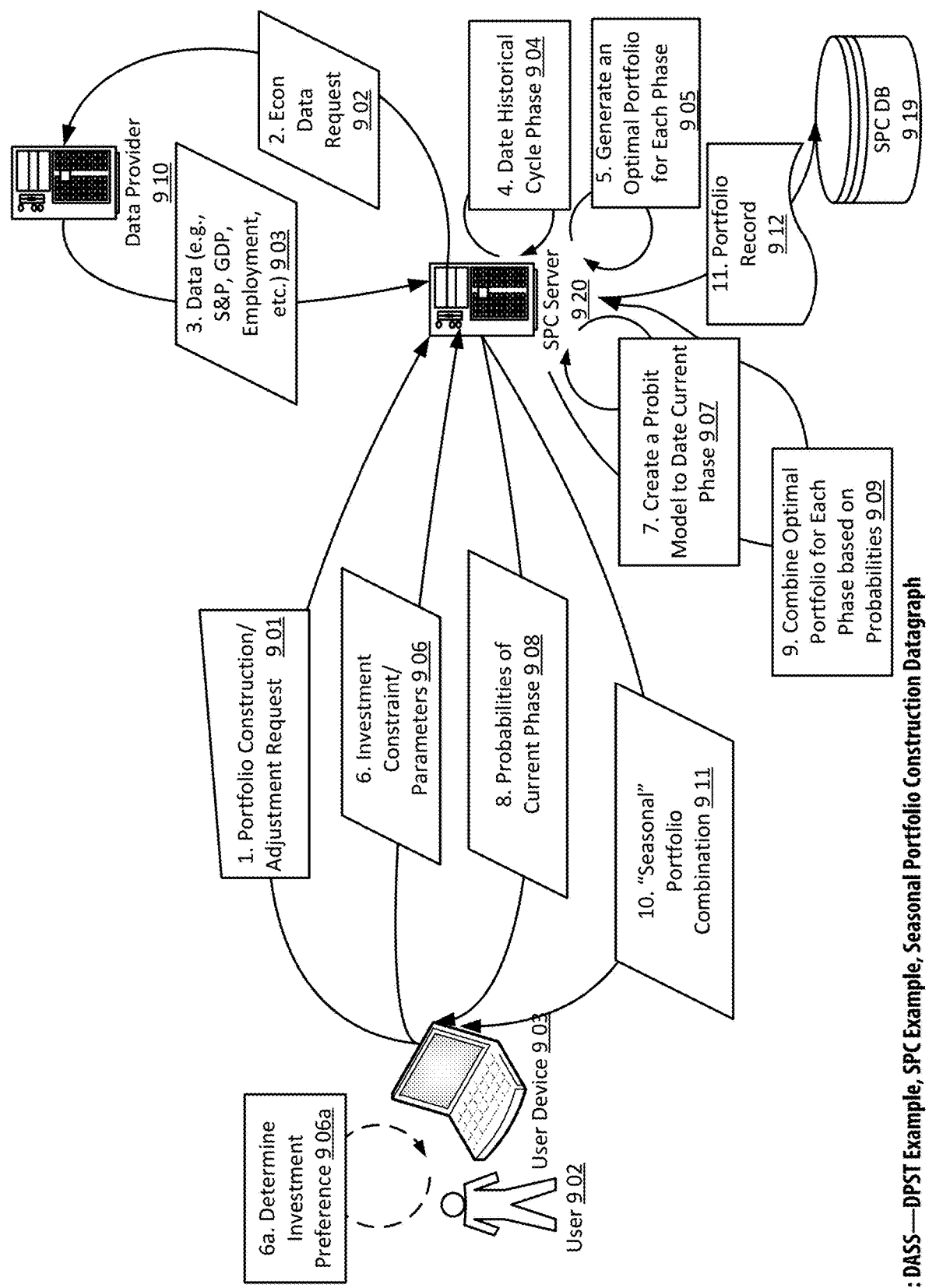
Fig. 9: DASS—DPST Example, SPC Example, Seasonal Portfolio Construction Datagraph

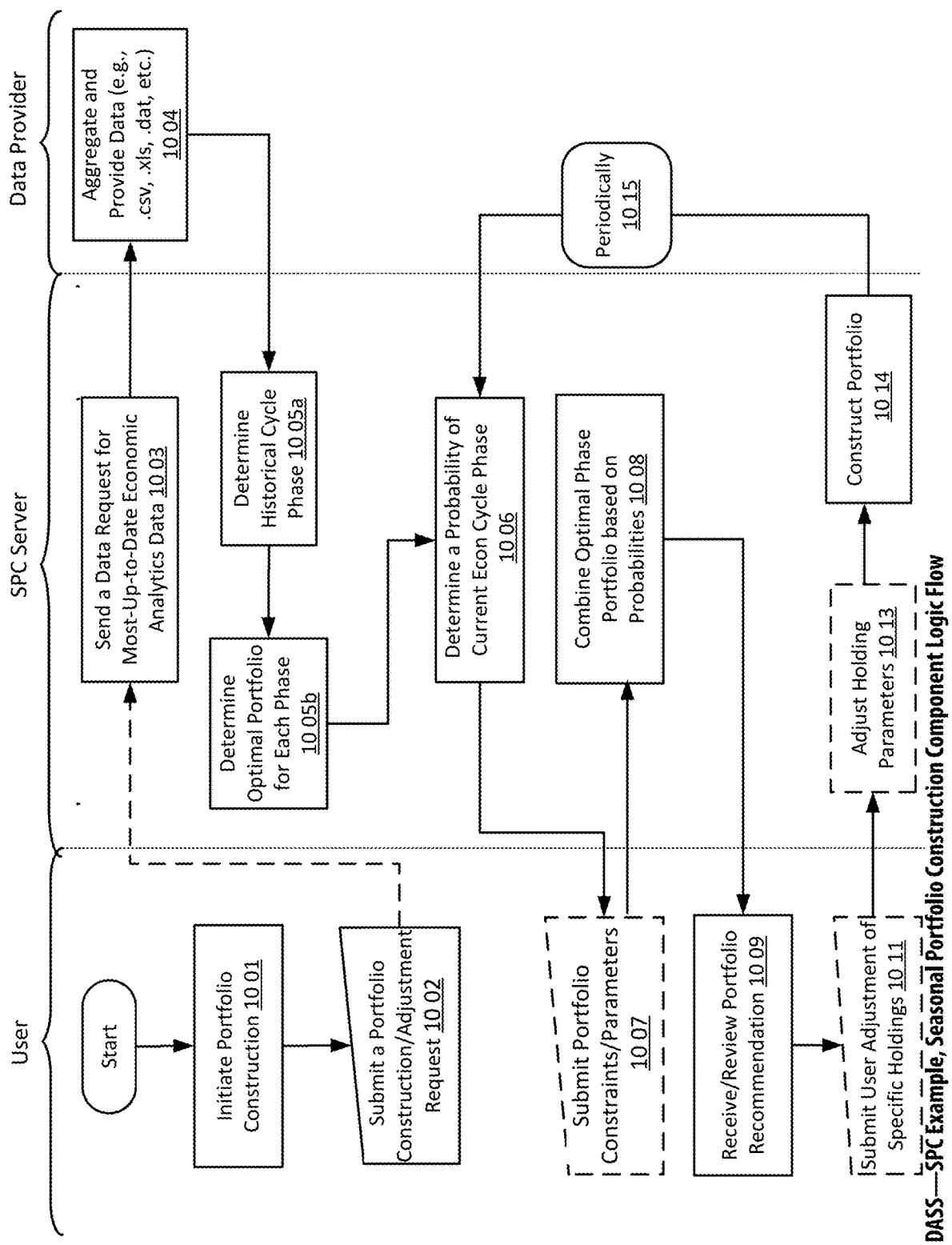
Fig. 10a: DASS—SPC Example, Seasonal Portfolio Construction Component Logic Flow

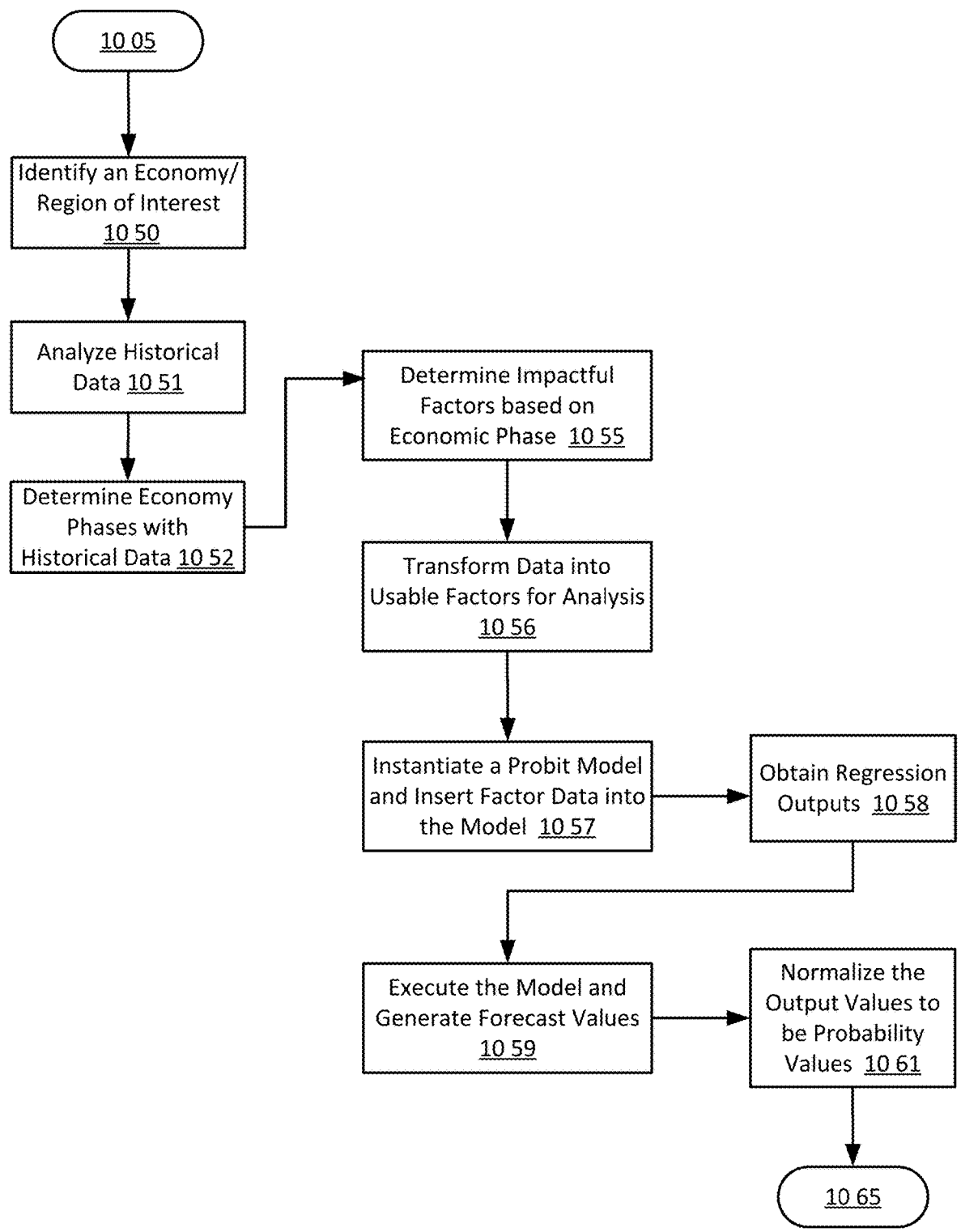
Fig.10b: DASS—SPC Example, Generate Probabilities of Each Phase Component Logic Flow

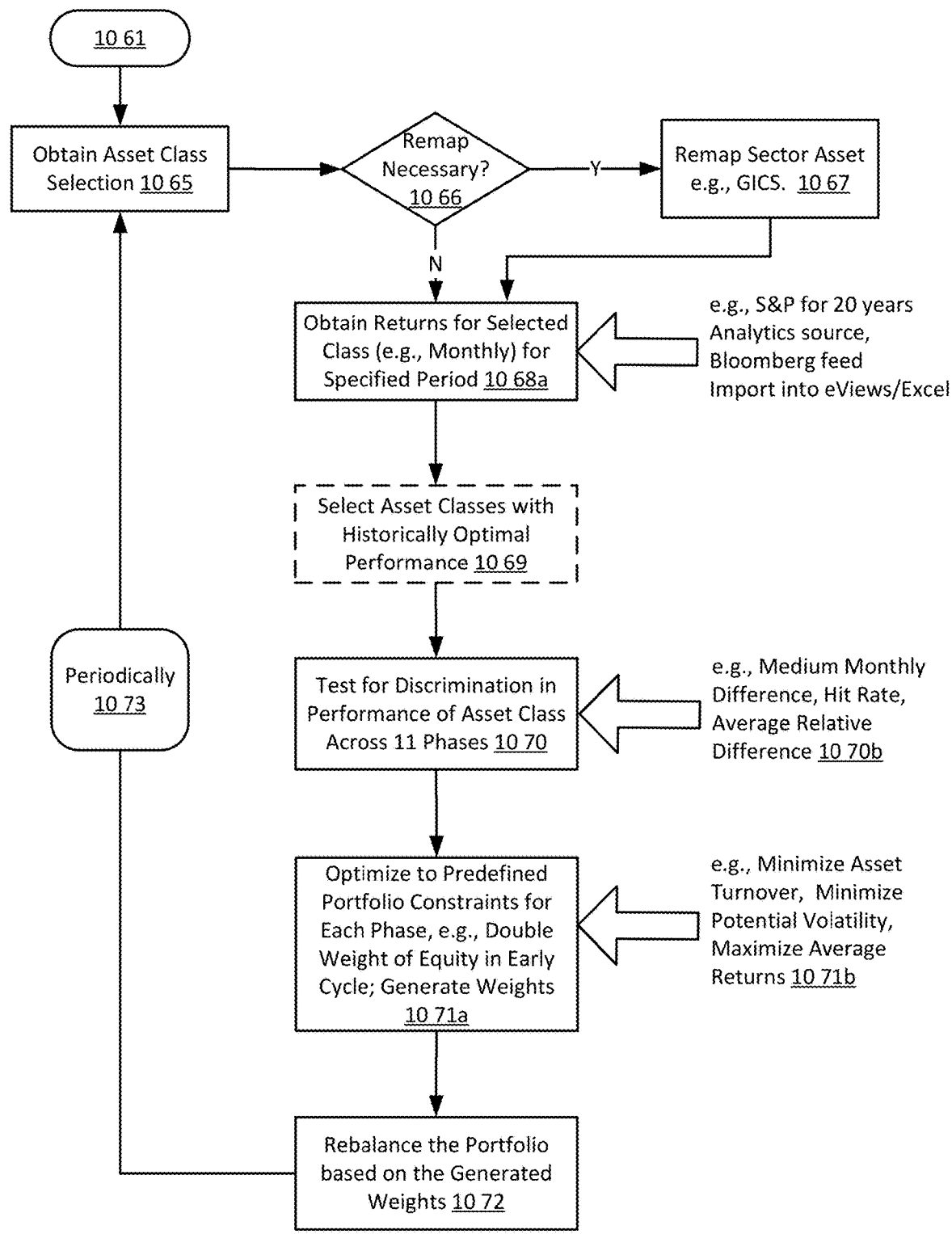
Fig.10c: DASS—SPC Example, Seasonal Portfolio Construction Component Logic Flow

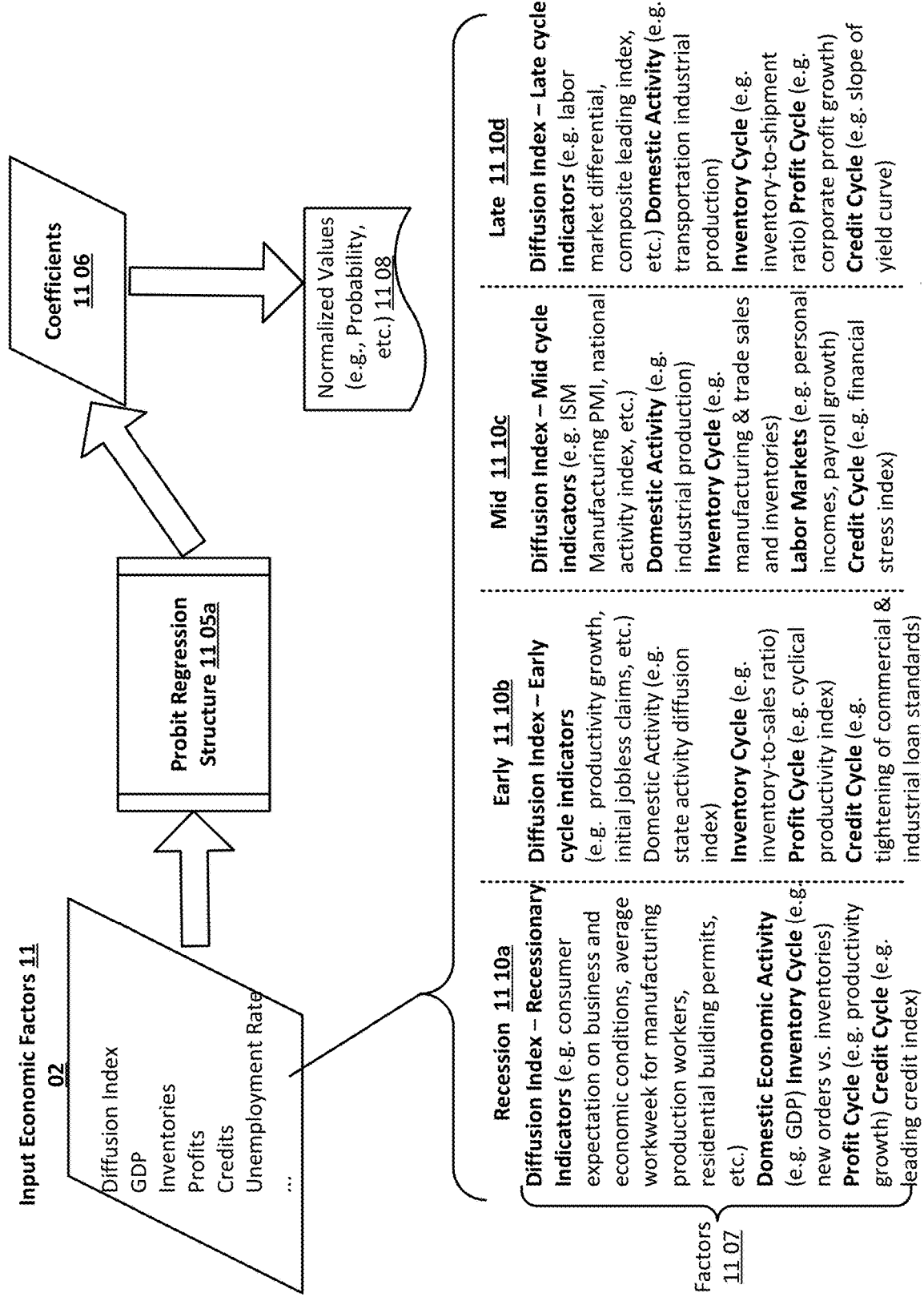
Fig.11a: DASS—SPC Example, Regression Engine

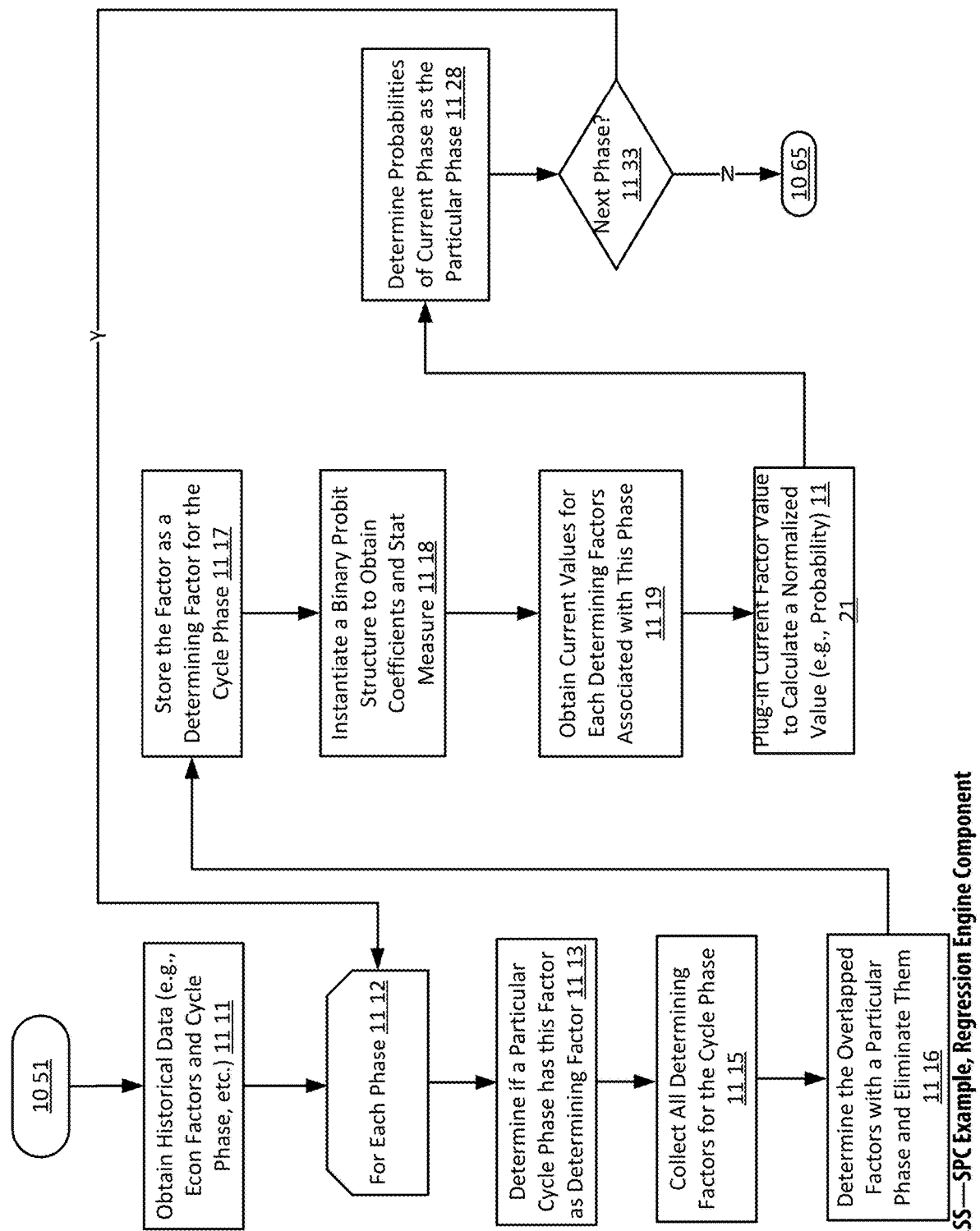
Fig.11b: DASS—SPC Example, Regression Engine Component

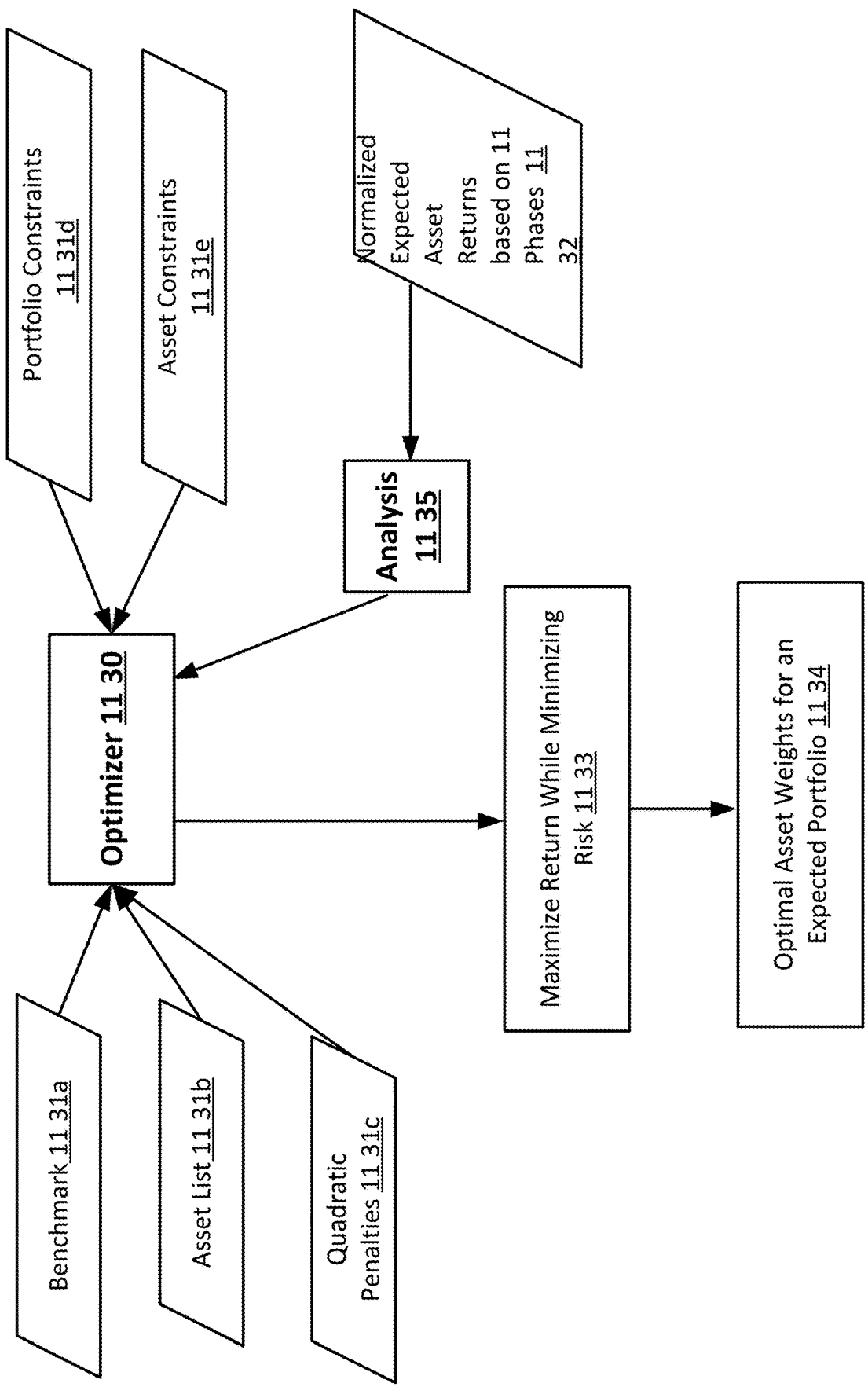
Fig.11c: DASS—SPC Example, Optimal Portfolio for a Phase Generator

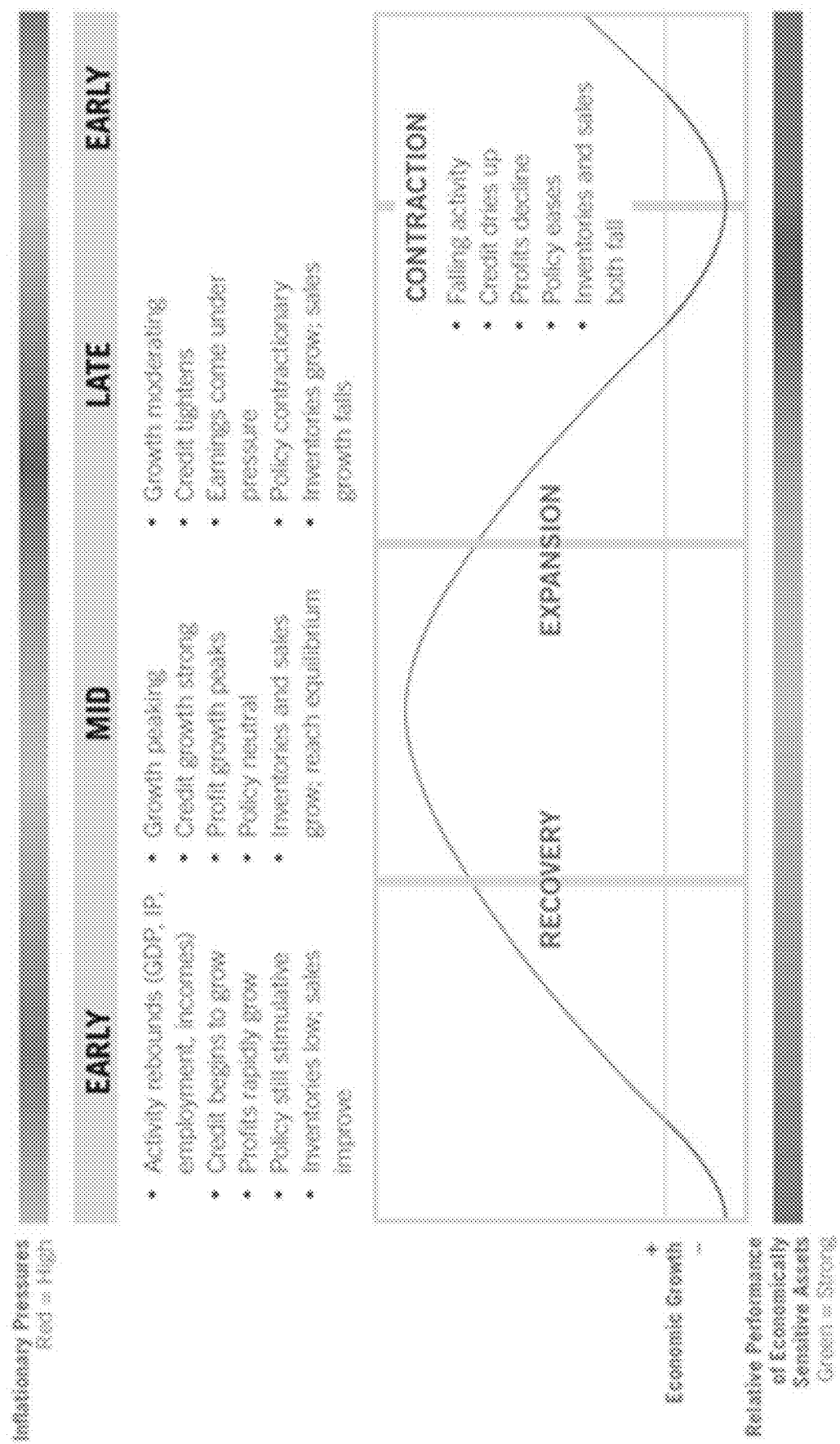
Fig. 12a: DASS—SPC Example, Data Analytics

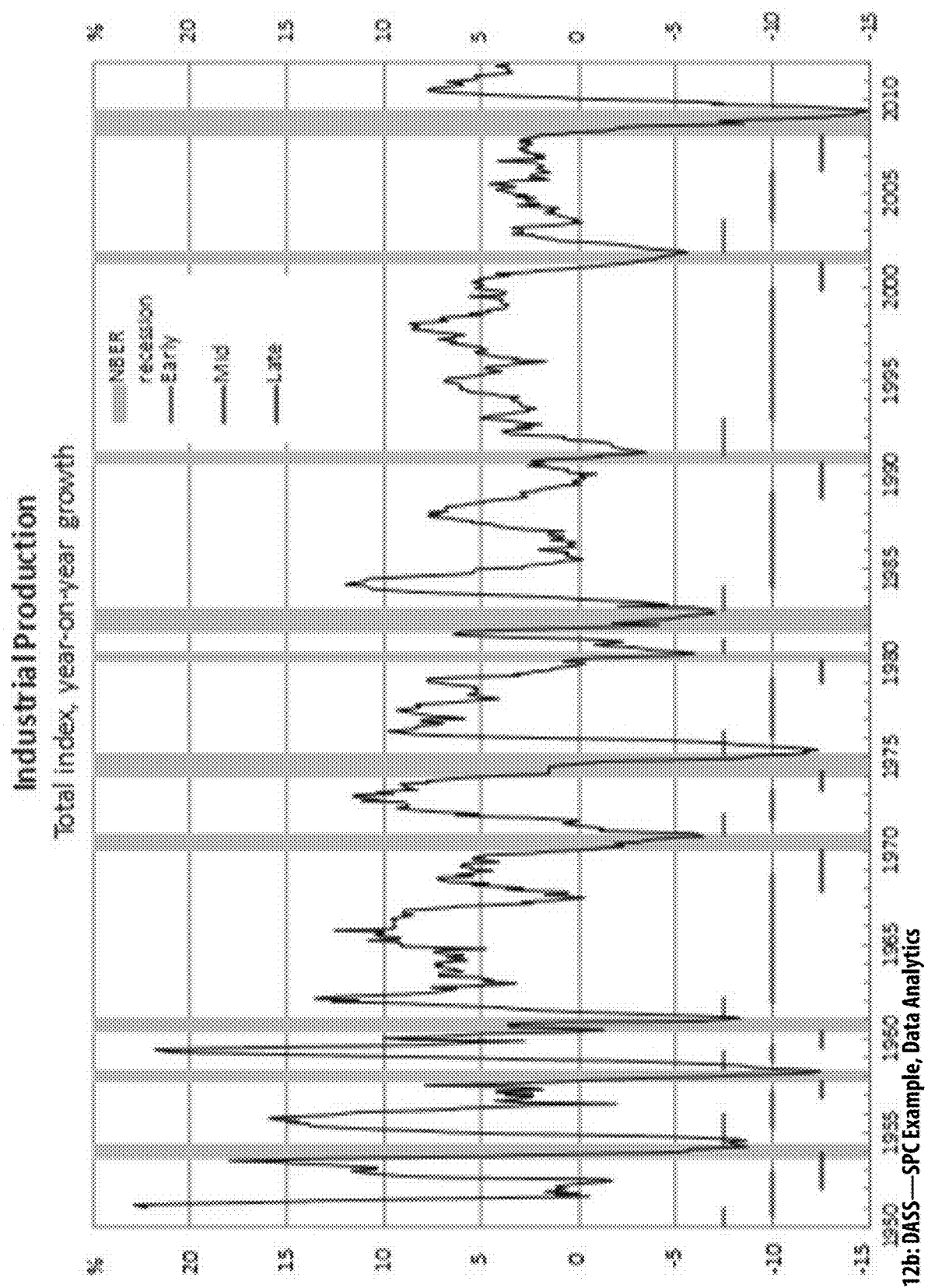
Fig.12b: DASS—SPC Example, Data Analytics

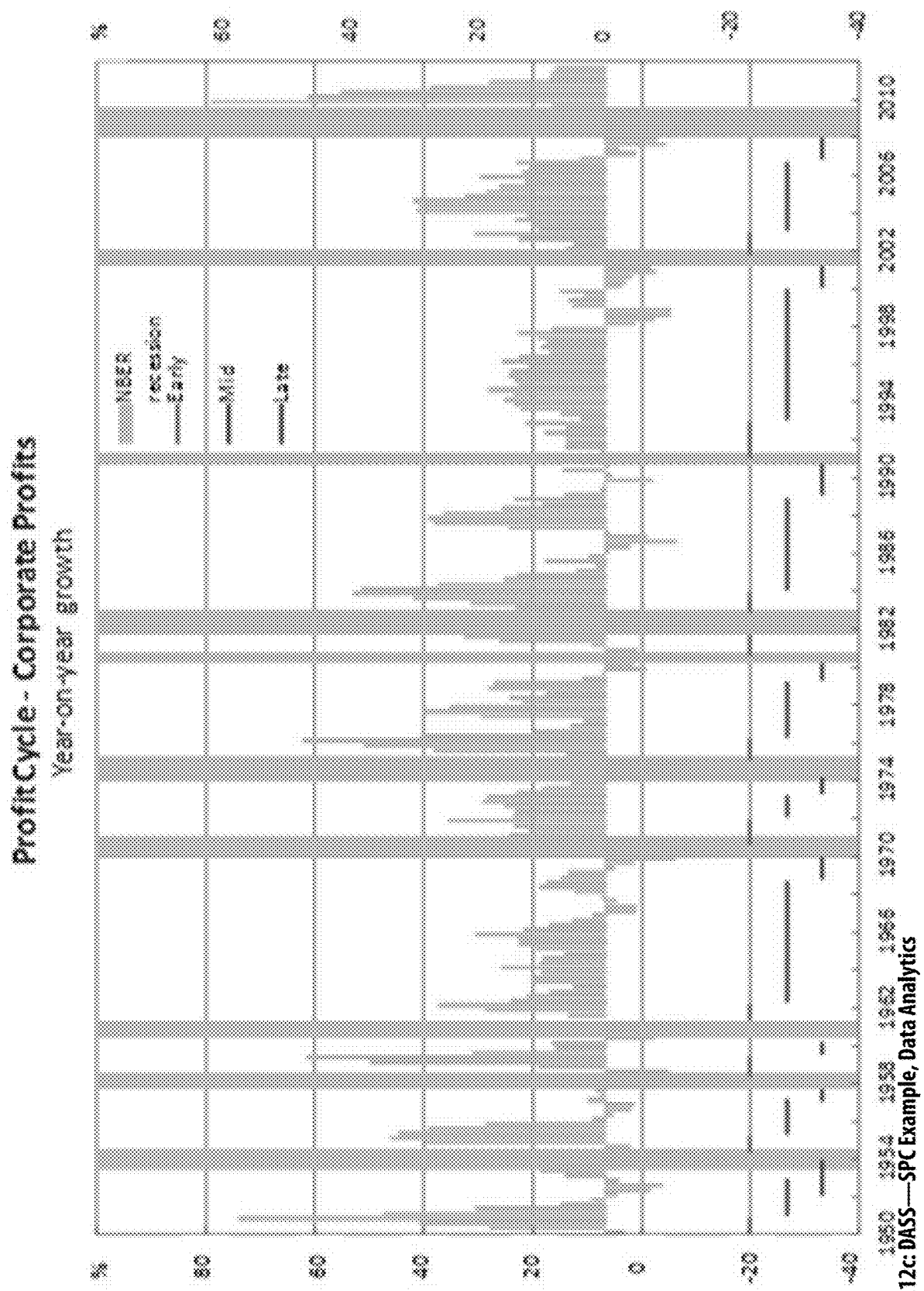
Fig.12c: DASS——SPC Example, Data Analytics

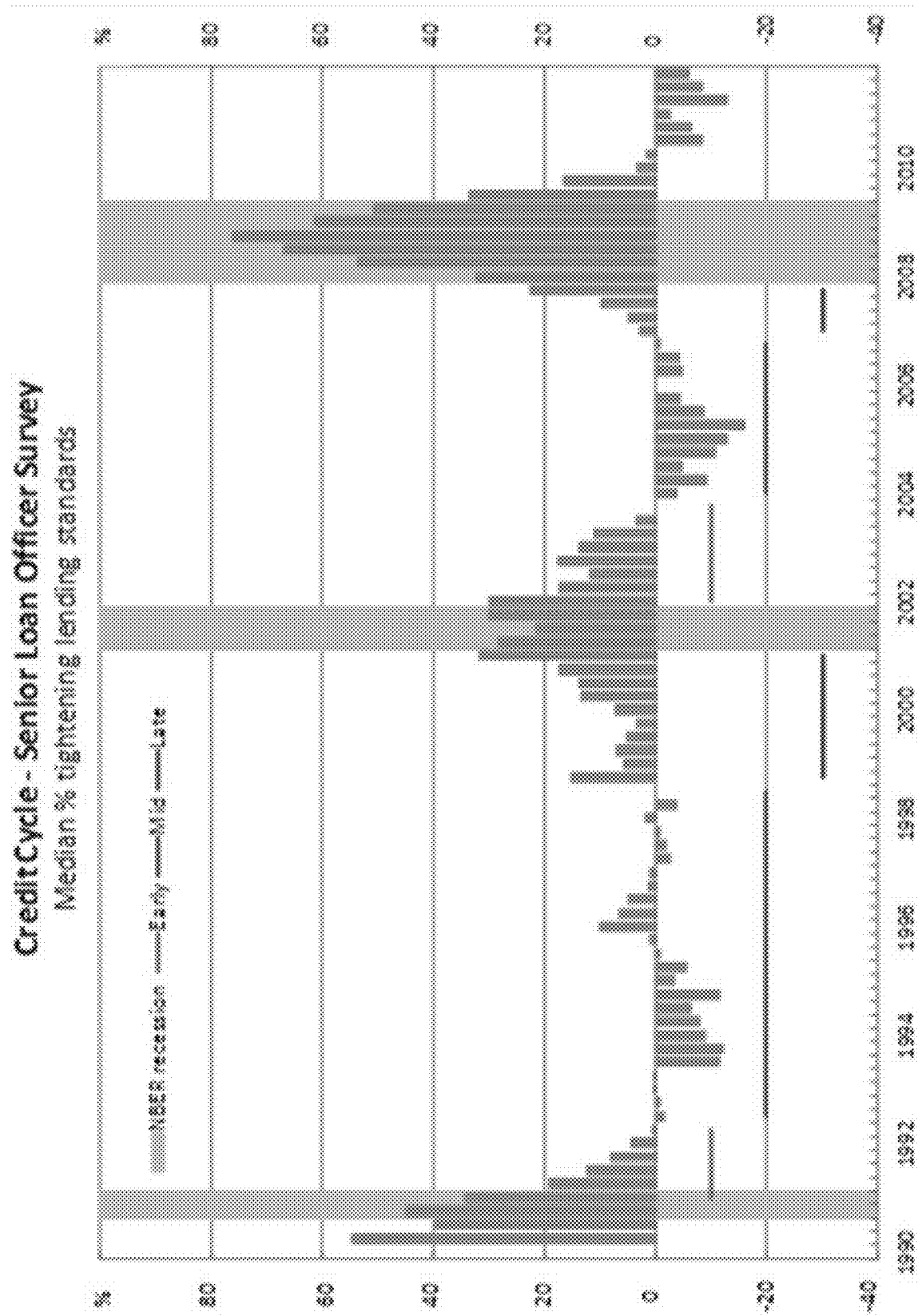
Fig.12d: DASS—SPC Example, Data Analytics

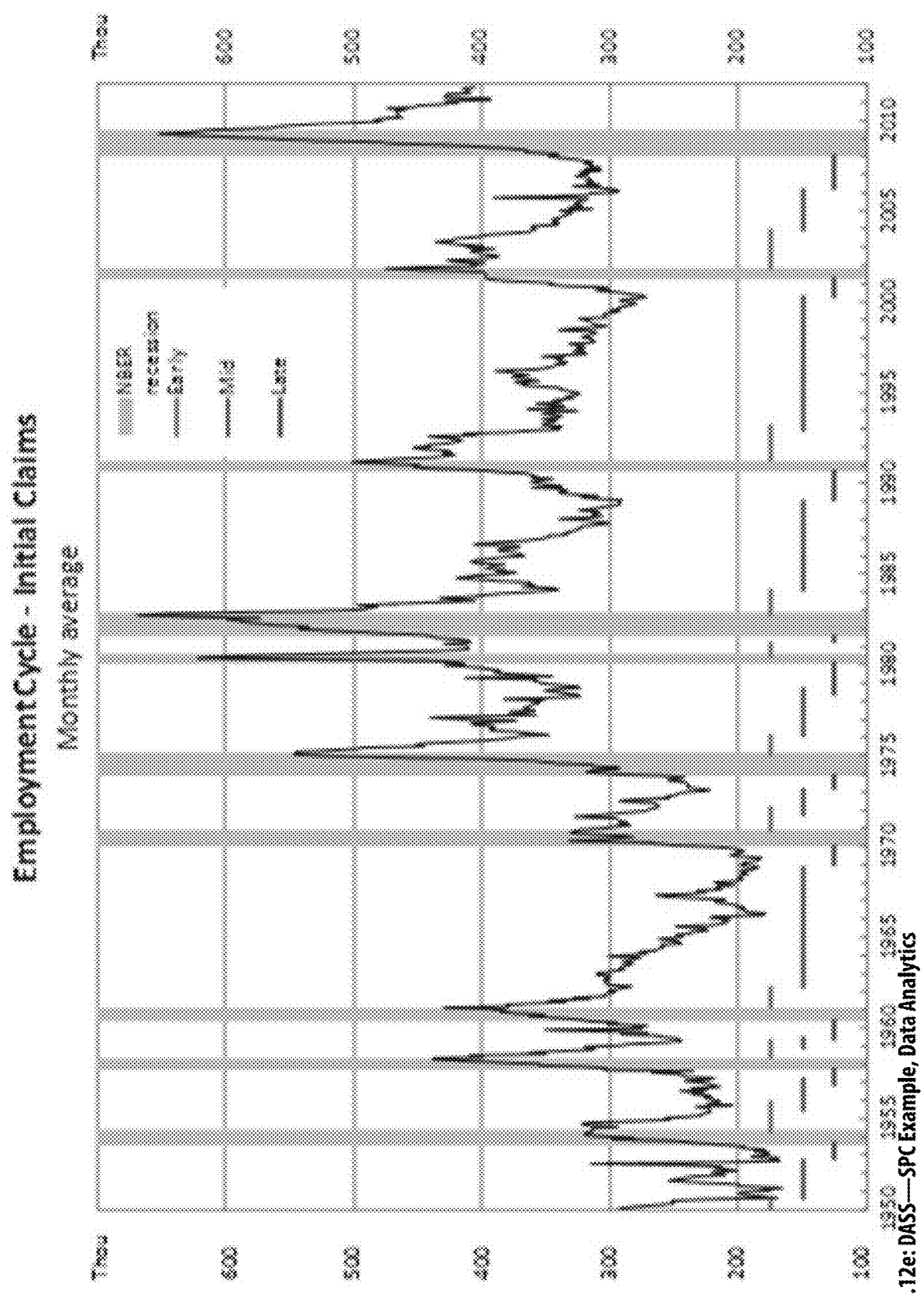
Fig.12e: DASS—SPC Example, Data Analytics

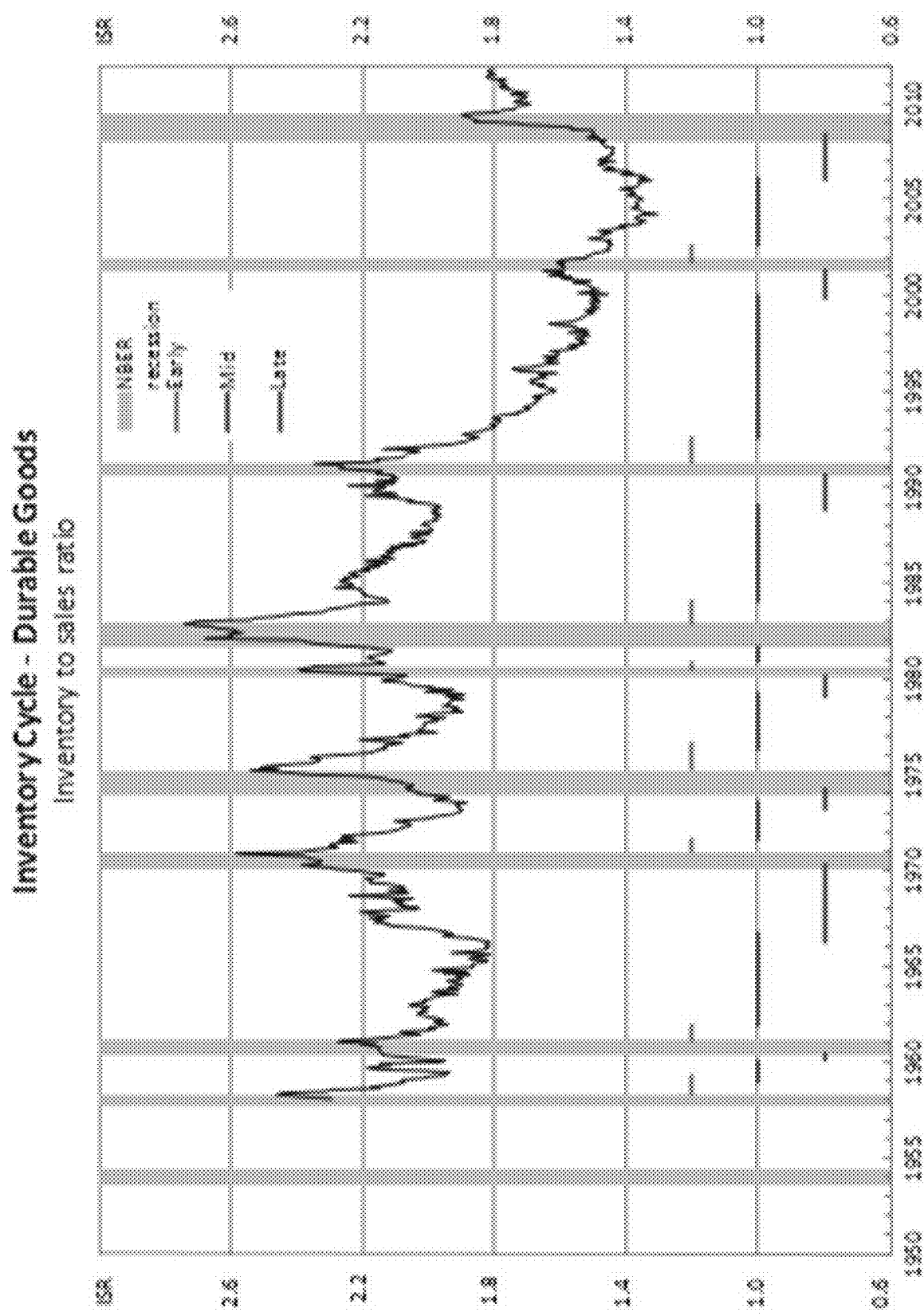
Fig.12f: DASS—SPC Example, Data Analytics

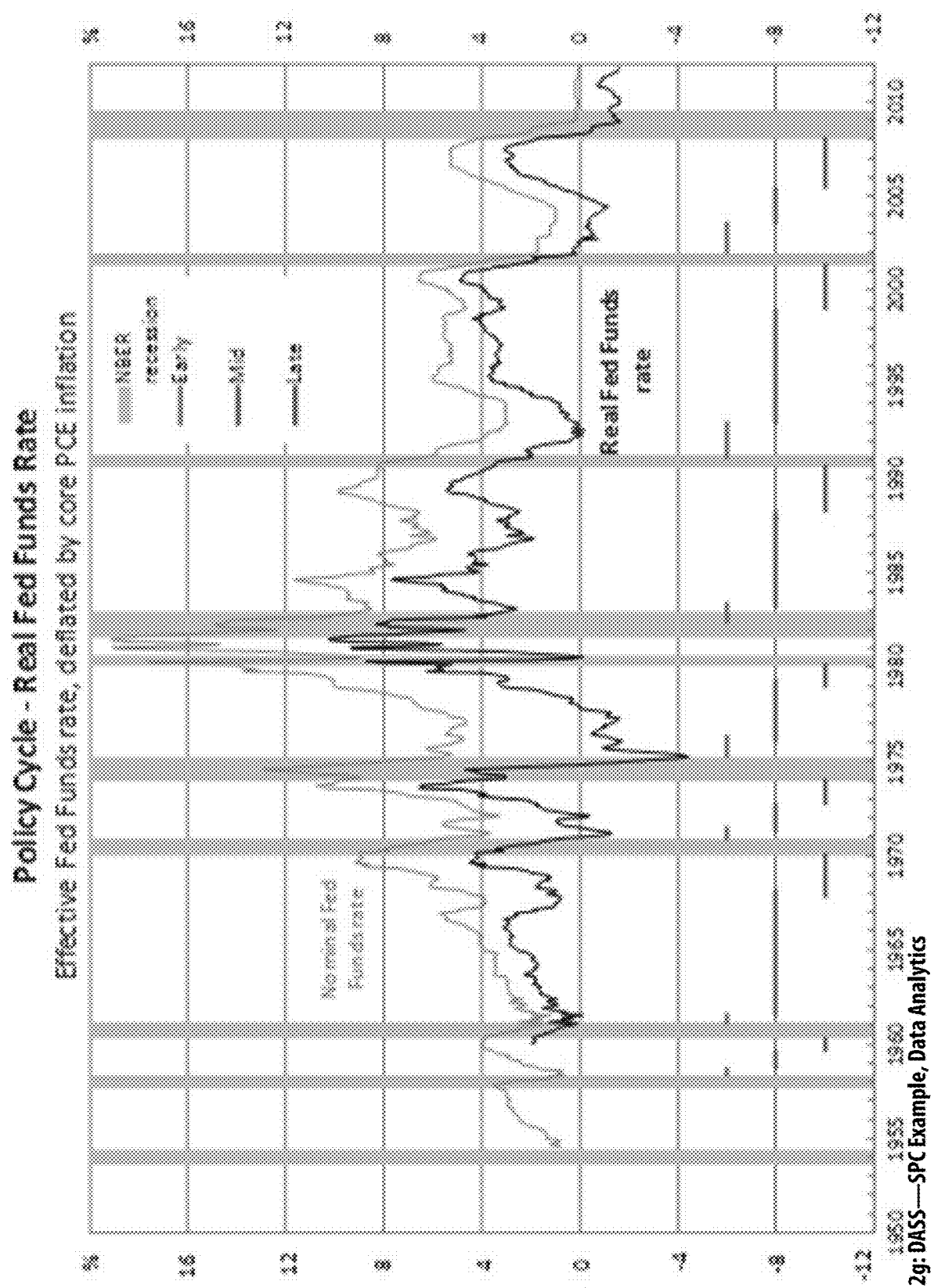
Fig.12g: DASS—SPC Example, Data Analytics

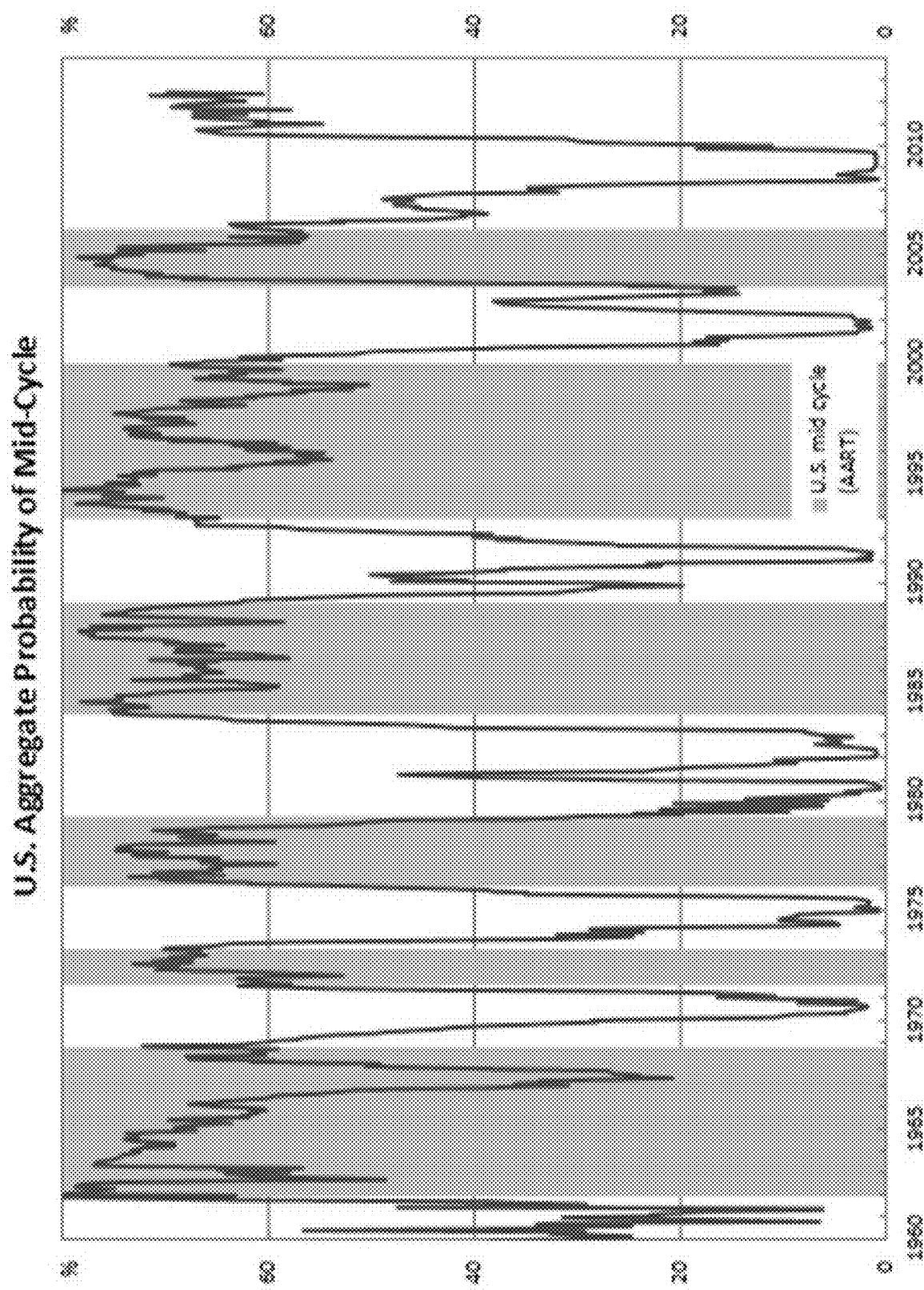
Fig. 13a: DASS—SPC Example, Data Analytics

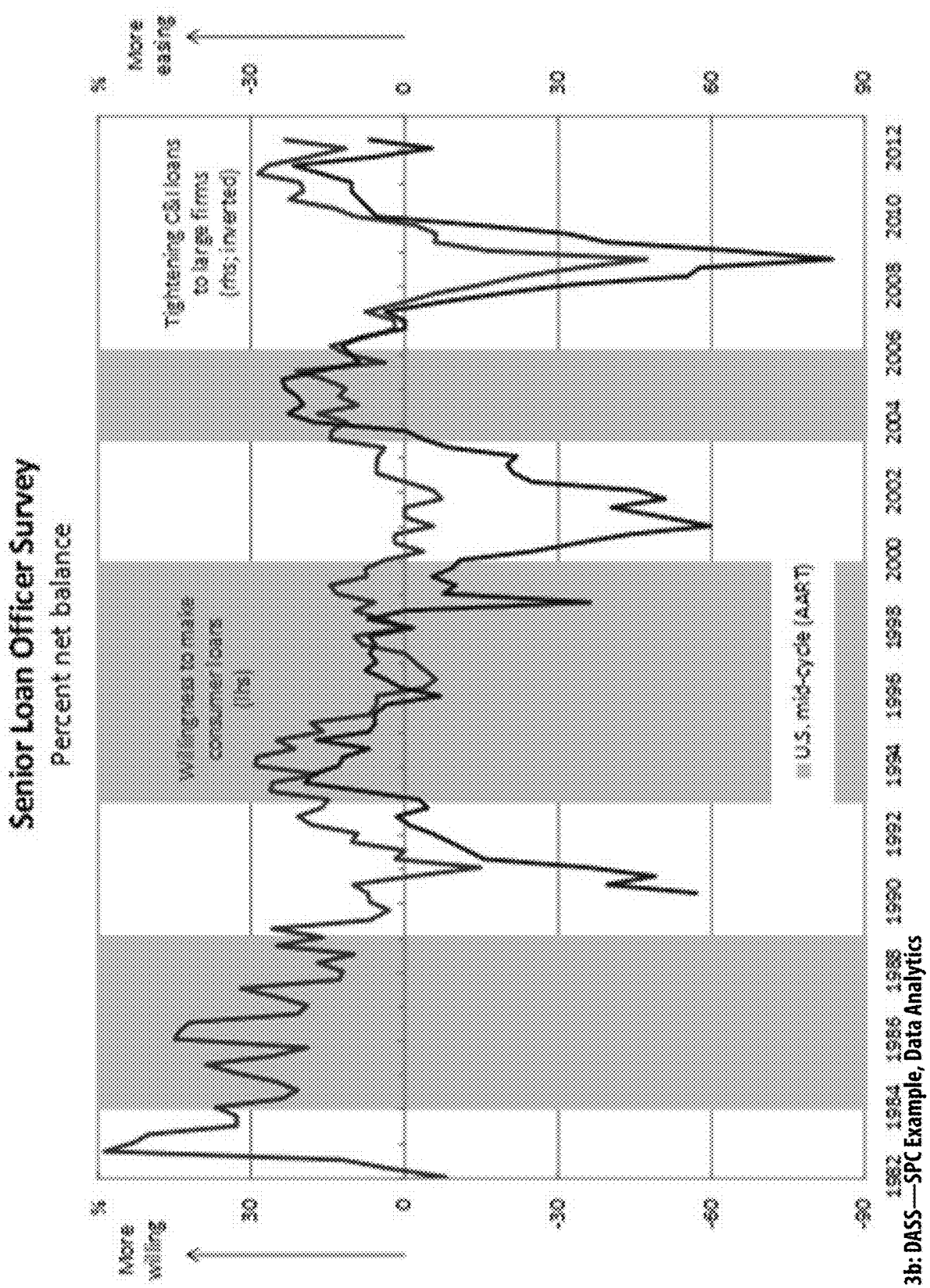
Fig.13b: DASS—SPC Example, Data Analytics

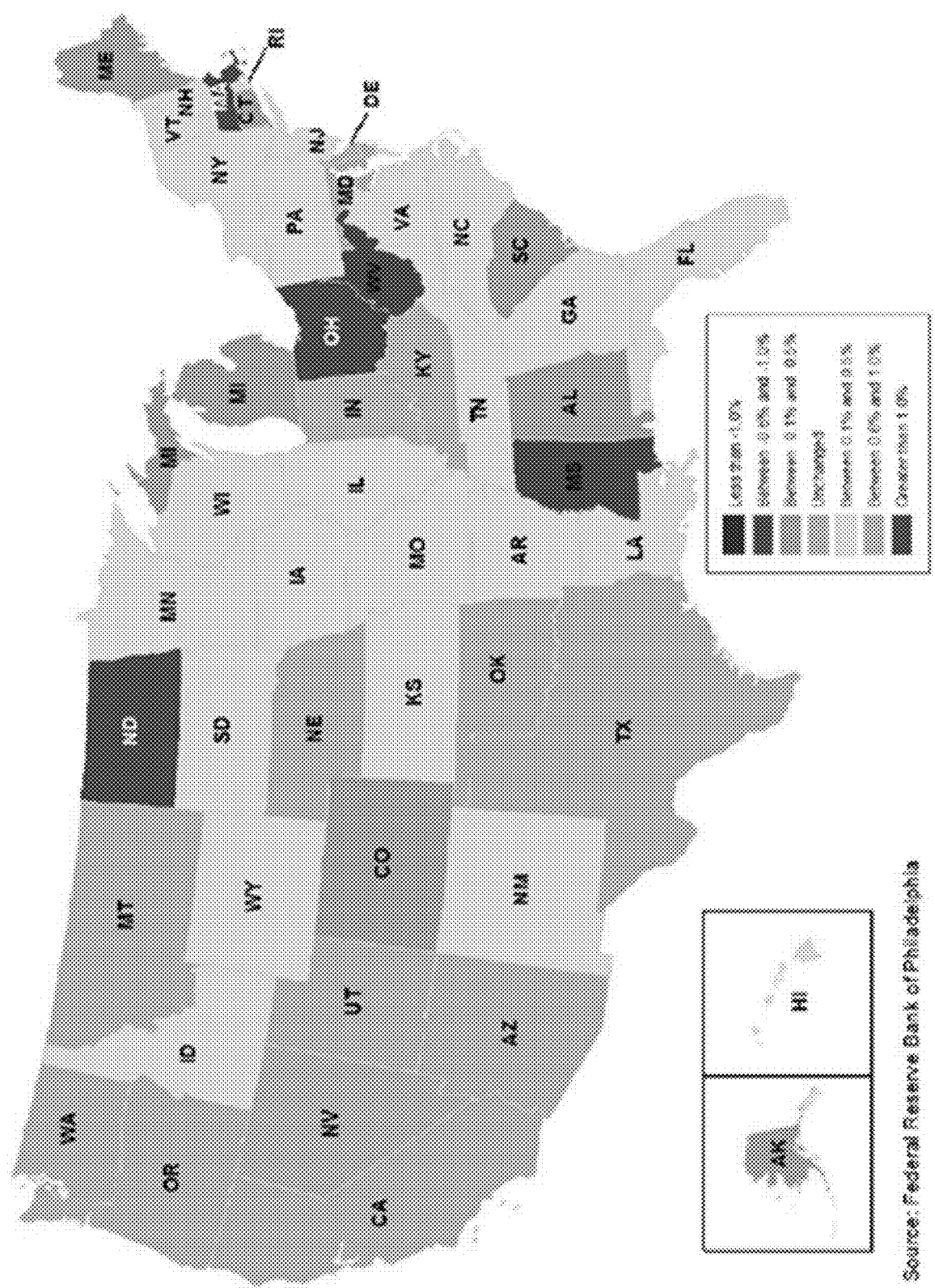
Fig.13c: DASS—SPC Example, Data Analytics

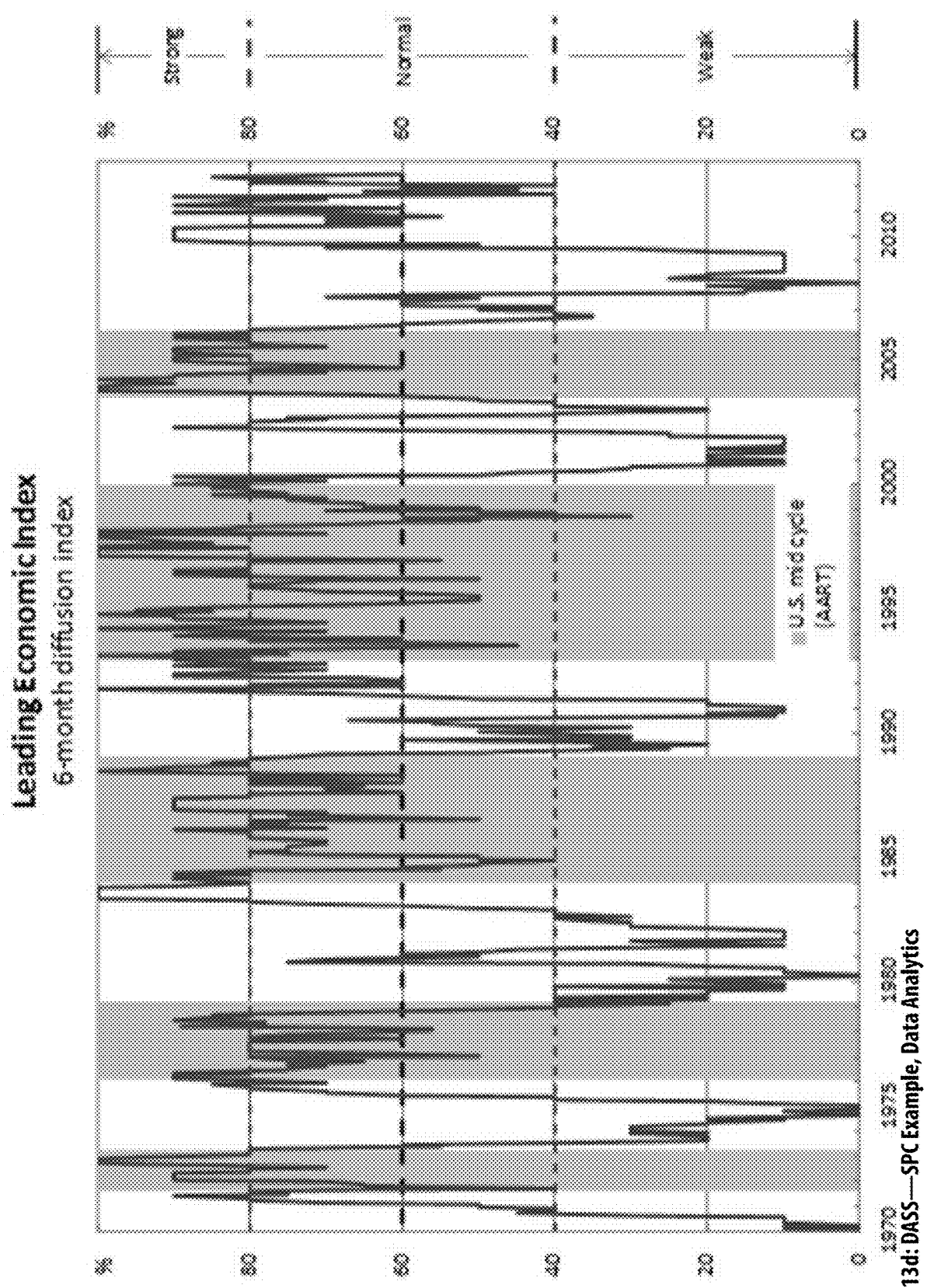
Fig.13d: DASS—SPC Example, Data Analytics

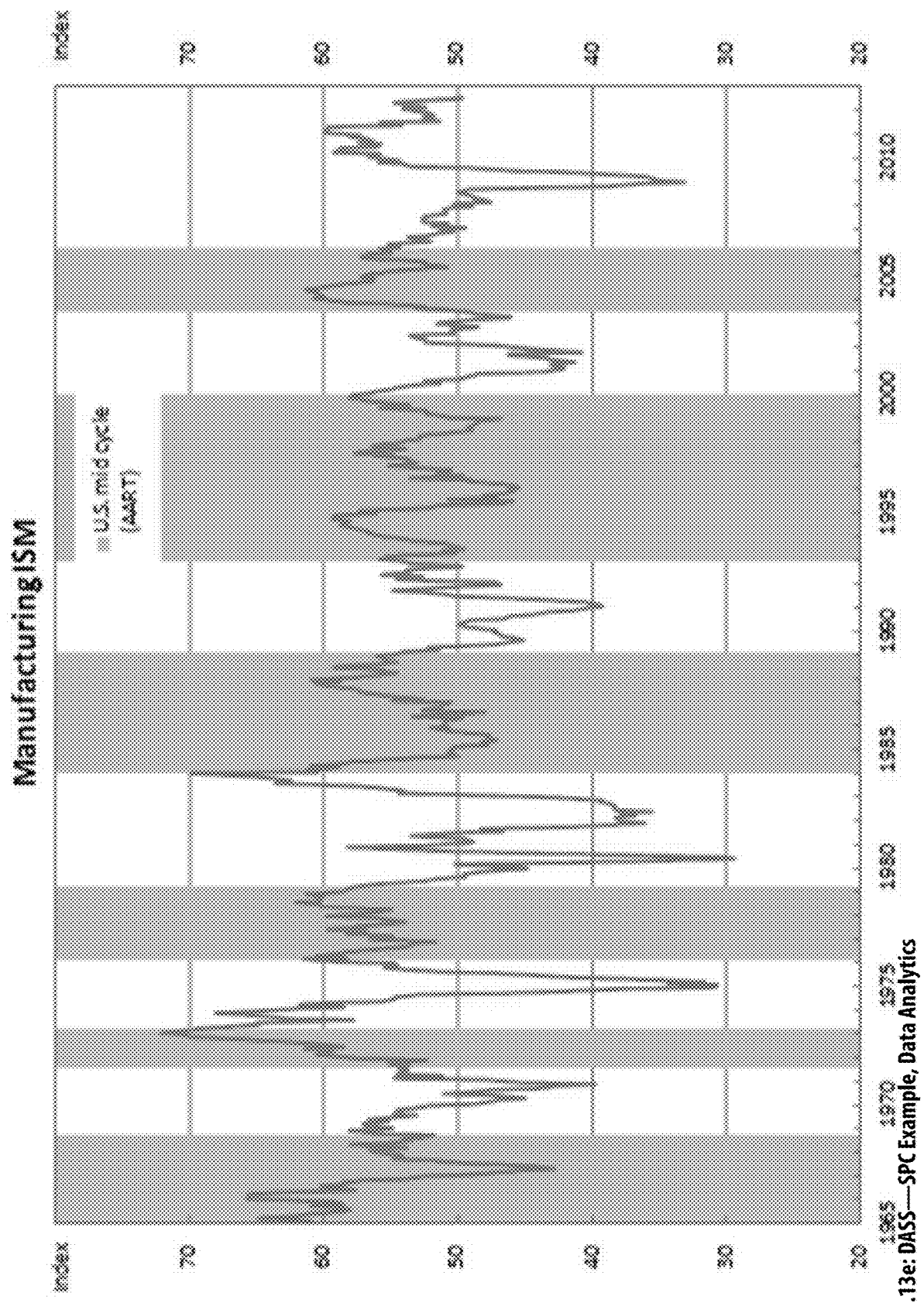
Fig. 13e: DASS—SPC Example, Data Analytics

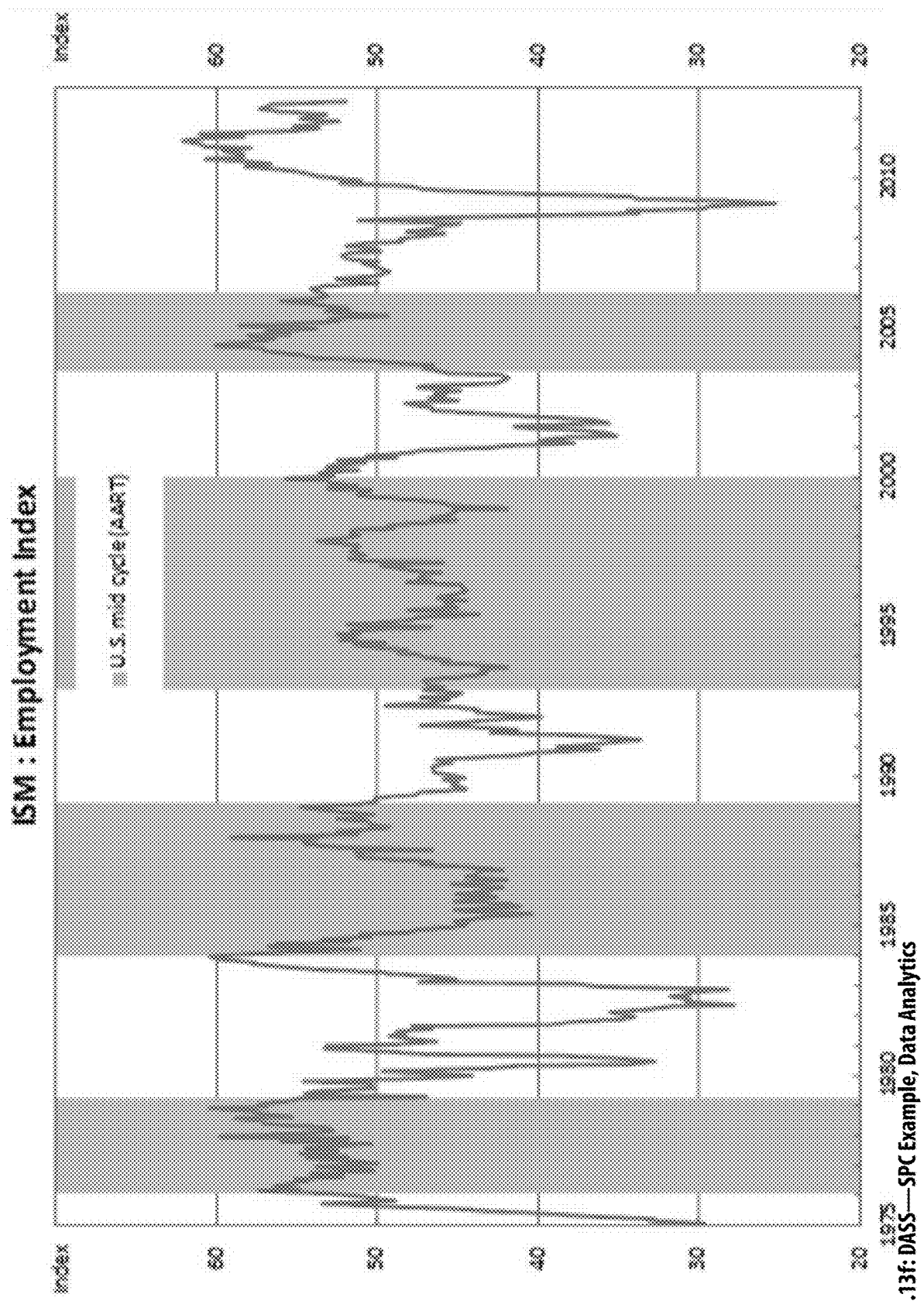
Fig. 13f: DASS—SPC Example, Data Analytics

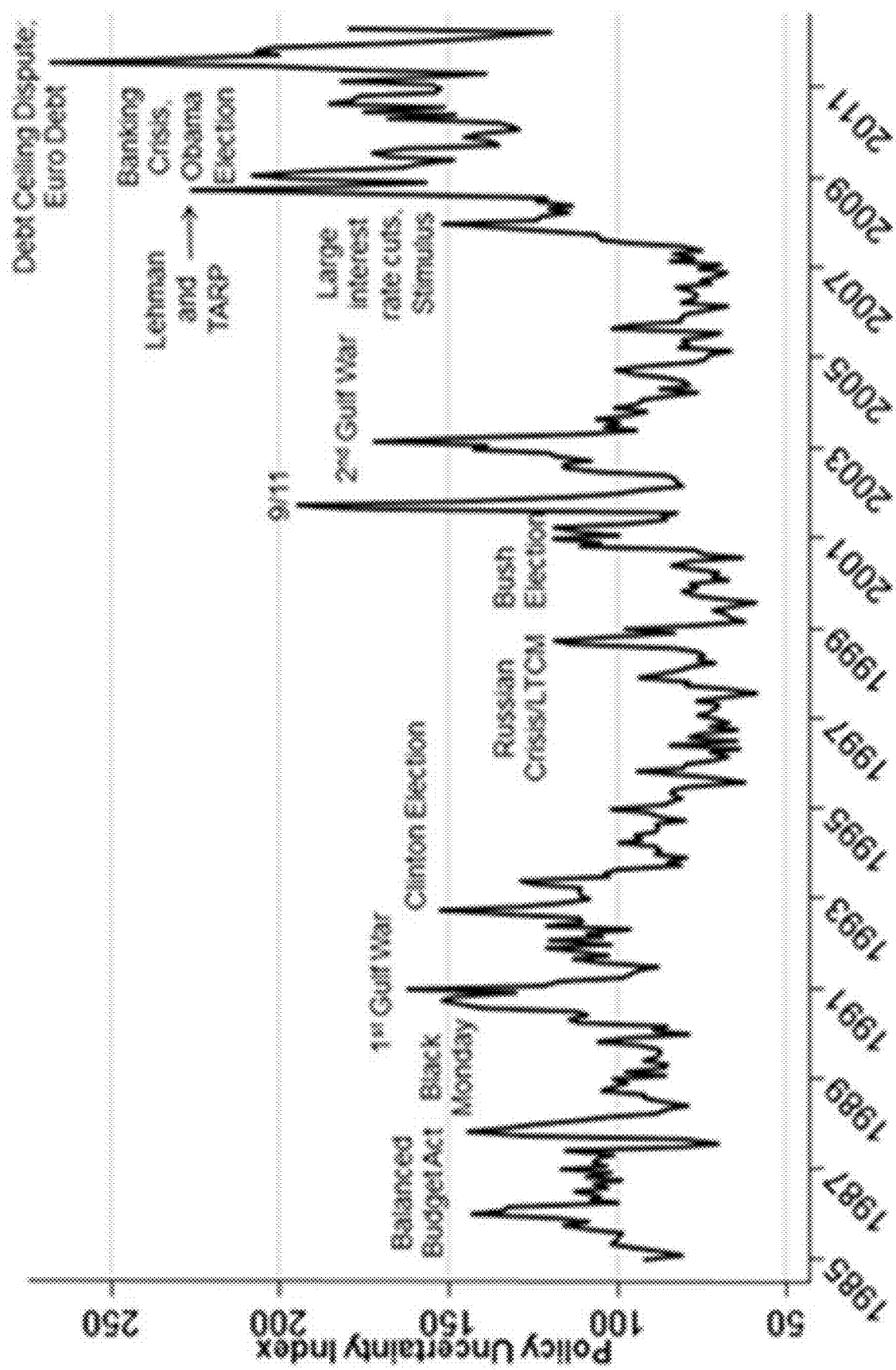
Fig. 13g: DASS—SPC Example, Data Analytics

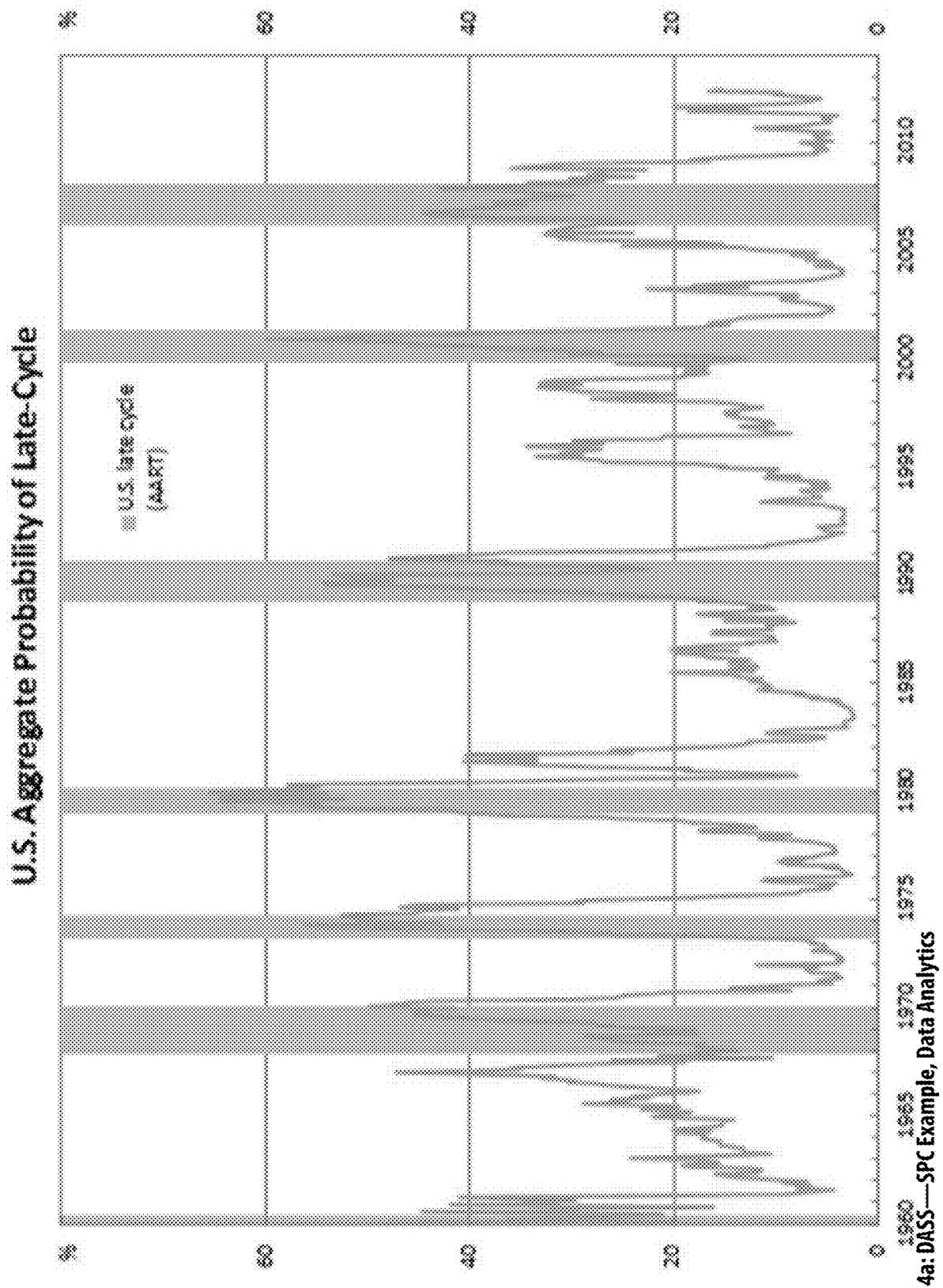
Fig. 14a: DASS—SPC Example, Data Analytics

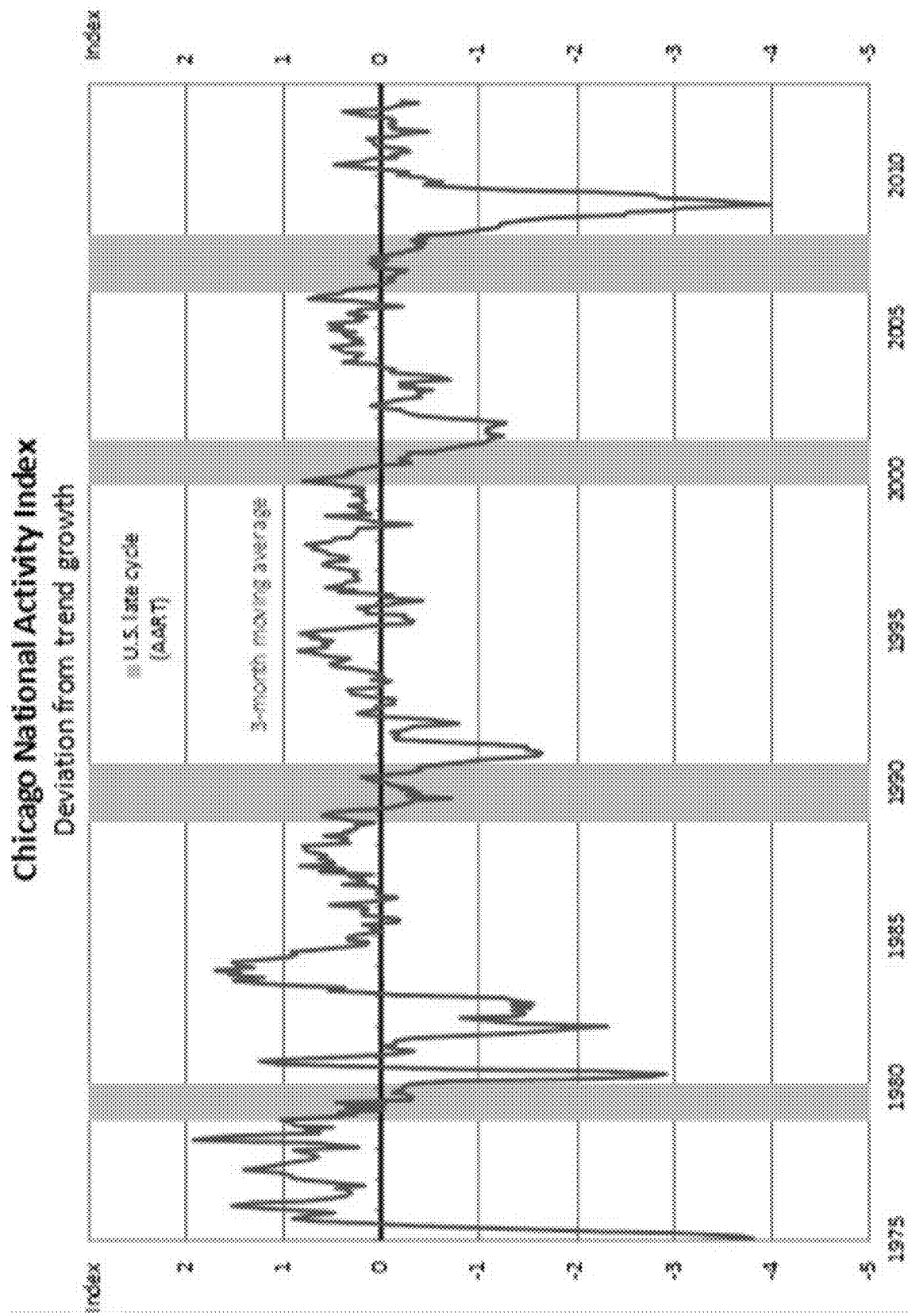
Fig. 14b: DASS—SPC Example, Data Analytics

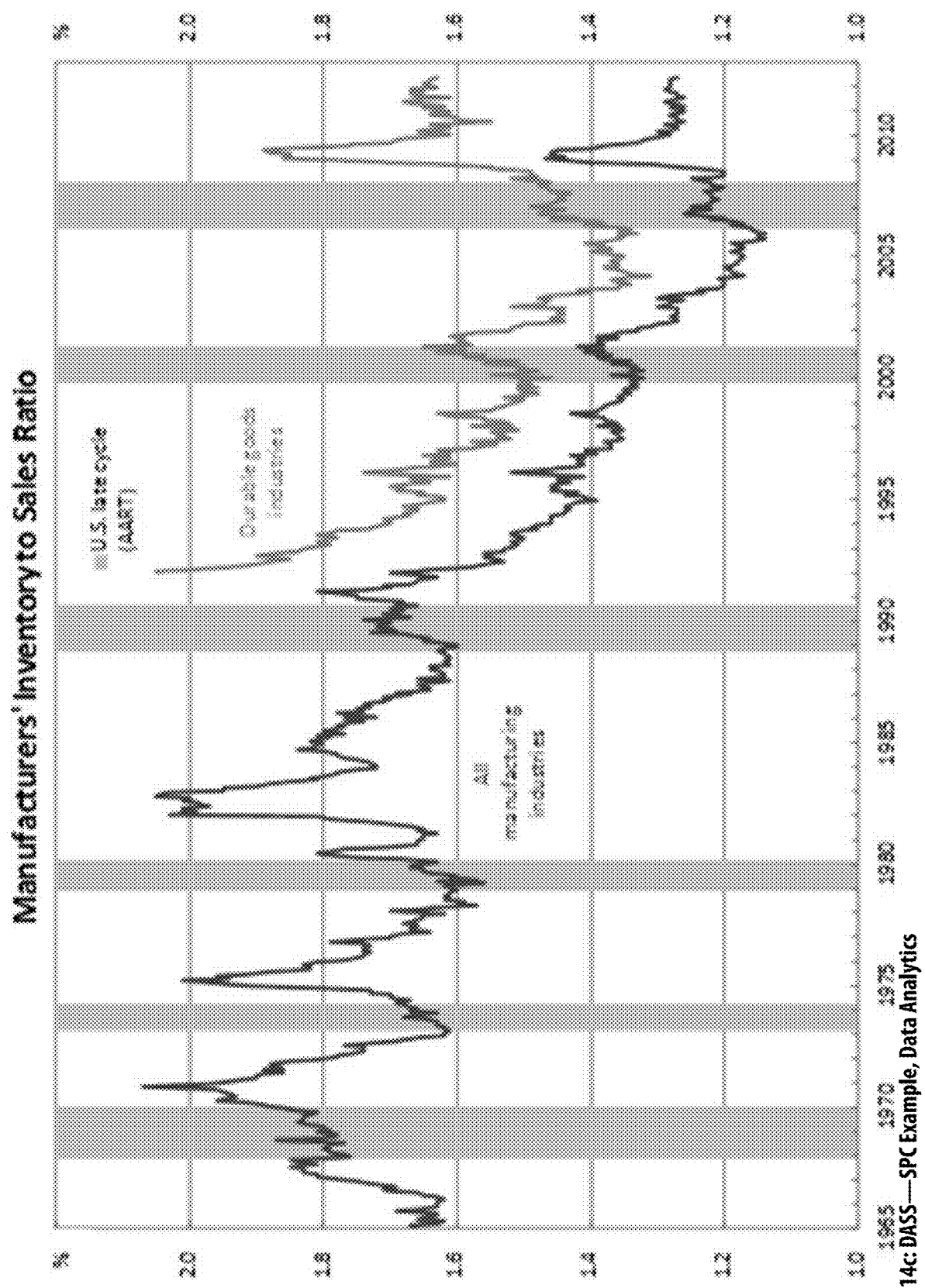
Fig.14c: DASS—SPC Example, Data Analytics

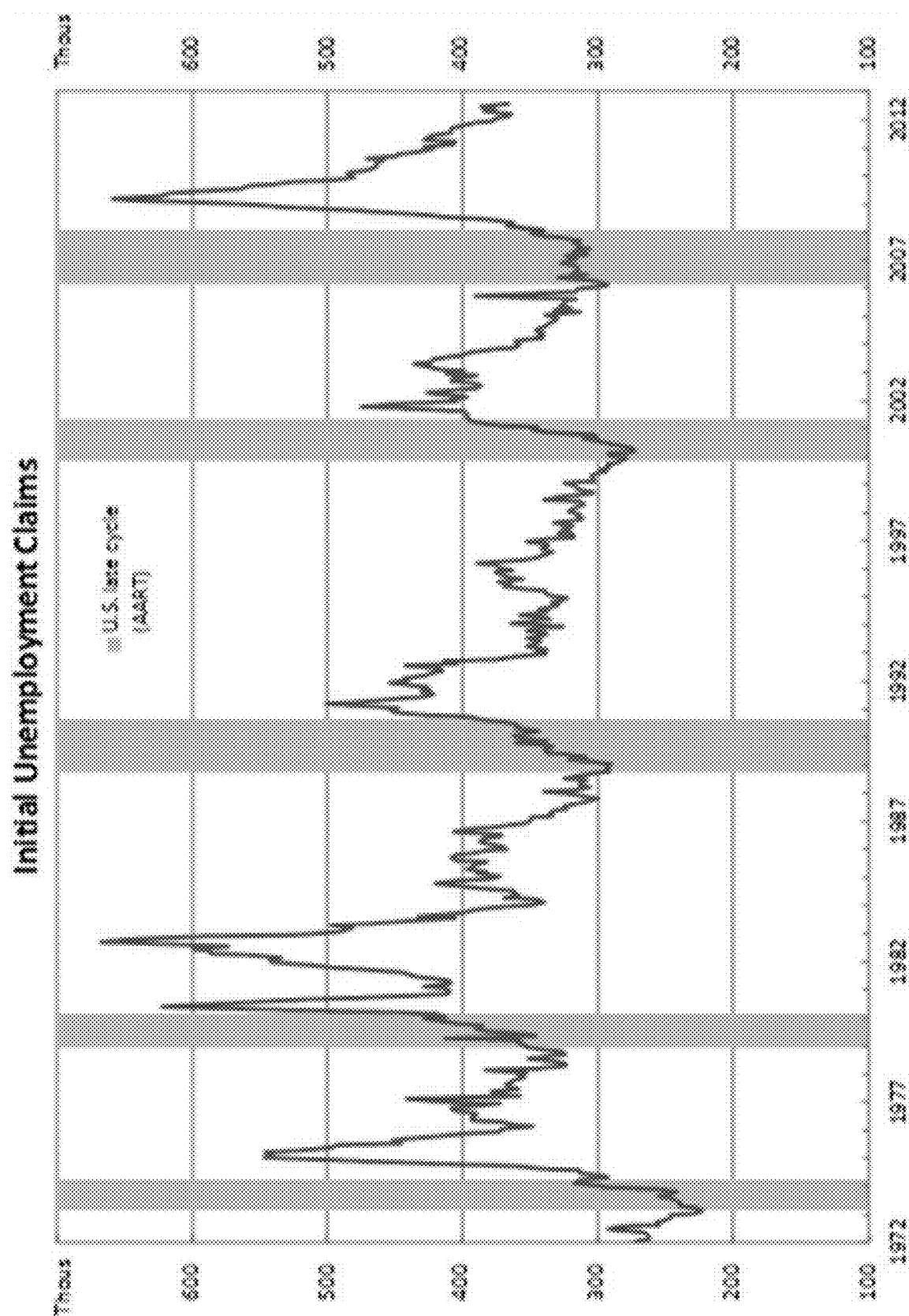
Fig.14d: DASS—SPC Example, Data Analytics

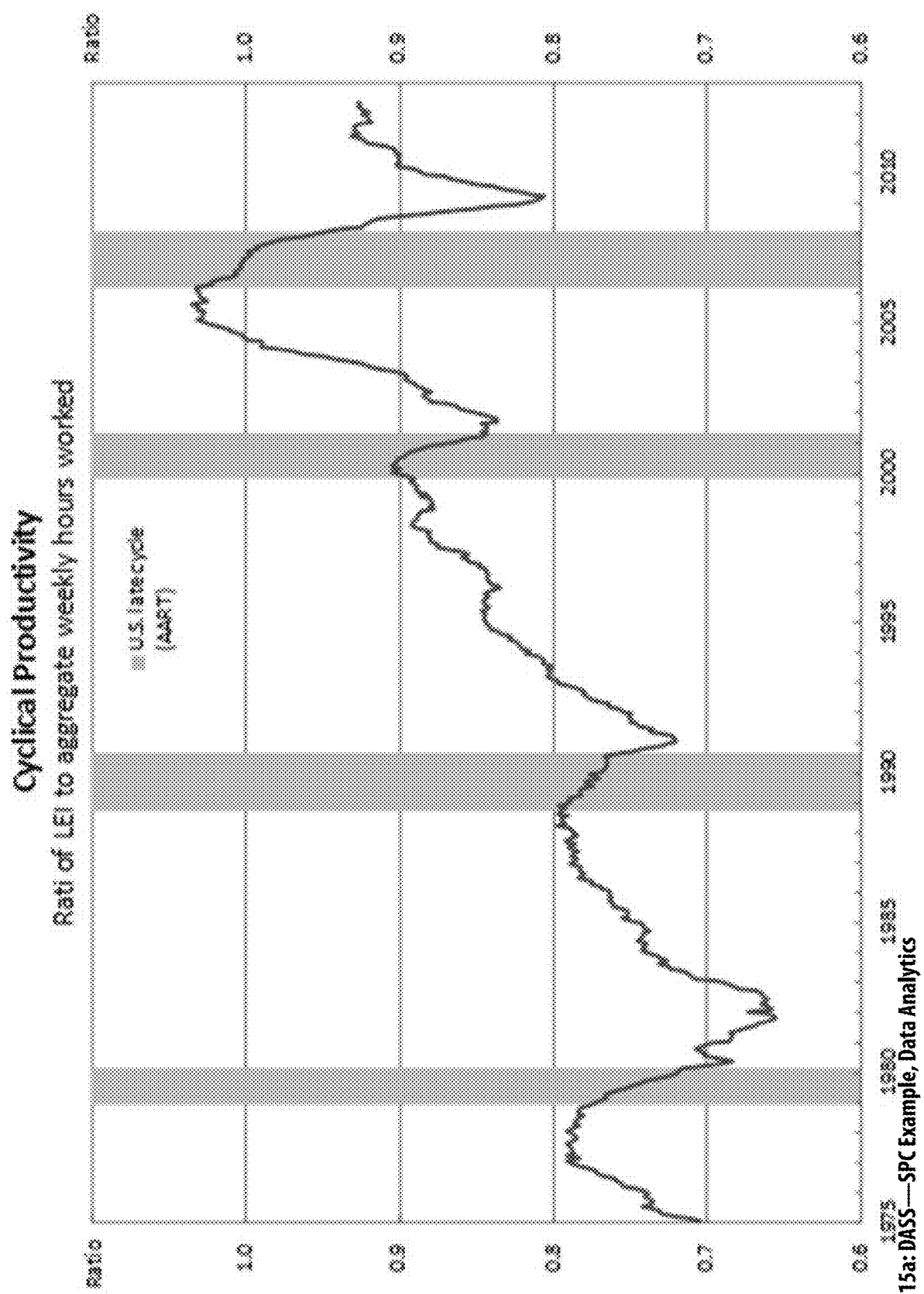
Fig.15a: DASS—SPC Example, Data Analytics

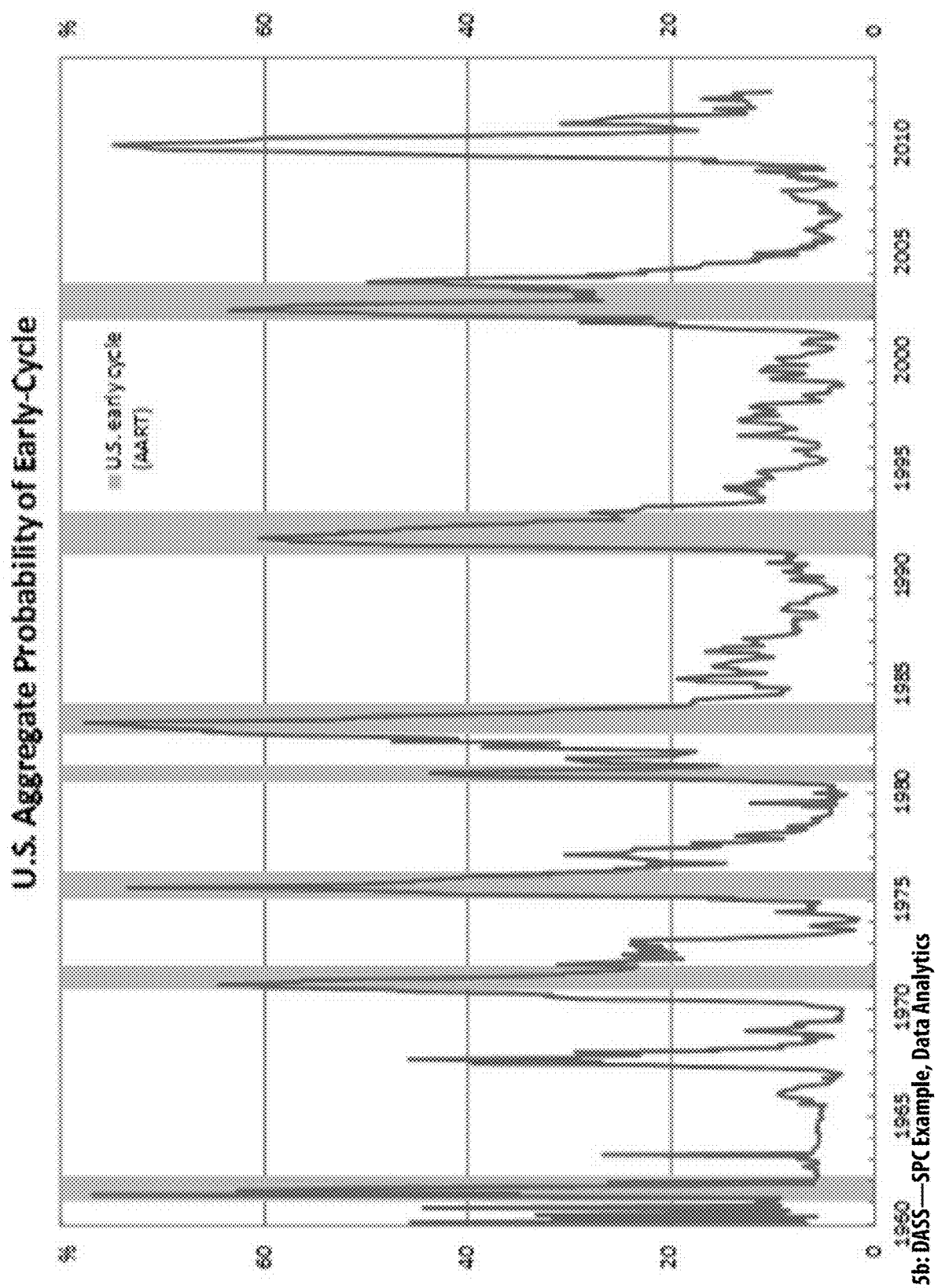
Fig.15b: DASS—SPC Example, Data Analytics

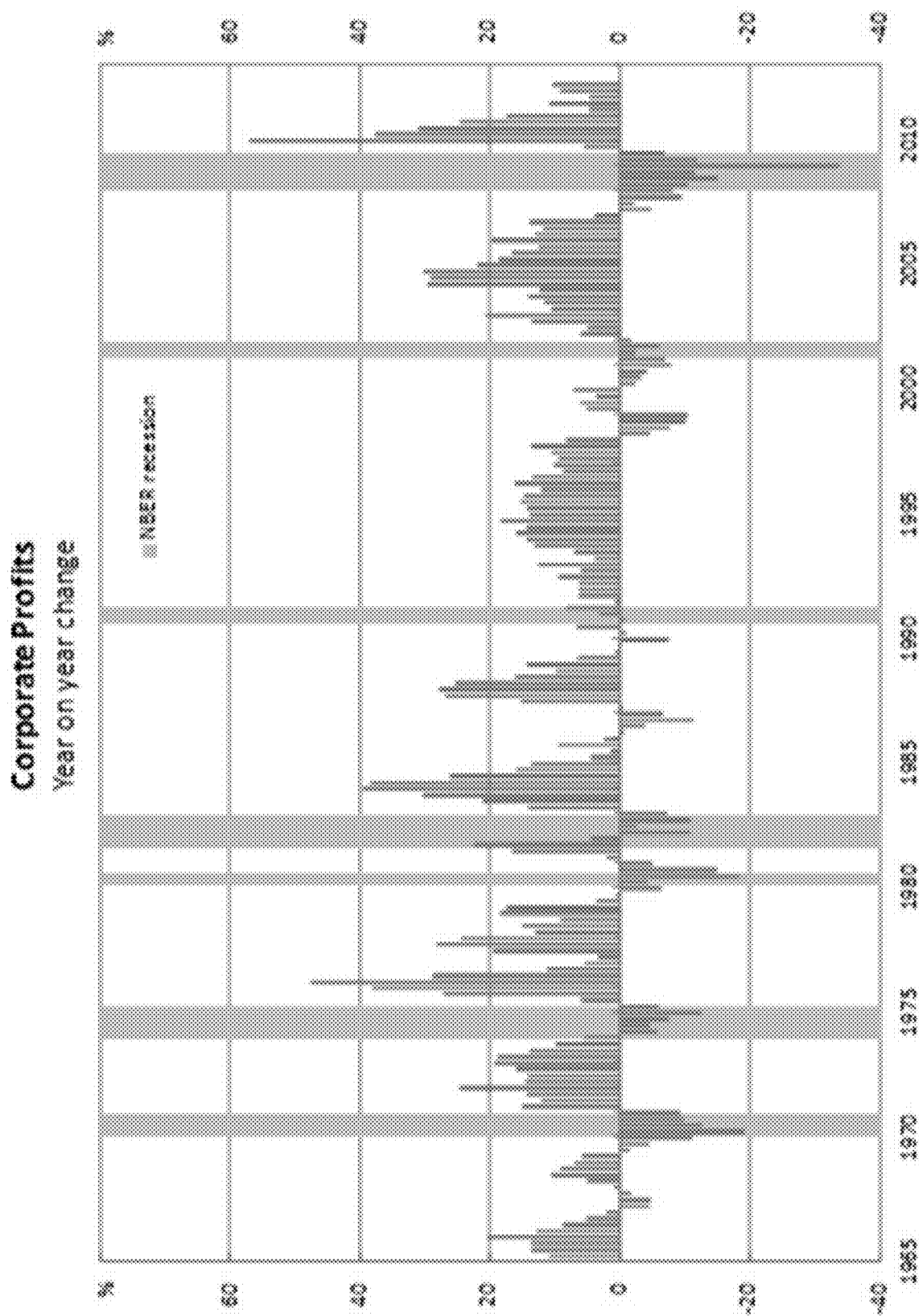
Fig.15c: DASS—SPC Example, Data Analytics

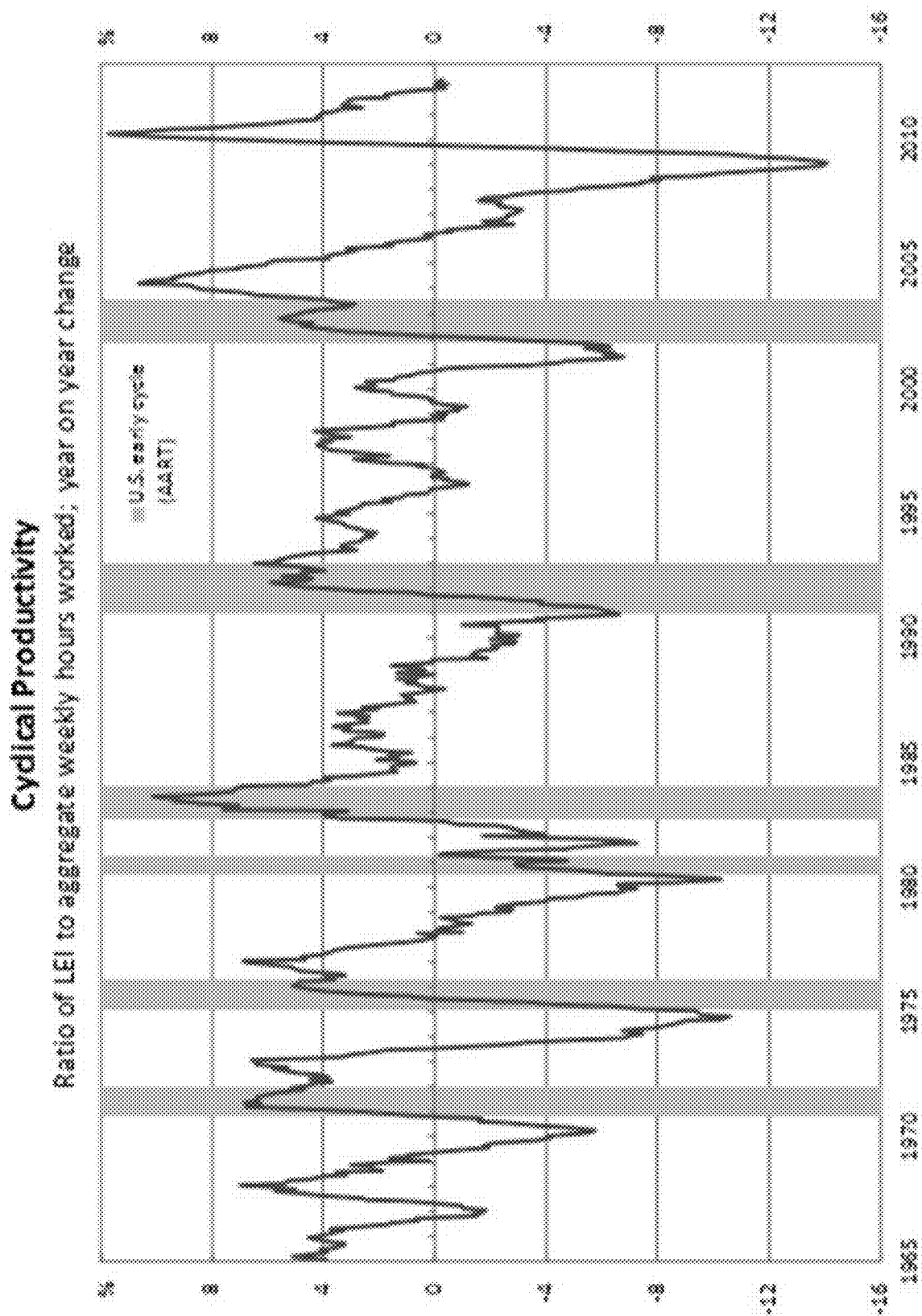
Fig.15d: DASS—SPC Example, Data Analytics

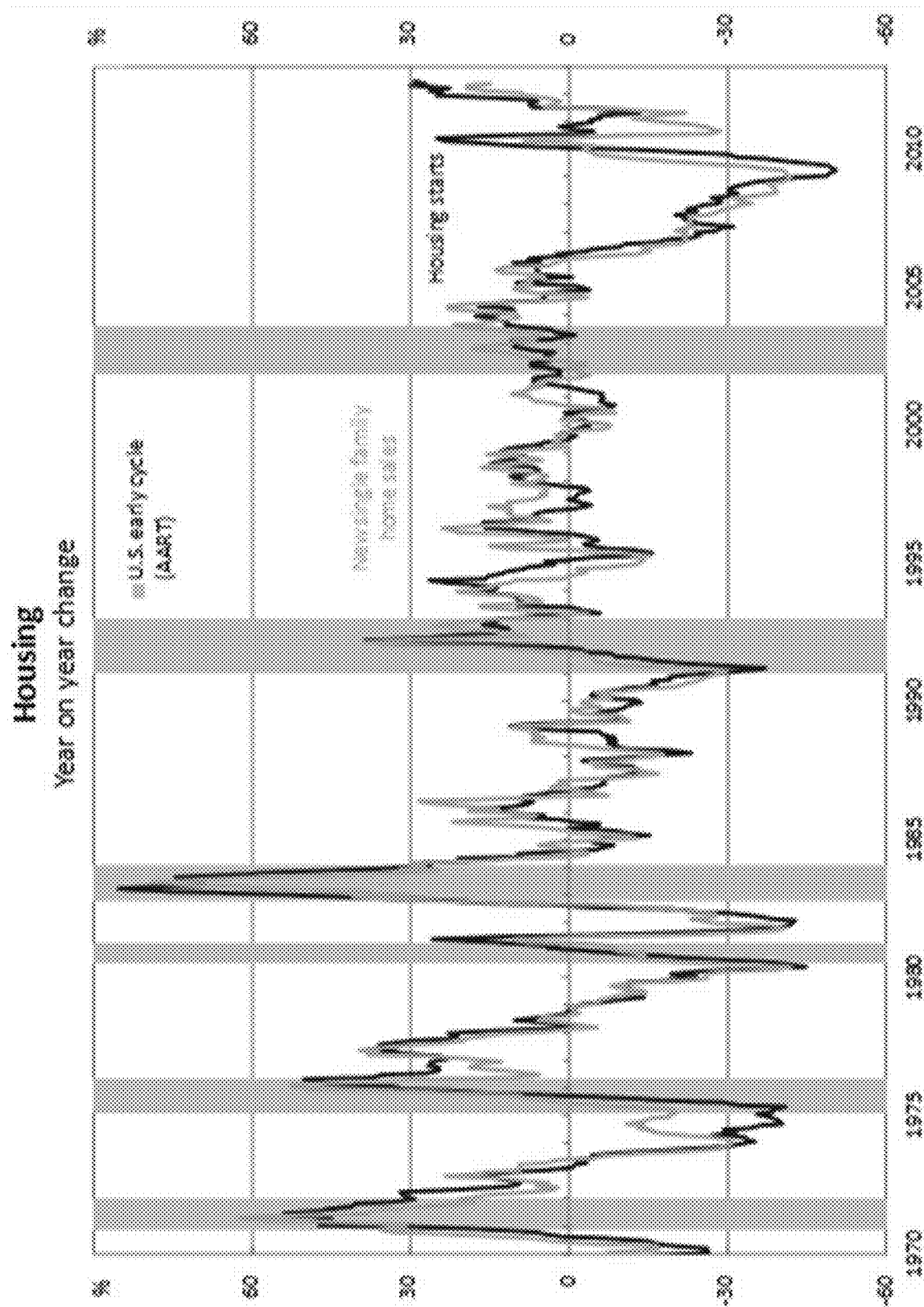
Fig.15e: DASS—SPC Example, Data Analytics

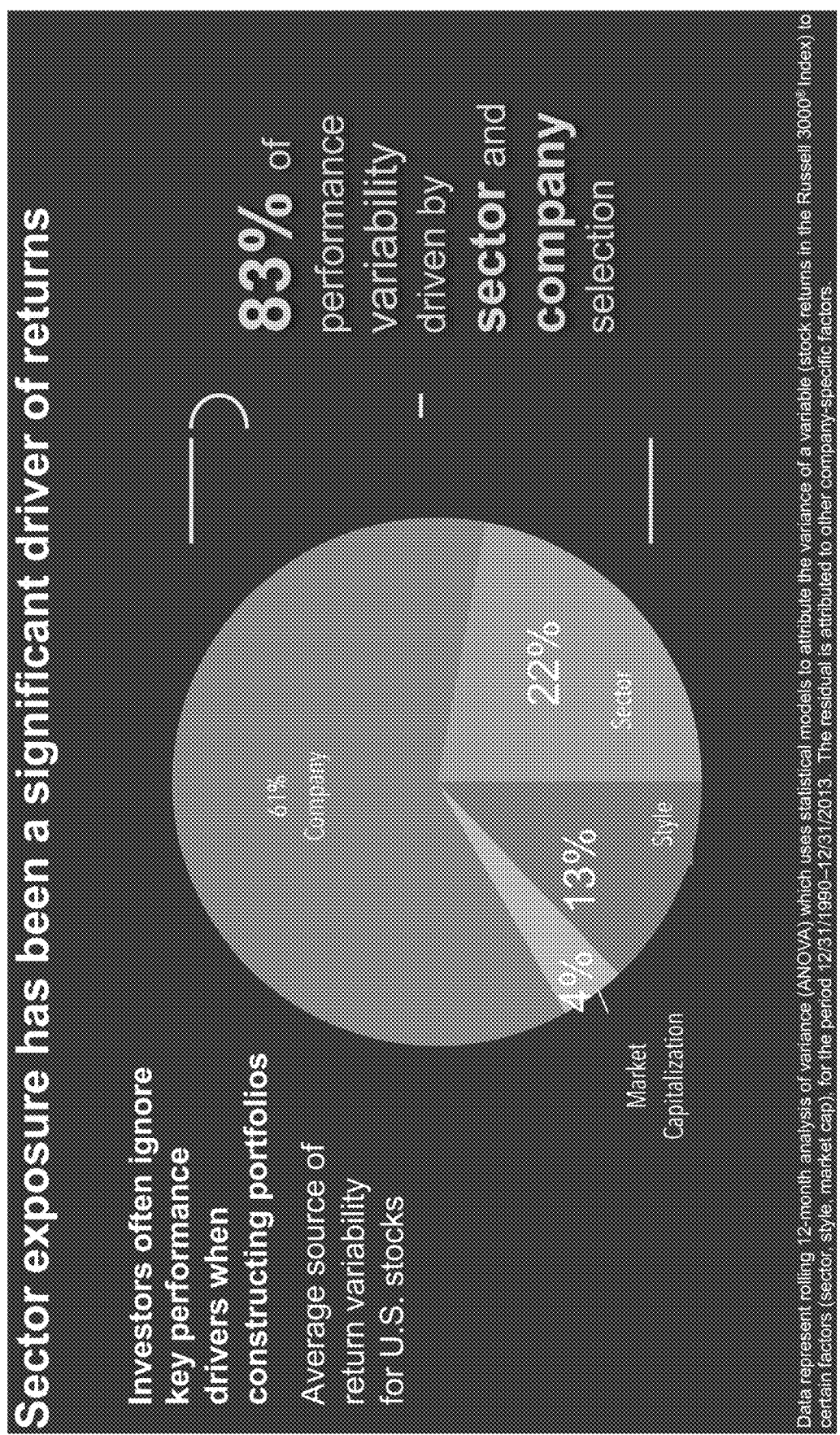
Fig.16: DASS—Cycle Scenario Construct

Sectors Have Distinct Characteristics for Portfolio Construction

Sectors exhibit clear patterns of volatility
*Equity sectors annual standard deviation**

| | 1993 | 1994 | 1995 | 1996 | 1997 | 1998 | 1999 | 2000 | 2001 | 2002 | 2003 | 2004 | 2005 | 2006 | 2007 | 2008 | 2009 | 2010 | 2011 | 2012 | 2013 |
|---|---|---|---|---|---|---|---|---|---|---|---|---|---|---|---|---|---|---|---|---|---|
| Materials | 15.4 | 17.0 | 17.4 | 24.9 | 28.1 | 33.9 | 33.2 | 45.4 | 54.3 | 47.1 | 20.4 | 18.4 | 24.7 | 22.4 | 15.7 | 37.0 | 41.5 | 24.7 | 27.2 | 16.7 | 14.3 |
| Information Technology | 15.1 | 16.0 | 12.7 | 14.4 | 18.5 | 77.9 | 23.8 | 28.5 | 32.1 | 44.3 | 17.5 | 16.3 | 13.0 | 15.8 | 15.5 | 34.4 | 33.7 | 24.4 | 26.9 | 17.2 | 12.9 |
| | 12.7 | | | | | | | | | 23.4 | 17.2 | 13.0 | 16.2 | 14.9 | 15.2 | 30.4 | 30.0 | 24.2 | 22.6 | 15.9 | 11.9 |
| EXAMPLE #1: Consistently High *Information Technology* | | | | | | | | | | 21.6 | 16.1 | 11.5 | 12.7 | 10.2 | 13.0 | 30.1 | 29.8 | 23.0 | 21.5 | 14.4 | 11.1 |
| | 11.5 | | | | | | | | 20.7 | 20.8 | 15.7 | 10.1 | 10.1 | 9.9 | 12.9 | 29.7 | 23.0 | 21.6 | 18.6 | 12.5 | 11.1 |
| Financials | 11.3 | 11.9 | 9.0 | 11.1 | 16.3 | 23.0 | 16.4 | 20.0 | 20.2 | 20.2 | 15.1 | 9.8 | 9.9 | 9.2 | 12.5 | 26.3 | 22.9 | 19.7 | 17.5 | 11.1 | 10.9 |
| Energy | 11.1 | 11.1 | 8.4 | 10.8 | 13.5 | 22.0 | 16.3 | 20.4 | 19.5 | 19.7 | 15.1 | 9.7 | 9.0 | 9.0 | 11.8 | 24.3 | 19.0 | 17.0 | 17.2 | 10.7 | 10.0 |
| Consumer Discretionary | | 7.8 | 10.7 | 15.3 | 13.4 | 20.8 | 17.6 | 17.7 | 14.2 | 9.6 | 6.8 | 6.8 | 10.4 | 23.1 | 18.3 | 15.0 | 13.0 | 10.1 | 9.7 | | |
| Top 3,000 Stocks | | 7.8 | 10.6 | 15.1 | 22.8 | 14.9 | 15.6 | 16.4 | 11.6 | 8.5 | 6.8 | 6.8 | 10.3 | 21.3 | 13.0 | 15.0 | 10.8 | 9.8 | 8.6 | | |
| Industrials | 10.1 | 10.9 | 7.3 | 10.5 | 12.5 | 14.9 | 14.6 | 18.8 | 13.9 | 13.8 | 9.9 | 8.1 | 7.5 | 6.7 | | 17.5 | 17.1 | 15.0 | 13.8 | 9.4 | 8.6 |
| Telecom Services | | | | | | | | | | 13.3 | 9.1 | 7.6 | 6.8 | | | | | | 6.9 | 7.8 | 8.5 |
| Health Care | 6.8 | | | | | | | | | | | | | | | | | | | | |
| | 5.6 | 8.9 | 5.4 | 11.6 | 14.9 | 15.7 | | | | | | | | | | | | | | | |

EXAMPLE #2: Consistently Low *Consumer Staples*

*Standard Deviation: A statistical measurement of the dispersion of a fund's return over a specified period of time. U.S. equity market represented by top 3,000 U.S. stocks as measured by market capitalization; sectors as defined by GICS. Source: Fidelity Investments as of

Fig. 17: DASS—Cycle Scenario Construct

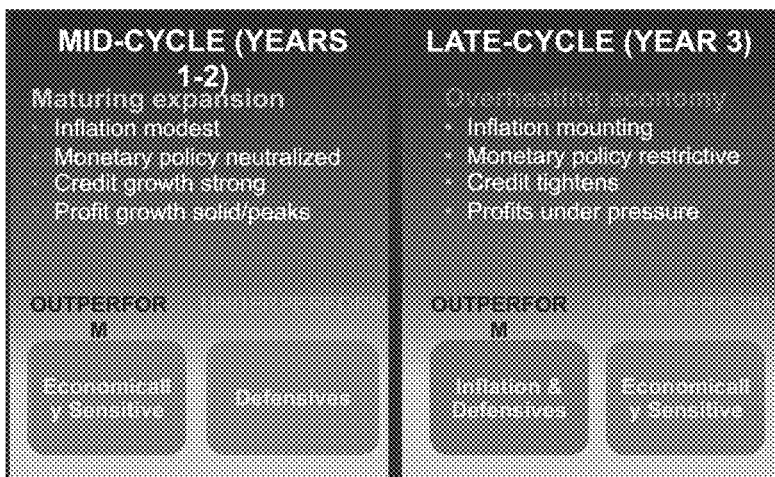
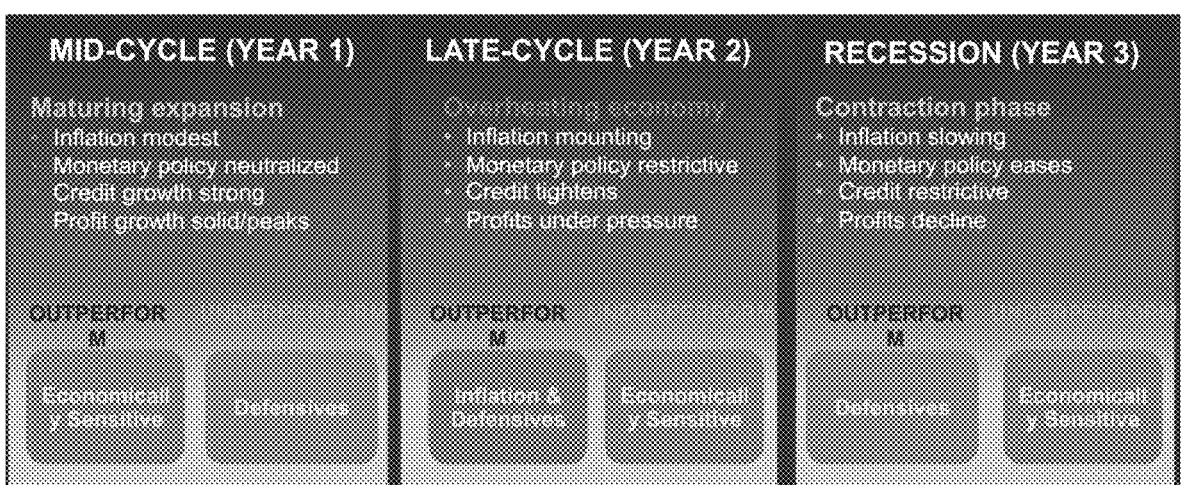
Fig.18: DASS—Cycle Scenario Construct

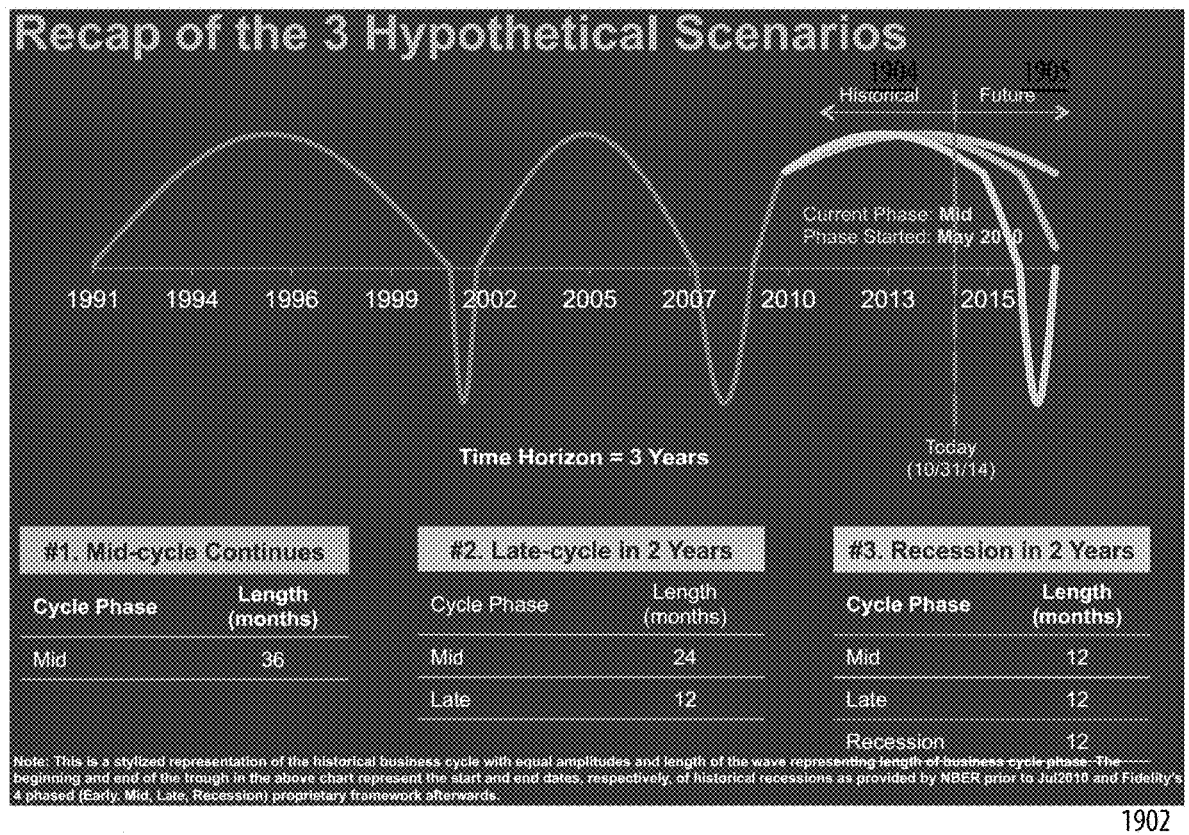
Fig.19: DASS—Cycle Scenario Construct

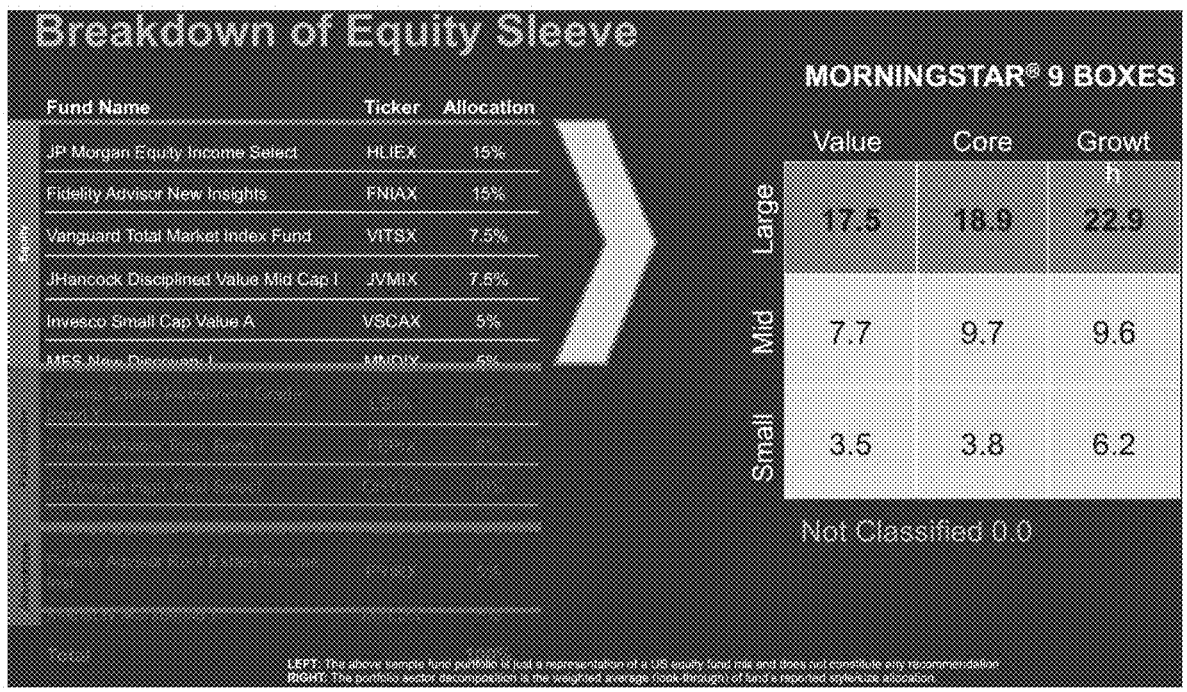
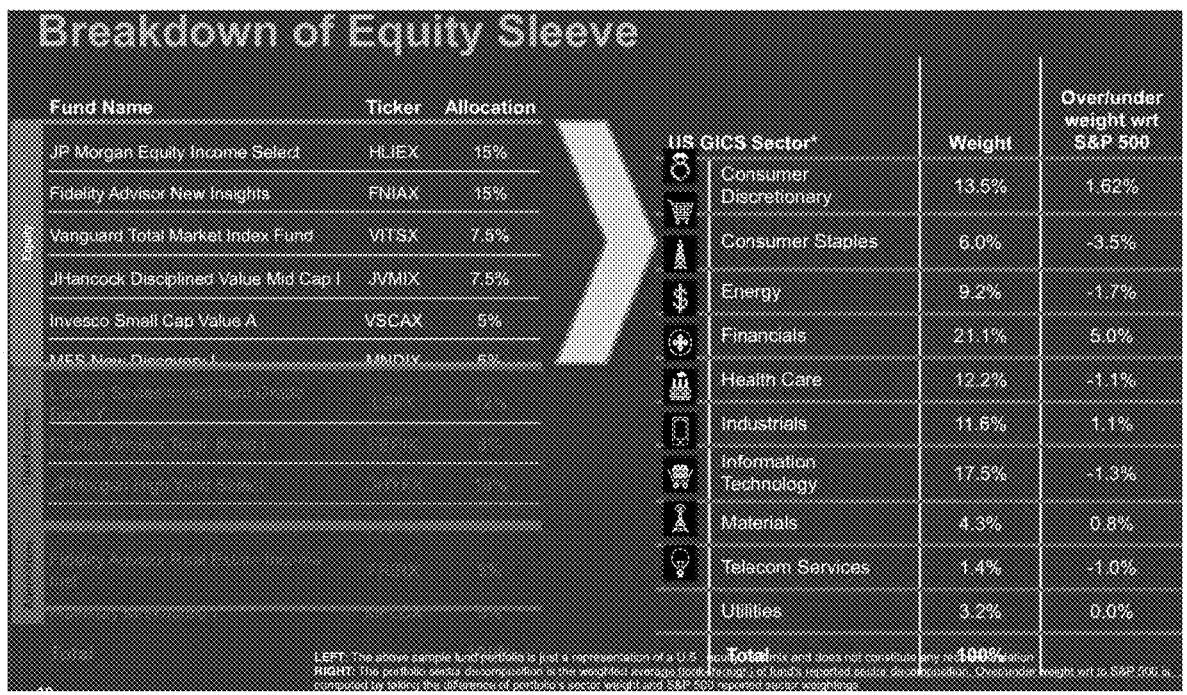
Fig.20: DASS—Cycle Scenario Construct

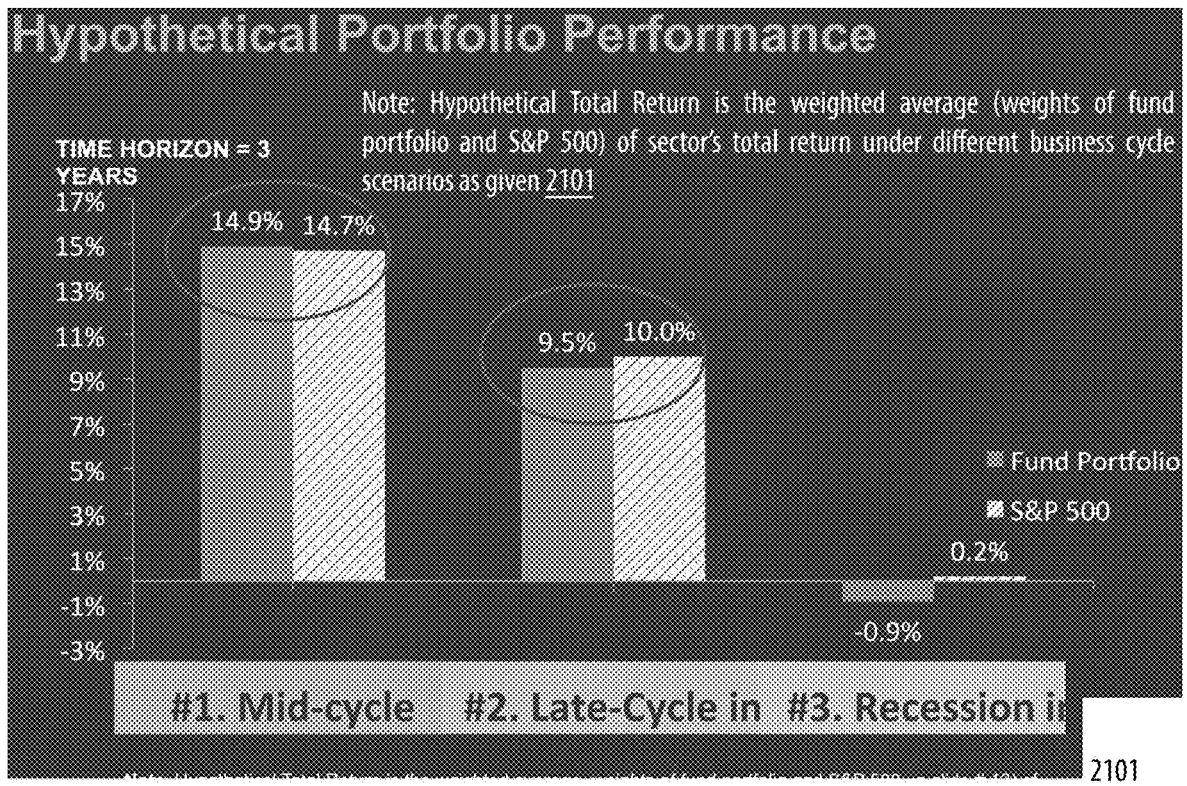
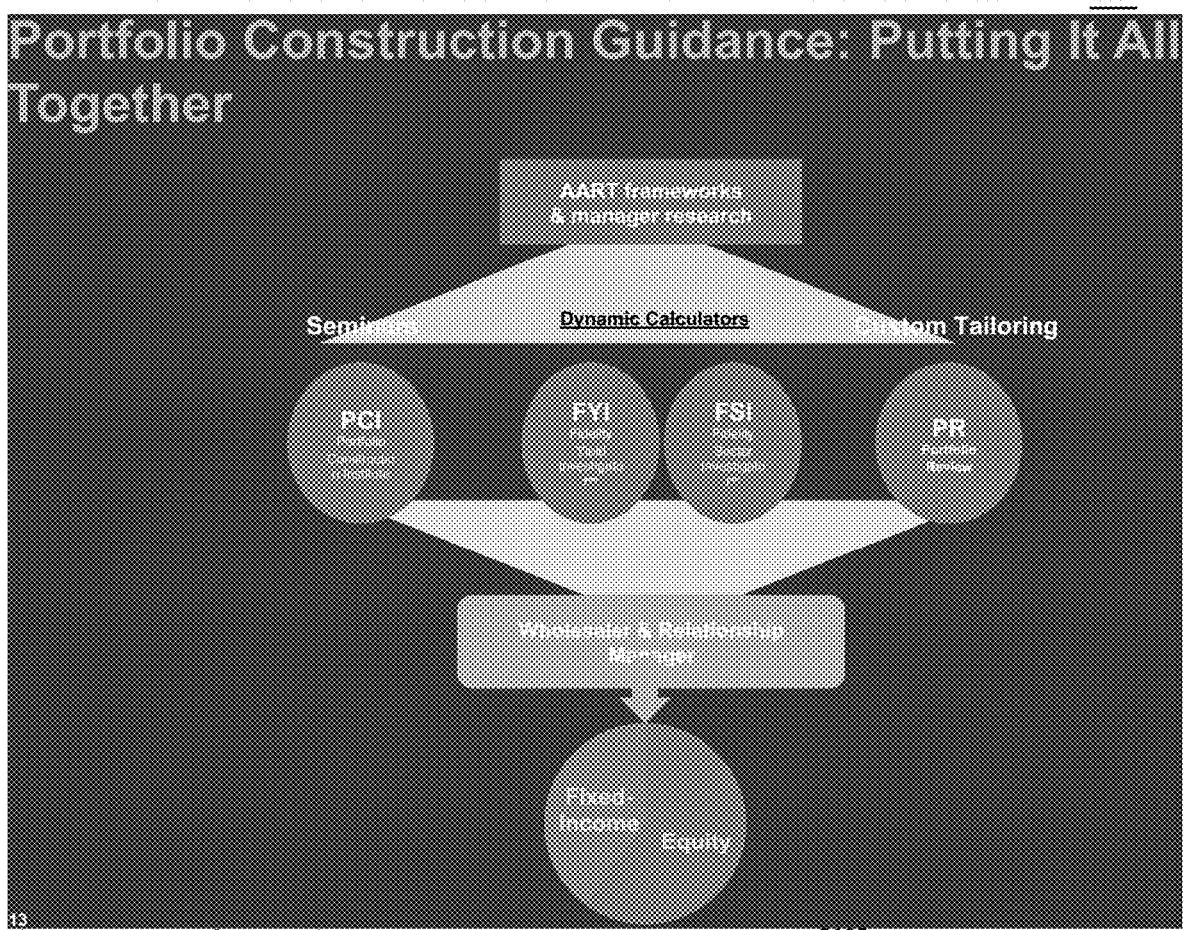
Fig.21: DASS—Cycle Scenario Construct

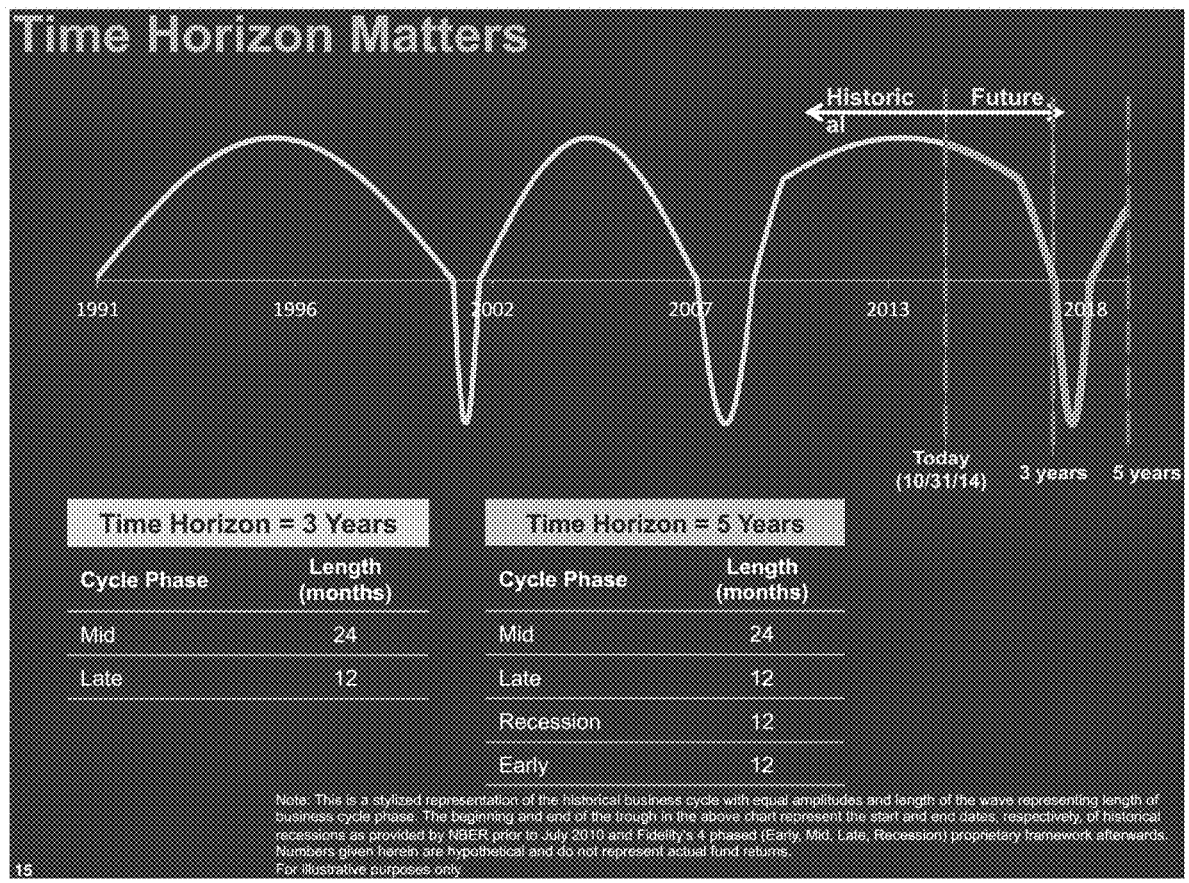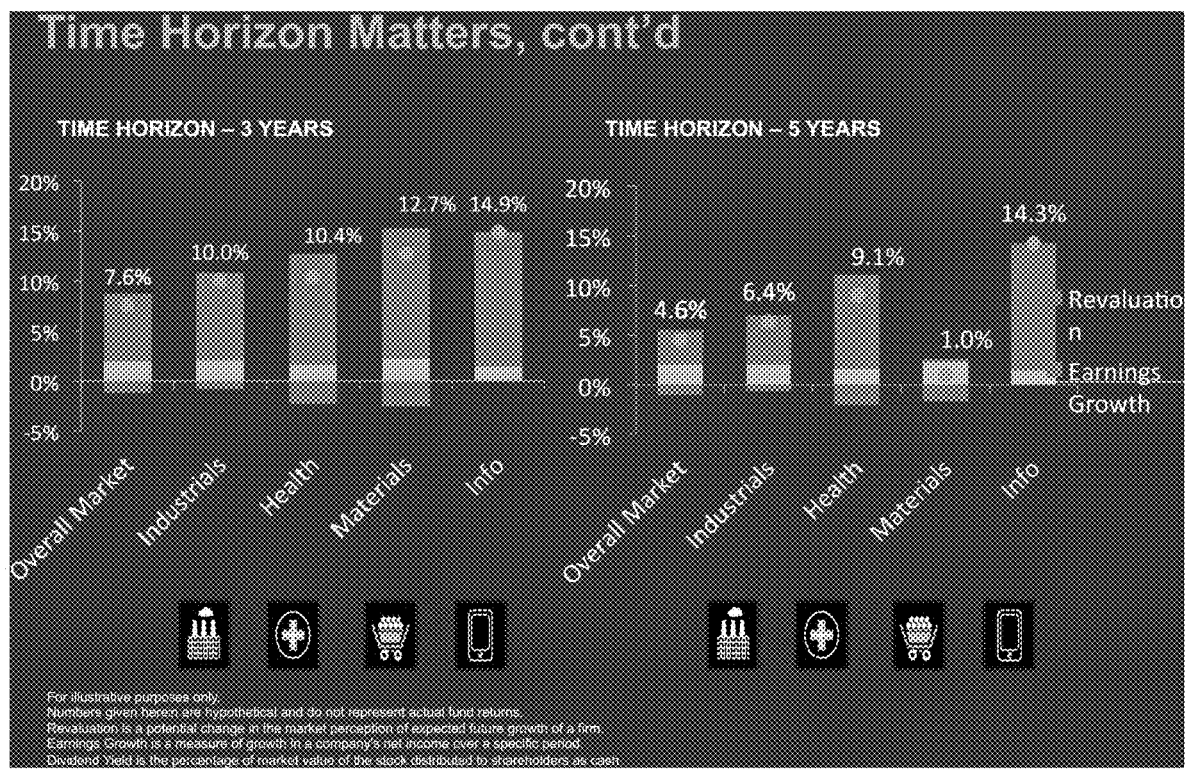
Fig.22: DASS—Cycle Scenario Construct

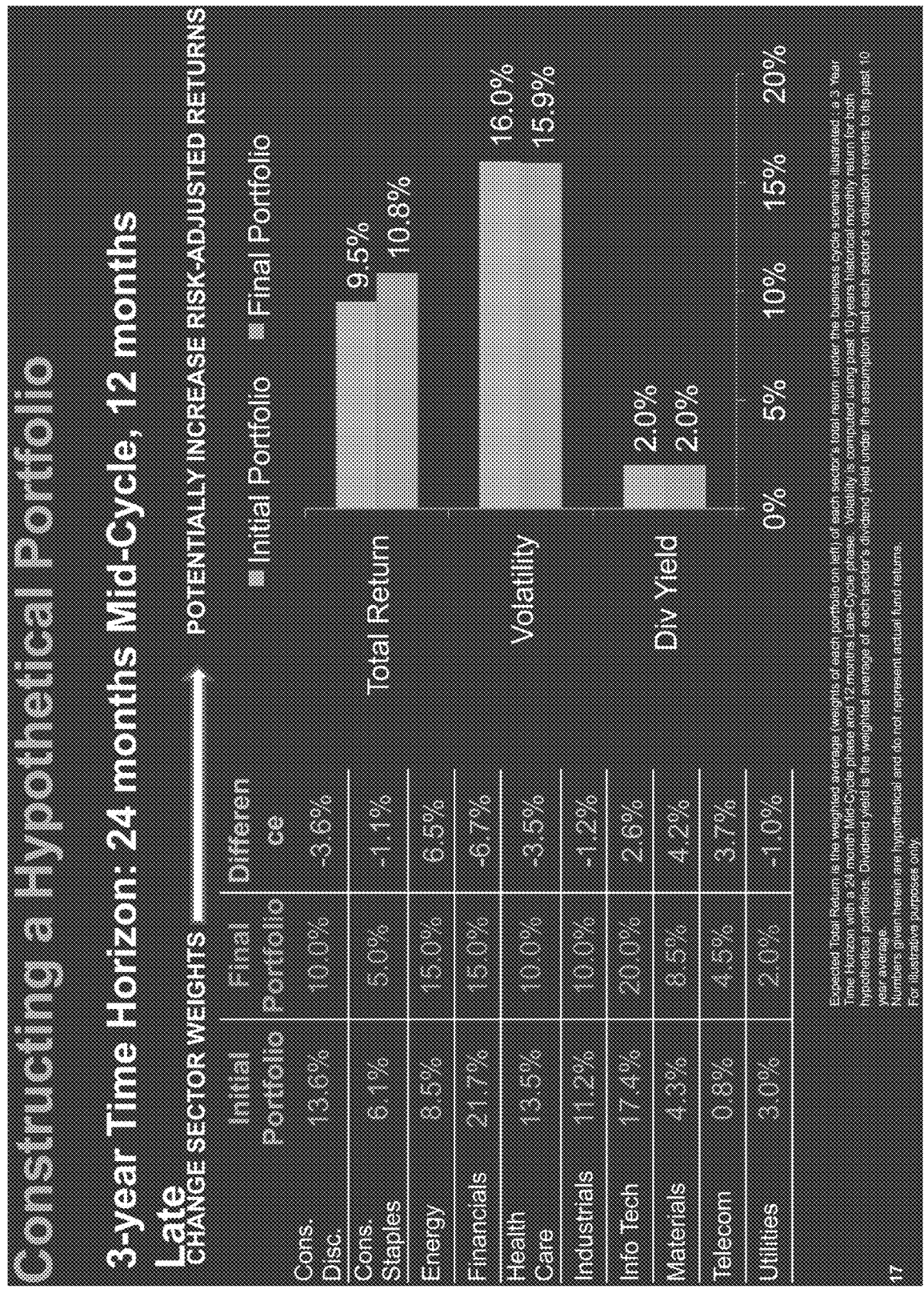
Fig.23: DASS—Cycle Scenario Construct

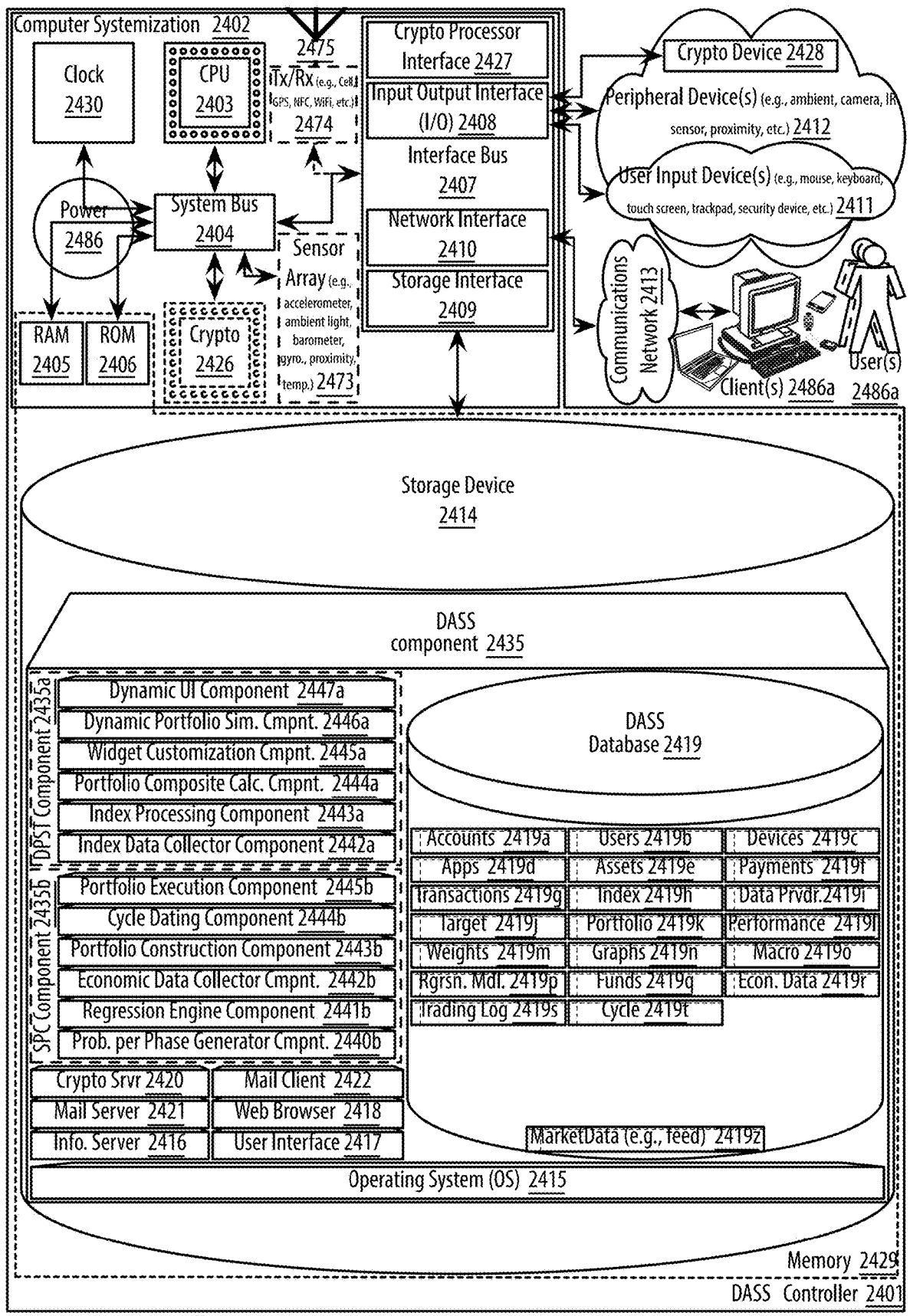
Fig.24: DASS—Controller

US 11,449,942 B2

DYNAMIC ASSET SECTOR SIMULATOR APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/113,510, filed Feb. 8, 2015, entitled "Dynamic Asset Sector Simulator Apparatuses, Methods and Systems." Applicant, also, hereby claims benefit to priority under 35 USC § 120 as a continuation-in-part of: U.S. patent application Ser. No. 14/601,119 filed on Jan. 20, 2015, entitled "Dynamic Portfolio Simulator Tool Apparatuses, Methods and Systems," which in turn claims priority under 35 USC § 119 as a non-provisional conversion of US provisional patent application Ser. No. 61/929,478, filed Jan. 20, 2014, entitled "Dynamic Portfolio Simulator Tool Apparatuses, Methods and Systems." Applicant, also, hereby claims benefit to priority under 35 US § 120 as a continuation-in-part of: U.S. patent application Ser. No. 14/286,792 filed on May 23, 2014, entitled "Seasonal Portfolio Construction Platform Apparatuses, Methods and Systems," which in turn claims priority under 35 USC as a continuation of U.S. patent application Ser. No. 14/137,971 filed on Dec. 20, 2013, entitled "Seasonal Portfolio Construction Platform Apparatuses, Methods and Systems." Applicant, also, hereby claims benefit to priority under 35 USC §§ 119, 365 as a national stage entry and continuation-in-part of serial no. PCT/US14/71765, filed Dec. 20, 2014, entitled "Seasonal Portfolio Construction Platform Apparatuses, Methods and Systems."

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address asset information technology, and more particularly, include Dynamic Asset Sector Simulator Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

People own all types of assets, some of which are secured instruments to underlying assets. People have used exchanges to facilitate trading and selling of such assets. Computer information systems, such as NAICO-NET, Trade*Plus and E*Trade allowed owners to trade securities assets electronically.

BRIEF DESCRIPTION OF THE DRAWINGS

Appendices and/or drawings illustrating various, non-limiting, example, innovative aspects of the Dynamic Asset Sector Simulator Apparatuses, Methods and Systems (hereinafter "DASS") disclosure, include:

FIGS. 1A-1C provide exemplary user interface diagrams illustrating embodiments of the DASS;

FIG. 1D provides an example diagram illustrating aspects of fixed income portfolio simulation within embodiments of the DPST;

FIG. 1E provides an example diagram illustrating aspects of economic cycle based investment management within embodiments of the SPC;

FIG. 1F provides an example diagram illustrating aspects of economic cycle phase determination within embodiments of the SPC;

FIG. 2A provides an example datagraph diagram illustrating aspects of interactive data flows between the DPST server and its affiliated entities for portfolio simulation within embodiments of the DPST;

FIG. 2B provides an example block diagram illustrating aspects of index data structure within embodiments of the DPST;

FIG. 2C provides an exemplary data plot illustrating yield processing within embodiments of the DPST;

FIG. 3A provide a logic flow diagram illustrating interactive process flows between a user/participant and the DPST server for portfolio simulation within embodiments of the DPST;

FIGS. 3B-3C provides an exemplary logic flow illustrating dynamic user interactions for portfolio calculation within embodiments of the DPST;

FIGS. 4A-8D provide example user interface (UI) diagrams illustrating aspects of portfolio configuration and calculation within embodiments of the DPST;

FIGS. 5A-5B provides exemplary user interface diagrams illustrating exemplary scenarios of portfolio simulations for different investment objectives within embodiments of the DPST;

FIGS. 6A-6E provides exemplary user interface diagrams illustrating alternative exemplary scenarios of portfolio simulations for different investment objectives within embodiments of the DPST;

FIGS. 7A-7D provides exemplary user interface diagrams illustrating portfolio diagnostics within embodiments of the DPST;

FIGS. 8A-8D provides exemplary user interface diagrams illustrating portfolio performance comparisons in a rising interest rate environment within embodiments of the DPST;

FIG. 9 provides an example datagraph diagram illustrating aspects of interactive data flows between the SPC server and its affiliated entities for seasonal portfolio construction within embodiments of the SPC;

FIGS. 10A-10C provide example logic flow diagrams illustrating aspects of work flows for seasonal portfolio construction, economic cycle phase dating within embodiments of the SPC;

FIGS. 11A-11B provide example combined data and logic flow diagram illustrating a regression engine for dating the economic cycle phase within embodiments of the SPC;

FIG. 11C provides an example logic flow diagram illustrating aspects of generating an optimal portfolio for a cycle phase within embodiments of the SPC;

FIGS. 12A-12G provide exemplary data analytics charts illustrating various economic indicators within embodiments of the SPC;

FIGS. 13A-13G provide exemplary data analytics charts illustrating economic indicators of mid-cycle within embodiments of the SPC;

FIGS. 14A-14D provide exemplary data analytics charts illustrating economic indicators of late-cycle within embodiments of the SPC;

FIGS. 15A-15E provide exemplary historical data analytics charts illustrating economic indicators of early-cycle within embodiments of the SPC;

FIGS. 16-23 provide exemplary cycle scenario data analytics charts illustrating economic indicators and cycle scenarios within embodiments of the DASS;

FIG. 24 shows a block diagram illustrating embodiments of a DASS controller.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Dynamic Asset Sector Simulator Apparatuses, Methods and Systems (hereinafter "DASS") transforms market assumptions, constraints, portfolio construction/adjustment requests inputs, via DASS components (e.g., DPST 1635a (index data collector, index process, portfolio cmpst. calc., widget cstm., dynamic portfolio sim., dynamic UI), SPC 1635b (prob. per phase generator, regression engine, econ. data collector, portfolio cnstrct., cycle dating, portfolio exec.), etc.), into asset allocation record, portfolio allocation and graphic presentation, seasonal portfolio investment transaction records outputs The DASS components, in various embodiments, implement advantageous features as set forth below.

INTRODUCTION

In one embodiment, the DASS builds on the facilities of a Dynamic Portfolio Simulator Tool (DPST) and a Seasonal Portfolio Construction Platform (SPC) components. In one embodiment, the DASS provides a business cycle approach to sector based equity investment systems. The DASS takes into account that the changing phases of the business cycle often coincide with shifts in relative equity sector earnings, and as such, that portfolio construction may be improved through cyclical tilts that take advantage of these shifts. As such, the DASS provides a calculator and calculation engine that can help advisors quantify actionable tradeoffs they may face.

The DASS extends the DPST's fixed income analytics engine by leveraging the SPC to allow for equity analytics as well as seasonality. User interaction is extended allowing for dynamic (e.g., slider) response to investigate sectors (e.g., equities). Cyclical (e.g., seasonal) allocations can now be calculated through an intuitive user interface, and allows for strategic allocations over long terms (e.g., a 10 year horizon) and tactical allocations (e.g., a 1 year horizon). For example, a user (e.g., financial advisor) may take in any mix of equity funds, provide ownership percentages those equities, receive over/under weights relative to a sector (e.g., index (S&P 500), etc.) and adapt allocations of holdings including cyclical movements and horizons (e.g., US equity allocation (e.g., linkage of earnings growth of a corporation and a sector that corporation operates in)). Further, a prognosis can be made, obtaining analysis relative to the user holdings, the DASS can give a forward prognosis, that, e.g., based on the sector position of the current holdings, relative to a specified cyclical outlook (e.g., probability of mid cycle, or user specified expectations), the DASS allows for adjustment of holdings on a moving forward basis. As such, the DASS provides a cycle framework based on this same observation: that both absolute and relative equity performance are largely driven by cyclical factors tied to the state of the economy. For instance, during an expansionary mid-cycle phase, you can expect sustained relative earnings growth in the technology and industrials sectors. When the economy moves to a recessionary phase, you can expect healthcare earnings to grow relatively faster than materials. The overall business cycle matters for portfolio risk and return, and strategically leveraging sector exposure may help improve portfolios. 1. Sectors have consistent classifications and performance drivers. Sectors benefit from fairly stable compositions, whereas growth stocks can migrate to value and small caps can graduate to mid or even large caps. 2. Sectors display clear patterns of volatility. For instance, tech is reliably riskier than consumer staples. 3. Sectors are not perfectly correlated. There is often a large performance dispersion between the best and worst performing sectors, creating a high return differentiation. This generates attractive diversification potential, which provides you with an opportunity to add value to your clients' portfolios, even if it doesn't guarantee against a loss. A time horizon of 10 years or more is typical for a strategic outlook, while one year or less is common for a tactical outlook. This leaves a vast intermediate horizon of between one and 10 years, with a corresponding wealth of risk and return opportunities. The DASS allows one to examine the sector mix that underlies existing funds and the manager mix. This is information may be publicly available, but because data is collected monthly, there may be a reporting lag and positions may shift in the middle of the month. That said, active managers sometimes specialize in a handful of sectors, so their sector bets can tend to persist. Further, the DASS allows a user to consider how the business and economic cycle might evolve over that intermediate (one to 10 years) time horizon. For example, a two to three year outlook today likely keeps us in a continued mid-cycle expansionary phase (overweighting cyclical industries such as tech), with possibly some exposure to an eventual late-cycle (energy and materials). As such, strategic asset allocations may be put in play over a secular horizon, tactical bets are evaluated every few weeks, and cyclical allocations fall in between—expect them to remain in place for at least a year, and often much longer. A cyclical and sector position established by the DASS can instruct the user with allocations that weather a wide range of potential economic scenarios over an intermediate time horizon, often over two or three years. The DASS' sector analysis can include and work across a diverse range of vehicles, regardless of whether they are active or passive, funds or ETFs. As the DASS is a sector-aware asset allocator, it can be configured to pay special attention to the sectorial discipline of their active managers. Thinking cyclically and utilizing sector investing, represents a largely untapped opportunity in allocation construction to diversify portfolios as well as invest for risk-adjusted returns. In addition, because business media is filled with views and perspectives on the overall economic direction, cyclical and sector investing can help facilitate a analysis that contemplates and insulates such directions. With the DASS allowing users to incorporate thoughtful views on the business cycle, while considering a more expansive use of equity sectors, provides for portfolio analysis and allocations, in real time, contemplating future cycles based on past cycles in an intuitive manner that has not been possible before the DASS.

In one embodiment, the DPST provides a dynamic calculation tool for investors to interactively simulate and obtain the performance (e.g., return, risk level, etc.) of a user constructed fixed income portfolio, and adjust parameters of the portfolio, and SPC provides an investment analytics and management tool facilitating a user (e.g., investors, consumers, portfolio managers, traders, etc.) to research, build and maintain an investment strategy for a customized portfolio based on a current economic cycle phase. The DASS extends the DPST and SPC facilities allowing users to calculate and simulate asset (e.g., a portfolio) value taking into account actual and/or expected asset/sector performance during a specified cycle. The DASS provides a business cycle framework and renders actionable guidance to sector allocators, taking into account their cyclical outlook, investment objectives, and existing US equity fund holdings. DASS calculates and allows users to explore never-before-seen forward-looking analytical perspective on asset portfolios. DASS connects together business cycle dynamics (e.g., SPC components) with sector-based equity return dynamics (e.g., DPST components) and connects it to portfolio outlook over a cyclical timeframe. As such, DASS provides a never-before-seen forward looking analytical perspective on asset portfolios.

Computer systems allow investors and managers to trade equities. Funds in the retirement saving accounts are managed by an investment manager for the individual investor to invest in various financial vehicles, such as a pension fund. Consumers invest in financial instruments to pursue an economic profit. Consumers buy publicly traded financial instruments from a public trading exchange platform (i.e., an outcry bidding system). Common publicly traded financial instruments are stocks, bonds, future contracts, and options. Consumers can buy or sell one or more types of financial instruments to form an investment portfolio. In order to manage the performance of the investment portfolio, consumers need to closely track the pricing index of each financial instrument in the portfolio on a daily basis.

In one embodiment, the DASS helps financial advisors leverage cyclical and sector exposure more effectively by taking advantage of potential sector performance opportunities and there by generating higher return differentials. The DASS helps advisors with critical portfolio construction decisions. DASS allows financial advisors to explore different scenarios in the business cycle, allowing them to quantify the actionable trade-offs they face when leveraging sector exposure in portfolio construction. In one embodiment, DASS identified that sectors accounted for 22 percent of the return differentials across U.S. stocks, more than style (13 percent) or size (4 percent) combined. In addition, the changing phases of the business cycle may coincide with shifts in potential equity sector earnings. As such, DASS can help improve model portfolios through cyclical tilts that leverage these shifts. DASS includes features such as:

Investigate the assumptions and evaluate the outlook for the U.S. business cycle over time horizons ranging from one to 10 years Examine the cyclical outlook embedded in their current mix of U.S. equity managers Build a hypothetical total return outlook for each equity sector over selected time horizons Explore portfolio implications of targeted risk/return levels, and of overweighting or underweighting sectors compared to a market benchmark.

DASS may also provide advantages by not overlooking the sector mix, and as such, DASS add value for users by taking discerning and taking advantage of the large performance dispersion between the best and worst performing sectors at any point in the business cycle.

In one embodiment, DASS builds DPST and SPC solutions in helping advisors with portfolio construction. DASS may employ and extend DPST components (e.g., in addition to basing calculations on bonds and now using assets, securities, asset portfolios, sectors and more), and the DPST components make rigorous portfolio construction analytics available to users to test portfolios in different hypothetical market environments in a simple, clear and interactive format. As such, DASS ads value for users by showing how they may be able to better position their clients' equity portfolios to take advantage of potential sector performance opportunities, and also allowing them to explore different scenarios in the business cycle and quantify the actionable trade-offs they face when leveraging sector exposure.

The DASS provides a complementary approach to equity investing, and that is through sectors. Stocks follow earnings over the long-term. Both stock prices and earnings have tended to trend upward in a secular timeframe, even though they cycle through the peaks and troughs of the economic cycle. Each equity sector has demonstrated a unique pattern of earnings growth and decline through the different phases of the business cycle, and this provides an opportunity for active managers to add value for their users. In addition, by using DASS, clients may take advantage of the fact that sectors have fairly stable composition, unlike growth stocks that migrate to value or small caps that graduate to mid or large.

DASS, in one embodiment, may provide an elegant and interactive calculator that explores fundamental mechanics of equity sectors through business cycles including how these sectors may perform during hypothetical future business cycles as entered by the user. The DASS may discern, how, historically, there have been persistent patterns in how different equity sectors grow their earnings in different phases of the business cycle and these patterns help to build an outlook for relative returns for each sector. DASS builds upon the economic outlook of the user (e.g., more specifically, how long different phases of the business cycles may last) and exploits the observed patterns to derive an outlook for the equity sectors. The calculator may then use GIGS sectors as building blocks to sample portfolios and allows the user to create custom portfolios based upon their objectives and constraints. Results generated by the Calculator are not a pre-programmed projection or prediction and instead are based on historical and current sector performance, plus standard calculations applied to user inputs. The DASS is designed to help answer questions such as:

What may happen to various equity sectors if a recession occurs tomorrow vs. 2 years from now?

How may a sample equity portfolio (as proxied by its sector mix) react to a period of prolonged cyclical growth?

Consumer Discretionary seems too expensive currently as represented by current P/E. What may the effect of this be on total return across various hypothetical evolutions of the US business cycle?

In the wake of strong growth in US economy, how may various sample equity portfolios perform against an objective of balanced income and capital appreciation?

In order to illustrate equity sectors' behavior under different phases of a business cycle, and to create sample portfolios, the DASS may use market indices to represent corresponding equity sectors. In one embodiment, DASS does not need to provide information on individual securities or equity mutual funds. Indices may be unmanaged and include the reinvestment of dividends. Indices may used to represent equity sectors are as follows:

| Equity GICS Sectors | Representative Index |
|---|---|
| Overall Market | MSCI US Investable Market (2500) Index |
| Consumer Discretionary | MSCI US Investable Market (2500)/Consumer Discretionary-SEC |
| Consumer Staples | MSCI US Investable Market (2500)/Consumer Staples-SEC |
| Energy | MSCI US Investable Market (2500)/Energy-SEC |
| Financials | MSCI US Investable Market (2500)/Financials-SEC |
| Health Care | MSCI US Investable Market (2500)/Health Care-SEC |
| Industrials | MSCI US Investable Market (2500)/Industrials-SEC |
| Information Technology | MSCI US Investable Market (2500)/Information Technology-SEC |
| Materials | MSCI US Investable Market (2500)/Materials-SEC |
| Telecommunication Services | MSCI US Investable Market (2500)/Telecom-SEC |
| Utilities | MSCI US Investable Market (2500)/Utilities-SEC |

As the above stated indices are relatively new and MSCI did not start reporting their related data until 1992. To find persistent historical patterns in sector earnings and establish robustness in the estimates, the DASS may employ data going back much further in the history (e.g., encompassing 5 full business cycles). Hence, historical phase-averaged earnings per share (EPS) growth for each sector and the historical long-term mean of their respective P/E ratios is estimated via sector portfolios created, e.g., from a DASS methodology by dividing the Top 3000 U.S stocks ranked by market capitalization into 10 sectors as defined by GIGS. The historical monthly EPS for each sector then starts from Jan. 1, 1970 and ends at the most recently concluded phase of the business cycle.

In one embodiment, the DASS may act as an asset sector investigator and/or calculator. The DASS helps investment professionals explore how the different phases of the (e.g., U.S.) business cycle may potentially affect the performance of various sectors comprising the (e.g., U.S.) equity market. DASS allows the user to play out certain hypothetical scenarios and their possible effect on certain equity investments as represented by market indices. The DASS may periodically update the calculator to incorporate newer market data, additional or alternate market indices, or modifications to calculation methods and assumptions.

DASS

In one embodiment, the DASS builds on the facilities of a Dynamic Portfolio Simulator Tool (DPST) and a Seasonal Portfolio Construction Platform (SPC) components. In one embodiment, the DPST provides a dynamic calculation tool for investors to interactively simulate and obtain the performance (e.g., return, risk level, etc.) of a user constructed fixed income portfolio, and adjust parameters of the portfolio, and SPC provides an investment analytics and management tool facilitating a user (e.g., investors, consumers, portfolio managers, traders, etc.) to research, build and maintain an investment strategy for a customized portfolio based on a current economic cycle phase. The DASS extends the DPST and SPC facilities allowing users to calculate and simulate asset (e.g., a portfolio) value taking into account actual and/or expected asset/sector performance during a specified cycle.

FIGS. 1A-1C provide exemplary user interface diagrams illustrating embodiments of the DASS.

DASS Business Cycle In order to illustrate equity sectors' behavior, the DASS may use a its business cycle framework (e.g., see the DPST component for greater detail). Over the intermediate term (time horizon of 1-10 years), asset performance is often driven largely by cyclical factors tied to the state of the economy—such as corporate earnings, interest rates, and inflation. The business cycle, which encompasses the cyclical fluctuations in an economy over many months or a few years, has therefore been a critical determinant of returns of the equity market and respective equity sectors.

Every business cycle is different in its own way, and though past performance is not guaranteed to repeat itself, certain patterns have tended to repeat themselves over time. Fluctuations in the business cycle are essentially distinct changes in the rate of growth in economic activity, particularly increasing or decreasing rates of growth in corporate profits, credit, inventories and employment. While unforeseen macroeconomic events or shocks can sometimes disrupt a trend, changes in these key indicators historically have provided a relatively reliable guide to recognizing the different phases of an economic cycle. DASS' quantitatively-backed, probabilistic approach helps make it possible to identify the state of the business cycle at any point in time Specifically, there are four distinct phases of a typical business cycle which typically reflect the following characteristics (e.g., see 170 of FIG. 1C):

Early-cycle phase 171: A "V-shaped," sharp recovery from recession, marked by above-average acceleration in economic activity (e.g., gross domestic product, industrial production, employment). Credit begins to grow amid easing monetary policy, creating a healthy environment for rapid profit growth. Business inventories are low, while sales growth improves significantly.

Mid-cycle phase 172: Typically the longest phase of the business cycle. The mid cycle is characterized by a positive but more moderate rate of growth than that experienced during the early-cycle phase. Economic activity gathers momentum, credit growth becomes strong, and profitability is healthy against an accommodative—though increasingly neutral—monetary policy backdrop. Inventories and sales grow, reaching equilibrium relative to each other.

Late-cycle phase 173: Emblematic of an "overheated" economy poised to slip into recession and hindered by above-trend rates of inflation. Economic growth rates slow to "stall speed," against a backdrop of restrictive monetary policy, tightening credit availability, and deteriorating corporate profit margins. Inventories tend to build unexpectedly as sales growth declines.

Recession phase 174: Features a contraction in economic activity. Corporate profits decline and credit is scarce for all economic actors. Monetary policy becomes more accommodative inventories gradually fall despite low sales levels, setting up the next expansion.

The performance of economically sensitive assets such as stocks tends to be the strongest during the early phase of the business cycle when growth is rising at an accelerating rate, then moderates through the other phases until returns generally decline during the recession. In contrast, more defensive assets such as Treasury bonds typically experience the opposite pattern, enjoying their highest returns relative to stocks during a recession and their worst performance during the early cycle. Additional detail may be found in the whitepaper "*Business Cycle Approach to Equity Sector*

*Investing*", September 2014 by Fidelity Investments, herein expressly incorporated by reference.

DASS Hypothetical Annualized Return Components

The equity return over a certain time horizon can be decomposed into the following 3 components.
Dividend Yield
EPS Growth
Revaluation (Change in Price to Earnings Ratio)

$$R = \frac{D}{P} + \Delta EPS + \Delta PE$$

Decomposing Total Return.
The total return of equity over a time period t can be derived as follows:

$$\text{Total Return}_t(R_t) = \frac{Dividend_t(D_t) + Price_t(P_t)}{Price_{t-1}(P_{t-1})} - 1$$

Where $Dividend_t$ is the dividend received at time t, $Price_t$ and $Price_{t-1}$ are the price of the stock at time t and t-1 respectively.

So, (1)

$$R_t = \frac{D_t}{P_{t-1}} + \frac{P_t}{P_{t-1}} - 1$$

Now, Price can be written as a product of firm's valuation and a statistic representing its fundamentals. For example:

$$P_t = E_t * \left(\frac{P_t}{E_t}\right) \text{ or } P_t = B_t * \left(\frac{P_t}{B_t}\right) \text{ or } P_t = S_t * \left(\frac{P_t}{S_t}\right) \quad (2)$$

Where $E_t$, $B_t$ and $S_t$ are firm's earnings per share (EPS), book value per share and sales revenue per share respectively.

Now, substituting equation (2) in equation (1) for Earnings per Share:

$$R_t = \frac{D_t}{P_{t-1}} + \frac{E_t * \left(\frac{P_t}{E_t}\right)}{E_{t-1} * \left(\frac{P_{t-1}}{E_{t-1}}\right)} - 1$$

$$R_t = \frac{D_t}{P_{t-1}} + \frac{E_t}{E_{t-1}} * \frac{\left(\frac{P}{E}\right)_t}{\left(\frac{P}{E}\right)_{t-1}} - 1$$

$$R_t \approx \frac{D_t}{P_{t-1}} + \left(\frac{E_t}{E_{t-1}} - 1\right) + \left(\frac{\left(\frac{P}{E}\right)_t}{\left(\frac{P}{E}\right)_{t-1}} - 1\right)$$

Total Return = Dividend Yield + EPS Growth + Revaluation $$\left(\% \text{ Change in } \frac{P}{E}\right)$$

Similarly, this relationship can be written in terms of Book value per growth or sales revenue per growth as follows:

Total Return = Dividend Yield +

Book per share Growth + Revaluation $\left(\% \text{ Change in } \frac{P}{B}\right)$ Total Return = Dividend Yield + Sales per share Growth +

Revaluation $\left(\% \text{ Change in } \frac{P}{S}\right)$

The above decomposition can be written in multiple different ways, for example as the sum of dividend yield, book growth and change in Price-to-Book ratio or as a sum of dividend yield, sales growth and change in Price-to-Sales ratio. It is important to stress that all of these relationships are essentially identities and not assumptions so any view on these components can be mapped to total return of equities. DASS estimates the magnitude of each component independently based on certain business cycle and valuation assumptions made by the user.

Dividend Yield:
Dividend Yield is the percentage of market value of the stock distributed to shareholders as cash.
Dividend yield depends upon a firm's dividend payout policy and stock valuation:

$$\frac{D}{P} = \frac{(D/E)}{(P/E)}$$

Where D/P is the dividend yield, D/E is dividend to earnings ratio or dividend payout ratio and P/E is Price to Earnings ratio and is a measure of stock's valuation.

Firms typically have a consistent payout policy; and hence D/E ratio has been fairly persistent historically. This is truer still at the sector index level. The DASS assumes (D/E) of each sector to be a constant; defaulted to the dividend payout ratio for each respective index at "As of Date" (month-end date representing the most recent date for which historical data are made available in the DASS) but can be edited if the user has a different view. P/E ratio changes for each month in the future and can be adjusted by the user. Please see "DASS Adjust Business Cycle Assumptions," below, for additional details on this feature.

EPS Growth:
EPS growth, for the purposes of this DASS, is a measure of the rate at which firms are expected to grow their net income per share. If a company has increased their Earnings in the current period relative to the prior period on per share basis, EPS growth will be positive but if the Earnings per share have declined relative to prior period, EPS growth will be negative.

$$EPS \text{ Growth} = \frac{EPS_f}{EPS_i} - 1$$

Where $EPS_f$ is the final EPS at the end of user's time horizon and $EPS_i$ is the initial or current Earnings per share.

EPS growth is closely tied to business cycles in general. Although past performance is no guarantee of future performance, sectors have displayed persistent patterns of EPS growth across the business cycle. Historically, economically-sensitive sectors tend to exhibit greater variation in EPS growth across the business cycle than defensive sectors. For instance, the Technology and Consumer Discretionary sectors historically have experienced strong EPS growth in the early cycle phase, but poor growth in recessions; whereas Utilities and Telecom have experienced moderate growth in all phases of the cycle. As always, while historical sector performance can assist users in evaluating how sectors may respond to future market cycles, there is no guarantee as to future performance.

Given EPS growth's strong historical correlation with business activity, the DASS takes the following steps to estimate hypothetical EPS growth for each sector:

(1) Every month in the period 1970-2014 is classified into a specific phase of the US business cycle, drawn from Early, Mid-cycle, Late and Recession.

(2) EPS growth is observed for each of the sectors in every month and an average EPS growth rate is computed for each sector during each phase of the business cycle. The time period used to compute the average EPS growth starts on Jan. 1, 1970 and ends at the last month of the most recently completed business cycle phase. For example, if the current cycle phases in Mid-cycle phase, the sample period ends with the most recent early phase.

(3) The user provides their business cycle outlook, which may include a sequence of Business Cycle phases, each with an associated length in months, beginning on As of date and ending at the user's Horizon.

(4) Each sector's EPS is assumed to grow or decline at each projected future business cycle phase (in 3 above) according to the respective historical averages (in 2 above). Within a given phase, EPS growth compounds for each sector at the appropriate historical average rate over the specified number of months.

In one embodiment, the computed historical average EPS growth in each sector and business cycle phase may depend on the characterization of historical time periods into business cycle phases. Changes in the cycle characterization can materially impact the phase-averaged historical EPS growth and hence the hypothetical total return computed by the user.

Revaluation:

Revaluation is a potential change in the Price to Earnings (P/E) multiple of a given stock, sector index, or portfolio. Expectations of improving firm prospects including growing revenues, reducing costs, improving profit margins, etc., will tend to lead market participants to re-price a stock at a higher multiple of its current Earnings and will result in positive revaluation. Similarly, any information which suggests degrading firm prospects and weaker Earnings growth will be priced at a lower multiple and will result in negative revaluation.

$$\text{Revaluation} = \frac{\left(\frac{P}{E}\right)_f}{\left(\frac{P}{E}\right)_i} - 1$$

Where $(P/E)_f$ is the P/E ratio at the end of user's time horizon and $(P/E)_I$ is the current P/E ratio on "As of Date"

This component of the return is very difficult to estimate as the future P/E ratio at the user's time horizon depends largely upon future investor behavior and the market's perception regarding future growth of the sector, which is almost impossible to predict accurately. However, P/E ratio has exhibited some tendency to revert towards its average levels. In the DASS, various options are provided to the user to allow them to specify their assumed P/E ratios at the end of their time horizon. After having defined the ending P/E ratio, the DASS follows a simple statistical process, described below in how to "Revert to Future Valuation," to estimate P/E ratios at the end of each month over the user's time horizon. The monthly change in P/E ratio is then compounded and annualized over the user's time horizon to estimate annualized revaluation return for each sector.

Revert to Future Valuation.

To estimate future revaluation return, a discrete-time autoregressive process (AR(1)) is adopted to revert current valuation to a user-specified future valuation with certain velocity as described below. Let's assume current or initial P/E=PE(0), user-specified final P/E=PEend and P/E ratio at any time t within user's time horizon is PE(t). So, at each subsequent time step t, the PE(t) will be dependent upon the PE (t−1), estimated at previous time step (t−1) using the equation (1) below:

$$PE(t)=a*PE(t-1)+(1-a)*PE_{end} \qquad (1)$$

where 'a' is the auto-correlation parameter, and is related (equation (3)) to Months-to-future P/E specified by the user.

Months-to-future P/E is the time it takes for a sector's P/E to reach the future P/E using the equation (1), which is an asymptotic process and converges to the future P/E only at infinity and hence to establish how slow or fast it should reach future P/E, P/E is assumed to travel 90% of the distance between initial P/E and future P/E in the time specified by Months-to-future P/E.

For example, in 180 of FIG. 1C, if the current P/E is 15 and future P/E selected is 18 and Months to future P/E is 30 months, the P/E ratio will change as specified by red line 181 over user's time horizon and will be equal to 17.7 (=15+ 90%*(18−15)) in 30 months.

As such, a relationship between 'a' and months-to-future P/E may be determined as follows, from equation (1):

$$PE(t)=a*PE(t-1)+(1-a)*PE_{end}$$

$$PE(t)=a(a*PE(t-2)+(1-a)*PE_{end})+(1-a)*PE_{end}$$

$$PE(t)=a^2*PE(t-2)+(1-a)*(1+a)*PE_{end}$$

Recursively, $$PE(t) = a^t * PE(0) + (1-a)*(1+a+a^2+\ldots+a^{t-1})*PE_{end} \qquad (2)$$

$$PE(t) = a^t * PE(0) + (1-a)*\frac{(1-a^t)}{(1-a)}*PE_{end}$$

$$PE(t) = a^t * PE(0) + (1-a^t)*PE_{end}$$

Now, PE(t) travels 90% of the distance between initial P/E and final P/E in time specified by Months-to-Future P/E (let's say N), hence, $$PE(N)-PE(0)=90\%*(PE_{end}-PE(0))$$

Substituting equation (2)

$$a^N * PE(0) + (1-a^N)*PE_{end} - PE(0) = 90\% * (PE_{end} - PE(0)) \qquad (3)$$

$$(1-a^N)*(PE_{end} - PE(0)) = 0.9*(PE_{end} - PE(0))$$

$$(1-a^N) = 0.9$$

$$N*\log(a) = \log(0.1)$$

$$N = \frac{\log(0.1)}{\log(a)}$$

DASS Adjust Business Cycle Assumptions

FIG. 1A shows analyzed market scenarios and annualized returns for various asset sectors. Moving to FIG. 1B shows use of the DASS' asset sector investigator tools, which allows the users to define their business cycle assumptions over their time horizon. The chart depicts both the historical US business cycle as defined in the "Business Cycles" 150 section and the user's projected business cycle outlook 151. The user interface may illustrate the ebb and flow of the economy by means of a smooth wave whose peaks and valleys is all drawn at equal magnitudes and is therefore representative only of the length, not the severity, of each business cycle phase. The chart has the following components:

Current Phase—

Represents the phase of US business cycle at the "As of Date" as well as the month and year when the US economy entered this phase, as estimated by DASS' asset allocation research component.

Historical Business Cycle—

Prior to May-2010, time series and inflection points of expansion and contraction in the US economy as estimated by National Bureau of Economic Research (NBER), where expansion is depicted as a crest of the wave and recession is depicted as trough of the wave. From May 2010 to As of Date, time series of 4 phases (e.g., Early, Mid, Late, Recession; see 170 of FIG. 1C) as identified by DASS' asset allocation research component.

Naïve Extrapolation for a specified Horizon—Represents a hypothetical business cycle outlook formed by extrapolating the historically estimated average length of each business cycle phase. According to the framework, the average lengths of business cycle phase are as follows (measured from January 1970-May 2010):

| Business Cycle Phase | Average Length (in months) |
| --- | --- |
| Early | 15 |
| Mid | 38 |
| Late | 17 |
| Recession | 9 |

Now, if for example the US is in the Mid Phase at "As of Date" and it has already spent 36 months in the mid cycle phase, the Naïve extrapolation continues in Mid Phase for 2 more months (=38−36) in the future, and transitions to late cycle for up to 17 months, and so forth.

Assumed Future Cycle—

This is the user-assumed future business cycle path. The user can use the sliders to adjust the length of individual business cycle phases and define the future path over his/her time horizon; e.g., see 152 of FIG. 1B. In one embodiment, by default, the assumed future cycle is set to the Naïve Extrapolation path, which shows the extrapolated length of future cycles, with a time horizon of at least 12 months.

Nominal/Real Earnings Settings

These settings may toggle how the DASS computes the mean of historical sector earnings, between:

Nominal Earnings—

In this mode, the DASS averages the growth in nominal earnings, or unadjusted for inflation, per share for each cycle phase and sector. The mean nominal earnings growth for each sector in each phase is then applied to estimate future earnings growth. The user does not need to make any inflation assumptions in this mode.

RealEarnings—

In this mode, the DASS averages the growth in real earnings (nominal earnings net of Consumer Price Index (CPI) inflation each month) per share for each cycle phase and sector. In order to estimate future earnings growth, the historical average real earnings growth for each sector and phase is then compounded by the user specified inflation rate over the user's time horizon as follows:

$$\text{Nominal Earnings growth}_{Early,i} = (1+\text{Real Earnings Growth}_{Early,i})*(1+\text{Inflation})-1$$

Where Nominal Earnings growth$_{Early, i}$ is the expected nominal earnings growth in early cycle for a sector i, Real Earnings Growth$_{Early, i}$ is the real earnings growth for sector i in early phase as estimated by historical earnings and inflation is the user specified future inflation.

Assumed Inflation Rate—

This section may be activated when the DASS's calculation mode is on "Real". This allows the users to adjust their assumptions of future CPI inflation (Year on Year) over their time horizon. This is defaulted to the YoY CPI inflation observed on "As of Date". The user can choose the assume inflation from the following options:

Current—

Represents the inflation rate observed on "As of Date"

Historical—

Represents the historical median of the inflation rate observed in the period 1970 to "As of Date"

Custom—

Enter the custom inflation rate assumption

Adjust Valuation Assumptions

In the DASS, the user can estimate the behavior of future valuation (P/E Ratio) by selecting from the below options for each sector:

Current P/E Ratio—

Price to Earnings ratio for each sector as observed on "As of Date".

Future P/E Ratio—

Price to Earnings ratio for each sector as assumed at the end of user's time horizon, based on user selected (from the options below) Future P/E Ratio Valuation assumptions.

(1) No Change—

If the user makes no changes, the DASS default settings will be used. The default assumes that valuations will remain at the current levels as observed on "As of Date" and are not expected to change. No Change in P/E ratio implies zero revaluation.

(2) Long-Term Mean—

This option assumes valuation level for each respective sector reverts toward its historical mean. The level of mean and the number of months it will take to reach the mean are estimated from historically observed P/Es between 1970 and the end date of most recently completed business cycle phase. Since only limited data is available for publicly available MSCI US Investable Market (2500) Index and its representative indices, sector indices created by DASS' proprietary methodology were used as a proxy to estimate Long-Term Mean. These sector indices were constructed by dividing the top 3000 US stocks by market capitalization into sectors based on their GIGS classification.

(3) Last 10 Year Mean—

Revert the current P/Es toward the mean P/E ratio observed in last 10 years from "As of Date".

(4) Last 10 Year Market Peak—

Revert the current sector P/Es toward the sector P/Es observed on the day when P/E ratio for the overall market (MSCI US Investable Market 2500 Index) was at its highest over the past 10 years.

(5) Last 10 Year Market Trough—

Revert the current sector P/Es toward the sector P/Es observed on the day when P/E ratio for the overall market (MSCI US Investable Market 2500 Index) was at its lowest over the past 10 years.

(6) Previous 10 Year Mean—

Revert the current P/Es toward the mean P/E ratio observed in the previous 10 year period i.e. the time period that started 20 years before "As of Date" and ended 10 years before "As of Date".

(7) Previous 10 Year Market Peak—

Revert the current sector P/Es toward the sector P/Es observed on the day when the P/E ratio for the overall market (MSCI US Investable Market 2500 Index) was at its highest in the previous 10 year period i.e. the time period that started 20 years before "As of Date" and ended 10 years before "As of Date".

(8) Previous 10 Year Market Trough—

Revert the current sector P/Es toward the sector P/Es observed on the day when P/E ratio for the overall market (MSCI US Investable Market 2500 Index) was at its lowest over the previous 10 year period i.e. the time period that started 20 years before "As of Date" and ended 10 years before "As of Date".

(9) Custom—

Revert the current sector P/Es toward the user-defined sector P/Es.

Using the user defined ending P/E ratio for each sector, the DASS employs a statistical method (e.g., see, above, "Revert to Future Valuation" calculations for details) to revert the current P/E ratio toward the specified future P/E ratio.

Months to Future P/E—

As discussed, above, "Revert to Future Valuation" calculations, assumes that P/E ratio will cover 90% of the distance between initial P/E ratio and future P/E ratio. For example, if current P/E ratio is 18, future P/E ratio is 20 and months to future P/E ratio is 24 months. The actual P/E ratio at the end of 24 months will be equal to 19.8 (18+90%*(20−18)).

Having estimated P/E ratio at the end of every month for each sector over the user's time horizon, the revaluation return is computed as percentage change in P/E ratio for each sector and is then compounded and annualized to estimate annualized revaluation return for each sector.

Dividend Payout Ratio—

Each sector's aggregate dividend payout ratio (dividend paid per unit of EPS) over user's time horizon. It is defaulted to the payout ratio observed on "As of Date".

Volatility—

Historical volatility of monthly total return observed in the past 10 years for each sector.

DASS Asset/Portfolio Implications

Figure 8A:
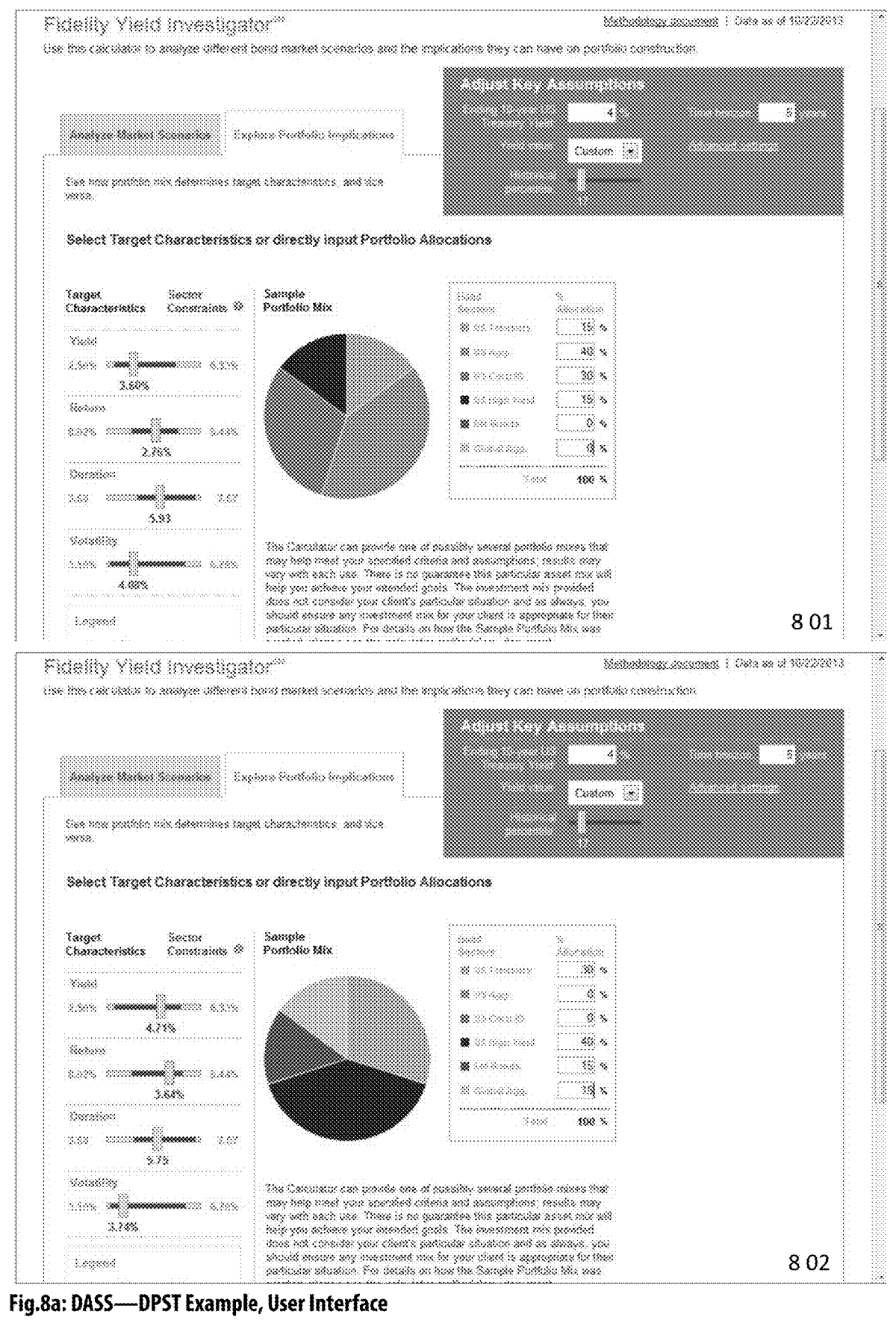

The "Explore Portfolio Implications" tab 190 of FIG. 1A allows a user to examine the portfolio-level hypothetical impact of his or her inputs on the "Market Scenarios" tab 191. The portfolio level results are driven by the user's assumptions about future business cycles, future inflation (if real mode is selected), future P/E and dividend payout ratio in the "Market Scenarios" tab. The Business Cycle assumptions "Cycle Phase Lengths" box is still visible on the top of the tab so the user has the opportunity to change those settings at any time, and observe the impact on the sample portfolio mix 152 of FIG. 1B; also see DPST user interface FIG. 4-8.

The "Explore Portfolio Implications" tab has 3 broad sections:

Sector Portfolio—

Models the portfolio under analysis. There DASS has multiple different ways a user can enter or generate the sector mix.

Target Characteristics—

Denotes the expected return, volatility and dividend yield of the selected portfolio under the assumptions made by the user in "Market Scenarios" tab. The user can generate a different portfolio by adjusting the target characteristics slider to a value based on his/her objectives.

Hypothetical Growth of $1000—

Demonstrates a hypothetical representation of how $10,000 invested in the selected portfolio today will grow under the assumptions made by the user on "Market Scenarios" tab with respect to a given benchmark.

DASS Sector Portfolio

A sector portfolio represents a hypothetical US equity portfolio constructed by investing in sector indices of MSCI US Investable Market (2500) index in proportions given by sector weights. For the purposes of the DASS, the portfolio is assumed to be held over the user's time horizon with monthly rebalancing to these fixed weights. This is for illustration only as indices are unmanaged and it is not possible to invest directly in an index. At first landing, the portfolio is defaulted to the MSCI US IMI Index and the sector weights are set equal to its sector weights estimated on a look-through basis on "As of date".

Over/Under Weight with Respect to Benchmark—

This column computes the excess weight (positive or negative) of each sector in the entered sector portfolio relative to a specified benchmark. It is simply the difference of sector weights of the portfolio and the benchmark as observed on a look through basis on "As of Date". The user can choose from the following benchmarks:

S&P 500 Index

Russell 3000 Index

Dow Jones Total Stock Market Index

MSCI US Investable Market (2500) Index

Contribution of Over/Under Weight on Excess Return—

This column indicates whether the over/under weight in each sector is producing a positive or negative effect on the portfolio's hypothetical excess return (ER). The process to assign symbols is as follows:

'+++' sign if sector's contribution to ER is >=max (ER, 1%)

'++' sign if sector's contribution to ER is >=50%*max (ER, 1%) & <max (ER, 1%)

'+' sign if sector's contribution to ER is >0 & <50%*max (ER, 1%)

No sign if sector's contribution to ER is =0%

'−' sign if sector's contribution to ER is <=50%*min (ER, −1%) & >0%

'−−' sign if sector's contribution to ER is <=min (ER, −1%) & >50%*min (ER, −1%)

'−−−' sign if sector's contribution to ER is <=min (ER, −1%)

Changing the Sector Portfolio—

There are a multiple different ways a user can change the sector portfolio as described below. Any change in the sector portfolio will correspondingly alter the target characteristics shown on the right.

(1) Entering Portfolio Allocations—

To enter sector weightings directly into the Equity Sector Allocation % box, simply click in the box next to each sector and type in a whole number. Or, move the sliders around so that the portfolio achieves a 100% total allocation. As the sector weightings should always sum up to 100%, all the other parts of the screen freeze until weights sum to 100%.

(2) Choose a Starting Portfolio—

This section has several pre-loaded portfolios which helps the user to get started. These sample portfolios serve as an additional resource available to help the user begin to think about the business cycles with respect to sample portfolios. They are not personalized or tailored to meet the needs of your or your clients' financial situation and in no way should they be considered a recommendation or investment advice. The current pre-loaded portfolios are:

(a) Broad US market indices such as S&P 500, Russell 3000, MSCI US IMI 2500, and Dow Jones US Total Market Index. Selecting any of these indices populates the sector portfolio with the index's sector exposure on "As of Date" as reported by Morningstar.

(b) Cyclical tilts have 4 portfolios (Early phase tilt, Mid phase tilt, Late phase tilt and recession tilt) which are created by over weighting the sectors which have historically performed well in the respective business cycle phase and under weighting the sectors which have historically performed poorly in the same business cycle phase. The process to estimate these portfolios is as follows:

(i) The sector weights of MSCI US IMI are determined as reported by on "As of Date"

(ii) In each business cycle phase, the sectors which have performed well historically are overweighed to a total of 10% with respect to MSCI US IMI and sectors that have performed poorly are underweighted to a total of 10% with respect to MSCI US IMI. The following picture demonstrates the historical strength and weakness of each sector in each business cycle phase. Please refer to "The Business cycle Approach to Equity Sector Investing", September 2014 by Fidelity Investments. In the chart below, date represents, e.g.; top 3,000 stocks by Utilities -- -+ ++ capitalization; blank portions suggest no clear pattern of over- or underperformance vs. broader market; double +/− signs indicate that the sector is showing a consistent signal across three metrics: full-phase average performance, median monthly difference, and cycle hit rate; a single +/− indicates a mixed or less consistent signal.

| Sector | Early | Mid | Late | Recession |
| --- | --- | --- | --- | --- |
| Financials | + | | − | |
| Consumer Discretionary | ++ | | −− | |
| Technology | + | + | −− | −− |
| Industrials | ++ | + | | −− |
| Materials | −− | ++ | − | |
| Consumer Staples | − | | + | ++ |
| Health Care | − | | ++ | ++ |
| Energy | −− | | ++ | |
| Telecom | −− | | | ++ |
| Utilities | −− | − | + | ++ |

Blank portions above suggest no clear pattern of over- or under- Peformance vs. broader market. Double +/− signs indicate that the sector is Showing a consistent signal across all three metrics: full-phase average performance, Median monthly difference and cycle hit rate. A single +/− indicates a mixed or less consistent signal. Source: Fidelity Investments (AART).

For example, mid cycle phase has '+' for Technology and Industrials, '−' for utilities and '− −' for Materials. So, a 10% overweight is divided equally among Technology and Industrials, and 10% underweight is divided among utilities and materials in 1:2 ratio. Hence, sector over/under weight would be as follows:

| Sector | % Over/under weight with respect to MSCI US IMI |
| --- | --- |
| Technology | +5% |
| Industrials | +5% |
| Utilities | −3.33% |
| Materials | −6.66% |

(c) The user can enter and save his/her portfolio by entering a fund mix. The section asks the user to enter fund tickers and their respective % allocation in the portfolio, which gets translated into a sector mix. The user can enter any mix of mutual funds or ETFs as long as it exists in the database and the DASS will inform the user which funds are eligible to be analyzed by the DASS. Since this DASS can only analyze US equity sectors; there are restrictions to the funds that can be analyzed using the DASS's methodology. A mutual fund or ETF must satisfy following criteria to become eligible to be analyzed by the DASS:

The fund should be defined as US open-ended equity fund or an ETF by Morningstar (i) The fund should have at least 80% currency exposure to USD (ii) The fund should not have any short positions (iii) The fund should not use any leverage or its underlying sector holdings should not add to greater than 102% of the assets (iv) The fund should have at least 70% of its allocation to US domestic equities After identifying the funds eligible to be analyzed by the DASS, the portfolio weights are rescaled such that all the eligible funds weight add upto 100%. The underlying sector exposures of this eligible fund mix is computed by looking through each fund's most recently reported sector holdings and doing the weighted average using fund weights. Each eligible fund's sector holdings are sourced from Morningstar as reported on "As of Date" for all the Non-Fidelity funds and from Fidelity Investments for all the Fidelity Investments. The DASS will also display the % of the fund mix that is being used to compute the sector exposures. These sector exposures are then exported to the current sector portfolio under "Explore Portfolio Implications". Please note that these sector exposures are reported sector holdings of each fund at "As of date" and can materially differ in the future. It does not imply past or future performance of any fund or specific investment.

It should be noted that the custom mix features allows users to estimate the general sector components of a given investment. It should in no way be construed or viewed as an indication of how a fund will perform. The DASS uses representative indices which differ from funds in numerous ways, including, but not limited to the fact they do not take into consideration fund expenses or portfolio manager investment decisions. In addition, hypothetical returns are based on historical and current index performance and characteristics and there is no guarantee that past or current performance will be repeated.

(3) Generating Portfolio by Target Characteristics—

The user may adjust the Target Characteristics sliders to identify a target yield, or return, or volatility for a sample portfolio. This method invokes the DASS to "solve" for a portfolio mix that aligns with the target levels. This scenario involves industry-standard statistical optimization techniques. In the context of the DASS, we call this "solving." Please see the next section for further details on solving.

Target Characteristics

The DASS allows the user to solve for a sample portfolio mix by setting the value for any of the characteristics listed below:

(1) Target Return—

A user may specify a target level of hypothetical total return. The portfolio return is the weighted average of the returns, which includes the aggregate of the dividend yield, EPS growth and any reevaluation adjustments of the equity sectors that comprise the sample portfolio. The target return outputs will highly depend upon the assumption inputs for Business cycles, time horizon, and valuations input on the "Market Scenario" tab, to solve for the target return.

(2) Target Volatility—

Portfolio volatility is a measure of dispersion or variance in portfolio returns and is calculated as standard deviation of monthly return. It depends upon the portfolio composition, how volatile the equity sectors are in the portfolio, and lastly the correlation among the asset returns. The user can create a portfolio by specifying target variability in the returns.

(3) Target Dividend Yield—

This is the hypothetical aggregate annual dividend yield that the user would want to derive from his or her portfolio. The aggregate portfolio yield is the weighted average of the yields of the equity sectors that comprise the sample portfolio. The user can construct a portfolio by targeting a specific dividend yield.

It should be noted that the upper and lower limits of the Target Characteristics are equal to the highest and lowest values of yield, return and volatility across the sectors represented in the DASS. These values are based on internal DASS computations and the user inputs on the Market Scenario tab. (To validate this data, return to the Market Scenarios tab and review the individual sector data for any of these characteristics.)

The dark green region in a slider depicts the range of values that a slider can achieve under the portfolio weight constraints defined in "Sector Constraints". The lighter green region is inaccessible under the given constraints, but can be made accessible by relaxing some of the constraints. For example, A return slider can have lower limit of −5% and upper limit of 20%, which determines the range of all the possible return that a user can achieve by combining sectors in different proportions and in the assumptions made in "Market Scenario" tab. The light green region might only allow the user to remain between a return range from 5% to 15%, for example under the constraints that the user don't want to invest more than 25% in any individual sector as define under "Sector Constraints". If the user relaxes that constraint, he/she might be able to get higher range than 5% to 15%.

Solving for Portfolio Mix

As a user moves the slider and sets a new target value for a particular characteristic—for example, return—it will solve for a new sector portfolio which is expected to generate the user specified return under the assumptions on "Market Scenario" tab with approximately equal volatility and dividend yield as the previously selected portfolio. Please note that the solver will try to find the best portfolio possible when one exists, with best being defined as portfolio with a given level of characteristic (let's say return) and the other two characteristics (volatility and dividend yield) as close to the previous values as possible. Please refer to below Q&A for more details.

Q. What is "Solving" about?

A. Imagine you want to find three numbers, X, Y, and Z, which produce the highest possible sum X+Y+Z. The answer, of course, is to set each of these numbers to its respective highest possible value: infinity.

Now imagine you are limited to using values of X no larger than 3, Y no larger than 7, and Z no larger than 1 This time, you again set each number to its highest possible value, and obtain the sum X+Y+Z=3+7+1=11.

These are examples of solving. Computers are good at solving numerical problems, and there is a rich field of statistical optimization procedures that are dedicated to solving complex classes of numerical problems.

Q. Does Solving Get You the Best Answer?

A. There is not necessarily a single best answer; solving gets you a correct answer, when one exists.

It's easy to imagine problems for which multiple correct answers exist, like this one: find three numbers that add to 10, where none is individually larger than 4. (Think 3, 4, and 3; or 4, 4, and 2; or 2.9, 3.1, and 4.) In these cases and many others, solving may easily produce a different answer each time it is invoked.

Of course, not all problems have a solution, like this one: find a whole number whose square is 10. Solvers react to this situation in different ways: some report an approximate solution (like 3 or 3.162278), while others respond with an error message, and yet others carry on as if nothing happened.

Lastly, let's not equate "correct" answers with "best." Again, computer programs generate results as they are instructed to. Frequently they end up telling you what you asked to know, rather than what you wanted to learn.

Q. What is the Role of Constraints?

A. Constraints are limitations on the range of admissible answers. We have already encountered some—for instance, in the question, "find three numbers X, Y, and Z, with the highest possible sum, using values of X no larger than 3, Y no larger than 7, and Z no larger than 1" Here we constrained X to be at most 3, Y to be at most 7, and so on.

A constrained solution will logically perform no better than an unconstrained solution. In the example above we solved for infinity in the absence of constraints, then solved for 11, an acceptable answer in the constrained solution. Moreover, constrained solutions can also result in no admissible answers: consider the problem "Find 2 whole numbers X and Y that add to 5 while each is no greater than 2".

But the real world often introduces constraints ("Find me an open calendar slot in the next week") and so much of real-world solving involves trading off constraints for one another ("I have no open calendar slots in the next week, what if I shortened any lunch hour one day"). This last aspect—the careful trading off of different constraints—is central to the DASS's portfolio construction features.

Finally, it is important to emphasize again that the DASS will at best produce one acceptable answer to the stated question. Its answer does not constitute a recommendation nor provide investment advice, but simply one possible way to resolve the user's complex portfolio construction problem—in light of the user's own business cycle views—all as conveyed into the DASS.

Hypothetical Growth of $10,000

A growth chart represents hypothetical growth of $10,000 invested today in the selected sector portfolio to user's time horizon with monthly rebalancing. The growth is calculated using hypothetical return estimated with assumptions defined under "Market Scenarios" tab. The portfolio growth is compared to the growth of MSCI US IMI index, which is computed by investing $10,000 today hypothetically in the current sector weights of the index and holding it thru the user's time horizon It should be noted that in one embodiment, the DASS may contemplate calculations for sector exposure, which may be a significant driver of equity performance, yet is often ignored in portfolio construction. As such, the DASS may employ asset (e.g., equity) sectors as building blocks for portfolio construction. The DASS may make use of distinct characteristics that make equity sectors compelling building blocks, including: high performance dispersion, low correlations, patterns of performance and volatility. See Appendix 1 for additional detail on equity sector use by DASS.

Some embodiments of DASS include the following:

Full-Phase Average Performance:

Calculates the (geometric) average performance of a sector in a particular phase of the business cycle and subtracts the performance of the broader equity market. This method better captures the impact of compounding and performance that is experienced across full market cycles (i.e., longer holding periods). However, performance outliers carry greater weight and can skew results.

Median Monthly Difference:

Calculates the difference in the monthly performance of a sector compared with the broader equity market, and then takes the midpoint of those observations. This measure is indifferent to when a return period begins during a phase, which makes it a good measure for investors who may miss significant portions of each business cycle phase. This method mutes the extreme performance differences of outliers, and also underemphasizes the impact of compounding returns.

Cycle Hit Rate:

Calculates the frequency of a sector's outperforming the broader equity market over each business cycle phase since 1962. This measure represents the consistency of sector performance relative to the broader market over different cycles, removing the possibility that outsized gains during one period in history influence overall averages. This method suffers somewhat from small sample sizes, with only seven full cycles during the period, but persistent out- or underperformance still can be observed.

The DASS' DPST and SPC component calculations may be based upon user inputs and historical and current index performance.

Dynamic Portfolio Simulator Tool (DPST)

In one embodiment, the DPST may serve as an educational calculator that can equip users with a clearer grasp over the many interrelationships underlying fixed income assets and allow users to derive portfolio-level implications from their bond market views. The DPST tool may analyze a user's bond market views (more specifically treasury yield increase/decrease for a given time horizon) and guide the user on its implication on different fixed income asset classes. In one implementation, the DPST tool may enhance the user's understanding of bond mechanics concepts and help him in the investment decision-making process. The DPST tool may follow a building block approach to help the user translate his bond market views into return implications over a broader asset class level. The DPST tool may also build 'what if' scenarios and demonstrate portfolio construction based on the user's portfolio level objectives.

For example, a user may configure parameters in the DPST tools to set assumptions such as, e.g., US Treasury yields to be near the low end of their historical range, and to obtain estimates of the credit spreads. For another example, the DPST may analyze trends of fixed income asset classes when US Treasury rates rise or fall. In further examples, the DPST may analyze how US Treasury yields rising quickly (in 1 year) or slowly (over 15 years) may affect a fixed income instrument, how different rate and time horizon scenarios may affect certain return contributions to fixed income securities such as yield, roll, yield surprise, risk of default, and currency adjustments, and/or the like.

In further examples, the DPST may analyze when building a fixed income portfolio to a specified yield target, the different performance and/or portfolio construction strategy for the user when the user targets at any characteristic value, such as maximizing returns, minimizing volatility, minimizing duration, and/or the like.

Within implementations, the DPST may provide a client calculator component that brings together in one place all five drivers of fixed income, e.g., total return (yield), roll, yield change, defaults (net of recovery) and exchange rate effects. The DPST client component may provide a portfolio optimizer interface consisting of dynamic slider bars, where the allowable range on each slider is calculated on the fly based on holdings constraints and other user input (e.g., see FIGS. 4A-7D, etc.).

In some embodiments, the DPST may provide dynamic sliders, for example, in a portfolio construction tab. The DPST may, in some implementations, follow a batching process where a user may enter a set of input parameters—such as yield, return, duration, volatility, and correlation—and hit a "Solve" button. The DPST may optimize a set of solutions and may provide a portfolio mix which meets a user's objectives and constraints. While in some embodiments a user may hit a "Solve" button to view results after each alteration, other embodiments may automatically update and refresh as the user makes changes. The DPST may make optimization more transparent and thereby may enable the user to view portfolio tradeoffs in a clear and concise manner Users may view inputs and outputs side-by-side and explore how a change in each parameter affects the other parameters.

FIG. 1C provides an example diagram illustrating aspects of DPST simulator for fixed income portfolio within embodiments of the DPST. In one implementation, the DPST 110 may provide a client component to help investment professionals (e.g., user 101*a*) to compute the effect of certain economic and mathematical relationships within the fixed income market and how various bond sectors may react to changes in yield and spread levels over various investment horizons for the user's fixed income portfolio 120 (e.g., with various bond selections 105*a-b*), e.g., 106*a*. In one implementation, the DPST 110 may allow the user to play out certain hypothetical scenarios and their possible effect on certain fixed income investments as represented by market indices, e.g., by configuring different interest rate assumptions, investment objective, and/or the like, 106*b*.

FIG. 1E provides an example diagram illustrating aspects of portfolio construction based on the phase of business and/or economy cycle within embodiments of the SPC. In one implementation, asset prices (e.g., pricing of stocks, bonds, options, future contracts, and/or other derivatives, etc.) may fluctuate over the business cycle and their performance may vary over the different phases. As such, an investor 132 may adjust their investment portfolio parameters based on investment return analytics of the different phases of the business cycle, e.g., recession 131a, early cycle 131b, mid cycle 131c, and late cycle 131d.

For example, in one implementation, if the investor 132 determines they are at a recession phase of the business cycle, the investor 132 may adjust the portfolio to reduce investment on sectors that are most impacted by the recess, e.g., real estate, luxury goods, etc. In one implementation, the investor 132 may increase the weights of investment in some asset class (e.g., the consumer staples sector, etc.), which may be less impacted by the economic recession 133a.

As another example, the investor may choose to adjust the portfolio at the early phase of the business and/or economy 133b, e.g., selecting sectors that have historically performed well in the early phase. As another example, at the mid cycle of the business, when economic growth rate is at its peak, the investor 132 may increase weights on some asset classes (e.g., equity, IT stocks, etc.), e.g., 133c. As another example, at the late cycle of the business, when the economy slows down and approaches recession, the investor may need to be careful about investing in high-risk sectors as the economic growth may slow down during this stage.

FIG. 1F provides an example diagram illustrating aspects of determining business and/or economy cycle within embodiments of the SPC. In one implementation, as the investor may desire to construct and/or adjust the investment portfolio based on the current phase of a business cycle 141, the investor needs to understand how to determine what economic phase it is. In one implementation, the SPC server may provide a systematic approach for delineating stages of the cycle—recess, early, mid and late—so that the SPC may analyze asset returns within each business-cycle phase, and in turn inform asset allocation decisions. For example, as further discussed in FIG. 10B, the SPC may employ a probabilistic model (e.g., a probit regression model, etc.) based on economic indicators to determine the current phase of a business cycle 142.

In one implementation, aggregate business cycle fluctuations may reflect many aspects of the macroeconomy, including production, prices, employment, investment and consumption, and/or the like. Asset returns, may consequently have a strong cyclical component, with earnings, the interest rates and inflation determined by developments in the economy. Based on the macroeconomic indicators, the SPC may identify, retrospectively, phases of the business cycle as recess, early, mid and late, using a set of censoring rules on a plurality of indicators of the cycle, such as but not limited to corporate profits, credit, employment, inventories, and monetary policy. The phases may be chronological, and each phase may be 'dated' when half or more of the indicators (if data are available) signal a positive for that phase, e.g., see 1110a-d in FIG. 11A.

As shown by the chart 135, the SPC may evaluate economic indicators to delineate the phase of the cycle. In one implementation, the early phase 131a of the recovery occurs when policy stimulus begins to take effect and pent-up demand boils over. Exemplary economic indicators in the early phase 131a may include: real activity picks up; low interest rates encourage borrowing; sales unexpectedly increase but companies hold off re-stocking until they see sustained strength; and businesses may see rapid margin expansions and soaring profits, as they have trimmed all the fat from their operations during the recession.

With the recovery 134a gaining traction, at the mid cycle 131b, where confidence in the strength of the recovery builds, economic indicators may include: both credit and profit growth is strong; employment gains are steady; growth peaks; and policy moves to a neutral stance.

In one implementation, the expansion 134b may continue for a while as the economy spends most of its time in expansion but eventually it begins to brush up against capacity constraints, and policy tightens in response to building inflationary pressures. The business cycle may arrive at the late cycle 131c. Exemplary economic indicators at late cycle 131d may include: growth slows; banks scale back lending, and the rising price of credit dampens demand; firms accumulate inventory as sales weaken, which puts pressure on their earnings; policy may be slow to respond to the imminent crash, so settings remain contractionary (though becoming less restrictive toward the end).

In one implementation, as the business cycle rolls into the contraction 131d, the SPC may observe widespread falling real activity. Exemplary economic indicators at this stage may include: tight financial conditions result in shrinking demand; corporate profits plummet in line with sales revenues; companies pare back production and de-stock; and there is aggressive policy easing.

FIG. 2 provides an example datagraph diagram illustrating aspects of interactive data flows between the DPST server and its affiliated entities for DIA-purchasing and management within embodiments of the DPST. Within embodiments, a DPST server 220, a user 220 (e.g., an individual investor, a portfolio manager, a broker, etc.), a user device 250, a data provider 240 (e.g., (e.g., Bloomberg, NYSE, Chicago Board of Exchange, and/or other financial exchange, data service providers, and/or the like), a DPST database 219, and/or the like, may interact and exchange data messages via a communication network with regard to fixed income portfolio dynamic simulating within embodiments of the DPST.

In one embodiment, the DPST server 210 may constantly, intermittently, periodically, and/or on an on-demand basis, requesting data from a data provider 240. Such data provider 240 may provide historical market data (e.g., index, etc.), investment performance data, interest rate, treasury yields, and/or the like. Such data may be integrated and stored in the DPST database 219, e.g., in the INDEX table 251 and its sub-tables 251a-f in FIG. 2B.

In one implementation, the DPST server 210 may send a data request 201 to the Data provider 240, and obtain the data listing 202 (e.g., market index, corporate/treasury yields, etc.). For example, in one implementation, the returned data 202 may include a variety of different data formats, including, but not limited to xml, csv, dat, excel, txt, and/or the like. In further implementations, such data 202 may be integrated into a Matlab data file.

In one embodiment, a user may wish to have seasonal analysis (e.g., 152 of FIG. 1, 602, 651 of FIG. 6) performed as part of their yield analysis. In such embodiments, the DASS may employ the SPC component in addition to the DPST component, and requests to the data provider 240 and computation at the DPST server 210 may also take place at the SPC server 920, 902, 903, 904, 905, et seq. of FIG. 9.

In one implementation, the DPST may instantiate a DPST platform and retrieve a DPST user interface template 203, e.g., by accessing a library of DPST calculator components, as discussed in FIGS. 3B-3C.

In one implementation, the DPST server 210 may provide a user interface (UI) for user individualized parameters input 204. For example, as shown at 401-402 in FIG. 4A, the DPST server 210 may prompt the user 220 to enter individualized parameters 206 such as but not limited to assumed 10 year US treasury yield, time horizon, and/or the like. In further implementations, as shown at 503/505 in FIGS. 5A-5B, the user may enter, via a sliding bar widget, target characteristics of the fixed income portfolio, and/or portfolio constraints.

In one embodiment, the user 220 may operate a user device 230, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user 220 may input customization parameters 205 including market assumptions via a UI at the user device 250, which may in turn provide the user configured parameters (e.g., market assumptions) 205 to the DPST server 210.

For example, the user device 250 may generate a (Secure) Hypertext Transfer Protocol ("HTTP(S)") message including user input market assumptions 205 in the form of data formatted according to the eXtensible Markup Language (XML). An example listing of a user market assumption input message 205, substantially in the form of a HTTP(S) message including XML-formatted data, is provided below:

```
POST /market_assumption.php HTTP/1.1
Host: 192.168.23.126
Content-Type: Application/XML
Content-Length: 867
<?XML version = "1.0" encoding = "UTF-8"?>
<market_assumption>
     <session_id> HUUUSDWE </session_id>
     <user_id> JS001 </user_id>
     <timestamp>2020-12-31 23:59:59</timestamp>
     <user_accounts_details>
            <user_account_credentials>
                   <user_name>JohnDaDoeDoeDoooe@gmail.com</account_name>
                   <password>abc123</password>
                   //OPTIONAL <cookie>cookieID</cookie>
                   //OPTIONAL <digital_cert_link>www.mydigitalcertificate.com/
JohnDoeDaDoeDoe@gmail.com/mycertifcate.dc</digital_cert_link>
                   //OPTIONAL <digital_certificate>_DATA_</digital_certificate>
            </user_account_credentials>
     </user_accounts_details>
     <client_details> //iOS Client with App and Webkit
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>DASS.app</app_name>
            <app_version>1.0 </app_version>
            <app_webkit_name>Mobile Safari</client_webkit_name>
            <client_version>537.51.2</client_version>
     </client_details>
     <client_details> //iOS Client with Webbrowser
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
     </client_details>
     <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
```

```
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <portfolio_id> FI-001 </portfolio_id>
    <portfolio_name> my_fixed_income </portfolio_name>
<portfolio_assumptions>
        <ending_10_year_yield> 4.5% </ending_10_year_yield>
        <time_horizon> 1 year </time_horizon>
        <yield_value> custom </yield_value>
        <historical_percentile> 24% </historical_percentile>
        ...
    </portfolio_assumptions>
...
<market_assumption>
```

In one implementation, the user 220 may optionally submit user objective parameters, portfolio constraints (e.g., minimum or maximum weight, etc.) 209 to the DPST server 210. In another implementation, the DPST server 210 may calculate performance range to set ranges for sliding bar widgets 206 (e.g., see FIGS. 3B-3C), and return the UI widgets 207 (e.g., sliding bar, etc.) with customized ranges to the user device, e.g., see 503, 505 in FIGS. 5A-5B, etc. An example listing of the UI widget message 207, substantially in the form of a HTTP(S) message including XML-formatted data, is provided below:

```
POST /ui_widget.php HTTP/1.1
Host: 192.168.23.126
Content-Type: Application/XML
Content-Length: 867
<?XML version = "1.0" encoding = "UTF-8"?>
<ui_widget>
    <session_id> HUUUSDWE </session_id>
    <user_id> JS001 </user_id>
    <timestamp>2020-12-31 23:59:59</timestamp>
    <user_accounts_details>
            <user_account_credentials>
                    <user_name>JohnDaDoeDoeDoooe@gmail.com</account_name>
                    <password>abc123</password>
                    //OPTIONAL <cookie>cookieID</cookie>
                    //OPTIONAL <digital_cert_link>www.mydigitalcertificate.com/
JohnDoeDaDoeDoe@gmail.com/mycertifcate.dc</digital_cert_link>
                    //OPTIONAL <digital_certificate>_DATA_</digital_certificate>
            </user_account_credentials>
    </user_accounts_details>
    <client_details> //iOS Client with App and Webkit
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
            <app_installed_flag>true</app_installed_flag>
            <app_name>DASS.app</app_name>
            <app_version>1.0 </app_version>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac
```

-continued

```
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <widget_1>
            <widget_type> sliding bar </widget_type>
            <variable> yield </variable>
            <variable_min> 2.7% </variable_min>
            <variable_max> 6.5% </variable_max>
            <hard_min> 0.7% </hard_min>
            <hard_max> 63.5% </hard_max>
            <format>
                    <length> 20 </length>
                    <width> 2 <width>
                    <bar>
                            <height> 4 </height>
                            <width> 2 </width>
                            ...
                            <color> grey </color>
                    </bar>
                    <color> grey </color>
                    ...
            </format>
            ...
    </widget_1>
    <widget_2>
            <widget_type> sliding bar </widget_type>
            <variable> yield </variable>
            <variable_min> 0.86% </variable_min>
            <variable_max> 5.22% </variable_max>
            <hard_min> 0.7% </hard_min>
            <hard_max> 63.5% </hard_max>
            <format>
                    <length> 20 </length>
                    <width> 2 <width>
                    <bar>
                            <height> 4 </height>
                            <width> 2 </width>
                            ...
                            <color> grey </color>
```

```
            </bar>
                <color> grey </color>
                ...
        </format>
            ...
    </widget_2>
        ...
</ui_widget>
```

In one implementation, the user may input user parameters via the sliding bars with customized sliding ranges, e.g., for target yield, returns, duration, volatility, and/or the like. For example, the target characteristics parameter target yield comprises the aggregate annual yield that the user would want to derive from their portfolio, which could depend upon spending requirements and desired potential income. The aggregate portfolio yield is the weighted average of the yields of the fixed income asset subclasses that comprise the sample portfolio. The user may either construct a portfolio by targeting a specific yield (say 5%) or may just seek to maximize the yield if they don't have any specific spending requirements. In another example, the parameter target return allows a user to specify objectives for total return, which is the total wealth benefit derived from holding the portfolio. The portfolio return is the weighted average of the returns of the fixed income asset subclasses that comprise the sample portfolio. The optimization for target return may highly depend upon the assumption inputs for Treasury yield, horizon and credit spread a user choose as it uses the building blocks of return, described above to solve for the target return. A user may target a specific return or can choose to maximize it. In another example, the target duration is the total interest rate sensitivity of the portfolio, which gives a measure of total return expected to be observed in the portfolio with 1% change in interest rates. It is calculated as the sum of product of portfolio weights and individual asset level durations. In another implementation, a user may target a specific duration in the portfolio or may choose to minimize it.

For another example, the parameter target volatility may include portfolio volatility, which a measure of dispersion or variance in your portfolio returns. It depends upon the portfolio composition, how volatile the fixed income asset subclasses are in the portfolio and lastly the correlation among the asset returns. A user may create a portfolio by specifying target variability in the returns or can just choose to minimize it.

An example listing of the user configured parameter message 209, substantially in the form of a HTTP(S) message including XML-formatted data, is provided below:

```
POST /user_parameter.php HTTP/1.1
Host: 192.168.23.126
Content-Type: Application/XML
Content-Length: 867
<?XML version = "1.0" encoding = "UTF-8"?>
<user_parameter>
    <session_id> HUUUSDWE </session_id>
    <user_id> JS001 </user_id>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        <client_IP>10.0.0.123</client_IP>
        <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>DASS.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac
```

```
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <user>
            <name> John Smith </name>
            <DOB> 1970-10-21 </DOB>
            <gender> m </gender>
            <address>
                    <street> 111 Palm Street </street>
                    <city> Palm Beach </city>
                    <state> CA </state>
                    <zipcode> 00000 </zipcode>
                    ...
            </address>
            ...
    <portfolio_id> FI-001 </portfolio_id>
    <portfolio_name> my_fixed_income </portfolio_name>
<portfolio_target>
            <yield> 4.53% </yield>
            <return> 3% </return>
            <duration> 6.06 </return>
            <volatility> 5.7% </volatility>
            ...
    </portfolio_target>
    <portfolio_constraints>
            <US_treasury> 70% </us_treasury>
    <us_agg> 70% </us_agg>
            <us_corp_ig> 70% </us_corp_ig>
            <us_high_yield> 50% </us_high_yield>
            <em_bonds> 50% </em_bonds>
            <global_agg> 50% </global_agg>
            ...
    </portfolio_constraints>
    ...
</user_parameter>
```

In one implementation, the DPST may calculate portfolio weights 212 and save to the DPST database 219. For example, in one implementation, an exemplary listing, written substantially in the form of PHP/SQL commands, to store the DIA purchasing record data 212 to the DPST database, is provided below:

```
<?PHP
header('Content-Type: text/plain');
...
// store input data in a database
mysql_connect("201.408.185.132",$DPST_server,$password);
// access database server
mysql_select("DPST_DB.SQL"); // select database to append
mysql_query("INSERT INTO AllocationTable (timestamp, portfolio_id,
portfolio_name, 10_year_ending_yield, time_horizon,
yield_value,target_yield,
target_return, us_treasury_weight, us_agg_weight, us_corp_weight,
us_high_yield, em_bonds_weight, global_agg_weight, ...)
VALUES ($timestamp, $portfolio_id, $portfolio_name,
$10_year_ending_yield,
$time_horizon, $yield_value, $target_yield, $target_return,
$us_treasury_weight, $us_agg_weight, $us_corp_weight,
$us_high_yield,
$em_bonds_weight, $global_agg_weight, ...); // add data to
RiskBoundaryTable table in a CLIENT database
mysql_close("DPST_DB.SQL"); // close connection to database
?>
```

Within implementations, the DPST may provide the portfolio allocation weights to the user, e.g., in a graphic presentation 211.

FIG. 2B provides an exemplary diagram illustrating data structure of market index data in the DPST database within embodiments of the DPST. Within implementations, the DPST may employ and maintain data in a database, e.g., an Oracle database, see e.g., 219 in FIG. 2A, 819 in FIG. 8, etc. In one implementation, the DPST may maintain an index data table (e.g., see 819c in FIG. 8), which may include a hierarchy of sub-tables as shown in FIG. 2B.

For example, the DPST may use certain widely known market indices to represent corresponding fixed income asset subclasses. The DPST may obtain indices used to represent fixed income asset subclasses as discussed in Table 1:

TABLE 1

Exemplary Data Indices

| Fixed Income Asset Subclass | Representative Index |
| --- | --- |
| US Treasury bonds Barclays US 7-10 Year Treasury Bond Index | Barclays US 7-10 Year Treasury Bond Index |
| US Treasury Inflation Protected Securities | Barclays US 1-10 Year TIPS Index (Series-L) |
| US Bond Aggregate | Barclays US Aggregate Bond Index |
| US Corporate Bonds | Barclays US Corporate Investment Grade Total Return Index |
| US High Yield Bonds | Bank of America Merrill Lynch US High Yield Master II Index |
| Emerging Market Debt (Hard Currency) | JP Morgan Emerging Markets Bond Index Global |
| Global Bond Aggregate ex US (Local currency, Un-hedged) | Barclays Global Aggregate Excluding US (un-hedged) Index |

For each index, the DPST may be provided with daily data items such as, but not limited to yield, maturity, duration, total return over the past day, and/or the like. For example, when bonds are held over any given horizon, several forms of gain or loss accrue to the holder, such as, but not limited to yield, roll, yield change, loss upon default, and currency translation, and/or the like. The calculator may estimate the magnitude of each of these effects on an annualized basis out to the user-specified horizon.

For example, the yield data field may include income, consisting of bond coupon, which is paid to the holder. For a horizon of 1 year, yield equals the initial prevailing market yield. For longer horizons, yield may be higher or lower, depending on whether rates are assumed to rise or fall, respectively. For another example, the roll data field may include effect of bonds drawing closer to maturity, all else equal. For example, when an investor purchased a 10 year bond and hold it, after one year it only has nine more years remaining till it matures. The bond has "rolled down" its yield curve. And since the yield on a 9 year bond is generally slightly less than that on a 10 year bond, its price may be correspondingly higher. This potential price increase is an unrealized gain to the bond holder.

In one implementation, the index data table 251 in include a MARKET_INDEX sub-table 251a, which may include more than 700 rows, and contain entries for various indexes for DPST. This table's contents may be reloaded based on file feed.

In one implementation, the index data table may further include an INDEX_PRICE sub-table 251b, which contains data needed by the DPST calculation, such as NAV_AM (e.g., net asset value, etc.) and PERCENT_DIFF_AM (e.g., return, etc.). Entries for this table are provided by a daily file feed. As this table is loaded daily, and other DPST data may not be updated on a daily basis, the most recent rows from this table may not be directly incorporated into the calculation. Instead, DPST may pull the data from the rows where the INDEX_PRICE. EFF_DT=INDEX_ATTRIBUTE. AS_OF_DT (e.g., when index price effective date is the same as that of the index attribute).

In one implementation, an INDEX_ATTRIBUTE sub-table 251c may hold index-level data general information needed by DPST. This data may logically be added to MARKET_INDEX 251a, but columns may not be added to table 251a that will only be filled out for some of the more than 700 indices. Each row for an index on the INDEX_ATTRIBUTE table 251c may indicate that the corresponding index may be used by the DPST calculation. For example, there may be one row on this table for each index it uses, plus an additional row for the 10 Year Treasury. The indices rows on this table are also represented on MARKET_INDEX.

In one implementation, this table may also hold values needed by the DPST which are the results of daily-"raw"-data-based calculations done by the Stored Procedure. This "pre-calculated" data represents results that are based on the "most recent day"'s worth of data, which will remain valid until new raw data is loaded. These results could have been calculated in the business service, but are being pre-calculated and stored here for performance reasons.

In one implementation, the DPST may not store these calculated values for each past historical day; only the values as of the AS_OF_DT, which are the ones needed for the DPST. This data will be used in conjunction with daily "raw" data held on INDEX_ATTRIBUTION_DETAIL 251*d* and the user-entered Time Horizon, Assumed Future Treasury Yield, and index Assumed Future Credit Spreads to calculate expected returns for the page Bar Chart.

In one implementation, the INDEX_ATTRIBUTE table 251*c* may have a sub-table INDEX_ATTRIBUTE_DETAIL 251*d*, which may hold dated "raw" daily data for the DPST, the sort of data to receive in a daily feed process at some future point.

In another implementation, the INDEX_ATTRIBUTE table 251*c* may have a sub-table INDEX_PERCENTILE 251*d*, which may hold Stored Procedure calculated percentile ranking/credit spread pairs, for use by the browser Future Treasury Yield and Index slider controls for the bar chart results (e.g., see 404 in FIG. 4B). It includes entries for various indexes, and for the 10 Year Treasury, and/or the like. The number of datapoints to be created for each index may be determined at run time based on a parameter stored in FFP_PARAMETERS 251*h*.

In one implementation, the INDEX_CORRELATION sub-table 251*f* may hold the matrix of index-to-index correlation numbers (−1 to 1), for use in Portfolio Volatility calculations. These entries may also be calculated by the Stored Procedure. The full set of correlations may be stored, e.g., 7 sets of rows for each index, 7 rows per index (total 49 rows), and/or the like. So, if there is an entry keyed as "Index A"/"Index B", then there may also be an entry keyed as "Index B"/"Index A". The 2 entries may have the same correlation value.

In one implementation, an INFLATION table 251*g* may hold the daily inflation rates; an FFP_PARAMETERS table 251*h* may hold the Recovery Rate parameter for DPST use, and the parameter for the number of datapoints to create for each index in the INDEX_PERCENTILE table 251*e*, which may be used as input to the Stored Procedure that creates these table rows.

In one implementation, the INDEX_ATTRIBUTE_WIP 251*i*, and INDEX_ATTRIBUTE_DETAIL_WIP 251*j*, may hold "raw" data and maintain the most up-to-date data updates, e.g., there are WIP (Work-In-Progress) versions of these tables. The WIP tables may have the same layouts as the non-WIP versions of the same tables. New "raw" data may be loaded to the WIP tables, and then when the data load is completed, the WIP table contents may be merged with the non-WIP table contents.

Within implementations, the data tables 251*a-j* may be processed using a SQL loader. For example, MARKET_INDEX 251*a* and INDEX_PRICE 251*b*, data may not be loaded daily to the new tables, as DPST may not have an automatic daily feed for this data. Instead, raw data may be loaded approximately once a month. The month's new raw data will be made available to us on a formatted spreadsheet. There may be a SQL Loader script to load the "raw" data from the spreadsheet to the INDEX_ATTRIBUTE (AS_OF_DT only) and the INDEX_ATTRIBUTE_DETAIL, and INFLATION tables.

In one implementation, the DPST may employ an Index Stored Procedure, e.g., an on-demand Stored Procedure. This stored procedure may be invoked after the SQL Loader process has completed. The Stored Procedure may do the following: check that rows exist on the INDEX_ATTRIBUTE_DETAIL table 251*d* for every index found on the INDEX_ATTRIBUTE table 251*c*, where the INDEX_ATTRIBUTE_DETAIL. EFF_DT=the INDEX_ATTRIBUTE. AS_OF_DT.

The stored procedure may then check that rows exist on the INDEX_PRICE table 251*b* for every index found on the INDEX_ATTRIBUTE_TABLE 251*c* where the TREASURY_IN=N, and where the INDEX_PRICE. EFF_DT=the INDEX_ATTRIBUTE. AS_OF_DT.

The stored procedure may then Update INDEX_ATTRIBUTE_DETAIL 251*d* as required (e.g., calculating YIELD_PT and LOWER_YIELD_PT for any row where the UNADJ_YIELD_PT column is non-null and the YIELD_PT column is null; i.e., for the TIPSindex); and update the calculated derived-data columns on INDEX_ATTRIBUTE 251*c*. The stored procedure may then delete the existing contents of the INDEX_PERCENTILE 251*e* table, and create new rows for the table; delete the existing contents of the INDEX_CORRELATION_AGG table 251*f*, and create new rows for the table.

The stored procedure may then merge the WIP table contents with the INDEX_ATTRIBUTE 251*c* and the INDEX_ATTRIBUTE_DETAIL 251*d* tables, and commit all changes to all tables.

In one implementation, the DPST may implement SQL scripts to load certain datapoints on release, which are neither available from the formatted spreadsheet for upload via SQL Loader, nor calculated by the Stored Procedure. These datapoints may be added via SQL script. Such data points may include, but not limited to INDEX_ATTRIBUTE: CURRENCY_RETURN_PT, index indicators TREASURY_IN and TREASURY_BASED_IN, FFP_PARAMETERS, the rows for the Recovery Rate and the parameter for the number of percentile datapoints to create per index, and/or the like.

In one implementation, the DPST may communicate with a remote server for performance calculation, e.g., a Mathworks MatLab server. This vendor application may be used to perform Portfolio Weight calculations when the end-user enters a Target (maximize Yield, minimize Volatility, etc.) and clicks the Solve button. In one implementation, MatLab components may be accessed via an API. Request and response structures will be configured within MatLab for use with this API to allow for receiving and returning data from a calculation component, e.g., the portfolio composition calculator, e.g., see FIG. 3B-3C.

FIG. 3A provides a logic flow diagram illustrating interactive process flows between a user/investor and the DPST server for portfolio composition calculator within embodiments of the DPST. In one implementation, the DPST server may periodically, intermittently, constantly, and/or on an on demand basis, update market index data, historical bond performance data, etc. with a data provider. For example, the DPST server may send a data request 301 (e.g., see 201 in FIG. 2A, etc.) to the data provider (e.g., Bloomberg, NYSE, etc.), which may in turn aggregate and provide market index data 302 to the RT-SUM server. The DPST may analyze historical market index data 303, and integrate them into the database, e.g., see data tables 251*a-f* in FIG. 2B.

In one embodiment, in addition to and/or instead of analyzing historical market index data 303, the DPST may further obtain seasonal analytics to further frame yield analytics (e.g., if specified 202 of FIG. 2, 651 of FIG. 6, etc.) and may flow to e.g., 1005, 1005*a* of FIG. 10*a-c* for seasonal calculations as specified (e.g., 651 of FIG. 6).

In one implementation, a user (e.g., an investment professional, an individual investor, etc.), may initiate a DPST component 304 at a user device, e.g., a mobile application, a web browser based application, etc. The user may submit portfolio parameters, e.g., market assumptions such as interest rate, investment objective, investment constraints, etc. 305. For example, as shown at 401-402 FIG. 4A, the user may configure an assumed 10-year US treasury yield, time horizon; as further shown at the sliding bar 503, 505 in FIGS. 5A-5B, the user may configure the target yield, return, duration, volatility, etc. of the portfolio, and/or the like.

In one implementation, the DPST server may execute fixed income portfolio calculator based on the user configured parameters 308 (e.g., see FIGS. 3B-3C). When the user configured objective is achievable 309, the DPST may generate bond allocation weights to achieve the objective 312. Otherwise, the DPST may generate and provide an unavailable message to the user 311, e.g., by grey out the sliding bar, etc. In one implementation, the DPST may display the portfolio allocation weight to a list of available fixed incomes 313 to the user. Upon reviewing the allocation, the user may provide feedback and optionally submit portfolio adjustment 314, e.g., in a similar manner as in 305. The DPST may then re-execute the portfolio calculation to provide bond allocation weights 316.

FIGS. 3B-3C provide a logic flow diagram illustrating aspects of interactive process flows between a user and the DPST server to generate dynamic user interface for fixed income portfolio yield calculation and evaluation within embodiments of the DPST. Within implementations, the DPST may receive an indication to launch the calculator component, and initiate a DPST template 321. For example, the DPST template may comprise a previously stored web page, which may be served to a browser at the user device, e.g., 322. The template page may be framed by headers, left panel, footers, and/or the like.

In one implementation, on loading in the browser, the first tab of the page may be displayed, e.g., an Expected Return tab. The DPST may then immediately make an AJAX request to calculate range parameters for UI widgets such as the sliding bars (e.g., see the sliding bar 503 in FIG. 5A, etc.), e.g., 323. For example, the DPST may access a library and calculate an endpoint for the sliding bar. The endpoint may be part of the DPST Controller. The Controller returns the list of index market codes (MKT_INDEX_CD) for the indexes currently in use from the Properties artifact, and includes the codes as variables on the served page. In one implementation, the entries in Properties could be replaced in the future by a call to a new component to get the list of indexes. The page also may be hard-coded on itself the default Time Horizon figure (0 years). It should be noted that the sliders may have hard minimum maximum values 503b and then have dynamic, e.g., "soft" minimum maximums 503c from the DPST's calculation range. This assists the user to easily understand the quantifiable tradeoffs that are available for a user in hard versus soft criteria available to the user. In another embodiment, this would allow a user to instantly see and discern how the selection of filtering criteria effect their list of choices; for example, if a user is looking to purchase lamps on Amazon or eBay, and they receive 2,000,000+ matching results, and then add the constraints 503d of only seeing lamps costing under $100, and having non-cloth lamp shades, a slider may show the hard min-max slider going from $0 to $500, but a dynamically highlighted area from $15 to $100 where matching lamps exist, and scrubbing through that dynamic slider range will show the user only matching lamps fitting those constraints.

Once it has the list of indexes, the DPST Template then makes an AJAX call to an endpoint calculation function in the library. The call includes the list of indexes from the variables on the served page, e.g., 323.

In one implementation, the DPST may profess the inquire AJAX request, and retrieve index data from the database e.g., 324. For example, the DPST may call the new IndexPercentileInquire component, including the list of indexes on the request. This component retrieves the basic Index data (market code, index name, etc.) and the Index/Percentile information from the Index Summary/Index Percentiles tables. The response also includes the DISPLAY_ORDER_NO and DEFAULT_PORTFOLIO_PT. The DPST returns this data in JSON format to the browser.

In one implementation, on receipt of the Percentiles JSON response, the DPST may immediately make a second AJAX call to the endpoint calculator component, e.g., 325 to calculate returns. This call includes the index list, plus defaults for the expected user input—the default Time Horizon figure that was included on the page when served, plus the Current Yield/Credit Spread figures for the indexes and the Future Treasury Yield.

In one implementation, the DPST may receive the AJAX request to calculate returns, and invoke a return calculation function from the library accordingly, e.g., 326. For example, the DPST may call the new IndexHypotheticalReturnsCalculator component. The DPST includes the information passed it on the AJAX call in the request—index list, default Time Horizon, current Yield and current Credit Spreads, and/or the like. The calculator component returns the calculated expected results for each index. This equates to the FIGS. in the "Expected Returns" grid on Anshul's spreadsheet. In addition, the service will also retrieve from the Oracle Database and return the Duration and Volatility for each index. In one implementation, the Duration and Volatility may be returns as-is from the database, as they are not affected by user input. In turn, the DPST returns these results in JSON format to the browser.

In one implementation, when the DPST Template receives the second AJAX response, it calculates and displays the Index Bar Chart in left-to-right DISPLAY_ORDER_NO, and uses the Percentile figures to set up the Future Treasury Yield and Index Future Credit Spread Sliders, with initial values in the associated entry fields, e.g., 327. In this way, the user interface page is enabled for user input, e.g., see sliding bars 503 and 505 in FIGS. 5A-5B.

In one implementation, the DPST may receive user entered new parameters, e.g., a new Time Horizon, to reset the Future Treasury Yield using either the associated slider or entry field, and/or to reset one or more Index Future Credit Spreads, again using either the associated sliders or entry fields. On each such action (field entry, slider adjustment), the Template may again call the return calculator component endpoint to have the expected returns recalculated, and then display the results, e.g., 329.

In one implementation, upon providing the initial user interface page, if the user selects the portfolio construction option 330, e.g., when the user feels that the Time Horizon, Future Treasury Yield and Index Future Credit Spreads are to his liking, the user may click the page tab control to switch to the Portfolio Construction tab. The user may enter a Target type value, to have the DPST calculate portfolio percentage weights. As part of doing so, the user may also set index-level min/max Weight constraints. Alternatively, the user may simply enter the portfolio percentage weights himself.

For example, portfolio construction section allows users to examine portfolio-level implications of their bond market calculations. Users may do so in 2 ways—by either (a) entering a portfolio mix, i.e., allocations to each of the bond indexes available in DPST, to examine the resulting portfolio characteristics of yield, return, duration and volatility, or by (b) invoking the calculator to determine a portfolio mix that achieves target levels on yield, return, duration or volatility.

Once these are entered, the user may click the Solve button 333, which may trigger the DPST to make a call to invoke the "calculateportfolio" endpoint function, passing sets of parameters.

For example, if a target was entered 334, the DPST may pass parameters including, but not limited to target type and value (either a minimum/maximum indicator or a numeric value), DEFAULT_PORTFOLIO_PT for each index, list of by-index weight constraints, the expected returns grid of data, the index duration and volatility, and/or the like, e.g., 336.

Alternatively, continuing on with FIG. 3C, when no target type is provided 334, but the portfolio weights were directly entered by the user, the DPST may pass on list of weight-by-index values, the expected returns grid of data, the expected returns grid of data, the index duration and volatility, and/or the like, e.g., 337 to the portfolio calculation function. Upon receipt of the DPST/PortfolioComposition-Calculator AJAX request, the DPST may process the portfolio composition calculation, e.g., calling the IndexPortfolioCompositionCalculator component.

In one implementation, following up from 336 when a target type request is provided, then the DPST may call a remote server (e.g., a Matlab server, etc.) via MatLab API using the request information (target type & value, weight constraints, expected returns data), and/or the like, e.g., 341. The Matlab server may return the set of calculated portfolio weights. If a directly-entered weight type is included in a request, then the DPST may not need to call MatLab.

In one implementation, when the DPST has obtained the set of portfolio weights, the DPST may retrieves the index correlation matrix figures (e.g., see 251*f*) from the DPST Database (e.g., calculated by the Stored Procedure), and uses them in conjunction with the passed index volatility figures to call the MatLab server again to calculate the portfolio volatility, e.g., 342. The MatLab server may return the portfolio volatility as a singe value.

In one implementation, the DPST may return the portfolio weights list, the portfolio volatility, and the other portfolio-level summary figures. The DPST may then return the same response data in JSON format to the browser, wherein an exemplary JSON data message may include the returned the portfolio weights list, the portfolio volatility, and the other portfolio-level summary figures.

In one implementation, the DPST may use the returned portfolio weights to generate and display graphic presentations 344, e.g., the result portfolio pie chart (e.g., see 507 in FIG. 5A, etc.), and displays the returned Portfolio level data, including Volatility and other portfolio-level summary figures. Portfolio weights are displayed for indexes in index DISPLAY_ORDER_NO.

FIG. 2C provides a data plot diagram illustrating aspects of yield analysis within embodiments of the DPST. Within implementations, the DPST may "roll" a fixed income instrument for portfolio performance calculation within the duration of the fixed income, e.g., a bond. For example, "roll" is the portion of a bond's price change that is attributable to its finite maturity, e.g., see 271. Unlike, e.g., common stocks, which confer permanent ownership of the issuing corporation, bonds represent a debt of the issuer, which almost always has a stated maturity. For example, the 2.9% 10 year US Treasury note has a maturity of 10 years. And since yield varies with maturity (this relationship is captured by the yield curve), passage of time implies a change in yield, which in turn implies a price change.

For example, consider the Barclays US Aggregate Bond Index, at any given moment it is comprised of thousands of bonds. With every passing day, each of those bonds moves closer to maturity by one day. Hence as time passes, an investor who is exposed to the Barclays Agg will experience roll, much like the investor who buys and holds a single bond. It is just as meaningful to talk about the maturity of an index as represented by the weighted average maturity of its constituent bonds, and hence its roll, as of an individual bond.

In another implementation, the composition of any bond index may change throughout the year as new bonds are issued and get included; existing bonds mature or default and are henceforth excluded; bond characteristics like perceived credit quality change; and the index owner rebalances the mix of bonds in keeping with the index's overall objectives and intended character. Specifically, Barclays may carefully watch the mix of bonds within its namesake Aggregate bond index, to keep their weighted average maturity within a narrow range. So an investor in the Barclays Agg may not see their bonds roll down all the way to maturity. In one implementation, the DPST knows the maturity of each bond index, and assumes that index maturity remains constant from one year to the next, and that during a year, investors in the bond index experience one full year of roll. The DPST may not take into consideration daily changes in the indices' average maturity. For example, when considering a fixed income asset subclass where the index maturity is 10 years, the computed roll corresponds to a reduction in index maturity from 10 to 9 years, as if the index holds its composition of bonds steady for one year, and then rebalances back to a 10 year average maturity. As such, the DPST may calculate roll annually depending on the user's time horizon so an investor with a 15 year horizon may then experience this year of roll 15 times.

In one implementation, to estimate the yield of each index following one year of roll, all else equal, the DPST may identify another index whose characteristics come closest to the primary index, while having a maturity one year shorter. So for US treasury bonds, where the primary index the "Barclays US 7-10 Year Treasury Bond Index" is employed, the DPST may impute the roll-down yield from a "Barclays US 6-9 Year Treasury Bond Index". When such index is not available, the DPST may rely on a secondary index that most closely aligns with the primary index and adjust accordingly.

TABLE 2

Exemplary Data Indices

| Fixed Income Asset Subclass | Representative Index |
|---|---|
| US Treasury bonds Barclays US 7-10 Year Treasury Bond Index | Barclays US 1-4 Year Treasury Bond Index |
| US Treasury Inflation Protected Securities | Barclays US 1-5 Year TIPS Index (Series-L) |
| US Bond Aggregate | Barclays US Aggregate Bond Index (1-3 year) |
| US Corporate Bonds | Barclays US Corporate Investment Grade Total Return Index-Intermediate |
| US High Yield Bonds | Bank of America Merrill Lynch US High Yield Master II Index (0-1 Y) |
| Emerging Market Debt (Hard Currency) | JP Morgan Emerging Markets Bond Index Global-Intermediate |
| Global Bond Aggregate ex US (Local currency, Un-hedged) | Barclays Global Aggregate Excluding US (un-hedged) Index (1-3 Y) |

In one implementation, where the maturity difference between the primary and secondary indices is greater than one year, the DPST may impute the roll-down yield by interpolation. So if the secondary index has a maturity that is 2 years shorter than the primary index (instead of the desired 1 year shorter) then the DPST may use the midpoint of their two yields to approximate the postroll-down yield.

In one implementation, the DPST may take the difference between the roll-down yield and the initial yield, multiply this difference by the bond index duration to determine the hypothetical annualized roll down effect, assuming that the duration of the bond index remains fixed at its initial level and that the same duration applies to the index one year later at its rolled-down bond yield. In short, the DPST may assume that the yield curve will move in parallel so for any move in interest rates, there will be the same incremental effect on bonds across both maturities.

In one implementation, yield curves may slope upward, e.g., a higher yield for owning bonds of longer maturity. Then truly roll "down" the curve towards shorter maturity, and experience a resulting price increase. However, there are times, particularly in certain recessions or a sharp monetary tightening, when yield curves slope downward, e.g., lower yield for owning bonds of longer maturity. Then the DPST may roll "up" the curve, with a resulting price decrease. As such, if the yield curve was to slope downward, the DPST would capture this market environment and represent a negative roll accordingly.

In one implementation, the DPST may study the yield change, e.g., as shown in FIG. 2C, the effect of market trend in bond yield. It is well known that when yields rise, bond prices fall, and vice versa, all else equal. A bond's (or bond index's) duration measures the strength of this relationship at any point in time. Note that duration provides an approximation of this relationship and assumes that for every movement in interest rates, there is an equal movement in bond price (1 to 1 relationship). The DPST calculator may not take into consideration convexity or the concept that the price/yield relation may not be linear and may vary depending on a number of factors. Via the DPST user interface (e.g., 401-402 in FIG. 4A, etc.), the user provides an assumed level of yields at the end of their assumed horizon. The annualized hypothetical impact of yield change (e.g., 272) is then determined. For example, the user-provided yield (at the user-provided horizon) may be compared to the index's starting yield, and a hypothetical annualized yield change is determined, e.g., when the 10-year maturity bond index has a yield of 5%, and the user provides an assumed yield of 8% and an assumed horizon of 3 years. The yield change is then 3% (=8% assumed−5% current) and the annualized yield change is 1% (=3% change/3 year horizon). In one implementation, the annualized yield change is multiplied by the bond index duration to determine the annualized yield change effect. Continuing the example above, if the index had a duration of 7, the resulting annualized price effect is 0.7% (e.g., 7 duration times 1% per year) or a hypothetical loss of 70 basis points per year.

In another implementation, the DPST may analyze loss upon default (net of recoveries), e.g., effect on bond price of changes in credit quality, including both upgrades and downgrades. The DPST may rely on default and recovery rates upon default that are provided by the user. Baseline or default values are provided as follows: the baseline default rate assumption is ¼ of the credit spread with respect to intermediate treasury bond of the same maturity. The recovery rate, which is the amount of funds recovered from the issuer in case of the default, is modeled as follows: investment grade bond 45%, non-investment grade bond 40%. Since default is a constant rate in the calculator, it does not take into consideration the risk that someone owning a security depending on that unique situation may lose a lot more than the user provided level.

In one implementation, the DPST may employ currency translation, e.g., effect on prices of foreign bonds due to movements in currency exchange rates, which may affect the return of international bonds when these bond returns are quoted in their local currency. User may provides a level, e.g., the baseline or default value being 0.25% per year implying that USD strengthens by 25 basis points (0.25%) per year in the future against a representative basket of foreign currencies.

In further implementations, the DPST may evaluate a series of risk factors. For example, DPST uses certain indices to represent a particular fixed income class. An investor in this type of investment is concurrently subject to both yield and capital gain or loss potential. This is uniquely different than a buy & hold investment in an individual fixed income security which typically has a defined end or maturity date (although may be callable before this date). As such, an investor in an individual fixed income security may buy and hold the security meaning they would collect coupon payments, hold until maturity, and then receive their principal back. They may also decide to sell the security on the secondary market before the maturity and recognize a capital gain or loss. However, in selling away the bond, the investor may lose the coupon payments left on the security. As with any investing, certain risks may be applicable to any fixed income security. In such cases, the DPST may consider risk types as follows:

Default Risk: If a bond issuer fails to make either a coupon or principal payment on its bonds as they come due, it is said to be in default. This could arise in connection with the issuer's bankruptcy or a failure to meet some other provision of the bond indenture, such as a reporting or debt service reserve requirement.

Credit Risk: A bond's credit quality is an important consideration when evaluating investment choices. Credit ratings services may assign a credit rating to a bond and/or a bond issuer based on analysis of the issuer's financial condition and management, economic and debt characteristics, and the specific revenue sources securing the bond. The highest ratings are AAA (S&P) and Aaa (Moody's). Bonds rated BBB/Baa and higher are considered investment grade; bonds with lower ratings are considered higher risk, speculative or high yield. Lowe rated bonds will often have higher yields to compensate investors for increased risk.

Interest rate risk: Interest rate movements almost always have an impact on bond prices. When interest rates rise, the price of existing bonds typically falls. If a user sells their bond into this type of interest rate environment, they may probably get less than you paid for it. The volatility created by interest rate risk is greater for longer term bonds and usually declines as the maturity date gets closer.

Inflation risk: in an environment of high or increasing inflation, a bond investor is at risk of reduced purchasing power, based on future cash flow (coupon payments and principal).

Market risk: market risk is the risk that the bond market as a whole may decline, bringing the value of individual securities down with it, regardless of their fundamental characteristics.

Foreign risk: In addition to the risks mentioned above, there are additional considerations for bonds issued by foreign governments and corporations. These bonds can experience greater volatility, due to increased political, regulatory, market, or economic risks. These risks are usually more pronounced in emerging markets, which may be subject to greater social, economic, regulatory, and political uncertainties.

FIGS. 4A-4B provides exemplary user interface diagrams illustrating exemplary scenarios of portfolio simulations in terms of interest rate variations within embodiments of the DPST. Within implementations, a user may configure expected assumptions for the performance prediction/estimation, e.g., by adjusting the US treasury yield 401, time horizon 402, and/or the like. In one implementation, when interest rates are expected to rise, the user may evaluate whether it is time to move out of the fixed income, depending upon how and when interest rates move. The user may configure the DPST to simulate two scenarios, e.g., when interest rate move by 200 bps in 1 year, the simulation results show there may be huge negative returns across the fixed income spectrum and the user may desire to move out of the fixed income.

Alternatively, as shown in FIG. 4B, the user may configure the same interest rate move on a 5 year horizon 403, and even after the 200 bps move, the results may show that the user may still get around 2% return (annualized) in bonds (even more than that in High Yield and Emerging Markets) 404. The difference may be caused by the following effects: as rates rise slowly, coupons get reinvested at a subsequently higher interest rate which negates the effect of price depreciation; and there may be a component of the bond return, called roll (cyan bars) which is attributable to its finite maturity and hence generating a positive return as a bond gets near to the maturity.

FIGS. 5A-5B provides exemplary user interface diagrams illustrating exemplary scenarios of portfolio simulations for different investment objectives within embodiments of the DPST. In one implementation, when the user may desire to generate a fixed-income portfolio which gives me a 3% annualized return, the user may configure the 3% return with a sliding bar 503. In one implementation, the user may configure the interest rates rise by 200 bps (501) in 5 years (502). The DPST may generate estimation showing that the generated portfolio has a return of 3% but high interest rate sensitivity (duration=6.06) but there is still a room for compression (as shown by dark green bar).

Continuing on with FIG. 5B, if the user slides the duration bar to the left generates a portfolio with same level of target return but much lower interest rate sensitivity (duration), e.g., 505. The new portfolio may shift allocation from US Treasury & Corporate bonds to assets such as US Agg and Global Agg, which has relatively lower duration.

FIGS. 6A-6E provides exemplary user interface diagrams illustrating alternative exemplary scenarios of portfolio simulations for different investment objectives within embodiments of the DPST. For example, as shown in FIG. 6A, assuming the interest rates rise to their historical average in next 5 years, e.g., 601, the user may desire to construct a fixed-income portfolio with a 3% annualized return as investment objective. The DPST may show that the goal is unachievable as the maximum return that can be achieved in this scenario is 1.95% with the above portfolio composition, e.g., 602. In addition the user may supply cycle phase lengths 651 of interest for the analysis to employ the SPC component calculation engine. However, the light green section in Return bar shows that if the user relaxes the constraints, the goal may be achieved.

For example, as shown in FIG. 6C, when the user increases the maximum possible allocation in High Yield, EM and Global Agg (e.g., 605a-c) from 30% to 50% fulfills the objective and produces a portfolio with 3% return, e.g., 606 in FIG. 6D. In one implementation, the constructed portfolio may have a higher allocation to US High Yield to EM Bonds relative to the previous portfolio.

In another embodiment, the user may move sector allocation constraints. For example, in FIG. 6D, the user may increase the maximum possible allocation in US High-Yield, Emerging Market, and Global Aggregate from 30% to 50%. In some implementations, this may fulfill a user's objective, for example, of a 3% annualized return.

FIGS. 7A-7D provides exemplary user interface diagrams illustrating portfolio diagnostics within embodiments of the DPST. In one implementation, the DPST may provide analytics illustrating how a traditionally constructed fixed income allocation performs against an institutionally designed multi-sector bond allocation in a rising interest rate environment, e.g., with a traditionally constructed fixed income portfolio, interest rates may rise 150 bps (e.g., 701) over the course of the next 5 years (702) and an investor may expect a reasonable return, e.g., 703.

Continuing on with FIG. 7B, with an institutionally designed multi-sector bond allocation, interest rates may rise 250 bps (e.g., 704-705), and still earn the same reasonable amount of return as a traditionally constructed fixed income allocation, e.g., 706.

Continuing on with FIG. 7C, when interest rates rise even further, e.g., 500 bps (707-708), before a traditionally constructed fixed income portfolio would start to experience negative returns, the DPST may observe the return 709.

Continuing on with FIG. 7D, when interests rates rise 650 bps (e.g., 710-711), before an investor would experience negative returns in an institutional constructed multi-sector bond allocation, the DPST may provide the estimated return, e.g., 712.

Figure 8B:
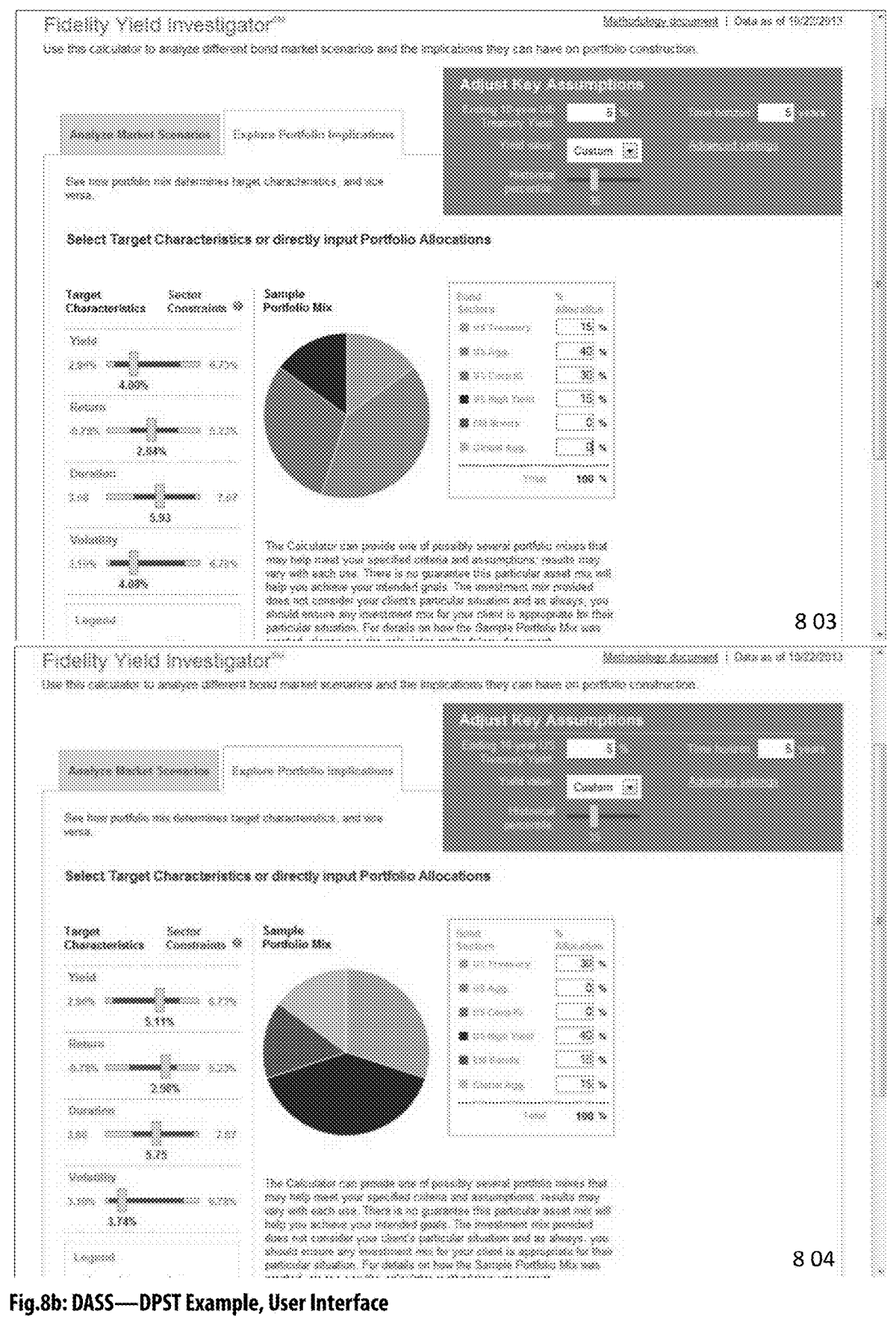

FIGS. 8A-8D provides exemplary user interface diagrams illustrating portfolio performance comparisons in a rising interest rate environment within embodiments of the DPST. In FIG. 8A, screenshots 801 and 802 show a first portfolio and second portfolio, respectively, when interest rates rise 150 bps. In some embodiments, the first portfolio 801 may be a traditionally-constructed portfolio with concentration in investment-grade bonds, while the second portfolio 802 may be a multi-sector portfolio with allocations in less traditional bond sectors. In the shown embodiment, both the first and second portfolios generate a reasonable return of 2.76% and 3.64% respectively. FIG. 8B screenshots 803 and 804 also show the first and second portfolios of FIG. 8A, but this time interest rates rise 205 bps. In some embodiments, the return on the first portfolio may be 2.04% and the return on the second embodiment may be 2.93%. In the shown embodiment, both the first and second portfolios may still generate similar rates of return. In FIG. 8C, the same first and second portfolios are shown as 805 and 806, respectively, but, in this figure, interest rates rise 550 bps. As shown, the return in the first portfolio is −0.13%, while the return in the second portfolio is 0.97%. While the first portfolio experienced a negative return, the return in the second portfolio remains positive. FIG. 8D shows the first portfolio 807 and second portfolio 808 as interest rates rise 700 bps. The first portfolio's return is −1.22%, while the second portfolio's return is −0.03° A. As shown, rates rose considerably before the multi-sector portfolio experienced a negative return.

Seasonal Portfolio Construction Platform (SPC)

The Seasonal Portfolio Construction Platform technology (hereinafter "SPC") provides an investment analytics and management tool facilitating a user (e.g., investors, consumers, portfolio managers, traders, etc.) to research, build and maintain an investment strategy for a customized portfolio based on a current economic cycle phase. In one embodiment, the SPC component 1635b of FIG. 16 may transform user portfolio construction request (e.g., see 901 in FIG. 9, etc.) via SPC components, such as but not limited to Economic Data Collector 1642b (e.g., see 1003-1005 in FIG. 10A, etc.), Portfolio Construction 1643b (e.g., see FIG. 10C, etc.), Economic Cycle Phase Dating 1644b (e.g., see FIGS. 10B and 11A-B, etc.), Portfolio Execution 1645b (e.g., see 1072 in FIG. 10C, etc.), and/or the like into portfolio investment records (e.g., see 912 in FIG. 9, etc.), and/or the like and use of the SPC.

FIG. 9 provides an example datagraph diagram illustrating aspects of interactive data flows between the SPC server and its affiliated entities for seasonal portfolio construction within embodiments of the SPC. Within embodiments, a SPC server 920, a user 902 (e.g., a consumer, an individual investor, a portfolio manager, a broker, etc.), a user device 903, a data provider 910 (e.g., Bloomberg, National Science Foundation economic data sharing, etc.), a SPC database 919, and/or the like, may interact and exchange data messages via a communication network with regard to business/economic cycle "dating" and portfolio construction within embodiments of the SPC.

In one embodiment, a user 902 may operate a user device 903, which may include any of a desktop computer, a laptop computer, a tablet computer, a Smartphone (e.g., a BlackBerry, an Apple iPhone, a Google Android, a HTC, a Samsung Galaxy, etc.), and/or the like. In one implementation, the user device 903 may send a portfolio construction, adjustment, and/or rebalancing request 901 to the SPC server 920, wherein the request may comprise an inquiry on the investment portfolio allocation strategy, e.g., the portfolio allocation to equity, bonds, and/or other assets, etc. For example, the user device 903 may generate a (Secure) Hypertext Transfer Protocol ("HTTP(S)") message including a portfolio construction and/or adjustment request 901 in the form of data formatted according to the eXtensible Markup Language (XML). An example listing of a portfolio construction, adjustment and/or rebalancing request 901, substantially in the form of a HTTP(S) message including XML-formatted data, is provided below:

```
POST /portfolio_request.php HTTP/1.1
Host: 192.168.23.126
Content-Type: Application/XML
Content-Length: 867
<?XML version = "1.0" encoding = "UTF-8"?>
<portfolio_request>
      <session_id> HUUUSDWE </session_id>
      <user_id> JS001 </user_id>
      <timestamp>2020-12-31 23:59:59</timestamp>
      <user_accounts_details>
            <user_account_credentials>
                  <user_name>JohnDaDoeDoeDoooe@gmail.com</account_name>
                  <password>abc123</password>
                  //OPTIONAL <cookie>cookieID</cookie>
                  //OPTIONAL <digital_cert_link>www.mydigitalcertificate.com/
JohnDoeDaDoeDoe@gmail.com/mycertifcate.dc</digital_cert_link>
                  //OPTIONAL <digital_certificate>_DATA_</digital_certificate>
            </user_account_credentials>
      </user_accounts_details>
      <client_details> //iOS Client with App and Webkit
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXXD</client_UDID>
            <client_OS>iOS</client_OS>
            <client_OS_version>7.1.1</client_OS_version>
            <client_app_type>app with webkit</client_app_type>
```

```
            <app_installed_flag>true</app_installed_flag>
            <app_name>DASS.app</app_name>
            <app_version>1.0 </app_version>
            <app_webkit_name>Mobile Safari</client_webkit_name>
            <client_version>537.51.2</client_version>
    </client_details>
    <client_details> //iOS Client with Webbrowser
            <client_IP>10.0.0.123</client_IP>
            <user_agent_string>Mozilla/5.0 (iPhone; CPU iPhone OS 7_1_1 like Mac
OS X) AppleWebKit/537.51.2 (KHTML, like Gecko) Version/7.0 Mobile/11D201
Safari/9537.53</user_agent_string>
            <client_product_type>iPhone6,1</client_product_type>
            <client_serial_number>DNXXX1X1XXXX</client_serial_number>
            <client_UDID>3XXXXXXXXXXXXXXXXXXXXXXXXD</client_UDID>
            <client_OS>iOS</client_OS>
            <client_OS_version>7.1.1</client_OS_version>
            <client_app_type>web browser</client_app_type>
            <client_name>Mobile Safari</client_name>
            <client_version>9537.53</client_version>
    </client_details>
    <client_details> //Android Client with Webbrowser
            <client_IP>10.0.0.123</client_IP>
            <user_agent_string>Mozilla/5.0 (Linux; U; Android 4.0.4; en-us; Nexus
S Build/IMM76D) AppleWebKit/534.30 (KHTML, like Gecko) Version/4.0 Mobile
Safari/534.30</user_agent_string>
            <client_product_type>Nexus S</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Android</client_OS>
            <client_OS_version>4.0.4</client_OS_version>
            <client_app_type>web browser</client_app_type>
            <client_name>Mobile Safari</client_name>
            <client_version>534.30</client_version>
    </client_details>
    <client_details> //Mac Desktop with Webbrowser
            <client_IP>10.0.0.123</client_IP>
            <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
            <client_product_type>MacPro5,1</client_product_type>
            <client_serial_number>YXXXXXXXXZ</client_serial_number>
            <client_UDID>FXXXXXXXXX-XXXX-XXXX-XXXX-XXXXXXXXXXXX</client_UDID>
            <client_OS>Mac OS X</client_OS>
            <client_OS_version>10.9.3</client_OS_version>
            <client_app_type>web browser</client_app_type>
            <client_name>Mobile Safari</client_name>
            <client_version>537.75.14</client_version>
    </client_details>
    <client_details>
            <client_IP>192.168.23.126</client_IP>
            <client_type>smartphone</client_type>
            <client_model>HTC Hero</client_model>
            <device_id> HTC_JS_001 </device_id>
            ...
    <client_details>
    ...
    <request> construction </request>
    <portfolio_amount> 10,000 </portfolio_amount>
    <- -!optional -- >
    <constituent>
            <type_1> equity </type_1>
            <type_2> bonds </type_2>
            ...
    </constituent>
    ...
    <portfolio_request>
```

In the above example, the user 902 may optionally specify desired investment instrument types, e.g., equity, bonds, etc., and the SPC server 920 may provide an allocation percentage for each type accordingly.

In one implementation, the SPC server 920 may obtain and/or update economic data from a data provider 910, e.g., a database and/or server that aggregate economic indicator data, etc. In one implementation, an example listing of the economic data request 902, substantially in the form of a HTTP(S) message including XML-formatted data, is provided below:

```
POST /data_request.php HTTP/1.1
Host: 192.168.23.126
Content-Type: Application/XML
Content-Length: 867
```

```
<?XML version = "1.0" encoding = "UTF-8"?>
<benchmark_request>
    <session_id> HUUUSDFSF&*&FDS </session_id>
    <timestamp> 2014-02-22 15:22:43</timestamp>
    ...
    <request_data>
        <start_time> Jan-2014 </start_time>
        <end_time> dec-2014 </end_time>
        <type>
            <type_1> unemployment </type_1>
            <type_2> index </type_2>
            <type_3> GDP </type_3>
            ...
        </type>
    <request_data>
    <acceptable_format> CSV, xml </acceptable_format>
    ...
<data_request>
```

In one implementation, the SPC server 920 may receive the requested economic indicators 903 from the data provider 910, e.g., in the form of a ".csv" files, Excel spreadsheet, and/or the like.

In one implementation, the SPC server 920 may analyze the obtained historical data 903 to determine economic indicator characteristics associated with each economic/business cycle phase 904, e.g., "date" the historical economic cycle, etc., as further discussed in FIGS. 11A-11B. In one implementation, the SPC may then analyze historical market performance to generate an optimal portfolio associated with each economic business cycle phase 905, e.g., see FIG. 11C. In one implementation, the obtaining historical data 902-903 and dating historical cycle phase and generating/updating optimal portfolio for a phase 904-905, may be conducted periodically, e.g., with updated data.

In one implementation, the user 902 may determine investment preferences 906a, and submit investment constraint and/or parameters 906, e.g., a maximum allocation percentage of one asset type, a maximum allocation percentage of a holding, etc. In one implementation, an example listing of a user investment constraint/parameter request 906, substantially in the form of a HTTP(S) message including XML-formatted data, is provided below:

```
POST /user_setting.php HTTP/1.1
Host: 192.168.23.126
Content-Type: Application/XML
Content-Length: 867
<?XML version = "1.0" encoding = "UTF-8"?>
<user_setting>
    <session_id> HUUUSDWE </session_id>
    <timestamp> 2014-02-22 15:22:43</timestamp>
    <user_id> JS001 </user_id>
    <client_details>
        <client_IP>192.168.23.126</client_IP>
        <client_type>smartphone</client_type>
        <client_model>HTC Hero</client_model>
        <device_id> HTC_JS_001 </device_id>
        ...
    <client_details>
    ...
    <portfolio_id> JS_MyUS </portfolio_id>
    <portfolio_name> my US investment </portfolio_name>
    <portfolio_date> 2014-02-02 </portfolio_date>
    <portfolio_setting>
        <setting_1>
            <asset> equity </asset>
            <max_alloc> 30% </max_alloc>
            ...
        </setting_1>
        <setting_1>
            <asset> equity </asset>
            <restriction> ABC </restriction>
            ...
        </setting_2>
    </portfolio_setting>
    ...
<user_setting>
```

In the above example, a user 902 may configure a maximum allocation percentage of equity to be 30%; and may restrict investment in stock symbol "ABC" (e.g., for conflict reasons, etc.).

In one implementation, the SPC server may create a probit regression model to "date" the current economic business cycle phase 907 (e.g., see FIG. 11B, etc.), which may generates probabilities of the current economic phase. For example, the SPC may determine, via the regression model, that the probability of being in an early economic phase is 0.3, the probability of being in a mid cycle is 0.7, and/or the like. Within implementations, an example listing of the regression probabilities of current phase message 908, substantially in the form of a HTTP(S) message including XML-formatted data, is provided below:

```
POST /phase_probability.php HTTP/1.1
Host: 192.168.23.126
Content-Type: Application/XML
Content-Length: 867
<?XML version = "1.0" encoding = "UTF-8"?>
<phase_probability>
    <session_id> HUUUSDWE </session_id>
    <timestamp> 2014-02-22 15:22:43</timestamp>
    <model> probit regression </model>
    <early>
        ...
        <prob> 0.112 </prob>
        <st_error> 0.00342 </st_error>
        ...
    </early>
    <mid>
        ...
        <prob> 0.612 </prob>
        <st_error> 0.00242 </st_error>
        ...
    </mid>
    <late>
        ...
        <prob> 0.012 </prob>
        <st_error> 0.00142 </st_error>
        ...
    </late>
    ...
</phase_probability>
```

In one implementation, the SPC may retrieve the optimal portfolio for each business cycle phase, and generate a portfolio by combining the probability weighted optimal business cycle portfolios. As in the above example, the output portfolio would combine 0.112 of the optimal early cycle portfolio, 0.612 of the optimal mid cycle portfolio and 0.012 of the optimal late cycle portfolio, and/or the like. The combined seasonal portfolio 911 may be returned to the user.

In one implementation, the SPC server 920 may generate a portfolio record 912 to the SPC database 919. For example, an exemplary listing, written substantially in the form of PHP/SQL commands, to store the portfolio record 912 to the SPC database, is provided below:

```
<?PHP
header('Content-Type: text/plain');
...
// store input data in a database
mysql_connect("201.408.185.132",$SPC_server,$password);
    // access database server
mysql_select("SPC_DB.SQL"); // select database to append
mysql_query("INSERT INTO PortfolioTable (timestamp, portfolio_id,
    portfolio_name, portfolio_amount, portfolio_restriction,
    portfolio_user_setting, econ_cycle, portfolio_alloc,
    portfolio_return,...)
VALUES ($timestamp, $portfolio_id, $portfolio_name,
$portfolio_amount,
    $portfolio_restriction, $portfolio_user_setting, $econ_cycle,
    $portfolio_alloc, $portfolio_return); // add data to
    PortfolioTable table in a SPC database
mysql_close("SPC_DB.SQL"); // close connection to database
?>
```

FIG. 10A provides an example logic flow diagram illustrating aspects of seasonal portfolio construction based on the phase of business and/or economic cycle within embodiments of the SPC. Within embodiments, a user (e.g., an investor, a portfolio manager, and/or the like) may initiate the portfolio construction 1001, and submit a portfolio construction/adjustment request 1002, e.g., to update the portfolio allocations to different constituents based on the current phase of the business and/or economy cycle. In one implementation, the user may optionally submit portfolio constraints and parameters 1007. For example, the user may manually set rules on the investment allocation, such as but not limited to a maximum investment weight/ratio/percentage for a constituent, a maximum weight/ratio/percentage for a type of financial instrument, a maximum weight/ratio/percentage for an industrial sector, and/or the like.

In another implementation, the SPC server may update with a data provider (e.g., Bloomberg, etc.) constantly, periodically, intermittently, and/or on demand. For example, in one implementation, the SPC server may constantly, periodically, intermittently, and/or upon a user request, send a data request (e.g., see 902 in FIG. 9) for the most-up-to-date economic analytics data 1003 from a data provider, which may in turn aggregate and provide the economic data analytics 1004 to the SPC server. For example, the economics analytics data may take a form similar to a spreadsheet in the format of ".csv," ".xls," ".dat" and/or the like, and may comprise statistical results generated from eViews, and/or the like. Economic data may include, but not limited to GDP, employment, income, credit, profits, policy, inventories, and/or the like.

In one implementation, upon receiving the most-up-to-date economic data analytics, the SPC server may determine analyze the data to "date" historical cycle phases 1005a, e.g., to determine data characteristics associated with each cycle phase historically. In one implementation, the SPC may then determine an optimal investment portfolio for each cycle phase 1005b, as further discussed in FIG. 11C. In one embodiment In one implementation, the SPC may determine the current phase of the economic/business cycle 1006, e.g., by determining a probability that the current business cycle may be associated with each cycle phase, early, mid, late or recession, etc. "date" the cycle, etc. Combining with the portfolio constraints/parameters that may be optionally submitted from the user 1007, the SPC server may combine optimal portfolios associated with each cycle phase based on the probabilities that the current business cycle is associated with each phase 1008. For example, in one implementation, the SPC server may maintain a list of securities, ETFs, bonds, and/or other investment instruments that generate an optimal investment combination suitable for a particular economic phase, and the SPC server may make the investment portfolio recommendation based on the economic phase. In one implementation, such optimal investment combination suitable for the particular economic phase may be obtained via historical performance analytics, e.g., see FIG. 11C.

In one implementation, the user may receive and review the provided portfolio recommendation 1009, and may optionally submit a user selection of specific holdings 1011 (or may alternatively accept the default settings from SPC). In one implementation, the SPC server may optionally adjust the holding parameters based on user preferences 1013, e.g., the user configured parameters on investment allocation within a sector, an industry, a type of instrument, etc., and may construct the portfolio based on the parameters 1014. In one implementation, the economic cycle phase "dating" and portfolio construction updating may occur periodically 1015, and the SPC may rebalance the portfolio based on the current phase of the economic/business cycle.

FIGS. 10B-10C provide exemplary logic flow diagrams illustrating aspects of determining a current phase in the economic/business cycle 1006 within embodiments of the SPC. In one implementation, upon receiving the most-up-to-date economic data analytics from a data provider 1005, the SPC may identify an economy/region of interest (e.g., a country, a geo-political district, and/or the like) 1050, retrieve and analyze historical economic data 1051 and the corresponding economic cycle phase 1052, e.g., to establish a statistical structure describing the correlation between economic indicators and the economic cycle phase. Further discussions on the statistical structure are provided in FIGS. 11A-11B.

In one implementation, the SPC may determine impactful factors for each economic phase 1055 (e.g., recess/early/mid/late phases may have representative impactful economic factors, see FIG. 11A, etc.). Exemplary asset classes may include, but not limited to equities, fixed income, real estate, currency, collectibles, derivatives, and/or the like. For example, for the recession phase, the exemplary impactful factors may include, but not limited to failing activity, drying credit, declining profits, easing policy, falling sales and inventory data, and/or the like. In one implementation, the SPC may obtain and collect data values of the corresponding data factors to transform data into usable factors for analysis 1056, and instantiate a probit model to insert the factor data into the model 1057. For example, the probit model may generate a normalized value that indicates a probability value that the current economy may be associated with a particular business cycle phase.

In one implementation, the SPC may obtain output form the probit model 1058, e.g., coefficients of the regression model, and execute the probit model with the coefficients to generate forecast output values 1059.

and normalize the output values to generate a probability value associated with an economic cycle phase 1061. In one implementation, the SPC may determine the current economic cycle phase based on the probability value for each phases, e.g., recess, early, mid or late, etc. Further discussion of the probit model "dating" the current economic cycle phase is provided in FIGS. 11A-11B.

Continuing on with FIG. 10C, upon "dating" the economic/business cycle phase in FIG. 10B, the SPC may construct and/or update the seasonal portfolio. In one implementation, the SPC may optionally obtain an asset class selection 1065, e.g., an asset class that the user is interested in for investment portfolio construction, etc. Exemplary asset classes may include, but not limited to equities, fixed income, real estate, currency, collectibles, derivatives, and/or the like. In one implementation, the SPC may retrieve stock classification under the selected asset class selection, sector, and/or the like, and may determine whether any remap is necessary for the asset classes and/or stock classification 1066. For example, the retrieved historical stock classification may be obsolete and the SPC may need to remap and apply the current structure to the past scheme to create the stock classification 1067, e.g., responding to market index such as GICS, and/or the like.

In one implementation, the SPC may obtain historical returns for a selected asset class (e.g., monthly returns, etc.) for a specified time period 1068a. Exemplary data sources may include, but not limited to S&P index for 20 years, analytics sources, Bloomberg feeds, and/or the like; such data may be imported into eViews, Microsoft Excel, and/or the like.

In one implementation, the SPC may optionally select asset classes with historically optimal performance 1069, and test for discrimination in performance of asset classes across the early/mid/late/recess phases 1070. For example, indicators employed for the discrimination testing may include, but not limited to random monthly difference, hit rate, average relative difference, and/or the like, 1070b. In one implementation, the SPC may compare the difference of asset class performance in the four difference economic cycle phases. Exemplary discrimination testing procedures may include, but not limited to paired comparison, due-trio testing, triangle testing, ABX testing, duo-trio in constant reference models, and/or the like. For example, the discrimination testing may illustrate the major contributor for portfolio performance, e.g., 30% of the total return may come from equities asset class in the early cycle, etc.

In one implementation, the SPC may optimize the portfolio constituents with based on predefined portfolio constraints, e.g., the SPC may double the weights of equities in the early cycle as equities perform better at such phase of the economy, etc. 1071a. For example, the SPC may adopt different objectives when determining weights of different asset classes, such as but not limited to minimizing asset turnover, minimizing potential volatility, maximizing average returns, etc., 1071b. Additionally, the SPC may have additional constraints for asset class weighting, e.g., a max-min approach that requiring no asset class holds more than 20% of the entire portfolio, etc.

In one implementation, the SPC may rebalance the portfolio based on the generated constituent weights 1072, based on the weights determined at 1071a. In one implementation, the SPC may periodically 1073 update the portfolio.

FIGS. 11A-11B provide exemplary combined data and logic flow diagrams illustrating SPC regression engine providing the probit model to "dating" a current business/economic cycle phase (e.g., to determine a probability that the current cycle is within a particular business cycle phase, etc.) within embodiments of the SPC. In one implementation, the SPC may obtain input economic factors 1102, such as, but not limited to diffusion index, GDP, sales and inventories, profits, credits, unemployment rate, and/or the like.

In one implementation, different economic phase may have different characteristics associated with the data factors 1107. For example, during recession 1110a, the SPC may employ factors such as, but not limited to diffusion index—recessionary indicators (e.g. consumer expectation on business and economic conditions, average workweek for manufacturing production workers, residential building permits, etc.), domestic economic activity (e.g. GDP), inventory cycle (e.g. new orders vs. inventories), profit cycle (e.g. productivity growth), credit cycle (e.g. leading credit index), and/or the like. During early cycle 1110b, the SPC may employ factors such as, but not limited to diffusion index—early cycle indicators (e.g. productivity growth, initial jobless claims, etc.), domestic activity (e.g. state activity diffusion index), inventory cycle (e.g. inventory-to-sales ratio), profit cycle (e.g. cyclical productivity index), credit cycle (e.g. tightening of commercial & industrial loan standards), and/or the like. During mid cycle 1110c, the SPC may employ factors such as, but not limited to diffusion index—mid cycle indicators (e.g. ISM manufacturing PMI, national activity index, etc.), domestic activity (e.g. industrial production), inventory cycle (e.g. manufacturing & trade sales and inventories), labor markets (e.g. personal incomes, payroll growth), credit cycle (e.g. financial stress index), and/or the like. For late cycle 1110d, the SPC may employ factors such as, but not limited to diffusion index—late cycle indicators (e.g. labor market differential, composite leading index, etc.), domestic activity (e.g. transportation industrial production), inventory cycle (e.g. inventory-to-shipment ratio), profit cycle (e.g. corporate profit growth), credit cycle (e.g. slope of yield curve), and/or the like.

In one implementation, the SPC may invoke a probit regression structure 1105a employing the input economic factors 1102 to generate coefficients 906 for the factors 1107. In one implementation, the SPC may generate normalized values as outputs 1108 of the probit regression structure, e.g., representing a probability of the recession phase 1110a, early cycle 1110b, mid cycle 1110c, and/or late cycle 1110d.

With reference to FIG. 11B, the SPC may obtain historical data 1111, including but not limited to the economic data factors 1102 and the corresponding cycle phase, and/or the like. Different economic/business cycle phases may have different representative economic factors, and SPC may determine a group of impactful economic factors for each phase. For each factor and/or each cycle phase 1112, the SPC may determine whether the particular cycle phase has a factor as a determining factor 1113, and may then collect all determining factors for the cycle phase 1115. In one implementation, the SPC may determine overlapped factors with a particular phase and eliminate the overlapped factor 1116. The SPC may then store the factor as a determining factor for the particular cycle phase 1117.

In one implementation, the SPC may instantiate a binary probit structure to obtain coefficients for regressors and obtain import current values of the factors into the structure to obtain a statistical measure (e.g., a probability that current business cycle phase is the particular cycle phase, etc.) for the factor 1118.

For example, in one implementation, exemplary binary probit regression results employing various economic indicators as variables e.g., 1107, and determining a probability that the current economic/business cycle phase is in an early cycle, may be provided as the following:

Dependent Variable: EARLY
Method: ML-Binary Probit (Quadratic hill climbing)
Time: 18:20
Sample (adjusted): 1957M03 2013M06
Included observations: 676 after adjustments
Convergence achieved after 4 iterations
QML (Huber/White) standard errors & covariance

| Variable | Coefficient | Std. Error | z-Statistic | Prob. |
|---|---|---|---|---|
| C | −1.529695 | 0.081831 | −18.69324 | 0.0000 |
| US_DFI_EARLY(−2) | 0.040949 | 0.003214 | 12.73944 | 0.0000 |

| | | | |
|---|---|---|---|
| McFadden R-squared | 0.388657 | Mean dependent var | 0.213018 |
| S.D. dependent var | 0.409743 | S.E. of regression | 0.306071 |
| Akaike info criterion | 0.639180 | Sum squared resid | 63.14015 |
| Schwarz criterion | 0.652542 | Log likelihood | −214.0429 |
| Hannan-Quinn criter. | 0.644353 | Deviance | 428.0858 |
| Restr. deviance | 700.2381 | Restr. log likelihood | −350.1191 |
| LR statistic | 272.1524 | Avg. log likelihood | −0.316631 |
| Prob(LR statistic) | 0.000000 | | |

| | | | |
|---|---|---|---|
| Obs with Dep = 0 | 532 | Total obs | 676 |
| Obs with Dep = 1 | 144 | | |

Dependent Variable: EARLY
Method: ML-Binary Probit (Quadratic hill climbing)
Time: 18:20
Sample (adjusted): 1965M08 2013M06
Included observations: 575 after adjustments
Convergence achieved after 4 iterations
QML (Huber/White) standard errors & covariance

| Variable | Coefficient | Std. Error | z-Statistic | Prob. |
|---|---|---|---|---|
| C | −1.014572 | 0.078233 | −12.96852 | 0.0000 |
| US_CYCPROD(−1) | 24.71008 | 2.665952 | 9.268762 | 0.0000 |

| | | | |
|---|---|---|---|
| McFadden R-squared | 0.291978 | Mean dependent var | 0.201739 |
| S.D. dependent var | 0.401648 | S.E. of regression | 0.318868 |
| Akaike info criterion | 0.718949 | Sum squared resid | 58.26094 |
| Schwarz criterion | 0.734094 | Log likelihood | −204.6978 |
| Hannan-Quinn criter. | 0.724856 | Deviance | 409.3955 |
| Restr. deviance | 578.2245 | Restr. log likelihood | −289.1123 |
| LR statistic | 168.8290 | Avg. log likelihood | −0.355996 |
| Prob(LR statistic) | 0.000000 | | |

| | | | |
|---|---|---|---|
| Obs with Dep = 0 | 459 | Total obs | 575 |
| Obs with Dep = 1 | 116 | | |

Dependent Variable: EARLY
Method: ML-Binary Probit (Quadratic hill climbing)
Time: 18:20
Sample (adjusted): 1967M03 2013M06
Included observations: 494 after adjustments
Convergence achieved after 4 iterations
QML (Huber/White) standard errors & covariance

| Variable | Coefficient | Std. Error | z-Statistic | Prob. |
|---|---|---|---|---|
| C | −2.254278 | 0.155594 | −14.48816 | 0.0000 |
| US_CONSRATIO(−1) | 0.987687 | 0.105585 | 9.354385 | 0.0000 |

| | | | |
|---|---|---|---|
| McFadden R-squared | 0.283253 | Mean dependent var | 0.204453 |
| S.D. dependent var | 0.403710 | S.E. of regression | 0.337233 |
| Akaike info criterion | 0.734183 | Sum squared resid | 55.95314 |
| Schwarz criterion | 0.751197 | Log likelihood | −179.3432 |
| Hannan-Quinn criter. | 0.740863 | Deviance | 358.6864 |
| Restr. deviance | 500.4364 | Restr. log likelihood | −250.2182 |
| LR statistic | 141.7500 | Avg. log likelihood | −0.363043 |
| Prob(LR statistic) | 0.000000 | | |

| | | | |
|---|---|---|---|
| Obs with Dep = 0 | 393 | Total obs | 494 |
| Obs with Dep = 1 | 101 | | |

-continued

Dependent Variable: EARLY
Method: ML-Binary Probit (Quadratic hill climbing)
Time: 18:20
Sample (adjusted): 1968M06 2013M06
Included observations: 541 after adjustments
Convergence achieved after 5 iterations
QML (Huber/White) standard errors & covariance

| Variable | Coefficient | Std. Error | z-Statistic | Prob. |
|---|---|---|---|---|
| C | −2.189391 | 0.182681 | −11.98476 | 0.0000 |
| BOFGX(−1) | 0.033204 | 0.003540 | 9.379791 | 0.0000 |

| | | | |
|---|---|---|---|
| McFadden R-squared | 0.247576 | Mean dependent var | 0.214418 |
| S.D. dependent var | 0.410798 | S.E. of regression | 0.353472 |
| Akaike info criterion | 0.789540 | Sum squared resid | 67.34417 |
| Schwarz criterion | 0.805413 | Log likelihood | −211.5707 |
| Hannan-Quinn criter. | 0.795747 | Deviance | 423.1413 |
| Restr. deviance | 562.3709 | Restr. log likelihood | −281.1855 |
| LR statistic | 139.2296 | Avg. log likelihood | −0.391073 |
| Prob(LR statistic) | 0.000000 | | |

| | | | |
|---|---|---|---|
| Obs with Dep = 0 | 425 | Total obs | 541 |
| Obs with Dep = 1 | 116 | | |

In one implementation, upon obtaining the coefficients, the SPC may obtain the current values of the determining factors in the regression model 1119, and import the data values into a probit structure to calculate a normalized value (e.g., a probability value, etc.) 1121. Such normalized value may be obtained as a probability that the current cycle phase is associated with the particular cycle phase 1128.

In one implementation, the SPC may determine whether the four cycle phases have been iterated 1133, and may then repeat 1113-1128 for every cycle phase, e.g., early, mid, late and recession, so that the SPC may obtain a probability of each cycle phase for the current cycle phase.

FIG. 11C provides an example logic flow diagram illustrating generating an optimal portfolio for a cycle phase (e.g., 905) within embodiments of the SPC. Within implementations, the SPC may launch an optimizer 1130, which may incorporate historical data such as, but not limited to benchmark 1131a, available asset list 1131b, quadratic penalty (e.g., penalty functions, etc.) 1131c, portfolio constraints 1131d (e.g., user preferences on one or more asset classes, etc.), asset constraints 1131e (e.g., user preferences on a maximum/minimum weight of an asset class, etc.), and/or the like.

In one implementation, the optimizer 1130 may employ a normalized expected asset return (e.g., per cycle phase, early, mid, late or recession) objective 1132, and the optimizer 1130 may in turn maximize the return while minimizing a risk 1133 to generate optimal asset weights for an expected portfolio (e.g., per cycle phase, early, mid, late and recession).

FIGS. 12A-12G provide exemplary data analytics charts illustrating various economic indicators within embodiments of the SPC. Within embodiments, FIG. 12A provides an illustration of four different business cycle phases as discussed in FIG. 1B.

FIG. 12B illustrates industrial production to proxy current activity, wherein the transition from early to contraction occurs as production first increases at an increasing then decreasing rate, and subsequently decreases at a decreasing then increasing rate.

FIG. 12C illustrates corporate profits growth, which capture important information about demand and production and changes in margins. The early phase is dated when profits rebound sharply due to dramatic margin expansion as sales pick up and capacity remains lean. The mid cycle sees stable margins and profit growth, while late cycle sees margins and profits coming under pressure.

FIG. 12D illustrates credit growth, wherein the extension of credit may be important to both households and business, underpinning their ability to consume and invest. In one implementation, in the early cycle, banks may become less tight after strict credit rationing in the recession; the mid cycle sees banks on net easing lending conditions, spurring borrowing and spending; and during the late cycle, the economy overheats and banks once again may restrain credit by tightening standards.

FIG. 12E illustrates employment growth, wherein jobs drive household incomes and consumption, the latter comprising the largest share of the U.S. economy. In one implementation, initial claims as a timely indicator of the labor market, unaffected by the level of participation which can distort the unemployment rate. The early cycle occurs when claims fall sharply from the peak in the later part of the recession, as businesses cease massive retrenchment. In mid cycle, claims follow a gradual downward trajectory, which may nevertheless be interrupted by short-lived upticks. Claims bottom in late cycle, before making a decided leg-up into the next contraction FIG. 12F illustrates inventory cycle. In one implementation, inventories, like profits, reveal much about demand and production. We look at durable goods to better gauge cyclical fluctuations, and date the early cycle when the inventory-to-sales ratio falls steeply. For example, The ISR drifts lower in mid cycle even as both sales and inventories grow. The ISR may begin to climb in late cycle, as sales wane but producers are slow to react so inventories accumulate unintentionally.

FIG. 12G illustrates policy change cycle. For example, as shown in FIG. 12G, since the Great Depression, activist monetary policy has been a constant feature of the macreconomy, whereby authorities may react to past, current or forecast developments in the economic environment. In one implementation, the Fed Funds rate deflated with core PCE inflation may be employed to determine the policy stance—assuming the Fed follows a real interest rate rule, because it is the expected path of the real rate that affects economic decisions.

In one implementation, the early cycle may be typical when the target policy rate is slashed and real rates are negative to provide stimulus to the economy. In the mid cycle, policy may be more steady, remaining stimulatory (or is beginning to normalize) and real rates are around their average levels. In late cycle, policy is tight and real rates are restrictive. Often the Fed begins to cut rates heading into a recession, but may be too late to avert it.

FIGS. 13A-13G provide exemplary data analytics charts illustrating economic indicators of mid-cycle within embodiments of the SPC. In one implementation, the SPC may identify, retrospectively, the three expansion phases of a typical U.S. business cycle as early, mid and late, using a set of censoring rules on five indicators that reflect the fundamental cyclical dynamics Economic indicators to analyze the economic/business cycle may include, but not limited to corporate profits, credit, employment, inventories, and monetary policy (e.g., see FIG. 12A). In one implementation, the SPC may build quantitative models to determine the likelihood of being in each phase at a particular point in time. While these business cycle models are designed to give a reading on the current state of the economy, in contrast to the recession probability model which has a short lead of three months, studies show that there is a high degree of persistence in the underlying economic cycle so that today's state contains a lot of information about the course of the economy in the future.

With reference to FIG. 13A, as the economy may spend most of its time in the mid cycle, where the strength of the expansion gains traction and is widespread. Production may grow at a steady pace, supported by solid demand, and the economy is consistently adding jobs. The monetary policy stance is also accommodative. So the choice of mid-cycle indicators captures broad-based improvement as well as stability in overall macroeconomic conditions, across sectors and markets, at the national and regional levels. In one implementation, the broad sweep of available indicators may point to a high probability of the U.S. being in mid cycle (e.g., see FIG. 13A).

In one implementation, a typical feature of the mid cycle is easing lending conditions which underpin steady credit growth, e.g., see FIG. 13B. When credit flows, the economy usually grows. The Fed's Senior Loan Officer Survey suggests that banks are on net still easing—though not as aggressively as they do in early cycle—which is generally consistent with the economy being in a state of expansion.

In another implementation, FIG. 13C shows indicators of state-level activity suggest that improvement is widespread geographically, with the majority of states seeing gains over a 3-month period in employment, production and real earnings. This may be typical of an economic expansion that is fairly entrenched. Looking ahead, localised weakness may become evident in areas adversely affected by drought conditions.

As shown in FIG. 13D, there have also been generally more strengths than weaknesses across the different parts of the economy since the beginning of the year, particularly in housing and to a lesser extent employment (e.g., see FIG. 13D).

As shown in FIGS. 13E-F, some forward-looking indicators may have softened, especially in the industrial sector (e.g., FIGS. 13E-F).

With reference to FIG. 13G, a large part of the current soft-patch is undoubtedly related to policy uncertainty, already high relative to history, and likely to intensify. When the second half of the year unfolds and lack of clarity persists on the fiscal cliff, households and businesses may increasingly behave with caution, affecting their spending, investment and hiring decisions. So while the deterioration in macro indicators is not at odds with previous mid-cycle slowdowns, the extreme policy risks, the subdued global outlook, and fragile sentiment raises the risks of a significantly worse outcome for the final months of the year.

FIGS. 14A-14D provide exemplary data analytics charts illustrating economic indicators of late-cycle within embodiments of the SPC. With reference to FIG. 14A, The late cycle is usually the most difficult phase to model, as it tends to occur because of an exogenous shock, or the gradual building up of pressures from capacity constraints, policy tightening, asset bubbles, and other imbalances. The probability of the U.S. entering the late cycle has ticked up in recent months is provided in FIG. 14A.

As shown in FIG. 14B, momentum across a broad range of data may appear to have eased recently. For example, the Chicago Fed National Index—which captures indicators from production and income, to consumption and housing—may point to some loss in momentum (e.g., see FIG. 14B).

In one implementation, the current slowdown is on a similar scale to that which occurred in the middle of 2011, but the downside risks have mounted. In addition to domestic policy risks there are external risks from an escalation of the ongoing European crisis and a further weakening of the Chinese economy. In one implementation, it is likely that the softness in activity, including the declines in new orders, is a symptom of precautionary behavior as a result of heightened uncertainty over the near-term domestic and global outlook.

Returning to the fundamental dynamics of a mid cycle, overall inventory levels remain well contained. And initial unemployment claims seems to have resumed a downward trend (FIGS. 14C-D). Lending and monetary conditions may also remain supportive (FIG. 13F).

With reference to FIG. 15A, the quantitative and qualitative analysis may suggest that the U.S. economy is not yet in late cycle, but may be on the cusp. Reflecting this, our measure of 'cyclical productivity'—the ratio of the Leading Economic Indicator to aggregate weekly hours worked—appears to have plateaued (e.g., see FIG. 15A). This has tended to precede the late cycle because when firms cannot extract further productivity gains to increase production, they need to hire more workers. This eventually puts upward pressures on wages and underlying inflation—one of the defining characteristics of late cycle.

FIGS. 15B-15E provide exemplary historical data analytics charts illustrating economic indicators of early-cycle within embodiments of the SPC. With reference to FIG. 15B, the early phase of the recovery out of recession is one of the shortest phases of the business cycle, and tends to occur when policy stimulus kicks in and pent up demand boils over. It appears that the early phase of the current cycle began in the first months of 2009 and ended in mid-2010 (e.g., see FIG. 15B).

With reference to FIG. 15C, corporate profits may show the back of sharp margin expansion as sales picked up pace and production operations remained lean (e.g., see FIG. 15C). This period of soaring profits had ended by mid 2010 when firms began to hire again to add to capacity With reference to FIG. 15D, Our measure of 'cyclical productivity' corroborates this story (Chart 13). It too rebounded in early 2009, as leading indicators—including financial and manufacturing indicators—strengthened while the number of workers and their hours remained at low levels. By mid 2010, the recovery had steadied, and the labor market began its long process of recovery With reference to FIG. 15E, one sector that has the potential to give rise to some early-cycle dynamics is housing, where construction and sales have shown further signs of recovery (e.g., FIG. 15E). Since the 1970s, a housing recovery has signaled the beginning of most early-cycle periods. At the current juncture, it could offset some of the drag from other parts of the economy.

FIGS. 16-23 provide exemplary cycle scenario data analytics charts illustrating economic indicators and cycle scenarios within embodiments of the DASS. FIGS. 16 and 17 cyclical exposure and sector variations of volatility that may be enhanced by DASS. FIG. 18 shoes scenarios with mid, late and recession scenarios that the DASS portfolios that DASS highlights performance metrics for holdings. FIG. 19 shows allocations 1901 and both historical 1904 and future 1905 cycle sector phases determined by DASS. FIG. 20 shows equity sleeve breakdowns and weights for DASS analysis. FIG. 21 shows determined portfolio performance over cycles 2101 and frameworks for DASS 2002. FIG. 22 shows cycle time horizons for DASS. FIG. 23 shows cycle horizons and sector performance by weights for DASS.

DASS Controller

FIG. 24 shows a block diagram illustrating embodiments of a DASS controller. In this embodiment, the DASS controller 2401 may serve to aggregate, process, store, search, serve, identify, instruct, generate, match, and/or facilitate interactions with a computer through asset information technology technologies, and/or other related data.

Typically, users, which may be people and/or other systems, may engage information technology systems (e.g., computers) to facilitate information processing. In turn, computers employ processors to process information; such processors 2403 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2429 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the DASS controller 2401 may be connected to and/or communicate with entities such as, but not limited to: one or more users from peripheral devices 2412 (e.g., user input devices 2411); an optional cryptographic processor device 2428; and/or a communications network 2413.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The DASS controller 2401 may be based on computer systems that may comprise, but are not limited to, components such as: a computer systemization 2402 connected to memory 2429.

Computer Systemization

A computer systemization 2402 may comprise a clock 2430, central processing unit ("CPU(s)" and/or "processor(s)" (these terms are used interchangeable throughout the disclosure unless noted to the contrary)) 2403, a memory 2429 (e.g., a read only memory (ROM) 2406, a random access memory (RAM) 2405, etc.), and/or an interface bus 2407, and most frequently, although not necessarily, are all interconnected and/or communicating through a system bus 2404 on one or more (mother)board(s) 2402 having conductive and/or otherwise transportive circuit pathways through which instructions (e.g., binary encoded signals) may travel to effectuate communications, operations, storage, etc. The computer systemization may be connected to a power source 2486; e.g., optionally the power source may be internal. Optionally, a cryptographic processor 2426 may be connected to the system bus. In another embodiment, the cryptographic processor, transceivers (e.g., ICs) 2474, and/or sensor array (e.g., accelerometer, altimeter, ambient light, barometer, global positioning system (GPS) (thereby allowing DASS controller to determine its location), gyroscope, magnetometer, pedometer, proximity, ultra-violet sensor, etc.) 2473 may be connected as either internal and/or external peripheral devices 2412 via the interface bus I/O 2408 (not pictured) and/or directly via the interface bus 2407. In turn, the transceivers may be connected to antenna(s) 2475, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2429 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the DASS controller and beyond through various interfaces. Should processing requirements dictate a greater amount speed and/or capacity, distributed processors (e.g., see Distributed DASS below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the DASS may be achieved by implementing a microcontroller such as CAST's R8051XC2 microcontroller; Intel's MCS 51 (i.e., 8051 microcontroller); and/or the like. Also, to implement certain features of the DASS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the DASS component collection (distributed or otherwise) and/or features may be implemented via the microprocessor and/or via embedded components; e.g., via ASIC, coprocessor, DSP, FPGA, and/or the like. Alternately, some implementations of the DASS may be implemented with embedded components that are configured and used to achieve a variety of features or signal processing.

Depending on the particular implementation, the embedded components may include software solutions, hardware solutions, and/or some combination of both hardware/software solutions. For example, DASS features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the DASS features. A hierarchy of programmable interconnects allow logic blocks to be interconnected as needed by the DASS system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the DASS may be developed on regular FPGAs and then migrated into a fixed version that more resembles ASIC implementations. Alternate or coordinating implementations may migrate DASS controller features to a final ASIC instead of or in addition to FPGAs. Depending on the implementation all of the aforementioned embedded components and microprocessors may be considered the "CPU" and/or "processor" for the DASS.

Power Source

The power source 2486 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2486 is connected to at least one of the interconnected subsequent components of the DASS thereby providing an electric current to all subsequent components. In one example, the power source 2486 is connected to the system bus component 2404. In an alternative embodiment, an outside power source 2486 is provided through a connection across the I/O 2408 interface. For example, a USB and/or IEEE 1394 connection carries both data and power across the connection and is therefore a suitable source of power.

Interface Adapters

Interface bus(ses) 2407 may accept, connect, and/or communicate to a number of interface adapters, conventionally although not necessarily in the form of adapter cards, such as but not limited to: input output interfaces (I/O) 2408, storage interfaces 2409, network interfaces 2410, and/or the like. Optionally, cryptographic processor interfaces 2427 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X), PCI Express, Personal Computer Memory Card International Association (PCMCIA), and/or the like.

Storage interfaces 2409 may accept, communicate, and/or connect to a number of storage devices such as, but not limited to: storage devices 2414, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2410 may accept, communicate, and/or connect to a communications network 2413. Through a communications network 2413, the DASS controller is accessible through remote clients 2433b (e.g., computers with web browsers) by users 2433a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed DASS below), architectures may similarly be employed to pool, load balance, and/or otherwise decrease/increase the communicative bandwidth required by the DASS controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2410 may be used to engage with various communications network types 2413. For example, multiple network interfaces may be employed to allow for the communication over broadcast, multicast, and/or unicast networks.

Input Output interfaces (I/O) 2408 may accept, communicate, and/or connect to user, peripheral devices 2412 (e.g., input devices 2411), cryptographic processor devices 2428, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) display port, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2412 may be connected and/or communicate to I/O and/or other facilities of the like such as network interfaces, storage interfaces, directly to the interface bus, system bus, the CPU, and/or the like. Peripheral devices may be external, internal and/or part of the DASS controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2411 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the DASS controller may be embodied as an embedded, dedicated, and/or monitor-less (i.e., headless) device, wherein access would be provided over a network interface connection.

Cryptographic units such as, but not limited to, microcontrollers, processors 2426, interfaces 2427, and/or devices 2428 may be attached, and/or communicate with the DASS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 2429. However, memory is a fungible technology and resource, thus, any number of memory embodiments may be employed in lieu of or in concert with one another. It is to be understood that the DASS controller and/or a computer systemization may employ various forms of memory 2429. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2429 will include ROM 2406, RAM 2405, and a storage device 2414. A storage device 2414 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2429 may contain a collection of program and/or database components and/or data such as, but not limited to: operating system component(s) 2415 (operating system); information server component(s) 2416 (information server); user interface component(s) 2417 (user interface); Web browser component(s) 2418 (Web browser); database(s) 2419; mail server component(s) 2421; mail client component(s) 2422; cryptographic server component(s) 2420 (cryptographic server); the DASS component(s) 2435; and/or the like (i.e., collectively a component collection). These components may be stored and accessed from the storage devices and/or from storage devices accessible through an interface bus. Although non-conventional program components such as those in the component collection, typically, are stored in a local storage device 2414, they may also be loaded and/or stored in memory such as: peripheral devices, RAM, remote storage facilities through a communications network, ROM, various forms of memory, and/or the like.

Operating System

The operating system component 2415 is an executable program component facilitating the operation of the DASS controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the DASS controller to communicate with other entities through a communications network 2413. Various communication protocols may be used by the DASS controller as a subcarrier transport mechanism for interaction, such as, but not limited to: multicast, TCP/IP, UDP, unicast, and/or the like.

Information Server

An information server component 2416 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS); Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the DASS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the DASS database 2419, operating systems, other program components, user interfaces, Web browsers, and/or the like.

Access to the DASS database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the DASS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the DASS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2417 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2418 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the DASS enabled nodes. The combined application may be nugatory on systems employing standard Web browsers.

Mail Server

A mail server component 2421 is a stored program component that is executed by a CPU 2403. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POPS), simple mail transfer protocol (SMTP), and/or the like. The mail server can route, forward, and process incoming and outgoing mail messages that have been sent, relayed and/or otherwise traversing through and/or to the DASS. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the DASS mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2422 is a stored program component that is executed by a CPU 2403. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POPS, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2420 is a stored program component that is executed by a CPU 2403, cryptographic processor 2426, cryptographic processor interface 2427, cryptographic processor device 2428, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the DASS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the DASS component to engage in secure transactions if so desired. The cryptographic component facilitates the secure accessing of resources on the DASS and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The DASS Database

The DASS database component 2419 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the DASS database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the DASS database is implemented as a data-structure, the use of the DASS database 2419 may be integrated into another component such as the DASS component 2435. Also, the database may be implemented as a mix of data structures, objects, and relational structures. Databases may be consolidated and/or distributed in countless variations (e.g., see Distributed DASS below). Portions of databases, e.g., tables, may be exported and/or imported and thus decentralized and/or integrated.

In one embodiment, the database component 2419 includes several tables 2419*a-z*:

An accounts table 2419*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), account CreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2419*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a DASS);

An devices table 2419*c* includes fields such as, but not limited to: deviceID, sensorIDs, accountID, as setIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppinstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/enus/specification/adopted-specifications, and/or other device specifications, and/or the like;

An apps table 2419*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2419*e* includes fields such as, but not limited to: assetID, accountID, userID, distributorAccountID, distributorPaymentID, distributorOwnerID, as setOwnerID, as setType, as setSourceDeviceID, as setSourceDeviceType, as setSourceDeviceName, as setSourceDistributionChannelID, assetSourceDistributionChannelType, as setSourceDistributionChannelName, assetTargetChannelID, as setTargetChannelType, as setTargetChannelName, as setName, as setSeriesName, as setSeries Season, assetSeriesEpisode, assetCode, assetQuantity, assetCost, assetPrice, assetValue, as setManufactuer, as setModelNo, as setSerialNo, as setLocation, as setAddress, as setState, assetZIPcode, assetState, assetCountry, assetEmail, assetIPaddress, assetURLaccessCode, as setOwnerAccountID, subscriptionIDs, as setAuthroizationCode, as setAccessPrivileges, as setPreferences, as setRestrictions, assetAPI, assetAPIconnectionAddress, and/or the like;

A payments table 2419*f* includes fields such as, but not limited to: paymentID, accountID, userID, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, payment Country, paymentEmail, paymentAuthKey, paymentIPaddress, paymentURLaccessCode, paymentPortNo, paymentAccessPrivileges, paymentPreferences, payementRestrictions, and/or the like;

An transactions table 2419*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccess Privileges, transactionPreferences, transactionRestrictions, merchantAuthKey, merchantAuthCode, and/or the like;

An index table 2419*h* includes fields such as, but not limited to: indexID, dataProviderID, dataProviderName, indexType, indexPercentile, indexDetail, indexCorrelation, indexValue, indexName, indexTimestamp, assetID, portfolioID, weightsID, macroID, accountID, and/or the like;

An data_provider table 2419*i* includes fields such as, but not limited to: dataProviderID, dataProviderName, dataProviderType, providerDataType, providerindexType, providerServerIP, providerServerID, providerURL, indexID, assetID, portfolioID, weightsID, macroID, accountID, and/or the like;

An target table 2419*j* includes fields such as, but not limited to: targetID, portfolioID, userID, accountID, assetID, portfolioName, targetName, target return, targetYield, targetDuration, targetVolatility, and/or the like;

An portfolio table 2419*k* includes fields such as, but not limited to: portfolioID, portfolioName, userID, accountID, assetID, transactionID, marketID, dataProviderID, portfolioConstituentType, portfolioBenchmark, portfolioStartDate, portfolioEndDate, portfolioAssumption, portfolioTarget, portfolioAlert, portfolioConstraints, portfolioAallocation, portfolioReturn, portfolioAllocationWeights, weightsID, portfolioRebalance, portfolioActualReturn, and/or the like;

An performance table 2419*l* includes fields such as, but not limited to: performanceID, performanceType, performanceMetricName, userID, accountID, transactionID, portfolioID, weightsID, portfolioAllocationWeights, portfolioYield, portfolioReturn, and/or the like;

An weights table 2419*m* includes fields such as, but not limited to: weightsID, portfolioID, indexID, targetID, dataProviderID, userID, accountID, USTreasuryWeight, USCorplgWeight, USHighYield, emBondsWeight, globalAggWeight, and/or the like;

An graphs table 2419*n* includes fields such as, but not limited to: graphID, userID, accountID, portfolioID, portfolioWeights, portfolioReturns, portfolioYield, templateID, templateName, chartType, chartName, targetID, transactionID, marketDataFeedID, indexID, and/or the like;

A macro table 24190 may include fields such as, but not limited to: macroID, userID, accountID, transactionID, macro_type, macro_name, macro_timestamp, macro_value, macro_unit, and/or the like.

A regression_models table 2419*p* may include fields such as, but not limited to: modelID, macroID, userID, accountID, transactionID, model_name, model_type, model_objective, model_input, model_output, model_structure, model_parameters, model_index, model_cycle_id, model_variables, and/or the like.

A Funds table 2419*q* may include fields such as, but not limited to: fundsID, assetID, portfolioID, userID, accountID, fund_name, fund_etf, fund_type, fund_sector, fund_history, fund_performance, fund_min_investment, fund_return, fund_objective, and/or the like.

An economic_indicator table 2419*r* may include fields such as, but not limited to: econDataID, market_data_feed_ID, assetID, transactionID, userID, accountID, econ_data_type, econ_data_name, econ_data_timestamp, econ_data_value, econ_data_unit, econ_and/or the like.

A trading_log table 2419*s* may include fields such as, but not limited to: log_id, userID, accountID, transactionID, assetID, portfolioID, market_data_feed_ID, log_timestamp, log_instrument_id, log_portfolio_id, log_amount, log_exchange_id, log_quantity, and/or the like. A Performance table 919*i* may include fields such as, but not limited to: start_date, end_date, portfolio_id, return, sector_return, GDP, unemployment, inflation, what_if return, index_return, and/or the like.

A Cycle Phase table 2419*t* may include fields such as, but not limited to: cycleID, userID, accountID, fundsID, econDataID, logID, tcycle_name, cycle_phase_name, cycle_funds, cycle_GDP, cycle_unemployment, cycle_benchmark, cycle_target_weight, cycle_etf, cycle_inflation, cycle_pe, and/or the like.

A market_data table 2419*z* includes fields such as, but not limited to: market_data_feed_ID, econDataID, transactionID, asset_ID, asset_symbol, asset_name, spot_price, bid_price, ask_price, and/or the like; in one embodiment, the market data table is populated through a market data feed (e.g., Bloomberg's PhatPipe, Consolidated Quote System (CQS), Consolidated Tape Association (CTA), Consolidated Tape System (CTS), Dun & Bradstreet, OTC Montage Data Feed (OMDF), Reuter's Tib, Triarch, US equity trade and quote market data, Unlisted Trading Privileges (UTP) Trade Data Feed (UTDF), UTP Quotation Data Feed (UQDF), and/or the like feeds, e.g., via ITC 2.1 and/or respective feed protocols), for example, through Microsoft's Active Template Library and Dealing Object Technology's real-time toolkit Rtt.Multi.

In one embodiment, the DASS database may interact with other database systems. For example, employing a distributed database system, queries and data access by search DASS component may treat the combination of the DASS database, an integrated data security layer database as a single database entity (e.g., see Distributed DASS below).

In one embodiment, user programs may contain various user interface primitives, which may serve to update the DASS. Also, various accounts may require custom database tables depending upon the environments and the types of clients the DASS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2419*a-z*. The DASS may be configured to keep track of various settings, inputs, and parameters via database controllers.

The DASS database may communicate to and/or with other components in a component collection, including itself, and/or facilities of the like. Most frequently, the DASS database communicates with the DASS component, other program components, and/or the like. The database may contain, retain, and provide information regarding other nodes and data.

The DASSs

The DASS component 2435 is a stored program component that is executed by a CPU. In one embodiment, the DASS component incorporates any and/or all combinations of the aspects of the DASS that was discussed in the previous figures. As such, the DASS affects accessing, obtaining and the provision of information, services, transactions, and/or the like across various communications networks. The features and embodiments of the DASS discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the DASS's features and facilities, and in many cases reduce the costs, energy consumption/requirements, and extend the life of DASS's underlying infrastructure; this has the added benefit of making the DASS more reliable. Similarly, many of the features and mechanisms are designed to be easier for users to use and access, thereby broadening the audience that may enjoy/employ and exploit the feature sets of the DASS; such ease of use also helps to increase the reliability of the DASS. In addition, the feature sets include heightened security as noted via the Cryptographic components 2420, 2426, 2428 and throughout, making access to the features and data more reliable and secure The DASS transforms market assumptions, constraints, portfolio construction/adjustment requests inputs, via DASS components (e.g., DPST 1635a (index data collector, index process, portfolio cmpst. calc., widget cstm., dynamic portfolio sim., dynamic UI), SPC 1635b (prob. per phase generator, regression engine, econ. data collector, portfolio cnstrct., cycle dating, portfolio exec.)), into asset allocation record, portfolio allocation and graphic presentation, seasonal portfolio investment transaction records outputs.

The DASS component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the DASS server employs a cryptographic server to encrypt and decrypt communications. The DASS component may communicate to and/or with other components in a component collection, including itself, and/or facilities of the like. Most frequently, the DASS component communicates with the DASS database, operating systems, other program components, and/or the like. The DASS may contain, communicate, generate, obtain, and/or provide program component, system, user, and/or data communications, requests, and/or responses.

Distributed DASSs

The structure and/or operation of any of the DASS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the DASS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for DASS controller and/or DASS component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the DASS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:
   http://www.xay.com/perl/site/lib/SOAP/Parser.html
   http://publib.boulder.ibm.com/infocenter/tivihelp/v2r1/
      index.jsp?topic=/com.ibm.IBMDI.doc/
      referenceguide295.htm
and other parser implementations:
   http://publib.boulder.ibm.com/infocenter/tivihelp/v2r1/
      index.jsp?topic=/com.ibm.IBMDI.doc/
      referenceguide259.htm
all of which are hereby expressly incorporated by reference.

In order to address various issues and advance the art, the entirety of this application for Dynamic Asset Sector Simulator Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the FIGS. and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a DASS individual and/or enterprise user, database configuration and/or relational model, data type, data transmission and/or network framework, syntax structure, and/or the like, various embodiments of the DASS, may be implemented that enable a great deal of flexibility and customization. For example, aspects of the DASS may be adapted for operation management. While various embodiments and discussions of the DASS have included asset information technology, however, it is to be understood that the embodiments described herein may be readily configured and/or customized for a wide variety of other applications and/or implementations.

What is claimed is:

1. A dynamic range slider user interface configured to be displayed on a computer-based display of a user, wherein the interface is further configured to render portfolio simulations for various investment objectives including sector-based portfolio composition and performance over long and short term sector cycles, the interface comprising: a non-transient processor-readable medium storing processor-executable instructions issuable by a processor to generate the interface on the display, the interface, comprising:
generate a plurality of slider bars, each slider bar having a default slider color with a slider length;
generate for each slider bar a slider value selector knob traversable across the length of the slider bar, wherein the slider value selector knob is selectable and movable by a user;
obtain user collection parameter constraints;
calculate hard minimum and maximum values for a selected collection of equity sectors, the collection comprising a sector-based portfolio composition;
calculate, via a dynamic collection simulator component and seasonal portfolio construction platform component, a soft dynamic minimum and maximum values for each sector of a user selected collection based on the user collection parameter constraints,
wherein the seasonal portfolio construction component calculation, includes instructions to:
obtain economic indicator data by searching a data provider and filtering search results based on the selected collection;
instantiate a regression structure employing an economic indicator, said regression structure indicating a first economic cycle phase;
generate a probabilistic output indicating a probability that a current economic cycle phase belongs to the first economic cycle phase upon the instantiation of the regression structure;
retrieve a first optimal portfolio collection associated with the first economic cycle phase;
apply the probability as a first weight of the first optimal portfolio;
construct an asset portfolio collection based on a weighted first optimal portfolio;
provide, to the dynamic user interface component, the calculated hard minimum and maximum values for each sector of the selected collection and the soft dynamic minimum and maximum values for each sector of the selected collection;
update each of the slider bars with a highlight denoting the calculated soft dynamic minimum and maximum value range for the selected collection;
update each of the slider bars with updated values for the hard minimum and maximum values for the selected collection;
update positioning of the slider value selector knob of each slider bar within the soft dynamic minimum and maximum range;
generate and provide, for each slider bar, a dynamic range slider bar compositing the updated slider bar and slider value selector knob for interaction, wherein the interface comprises a plurality of layout frames on a single display, comprising:
a first frame for user selection of a historical interest rate;
a second frame for user selection for the length of various phases of business cycles based on seasonal shifts in relative equity sector earnings, wherein each phase is associated with a distinct slider bar;
a third frame for user selection of constraints on a sector composition, wherein each sector is associated with a distinct slider bar for selecting the constraints on the value of that sector;
a fourth frame for user selection of characteristics of investment objections including at least yield, return, duration, and volatility, wherein each characteristic is associated with a distinct slider bar, wherein the soft dynamic minimum and maximum values of each characteristic are dynamically adjustable by sliding the value selector knob of one or more of the slider bars associated with the sector constraints; and
a fifth frame for user selection of a percentage for each sector of a portfolio composition mix.

2. The medium of claim 1, wherein the optimal portfolio is any of: a business sector, an asset portfolio, an index, an asset.

3. The medium of claim 1, wherein the selected collection may include any of: a sector, a business sector, an asset collection, a portfolio, search results.

4. The medium of claim 1, wherein the collection parameter constraints may include any of: product characteristics and traits, financial asset characteristics and traits.

5. The medium of claim 4, wherein the characteristics and traits may include any of: cost, price, sale price, ask price, bid price, product feature specification parameters.

6. A dynamic portfolio simulator apparatus configured to display a dynamic range slider user interface on a computer-based display of a user, wherein the interface is further configured to render portfolio simulations for various investment objectives including sector-based portfolio composition and performance over long and short term sector cycles, the apparatus comprising:

a computing processor; and
a memory disposed in communication with the computing processor, and storing computing processor-executable instructions, said processor-executable instructions executable by the computing processor to:
generate a plurality of slider bars, each slider bar having a default slider color with a slider length:
generate for each slider bar a slider value selector knob traversable across the length of the slider bar, wherein the slider value selector knob is selectable and movable by a user;
obtain user collection parameter constraints;
calculate hard minimum and maximum values for a selected collection of equity sectors, the collection comprising a sector-based portfolio composition;
calculate, via a dynamic collection simulator component and seasonal portfolio construction platform component, a soft dynamic minimum and maximum values for each sector of a user selected collection based on the user collection parameter constraints,
wherein the seasonal portfolio construction component calculation, includes instructions to:
obtain economic indicator data by searching a data provider and filtering search results based on the selected collection;
instantiate a regression structure employing an economic indicator, said regression structure indicating a first economic cycle phase:
generate a probabilistic output indicating a probability that a current economic cycle phase belongs to the first economic cycle phase upon the instantiation of the regression structure;
retrieve a first optimal portfolio collection associated with the first economic cycle phase;
apply the probability as a first weight of the first optimal portfolio;
construct an asset portfolio collection based on a weighted first optimal portfolio;
provide, to the dynamic user interface component, the calculated hard minimum and maximum values for each sector of the selected collection and the soft dynamic minimum and maximum values for each sector of the selected collection;
update each of the slider bars with a highlight denoting the calculated soft dynamic minimum and maximum value range for the selected collection;
update each of the slider bars with updated values for the hard minimum and maximum values for the selected collection;
update positioning of the slider value selector knob of each slider bar within the soft dynamic minimum and maximum range;
generate and provide, for each slider bar, a dynamic range slider bar compositing the updated slider bar and slider value selector knob for interaction, wherein the interface comprises a plurality of layout frames on a single display, comprising:
a first frame for user selection of a historical interest rate;
a second frame for user selection for the length of various phases of business cycles based on seasonal shifts in relative equity sector earnings, wherein each phase is associated with a distinct slider bar;
a third frame for user selection of constraints on a sector composition, wherein each sector is associated with a distinct slider bar for selecting the constraints on the value of that sector;
a fourth frame for user selection of characteristics of investment objections including at least yield, return, duration, and volatility, wherein each characteristic is associated with a distinct slider bar, wherein the soft dynamic minimum and maximum values of each characteristic are dynamically adjustable by sliding the value selector knob of one or more of the slider bars associated with the sector constraints; and
a fifth frame for user selection of a percentage for each sector of a portfolio composition mix.

7. The apparatus of claim 6, wherein the optimal portfolio is any of: a business sector, an asset portfolio, an index, an asset.

8. The apparatus of claim 6, wherein the user configured market assumption parameters comprise any of: 10 year ending US treasury yield, time horizon, and interest rate.

9. The apparatus of claim 6, wherein the portfolio parameter configuration widget comprises a sliding bar.

10. The apparatus of claim 6, wherein the portfolio comprises any of: equities, physical assets, fixed income instruments.

11. The apparatus of claim 6, wherein the portfolio parameter configuration widget provides portfolio target characteristics.

12. The apparatus of claim 11, wherein the portfolio target characteristics comprises any of:
target yield, target return, duration, and volatility.

13. The apparatus of claim 6, wherein the portfolio parameters configuration widget provides portfolio constraints.

14. The apparatus of claim 6, wherein the portfolio constraints comprise an allocation range for each fixed income.

15. The apparatus of claim 6, wherein the portfolio composite outputs comprise allocation weights for one or more fixed income instruments.

16. The apparatus of claim 6, wherein the one or more fixed income instruments comprise any of:
US treasury, US Agg, US Corp IG, US High Yield, EM Bonds, and Global Agg.

17. A dynamic portfolio simulator system configured to display a dynamic range slider user interface on a computer-based display of a user, wherein the interface is further configured to render portfolio simulations for various investment objectives including sector-based portfolio composition and performance over long and short term sector cycles, the system comprising:
means to generate a plurality of slider bars, each slider bar having a default slider color with a slider length;
means to generate for each slider bar a slider value selector knob traversable across the length of the slider bar, wherein the slider value selector knob is selectable and movable by a user;
means to obtain user collection parameter constraints;
means to calculate hard minimum and maximum values for a selected collection of equity sectors, the collection comprising a sector-based portfolio composition;
means to calculate, via a dynamic collection simulator component and seasonal portfolio construction platform component, a soft dynamic minimum and maximum values for each sector of a user selected collection based on the user collection parameter constraints,
wherein the seasonal portfolio construction component calculation, includes instructions to:
obtain economic indicator data by searching a data provider and filtering search results based on the selected collection;
instantiate a regression structure employing an economic indicator, said regression structure indicating a first economic cycle phase:
generate a probabilistic output indicating a probability that a current economic cycle phase belongs to the first economic cycle phase upon the instantiation of the regression structure;
retrieve a first optimal portfolio collection associated with the first economic cycle phase;
apply the probability as a first weight of the first optimal portfolio;
construct an asset portfolio collection based on a weighted first optimal portfolio;
means to provide, to the dynamic user interface component, the calculated hard minimum and maximum values for each sector of the selected collection and the soft dynamic minimum and maximum values for each sector of the selected collection;
means to update each of the slider bars with a highlight denoting the calculated soft dynamic minimum and maximum value range for the selected collection;
means to update each of the slider bars with updated values for the hard minimum and maximum values for the selected collection;
means to update positioning of the slider value selector knob of each slider bar within the soft dynamic minimum and maximum range;
means to generate and provide, for each slider bar, a dynamic range slider bar compositing the updated slider bar and slider value selector knob for interaction, wherein the interface comprises a plurality of layout frames on a single display, comprising:
a first frame for user selection of a historical interest rate;
a second frame for user selection for the length of various phases of business cycles based on seasonal shifts in relative equity sector earnings, wherein each phase is associated with a distinct slider bar;
a third frame for user selection of constraints on a sector composition, wherein each sector is associated with a distinct slider bar for selecting the constraints on the value of that sector;
a fourth frame for user selection of characteristics of investment objections including at least yield, return, duration, and volatility, wherein each characteristic is associated with a distinct slider bar, wherein the soft dynamic minimum and maximum values of each characteristic are dynamically adjustable by sliding the value selector knob of one or more of the slider bars associated with the sector constraints; and
a fifth frame for user selection of a percentage for each sector of a portfolio composition mix.

18. A dynamic portfolio simulator processor-implemented method configured to display a dynamic range slider user interface on a computer-based display of a user, wherein the interface is further configured to render portfolio simulations for various investment objectives including sector-based portfolio composition and performance over long and short term sector cycles, the method comprising:

generating a plurality of slider bars, each slider bar having a default slider color with a slider length;
generating for each slider bar a slider value selector knob traversable across the length of the slider bar, wherein the slider value selector knob is selectable and movable by a user;
obtaining user collection parameter constraints;
calculating hard minimum and maximum values for a selected collection of equity sectors, the collection comprising a sector-based portfolio composition;
calculating, via a dynamic collection simulator component and seasonal portfolio construction platform component, a soft dynamic minimum and maximum values for each sector of a user selected collection based on the user collection parameter constraints,
wherein the seasonal portfolio construction component calculation, includes instructions to:
obtain economic indicator data by searching a data provider and filtering search results based on the selected collection;
instantiate a regression structure employing an economic indicator, said regression structure indicating a first economic cycle phase;
generate a probabilistic output indicating a probability that a current economic cycle phase belongs to the first economic cycle phase upon the instantiation of the regression structure;
retrieve a first optimal portfolio collection associated with the first economic cycle phase;
apply the probability as a first weight of the first optimal portfolio;
construct an asset portfolio collection based on a weighted first optimal portfolio;
providing, to the dynamic user interface component, the calculated hard minimum and maximum values for each sector of the selected collection and the soft dynamic minimum and maximum values for each sector of the selected collection;
updating each of the slider bars with a highlight denoting the calculated soft dynamic minimum and maximum value range for the selected collection;
updating each of the slider bars with updated values for the hard minimum and maximum values for the selected collection;
updating positioning of the slider value selector knob of each slider bar within the soft dynamic minimum and maximum range;
generating and providing, for each slider bar, a dynamic range slider bar compositing the updated slider bar and slider value selector knob for interaction, wherein the interface comprises a plurality of layout frames on a single display, comprising:
a first frame for user selection of a historical interest rate;
a second frame for user selection for the length of various phases of business cycles based on seasonal shifts in relative equity sector earnings, wherein each phase is associated with a distinct slider bar;
a third frame for user selection of constraints on a sector composition, wherein each sector is associated with a distinct slider bar for selecting the constraints on the value of that sector;
a fourth frame for user selection of characteristics of investment objections including at least yield, return, duration, and volatility, wherein each characteristic is associated with a distinct slider bar, wherein the soft dynamic minimum and maximum values of each characteristic are dynamically adjustable by sliding the value selector knob of one or more of the slider bars associated with the sector constraints; and a fifth frame for user selection of a percentage for each sector of a portfolio composition mix.

19. The method of claim 18, wherein the optimal portfolio is any of: a business sector, an asset portfolio, an index, an asset.

20. The method of claim 18, wherein the user configured market assumption parameters comprise any of: 10 year ending US treasury yield, time horizon, and interest rate.

21. The method of claim 18, wherein the portfolio parameter configuration widget comprises a sliding bar.

22. The method of claim 18, wherein the portfolio comprises one or more fixed income instruments.

23. The method of claim 18, wherein the portfolio parameter configuration widget provides portfolio target characteristics.

24. The method of claim 22, wherein the portfolio target characteristics comprises any of:

target yield, target return, duration, and volatility.

25. The method of claim 18, wherein the portfolio parameters configuration widget provides portfolio constraints.

26. The method of claim 18, wherein the portfolio constraints comprise an allocation range for each fixed income.

27. The method of claim 18, wherein the portfolio composite outputs comprise allocation weights for one or more fixed income instruments.

28. The method of claim 18, wherein the one or more fixed income instruments comprise any of:

US treasury, US Agg, US Corp IG, US High Yield, EM Bonds, and Global Agg.

\* \* \* \* \*